US012709416B2

(12) United States Patent
Schlak

(10) Patent No.: US 12,709,416 B2

(45) Date of Patent: Aug. 18, 2026

(54) BLADELESS eVTOL PASSENGER AIRCRAFT WITH FIXED-WING FORWARD FLIGHT TRAVEL, AND METHOD AND POWER PLANT THEREFOR

(71) Applicant: Austin Taylor Schlak, Attleboro, MA (US)

(72) Inventor: Daniel Keith Schlak, Alexandria, VA (US)

( * ) Notice: Subject to any disclaimer, the term of this patent is extended or adjusted under 35 U.S.C. 154(b) by 209 days.

(21) Appl. No.: 18/512,680

(22) Filed: Nov. 17, 2023

(65) Prior Publication Data

US 2024/0083603 A1 Mar. 14, 2024

(51) Int. Cl.

| | |
|---|---|
| ***B64D 27/32*** | (2024.01) |
| ***B64C 29/00*** | (2006.01) |
| ***B64U 10/20*** | (2023.01) |
| ***B64U 30/29*** | (2023.01) |
| *B64U 101/61* | (2023.01) |

(52) U.S. Cl.

CPC .......... *B64U 10/20* (2023.01); *B64C 29/0025* (2013.01); *B64D 27/32* (2024.01); *B64U 30/29* (2023.01); *B64U 2101/61* (2023.01)

(58) Field of Classification Search

CPC ............ B64C 29/0016; B64C 29/0025; B64C 39/064; B64C 29/005; B64C 15/02; B64D 27/32; B64U 10/20; B64U 30/20; B64U 30/29; B64U 30/30; F04D 17/122; F04K 1/002; F04K 1/006

See application file for complete search history.

(56) References Cited

U.S. PATENT DOCUMENTS

| | | | | | |
|---|---|---|---|---|---|
| 5,255,850 | A * | 10/1993 | Cockerham | F02K 1/56 239/265.29 |
| 9,777,698 | B2 | 10/2017 | Schlak | |
| 10,040,547 | B1 * | 8/2018 | Pedigo | B64U 30/10 |
| 10,723,474 | B2 * | 7/2020 | Lauder | B64C 21/08 |
| 12,098,676 | B1 * | 9/2024 | MacDonald | F02C 6/08 |
| 2002/0009363 | A1 * | 1/2002 | Ozaki | A61M 60/422 415/203 |
| 2009/0121073 | A1 * | 5/2009 | Doane | B64C 29/0066 244/129.4 |
| 2012/0036865 | A1 * | 2/2012 | Brillet | F02C 7/18 60/785 |
| 2022/0363378 | A1 | 11/2022 | Schlak | |

FOREIGN PATENT DOCUMENTS

| | | | | |
|---|---|---|---|---|
| EP | 2610461 | A2 * | 7/2013 | F02C 3/107 |

* cited by examiner

*Primary Examiner* — Philip J Bonzell
*Assistant Examiner* — Ryan Andrew Yankey
(74) *Attorney, Agent, or Firm* — Lambert Shortell & Connaughton; David J. Connaughton, Jr.; Justin P. Tinger

(57) ABSTRACT

An eVTOL aerial passenger drone, hereafter referred to as an aircraft, is provided. The aircraft may have an electrically powered fan system, which transposes longitudinally- or radially-captured ambient ingress air into at least one tangentially spinning thrust air stream traveling at extremely high outlet/thrust tangential velocities. This tangentially spinning thrust air stream is corralled from the fan system by at least one volute or entrainment device to a splitter mechanism in order that the thrust air stream can be ejected selectively downwardly, rearwardly, and at an angle between downwardly and rearwardly, for lift and forward propulsion of the aircraft.

22 Claims, 24 Drawing Sheets

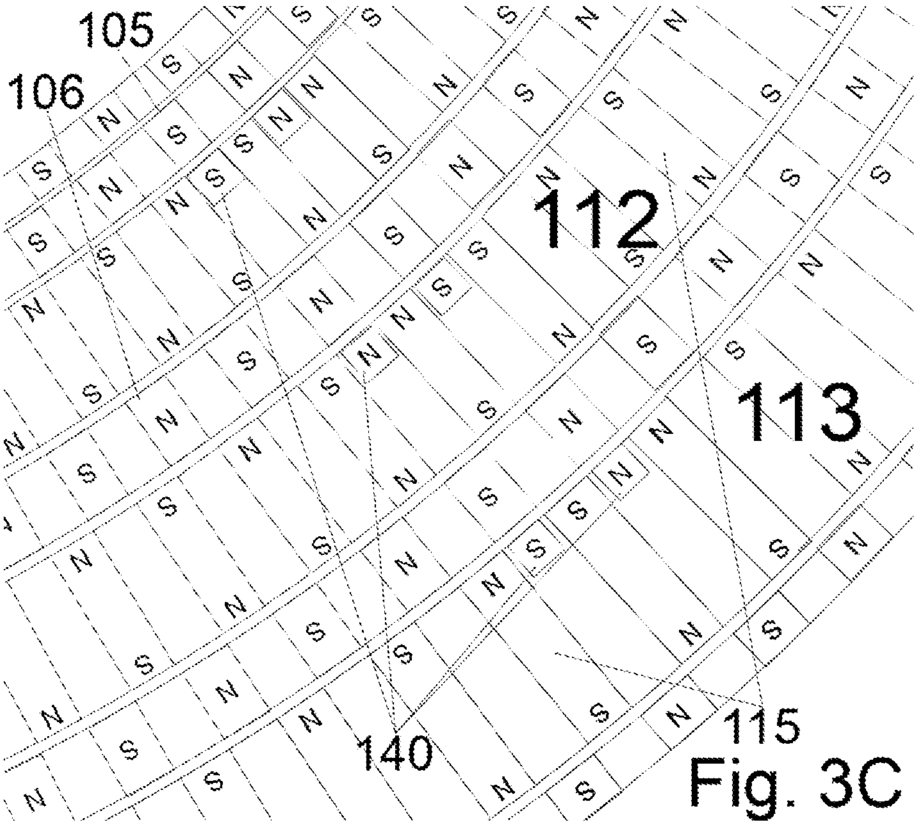
Fig. 3C
Fig. 3D
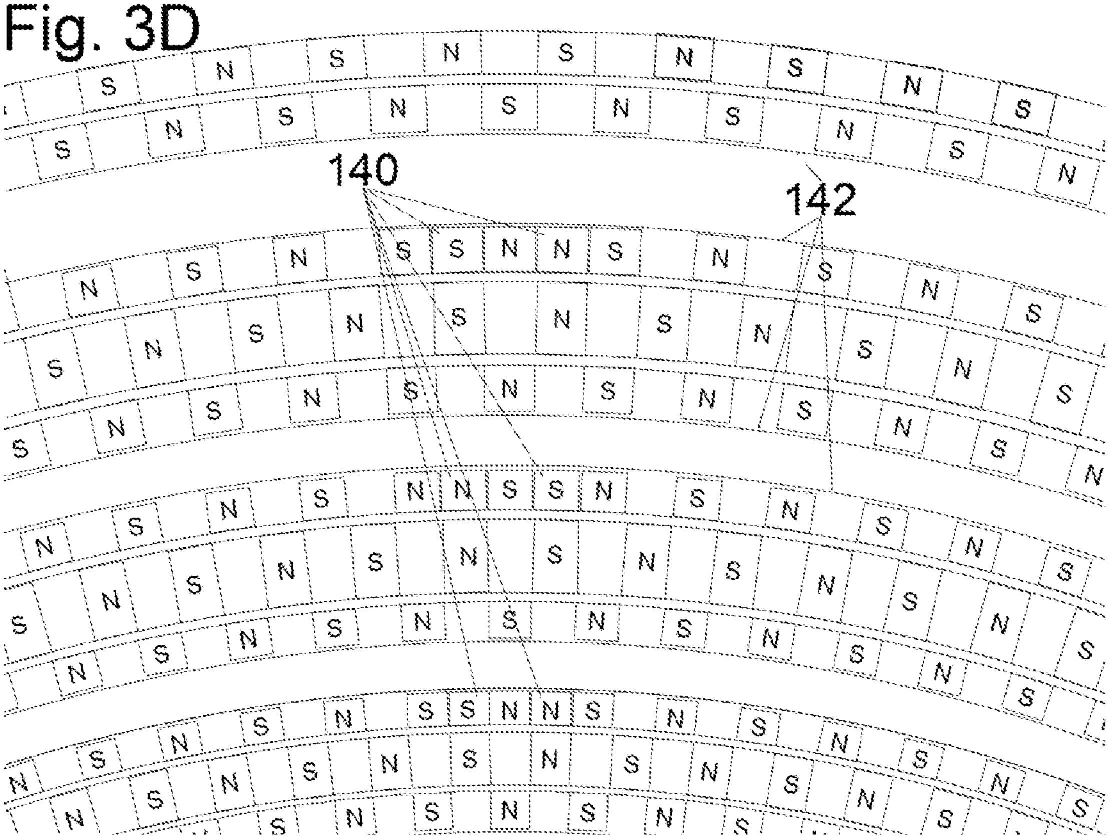

34
33
32
31
50
35
36
31
100
38
70
61D
61B
39
37
31B
33
32
31A
31D
37
39
31C
31
72
101
74
75
76

43
cg
42
42TR
44
45
47
150
1.5
1.3
0.75 cg
1.5
0.75
1.3 cg
1.5
0.75
1.3

1.5
cg
47
150
1.5
43°
1.1
1.02
1.5
1.5
0.75
60°
1.5
1.3

42E
42D 1.5
cg
1.5
43°
1.1
1.02
1.5
1.5
0.75
60°
1.5
1.3
42E
$F_S$
$F_S$
42D
42F
42F
$F_S$ 10
13
104

12
11
14

12A
12
12B 10
13

22
23
12
20
21

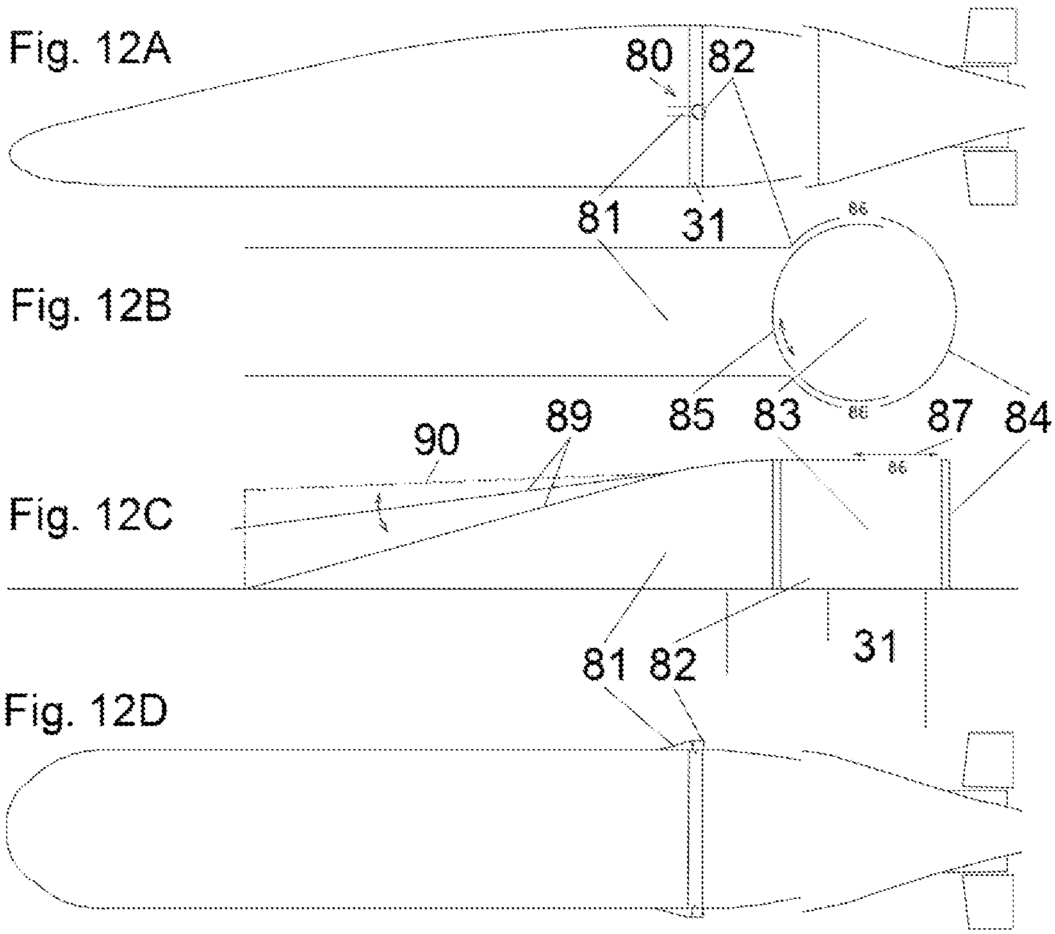
Fig. 12A
Fig. 12B
Fig. 12C
Fig. 12D
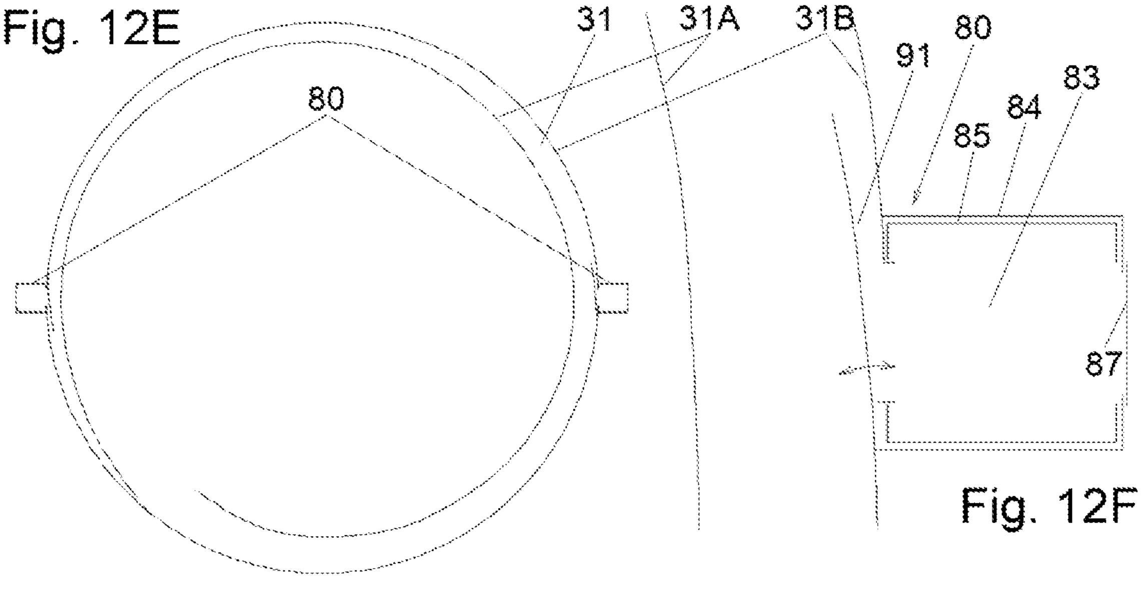
Fig. 12E
Fig. 12F
80
82
81
31
86
85
83
86
87
84
90
89
86
81
82
31
31
31A
31B
80
91
80
83
84
85
87

180
172
162C
170
171
173
167
163
165
174A
176
162B
174B
166
175A
164
165
175B
162A
174C
175C
161
51A 182
172A
181
183
186
185
184
187
188
180
189

Electrical Grid (240 V)
Voltage Multiplier Circuit
2000 V
51
51
51
Solids Filter
Degasification Module
Electrolyzer Module
Pump
$H_2$
$H_2$ Reservoir
Pump
Municipal Water Supply
Pump
Pump
$O_2$
Escape $O_2$
Sellable $O_2$
Carbon Capture Converter
Intake for Base Elements (Si, Na, Ca, etc.)
$CO_2$
Carbonate, etc.

| PROTOTYPE OPTIONS | Light | Med | Heavy | Low Voltage | Med Voltage | High Voltage | Perfect Combo |
|---|---|---|---|---|---|---|---|
| Total weight of fan module (net weight all fans) | 120 | 180 | 240 | 120 | 120 | 120 | 150 |
| Fan stage 1 | | | | | | | |
| WS = Weight/mass of fan stage (lbs) | 40 | 60 | 80 | 40 | 40 | 40 | 50 |
| AP = Voltage applied (standardized units) | 1.0 | 1.0 | 1.0 | 1.0 | 1.5 | 2.0 | 1.6 |
| SH = Stage horsepower | 40 | 60 | 80 | 40 | 60 | 80 | 80 |
| VT = Volumetric Throughput (CFM) | 7000 | 7000 | 7000 | 7000 | 7000 | 7000 | 7000 |
| A1 = Axial air exhaust velocity (mph) | 191 | 287 | 382 | 191 | 287 | 382 | 382 |
| T1 = tangential air exhaust velocity (mph) | 764 | 1146 | 1528 | 764 | 1146 | 1528 | 1528 |
| S1 = Total exhaust velocity vector scalar (mph) | 955 | 1433 | 1910 | 955 | 1433 | 1910 | 1910 |
| Fan Stage 2 | | | | | | | |
| WS = Weight/mass of fan stage (lbs) | 40 | 60 | 80 | 40 | 40 | 40 | 50 |
| AP = Voltage applied (standardized units) | 1 | 1 | 1 | 1.0 | 1.5 | 2.0 | 1.6 |
| SH = Stage horsepower | 40 | 60 | 80 | 40 | 60 | 80 | 80 |
| VT = Volumetric Throughput (CFM) | 7000 | 7000 | 7000 | 7000 | 7000 | 7000 | 7000 |
| A1 = Axial air exhaust velocity (mph) | 191 | 287 | 382 | 191 | 287 | 382 | 764 |
| T1 = tangential air exhaust velocity (mph) | 1719 | 2579 | 3438 | 1719 | 2579 | 3438 | 3056 |
| S1 = Total exhaust velocity vector scalar (mph) | 1910 | 2865 | 3820 | 1910 | 2865 | 3820 | 3820 |
| Fan Stage 3 | | | | | | | |
| WS = Weight/Mass of fan stage (lbs) | 40 | 60 | 80 | 40 | 40 | 40 | 50 |
| AP = Voltage Applied (standardized units) | 1 | 1 | 1 | 1.0 | 1.5 | 2.0 | 1.6 |
| SH = Stage horsepower | 40 | 60 | 80 | 40 | 60 | 80 | 80 |
| VT = Volumetric Throughput (CFM) | 7000 | 7000 | 7000 | 7000 | 7000 | 7000 | 7000 |
| A1 = Axial air exhaust velocity (mph) | 143 | 215 | 287 | 287 | 430 | 573 | 573 |
| T1 = tangential air exhaust velocity (mph) | **2722** | **4083** | **5444** | 2722 | 4083 | 5444 | 5157 |
| S1 = Total exhaust velocity vector scalar (mph) | 2865 | 4298 | 5730 | 2865 | 4298 | 5730 | 5730 |
| Adjustment factor internal drag in exhaust ducts | 0.93 | 1.40 | 1.86 | 0.93 | 1.40 | 1.86 | 1.86 |
| Adjustment factor expansion within exhaust | 1.69 | 2.54 | 3.38 | 1.69 | 2.54 | 3.38 | 3.38 |
| Total thrust (lb-ft) | 470 | 706 | 941 | 470 | 706 | 941 | 941 |
| **Aircraft thrust-to-weight ratio** | **0.80** | **1.09** | **1.33** | **0.80** | **1.21** | **1.61** | **1.53** |
| Aircraft net weight (lb) | 585 | 645 | 705 | 585 | 585 | 585 | 615 |
| Occupant weight (laptops and wires for proto) | 15 | 15 | 15 | 15 | 15 | 15 | 15 |
| Fan module weight | 120 | 180 | 240 | 120 | 120 | 120 | 150 |
| Airframe weight (aluminum for proto) | 300 | 300 | 300 | 300 | 300 | 300 | 300 |
| Battery weight | 100 | 100 | 100 | 100 | 100 | 100 | 100 |
| Auxiliary weight (including stabilizer fans) | 50 | 50 | 50 | 50 | 50 | 50 | 50 |

Fig. 18A
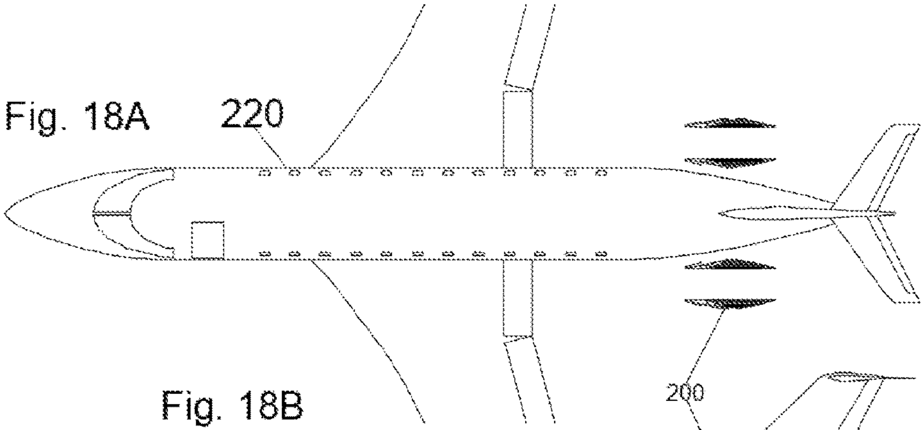
Fig. 18B
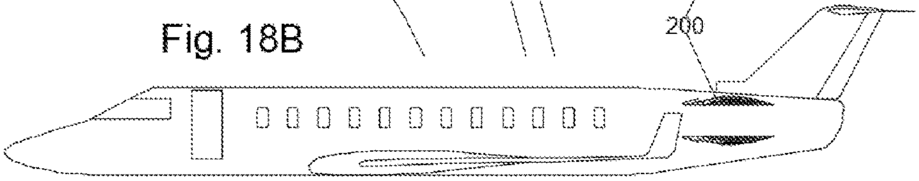
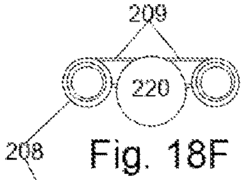
Fig. 18F
Fig. 18D
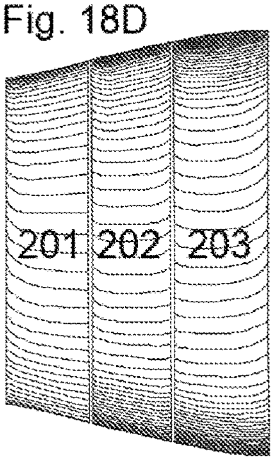
Fig. 18C
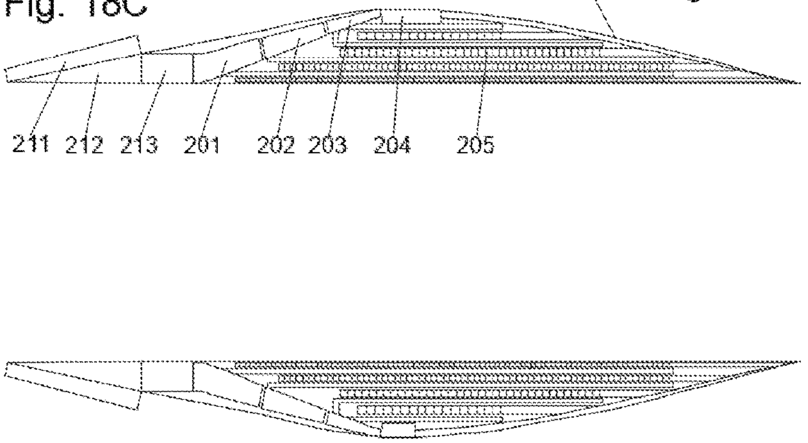
Fig. 18E
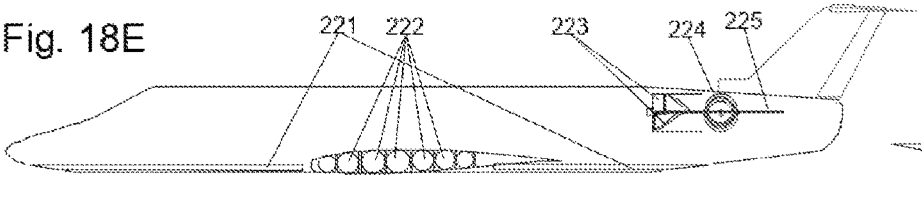
Fig. 18G
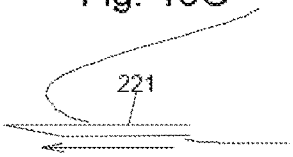
220
200
209
220
208
211 212 213 201 202 203 204 205
201 202 203
221 222
223 224 225
221

BLADELESS eVTOL PASSENGER AIRCRAFT WITH FIXED-WING FORWARD FLIGHT TRAVEL, AND METHOD AND POWER PLANT THEREFOR

TECHNICAL FIELD

The following disclosure relates generally to various fields of mechanical engineering and their application to the electric propulsion of bladeless personal and/or ride-sharing vertical-takeoff-and-landing (VTOL) aircrafts/pods, and it also relates to those various fields of mechanical engineering and their application to electric propulsion of mid-size private or small commercial aircrafts. Further, the following disclosure relates generally to mechanical devices and control systems therefor in pursuance of a bladeless (copterless) eVTOL passenger aircraft that has as its primary transport mode a fixed-wing (or flying wing) forward flight capability, during which there is little or no downward thrust.

CONTINUITY AND/OR PRIORITY

No continuity is claimed, but US 20220363378 A1 (credited to Daniel Keith Schlak, the same inventor of the present application) is incorporated by reference.

The specification and drawings of US 20220363378 A1 are herein incorporated by reference, such that their subject matter is by such incorporation by reference included within this application both interpretively and/or explicitly as a result of this paragraph, and said reference's subject matter provides background and support for multiple certain mechanisms and methods of the present application even when there are no more figures or specification segments herein devoted to or relevant to that reference. Redundantly though it is to state it, this application directly and completely invokes US 20220363378 A1 by reference, such that the specification and figures of US 20220363378 A1 are now a corporeal and unitary component of this application, and combinable with the various embodiments of this application when the combining is repetitive, beneficial, obvious, or a vector for hypothesis or useful speculation, and also because US 20220363378 A1 is in myriad ways divergent from what is being proposed herein yet encompasses plural overlapping aspects and assets.

Also, US 20220363378 A1 was invented by the same inventor as the instant application, as part of the same generic project that this application is the latest iteration of. Still, continuity will not be claimed because the prior application (US 20220363378 A1) is very lengthy and its being pasted herein would make this document unreadable due to the inevitable voluminousness, and excessiveness of figures, figure numbers, and reference numbers, that such pasting it herein would accrue to, if all the figures and their descriptions of US 20220363378 A1, even if summarized, were reiterated herein—an unwieldy document that would be unreadable.

Anything in US 20220363378 A1 that applies to an element or embodiment proposed within the present application would be an obvious combination or blend (to one of ordinary skill in the art) of said element/embodiment with various elements/embodiments of the present application, and anything in the present application that applies to an element or embodiment within US 20220363378 A1 would be an obvious combination or blend (to one of ordinary skill in the art) of that thing in the present application with the various elements/embodiments proposed in US 20220363378 A1.

BACKGROUND SUMMARY

Vertical Takeoff and Landing (VTOL) is the standard terminology for an aircraft's ability to take off and land without a runway. Electric VTOL (eVTOL) is a widely acknowledged and sought-after technology whose potential advantages need not be discussed at length herein because they are eminently well-known, while the simplest, lightest, and most efficient configuration is the desideratum of most eVTOL research and literature. Being restricted to runway-takeoff and runway-landing is a major waste of materials, energy, and time, and a source of inconvenience. The best-known and/or most successful prior-art solutions to VTOL are described hereinbelow. Discussion of traditional helicopters will be omitted herein except to point out their defects.

The first prior art VTOL solution to be discussed herein will be called the "Osprey" model, as that is the US military's name for the most common representative of it. This solution traditionally has two bilaterally opposed gas turbine engines, or electrically motorized fans or propellers, out on the ends of two truncated and cantilevered wings. The fans/propellers (and their thrust) pivot continuously from downwardly to rearwardly aimed, as well as any angle in between, during takeoff (and landing). The wings are smaller than a traditional airplane's wings, sized to provide full lift only after reaching a threshold airspeed, at which point the fans/propellers will have transitioned through their whole range of pivoting motion and are now aimed substantially rearwardly. It is argued herein that this system will probably never be very effective for small personal aircraft because the failure or stall of a single engine would be catastrophic and the wings and engines protrude sufficiently outwardly such that this system is not always stable or capable of countering winds. The applicant has seen attempts to duct air from a single mid- or rear-aircraft impulsion source out to the wings and thence downwardly. They are usually complicated and always incomplete apropos the actual needs of a functioning aircraft during transitional operation. Anyway, the primary drawback of the Osprey model is cost. It is probable that it will always be very expensive to produce and fly.

The second prior art VTOL solution discussed will also be named after the US military name, the "Harrier" model. It comprises a modified gas turbine engine with 3-4 low compressor stages whose bypass flow is gathered, near the front of the aircraft, by aimable front ducts that nozzle the exhaust selectively but continuously between downward and rearward directions, wherein the non-bypass (core) flow is gathered after the turbine and also nozzled between downward and rearward in a choreographed sequence with the front ducts. This is a very effective model for heavy aircraft with only a person or two in front of or behind the engine, but for a very small aircraft or a passenger airplane, this engine exists in the exact space where our occupant(s) need(s) to be—in the middle of the aircraft—and it requires so many metal parts, the weight of the engine makes the solution irredeemably unviable for us here.

The third prior art VTOL solution is known under the general heading of "X-Plane". It comprises paired pivotable cantilevered lateral wings with a bank of co-rotating impellers in them wherein said wings can swivel to point the trailing wing-edges (exhausts) downward and rearward, as well as any angle in between. There are in some embodiments equivalent (but smaller) pivoting impeller wings in the rear that do the same, such that there are four points of support during VTOL. The applicant is too unfamiliar with this version to go into it here, other than to say that those involved with the various versions of the project claim it can go over 300 mph, which is intriguing to say the least. The high airspeed is possible in part because the aircraft can use every impeller and all its power to both a) do VTOL and b) provide rearward thrust during full forward flight and still achieve lift completely aerodynamically during forward flight. This ability, of being able to use all available power for full forward flight after takeoff, is another desideratum of the present application.

The Applicant believes that the necessity of the X-Plane to have the impellers inside the wings constrains the diameters of the impellers, imposing an upper limit on total available thrust from each one. Increasing in such a prior art device the number of impellers, as its makers have, increases mass flow, and therefore only increases thrust incrementally, as a function of the added volume and mass of the multiple/extra impellers. The Applicant believes that the impellers of a VTOL system, to be truly powerful per unit of mass and volume throughput, must be made significantly larger in diameter than the thickness of the wings of the aircraft, which if done right will increase thrust at a compound (not 1-for-1 or incremental/linear) rate. Thus, the impeller of a truly high-performing aircraft probably cannot have the impellers in the wings.

The most salient lightweight aircraft scenarios known by the inventor for forward-only flight all limit the number of impeller modules to no greater than two, and prescribe that the impeller's (or impellers') location is/are more or less behind the occupant. The inventor believes that any straying from this latter configuration will lead to loss of efficiency and power, as well as to increasingly unwieldy and aesthetically unappealing aircraft geometries and/or inefficient airflow geometries.

The fourth solution will be called the "multi-copter". The personal aircrafts that use the multi-copter approach for VTOL and still try to achieve high forward airspeeds (not discussed will be those that are simply multi-rotor helicopters) are the most promising endeavors in this space. Usually, four to six (copter) rotors are provided, and at least two of them (for example one on each lateral side) pivot to horizontal to provide rearward exhaust (forward thrust). Some, or perhaps a majority, of these aircrafts are designed to provide aerodynamic lift as the airspeed increases, and as more lift is naturally provided, the copter scheme redirects a significant, but not full, portion of the thrust in a continuous manner from straight downward to more rearward or completely rearward. Some of the best designs achieve a nice top airspeed and get respectable thrust throughout their range of airspeeds, such that several of the downward-only copter rotors can shut down once they are not needed when aerodynamic lift takes over.

However, the only way to make every electrical motor do work on all of the air all of the time (emphasis added to "all of the time") would be to pivot all of the copters to substantially horizontal thrust, which has recently become possible and even available for sale. The fans would in such a case have to be greatly spaced out to keep them from blowing into each other.

All of the foregoing considerations lead to overly-limited top airspeeds for most of these aircraft. The fastest known by the applicant, concerning single-occupant drone-piloted use, is advertised as topping out at 250 mph. It is being advertised as being able to go 250 mph for 1 hour on one battery charge. Although the invention proposed in this application intends to make these aircraft obsolete by using all of its electrical motors to create rearward thrust during non-takeoff flight, and thus attaining much higher airspeeds, the applicant emphasizes this prior-art boast of 250 mph for 1 hour on one battery charge, as this is a harbinger of what capabilities we will have once we are using all of the electrical motors for rearward thrust during most of a flight. What this means is that battery technology is ready and waiting for what we are going to do here. As such, discussions on the subject of the batteries per se can be foregone in this document. Applicant, having perused much of the online-accessible literature, proposes that the enclosed volume of or occupied volume around these aircrafts is qualitatively greater than the volume required by the occupant, motors, and batteries. This decreases maneuverability (like landing in a parking spot or on the sidewalk). It also reduces the top airspeed even further and increases power consumption per mile traveled.

The fifth solution is the system proposed in U.S. Pat. No. 9,777,698 B2, entitled "Multiple Motor Gas Turbine Engine System with Auxiliary Gas Utilization", patented on Oct. 3, 2017, and credited to Schlak. Schlak ducts the exhaust from a GTE to two (or more) downwardly directed thrust nozzles, at least one in the rear and at least one in the front (shown in FIG. 6 of that document). The front downward nozzles get their engine exhaust from one end of the GTE and the rear downward nozzle (which is not really a nozzle) receives it from the other end of the GTE, somewhat like the Harrier model, but strangely reversed (the turbine exhaust goes out the front, etc.).

While in this situation the front nozzles are selectively activated (opened and closed proportionally), the rear "nozzle" comprises something we will hereafter call a "splitter" (see FIGS. 7 and 10 of that document), although Schlak does not use that name. The splitter has multiple panels behind the engine's fan, each of which can pivot to deflect its respective swath of fan exhaust through a range of directions between straight down to not at all (all the exhaust blasts out the back unimpeded) and the 90 degrees in between, much like the Osprey and Harrier models.

The splitter's panels are independently actuatable (see FIG. 10), such that (for instance) two can be flat to allow thrust straight out the back while 3 are pivoted up to a full deflecting 90-degree position, or 70 or 50 degrees or whatever, relative to the horizontal, to offer an alternative analog to the Osprey and Harrier hybrid/transition, such that the aircraft can be suspended first by the front downward nozzles being open and all the flaps being pivoted up to deflect gases down, such that all the thrust from the engine and fan is directed downwardly. As the aircraft increases in airspeed aerodynamic lift (like the previous models) will reduce the need for the downward thrust, and the front nozzles are throttled or closed to release less air downwardly, and the flaps are strategically cycled through a scheme of pivots that start allowing more exhaust to exit rearwardly without deflection, which with each moment increases the forward acceleration of the aircraft. In the end, all the flaps are flat such that all of the thrust is rearward, and the aircraft becomes a flying wing.

Like the copter models usually are, the Schlak airframe has a geometrical cross-section such that lift is inherently created by the body geometry, not by wings, as shown in FIG. 7. However, the Schlak system was born from an attempt to make a flying car that also drove around. Not only that, but great lengths were gone through to make the ground driving system a hybrid-electric one, to use less fuel. It is clear now, with the advent of ridesharing and ride-hailing apps, combined as they are with Smartphone technology, that wheels are no longer needed for door-to-door transportation. In other words, if I can take off from my driveway and land right next to my job or in someone else's driveway or on top of the store I'm going to, all items associated with ground travel, which appear to be 30-50% of the mass and 40-60% of the volume and complexity of the Schlak system, are wholly obsolete.

Removing all considerations of ground travel should cut the weight and volume of the vehicle (empty wt.) by 50-60%, especially now that road-safety precautions are not needed. Also, there is possibly decreased future need for multi-passenger vehicles in this technological space (but of course it will persist and probably will be desired in many folds of this nascent space). Even if two or three people want to go to the same place at the same time, there is no definitive reason to require a separate type of aircraft going around just for people who want to travel together, except for during long-distance hops and these are not completely within the scope of the present application but whose endeavors should not be considered outside of the normal skill of practitioners in the art. The multiple passengers can just hail two or three (or four, etc.) single-occupancy aircraft and hop in them as the aircrafts arrive, to meet up in a few minutes at the shared destination. However, it is quite likely that someone would want to have a multi-passenger vehicle for various uses in the future, and in light of this disclosure, people are going to manufacture multi-passenger vehicles based on this application. This document is going to be too long just describing a single passenger aircraft, so the obvious modifications that can be made to the present invention that would convert it into a bus, multi-passenger aircraft, ambulance, fleet defense fighter drone, etc., will be omitted herein, but they are multifariously obvious and such modifications should not be seen as novel to ones of ordinary skill in the art, in light of the present application, except where they bear surprising results.

Schlak also promotes the idea of incorporating a series two-stage diagonal compressor to achieve a high compression ratio for the engine core, as shown in FIG. 2A and described in the specification as mixed-flow compressors. The drive means (in this case, turbines) is disposed concentrically inwardly of the compressors, and each compressor and its drive means are integrated into one monolithic structure. Much of the disclosure of the present invention, insofar as the aforementioned features are useful, will simply borrow those features from the Schlak system, without comment.

Schlak has several other items that are in common with or incorporated by the present invention. One is small up-down-out thrust nozzles at some corners/zones of the aircraft to stabilize the zero- or low-airspeed maneuvering of the aircraft, as shown in FIG. 8 of that document. These are activated proportionally by a CPU in response to a six-DOF IMU (described in the specification) or other type of gyroscopic-accelerometric sensor to offset unwanted movements (pitch/yaw/roll) before the movements actually take place. Also, the splitter idea will be borrowed from Schlak for use in the present invention. Schlak greatly overestimated the capabilities of an open system—open meaning that too much exhaust flow is expanding into unpressurized space without it being constrained first. The present invention has taken the splitter idea to a new level by enclosing it and placing it downstream of all the impeller's exhaust air.

This application incorporates by reference the entirety of Schlak's U.S. Pat. No. 9,777,698 B2, such that all content, text and figures, of Schlak '698, are now part of the current disclosure.

As this instant application is a monumental improvement over Schlak '698, the contents of said Schlak '698 is incorporated hereinto as if they existed in this document.

There are also hundreds of other efforts, in the patent literature, in addition to the foregoing discussion of the last several paragraphs, dating back to 1940's French, American, British, and German patents, showing that the concept of VTOL has clearly been a perpetual muse to many engineers and amateurs who have wished to not only (e.g.) land troops in the jungle or other militaristic purposes, but more importantly to get us up and out of traffic, reduce our reliance on infrastructure and fuel, optimize our commutes, eliminate bottlenecks and parking lots, revitalize urban and suburban planning, reduce housing costs, revisit our approaches to medivac (being at the hospital 5 minutes after your emergency started) and law enforcement (no more traffic stops or police helicopters), as well as myriad other endeavors. There are too many relevant prior art references to cite in an Information Disclosure Statement. Thus, only the references that are most supportive of the current invention as well as supportive of the effectiveness of the current invention's features and concepts have been included.

Many of these various undiscussed prior-art systems would have worked okay if made, some would not have, and some do work fairly well right now. But to this day, a person can't touch an app on her/his phone, wait 30 seconds, walk to a driveway, roof, or yard, then sit in a chair that just arrived, close a hatch over oneself, and be at her/his job or outing destination in 2-5 minutes, or get from downtown Washington DC or its suburbs to downtown Philadelphia or its suburbs in 25 minutes, an option heretofore incomprehensible. And this one extant fact, that it is not happening now (which we all are sometimes acutely aware of and always vaguely aware of) serves as the industrial applicability for this application, in pointing out the insufficiency of the prior art systems and the actual state of the art at this time, such that the applicant will not nitpick the hundreds or even thousands of prior art inventions in the patent literature, for their sake and his own. The proposed system will make this thing happen that we've all been waiting for. It is so different from anything ever done before, even though it is comprised of a score of inventions that are peripherally (in other arts) known and a handful of entirely new things that will require pretty heavy explanation (herein), that it can't really be compared, any more than has already been herein, to the prior art, without a very lengthy exposition, which we have no use for here, because it is almost time to get to the big invention. But let's get back to the basics.

Of all the VTOL devices and systems discussed hereinabove, and the several others that will not be described hereafter, for all their myriad differences, and they do diverge wildly, they have one thing in common, a single underlying premise that is the main necessary condition for VTOL success. Every one of them is attempting to create a lift force or combination of lift forces whose sum vector is a nearly vertical vector passing upwardly through a single point or small locus near the center of gravity CG of the aircraft (CG will be treated synonymously with CM, center of mass, throughout this discussion, even when CM would be the better terminology). Importantly, this must, repeat must, be accomplished and upheld during non-aerodynamic flight, when the aircraft is not traveling forward fast enough to levitate itself using aerodynamic elements.

It did not take too long after the invention of the propeller for someone to realize that VTOL is very simplistically achieved, in the manner of helicopters. Of course, the engine can't be where the passenger is so it was moved back, the drive shaft was made to protrude upwardly from above the space between the engine and passenger, and the main rotor was given an engine with enough horsepower to raise the aircraft. However, no matter what people tried to do to increase the forward airspeed, such as for example putting horizontal-thrust jet engines on the sides of the aircraft, the main rotor made everything like this completely unfeasible and history has proved that the rotor of a helicopter is an albatross that that industry never really recovered from, and that is why there are so few helicopters, which is one of the best things that ever happened to the world, or didn't happen to be exact.

So, people tried to get away from the CG-based single horizontally spinning rotor (helicopter). This endeavor was very difficult to solve and up until the last several years it was essentially fruitless, at least for human payloads. If you put too much thrust on any one end/side of the aircraft, it quickly and unrecoverably pitches or yaws, and then slips or flops out of control. Stabilization systems have been devised to offset this but not to any noteworthy avail, especially because everything the Applicant has seen in the prior art cannot be used when it is windy and it never evinces any braking capability. Balancing has too been important (a copter rotor or vertically-aimed propeller on each side of the aircraft, downward jet exhausts on each side of the aircraft, etc.) to the extent that mankind is still hampered by the balancing problem and for want of better solutions we are stuck either a) using a single drive system to achieve forward travel and using a distinct, other drive system to achieve lift, or b) using the same drive system to achieve forward travel and lift, while pivoting the drive system through a transition stage that blends upward lift and forward propulsion after the takeoff and before the aerodynamic lift takes over.

Foundational Challenges of VTOL and eVTOL

Although the foregoing has been a sprint through the various scenarios known in the prior art to provide VTOL (and eVTOL), the Applicant has made an effort to attempt to delineate and summarize the quintessential requirements for VTOL success as he sees them at the time of filing, and they are put forth below. They are not required for VTOL per se, only for its optimal application. The Applicant does not believe all of these elements by themselves have been adequately disclosed by the prior art, and he believes that almost never have three or more of them been composited or fused for symbiotic use in a seriously significant way, and they are as follows:

I. The lift-sum vector must point up through the CG with pitch/roll/yaw always balanced/offset, either inherently or dynamically, even during cross-wind speed gusts of more than 20 mph.

II. A singular prime mover must drive both lift propulsion and forward propulsion. Preferably a single unit or pack of units would drive everything, meaning it would drive all thrust vertical and horizontal, as well as transient blends of vertical and horizontal.

III. The prime mover must achieve a maximum output powerful high enough that vertical levitation and forward thrust can be simultaneously achieved. But this is a concern that will be obviated or dwarfed by the next requirement/clause.

IV. The prime mover's thrust-to-weight ratio must be absolutely overpowering to minimize the time of a flight, because during every second of a flight the aircraft is expending a very significant amount of energy levitating itself, not only during takeoff and landing, but during aerodynamic flight too. There can be no partial measures for purely efficient flight and especially with purely efficient eVTOL flight. Even if it takes 30-50 extra pounds of batteries and 5-10 extra pounds of electrical coils to double the acceleration and thus cut down by 20-40% the flight-time, the tradeoff will have been worth it.

V. Coriolis forces must be (net) canceled out for the spinning bodies around their shared axial locus. Coriolis is a mysterious force that nonetheless exists and cannot be allowed to override the intended accelerations and motions of the aircraft. As a relevant example of its downsides, if all the spinning elements of the aircraft spin in the same direction around a single axis, Coriolis forces will impede the desired stabilization of the aircraft during low, moderate, and high speed linear travel and also twist the aircraft out of the sky during transient modes such as low-airspeed turning (in a preferred embodiment of the present invention as delineated in the forthcoming summary of invention and detailed description, an internal flywheel spins in an opposite rotational direction to the fan spin direction at a very high speed that offsets the Coriolis acceleration).

The state of the prior art is that the prior art has indeed solved some of the quintessential requirements for VTOL provided so far herein. And it has evidently done so using battery-powered electrical propulsion. However, it appears that the prior art does not condense all of or most of these quintessential solutions down into a single system that overcomes all the quintessential challenges while doing so easily and with very little complexity, mass, and expense.

The need to be fulfilled herein is, arguably, to give everyone what we have always wanted. We want a thing that lands in front of our house or workplace or at any location we happen to be at; we sit in it, it takes off vertically and quickly accelerates to take us to where we want to go. It then slows, drops, lands, we get out, and it goes away. We want it to go fast. We want it to be electric, for environmental reasons and to operate with high energy efficiency. For the most part the Applicant expects we will want it as a ride-hailing app. We want it to be inexpensive. It is certainly possible that some people will wish to possess one of their own and of course the wealthy will have luxury versions with a room in their home to house it, the room having a bay door in its ceiling. This latter approach would also serve for emergency rooms, skyscrapers, generals and admirals, municipal fire chiefs and other first responders, etc. In the case of EMS the patient would be placed in it and sent to the emergency room while the first responder hailed another ride to get home or back to the station after talking to the physician via telephone. The list of what a device like this could do for us is endless.

The last paragraph was provided in the background summary because to get where this application needs to go, in establishing an understanding of the invention to be proposed later, the background summary needed to discuss a certain type of device and its own prior art history and how it has been represented in the patent literature. The proposed invention aims to provide to us the capabilities of the preceding paragraphs by leveraging a compressor known by at least three names. The first name, being a more American designation, is diagonal compressor. The second name, being more universal and referred-to outside the US, is mixed-flow compressor. The third name is hybrid compressor, said last nomenclature being currently (it is believed) in disuse, and it can be dismissed. All three names refer to a compressor that has an overall screw-like intake with the screw widening from a smaller intake diameter to a larger outlet diameter. The nomenclature observed by the present application will be "diagonal". The diagonal nature of the compressor is seen in cross-sectional diagrams of the compressor, when depicted in such wise.

This type of compressor has vanes that each extend along the entire longitudinal or axial extent of the compressor, beginning in a first, highly skewed (large angle of attack) intake region, then having a second, mid transition region wherein the vanes are less skewed, and ending in a third region wherein the vanes are either straight or feathered back a bit, or even scooped forward. Sometimes mini-vanes are added progressively as the diagonal compressor expands along its cone-like body, to more precisely manipulate the flow and increase its enthalpy. The latter option is common and might be used in the present invention, or at least in a prototype of it.

When shown in 2D along a lateral cross-section, the diagonal compressor intakes gases axially (along the longitudinal/axial direction of the compressor) and applies an axial force to said gases to pull/suck them in longitudinally through said first region, and then the flow path bends radially outward (slanted, or diagonal) through said second, centrifugal region. At this second region the vanes of the compressor are less skewed (less twisted or curled) relative to the longitudinal direction and compared with said first region; as they corral the gases along the longitudinal length of the compressor and radially outwardly, the gases are subjected to centrifugal force, accelerating said gases more. The diagonal compressor comprises a third region wherein the vanes, probably still being somewhat straight, simultaneously accelerate the flowing gases via centrifugal force and uncurl them rearwardly (along the longitudinal direction) such that the flow, if captured by stator guide vanes and directed rearwardly (it would otherwise exit with excessive vortex), will exit the compressor at a very high tangential velocity, such that the industry, according to the prior art literature known to the Applicant at the time of filing, struggled to wield this outlet velocity, because the prior art never intended to use said high outlet air velocity in any other way than for increasing pressure; diagonal compressors are usually for turbochargers or for pressurizing oil or other fluids, but some recent prior art is starting to disclose them feeding the combustors of GTE's.

This diagonal, mixed-flow, or hybrid compressor is somewhat well known in the mechanical arts, and it is being borrowed herein to create a diagonal (mixed-flow) fan. Fans are, geometrically, not really different from compressors—all mechanical and aerospace engineers know this—but the distinction is being made right now because these fan(s), those proffered later in the present application, is/are performing more the duty of what a fan does, and they are also not compressing the incoming gas, in the preferred embodiments, except as a byproduct.

Thus, the present invention, in preferred embodiments, is using fans that will be named diagonal fans, and these fans are, tentatively and simply, jumbo lightweight versions of prior art diagonal (mixed-flow) compressors. Their effect on the intake air, as well as any beginning modeling of them, should probably follow the established prior art discussions of diagonal (or mixed-flow) compressors. In the event that this is not a perfectly imagined scenario, modifications of diagonal compressors to be used as the diagonal fans in this invention can and should be implemented in the future to create a more perfect impeller system. Nonetheless, the diagonal compressor's published history is the only model set upon which the present invention can rely at the time of filing, so, when the reader/Examiner reviews this document, it needs to be emphasized that diagonal compressors are common in the mechanical arts, and their compression ratios, when they are well-designed, are known to be in excess of 4:1. The present application as filed strays little from the known forms of said diagonal compressors; it merely suggests that they could be upsized and made of nonmetallic materials to convert them into fans. Improvements involved with the details of the conversion of diagonal compressors into diagonal fans are germane to this discussion, but they (in the future) rely on modeling and some additional foresight, retrospect, and testing—and the products of said modeling, foresight, retrospect, and testing (or other follow-on intellectual property) to do such a conversion should be obvious to practitioners of ordinary skill in the art, in light of the present application, unless they bear surprising results.

Rail-based systems were probably at some point a potential, simplistic path (or competitive alternative) to achieving the desiderata described above. They still might be. For instance, Applicant did invent some rail-based concepts almost 20 years ago (circa 2003-2005) that could have accomplished some of the things that are perfected in herein (in the described embodiments herein presented) and also in US 20220363378 A1.

For instance, Applicant envisioned then (circa 2003-2005) a non-stop subway system wherein each train of cars travels at very high speed (200+ mph) and at each station, instead of the train stopping, a car with fresh passengers is accelerated on a track parallel to the main track and then the fresh car is diverted/shifted such as to be in front of the train. The fresh car is, after being diverted onto the main track and in front of the train, allowed to slow by de-energizing it, and when the train catches up to it the train bonds with or connects to the fresh car; a door then opens between the fresh car and the front of the train, and passengers from the fresh car walk rearwardly through the train (all doors being open at this time) until they encounter a rearwardly-located car that has a sign that displays their destination station. The passengers stop in this car and sit in it until the car that has the sign displaying their destination station becomes the last car of the train, whereupon the last car decouples (and door closes) from the train and slows to be shunted onto a parallel station track to be braked completely in order to debark destination passengers at the passengers' chosen/declared destination and embark arriving passengers, and thence to be shot out, to repeat the process, in front of a train traveling in the same direction or shot out in front of a train traveling in the opposite direction, the latter option/direction being the most prevalent.

The Applicant invented the non-stop train in order that the passengers could avail of 200+ mph speeds to get where they're going while using less energy than a regular train. Of course, the rail concept is dead in most countries and as of the date of filing of this application, because of the concept proposed in this document, all other concepts are conceptually and practically superseded. The miles of tunnels required to fulfill that embodiment would always be insufficient for the general populace, especially those outside of metropolises and corridors of each country, and the tunnels would be especially difficult and costly to manifest upon the Earth as it exists with property rights and geographical formations being what they are. The invention proposed herein beats all subterraneous solutions. Still, the non-stop train was very interesting and could be useful somewhere.

The Applicant also had (circa 2003-2005) an idea for supersonic travel that could compete with US 20220363378 A1. That is, the traditional high-speed trains envisioned (in the prior art) from about 1990-2002 were very feasible and would have been useful until superseded (like the non-stop subway hereafter would be) by the embodiments proposed herein and in US 20220363378 A1. These ideas involved evacuated tubes with train rails on their bottoms and trains running in a vacuum along the rails. The Applicant's aversion to boring tubes through the Earth from New York to San Francisco resulted in an unpublished proposition that the tubes should be airborne—since they are evacuated on the inside for ease of supersonic travel (sonic-based terms no longer really being appropriate since the train was to travel in a vacuum, but still, thousands of miles per hour), if the tubes were to be properly hermetically sealed, they would float, and therefore instead of boring tunnels in the earth, we simply could have had floating tubes, connecting all the cities, with rails in them, which transported very-high-speed trains (since they travel so rapidly, they never really weigh down any particular extent of the tube and actually exhibit negligible sag or deformation of the rail portion within the tube that the train is traveling within).

The evacuated-tubes-in-the-sky potential embodiment would also somehow be part of a non-stop train as discussed earlier, such that the incoming front car of a train would be accelerated to thousands of mph in the direction of the approaching train, and then switch-tracked onto the main rails of the approaching train, to be joined therewith and the passengers walk back to their destination car, and when the destination car becomes the caboose, it is switch-tracked off of the back of the aircraft, decelerated electromagnetically (the whole thing should probably be magnetically levitated on the rails), and brought to a standstill for debarkation and embarkation. It is likely that the floating tubes would exist in pairs, in a one-way-per-lane system much like a two-way road.

Why the Applicant did not file a patent application for the preceding embodiments/concepts is unknowable (other than that an amateur patent search did knock out a few minor pillars of it as well as the Applicant's other concept, at the time, for a space elevator), but it is also fortuitous, because he didn't waste time on that stuff, which is important because the concepts of the present application obviate the whole lot of it.

BRIEF SUMMARY OF THE INVENTION

The objective of the present application is to propose a design for a small electronic vertical takeoff and landing (eVTOL) aircraft that is bladeless (not a copter-style vehicle), that is easily controlled and safe, that comprises one mode for vertical travel and an alternative mode for forward flight travel, and whose acceleration and airspeed are significantly greater than similarly-intentioned prior art aircrafts. In a most preferred embodiment the aircraft is a single passenger unmanned (autonomous) aerial vehicle. Even though the aircraft carries a passenger much of the time, the aircraft is not manned because the passenger, in the most preferred embodiment, does not control or contribute to anything other than selection of destination. There is no onboard pilot in this preferred embodiment even though the opposite, piloted navigation, is not herein unforeseen. Having an onboard pilot for a paying passenger would double the payload which is undesired in the preferred embodiment. However, in other potential embodiments, there could be implemented systems for operating such an aircraft some or all of the time by a trained pilot or a hobbyist.

The objective of the present application is further to propose such a small lightweight aircraft that meets and overcomes the foundational requirements/challenges of VTOL and eVTOL flight delineated in the background summary. However, an adequate brief summary of the preferred embodiments of the aircraft and its various modules must wait until the power plant embodiments of such an aircraft have been briefly summarized.

Fan Module and Splitter Module

The proposed aircraft and its capabilities rest upon a core concept best described at the time of filing as a serial multi-fan module, wherein the serial multi fan module comprises multiple (two or three or more) diagonal fans in series, wherein a $1^{st}$ diagonal fan stage feeds air to a $2^{nd}$ diagonal fan stage, and wherein in a preferred embodiment the $2^{nd}$ diagonal fan stage feeds air to a $3^{rd}$ diagonal fan stage, wherein the $1^{st}$, $2^{nd}$, and $3^{rd}$ fan stages share an axis of rotation while being axially disjunct but also nearly axially abutting with a small space between them. The combined serial multi-fan module (or impeller or power plant) will hereafter be usually referred to as the impeller or fan module. The fan stages each comprise fan vanes with each vane comprising a leading edge and a trailing edge. All of the fan stages of the fan module spin/rotate in the same rotational direction and with different rotational velocities.

The aircraft is provided with a fan intake module for inducting surrounding or passing air into the fan module. The surrounding or passing air passes into the fan intake module and is formed into an airflow by the fan intake module and routed by the fan intake module to the fan module. The $1^{st}$ diagonal fan stage accepts the air flow and accelerates it diagonally, meaning the air flow exiting the downstream end of the $1^{st}$ diagonal fan stage acquires a high tangential velocity component higher than its axial velocity component—in other words, the air is spinning around the axis of rotation of the fan module while also passing from upstream to downstream.

The air flow exiting the downstream end of the $1^{st}$ fan stage is spinning around the rotational axis moderately fast, so the $2^{nd}$ fan stage is made to spin at approximately twice the rotational velocity of the $1^{st}$ fan stage, allowing the leading edges of the $2^{nd}$ fan stage vanes to slice into the airflow just like the leading edges of the $1^{st}$ fan stage cut into a non-spinning intake air flow. Since the $2^{nd}$ fan stage spins at twice the rotational velocity of the $1^{st}$ fan stage, the air flow exiting the downstream end of the $2^{nd}$ fan stage is spinning around the axis of rotation of the fan module at twice the rate it was spinning downstream of the $1^{st}$ fan stage. In other words, the airflow swirling through the fan module just downstream of the $2^{nd}$ fan stage has a very high tangential velocity, while still having roughly the same axial velocity it had downstream of the $1^{st}$ fan stage.

Similarly, since the air flow exiting the downstream end of the $2^{nd}$ fan stage is spinning around the rotational axis very fast, the $3^{rd}$ fan stage is made to spin at around three times the rotational velocity of the $1^{st}$ fan stage (which is 1.5 times the rotational velocity of the $2^{nd}$ fan stage), allowing the leading edges of the $3^{rd}$ fan stage vanes to slice into the air flow just like the leading edges of the $2^{nd}$ fan stage cut into a slower-spinning air flow downstream of the $1^{st}$ fan stage. Since the $3^{rd}$ fan stage spins at 1.5 times the rotational velocity of the $2^{nd}$ fan stage, the air flow exiting the downstream end of the $3^{rd}$ fan stage is spinning around the axis of rotation of the fan module at roughly 1.5 times the rate it was spinning downstream of the $2^{nd}$ fan stage, which is 3 times the rate it was spinning downstream of the $1^{st}$ fan stage. In other words, the air flow swirling through the fan module just downstream of the $3^{rd}$ fan stage has an extremely high tangential velocity, while still having about the same axial velocity it had downstream of the $1^{st}$ fan stage. This extremely high tangential velocity coming from the $3^{rd}$ fan stage will be used almost immediately by the aircraft as downward or rearward thrust.

What the foregoing means is that, where a tangential velocity TV of the airflow downstream of a stage n is $TV_n$, the tangential velocity $TV_n$ of the airflow exiting fan stage n is actually $n*TV_1$. Where the total number of fans in the fan module is N, the tangential velocity TV of the air flow exiting the fan module is $N*TV_1$. This means that the thrust (m-doev where m-dot=volumetric throughput of the fan module) available from the tangential airflow velocity exiting the fan module, if the flow were routed in a single direction, would be $N*TV_1$*m-dot. Presuming that during takeoff the m-dot value (described in the detailed description) is merely a linear function of the fan intake area A using a linear coefficient k, the thrust is equal to $N*TV_1*kA$ or N*T (T being a single stage thrust). This means that for a certain size of fan module being used, the value A will directly follow from the fan module size, and therefore the value N (total number of fans) and first stage tangential velocity $TV_1$ will be tradeoffs for a given desired thrust, wherein $TV_1$ (if all of the stages have the same power) is a linear function of its power, such that once a fan module size has been determined, and an overall thrust required to raise/levitate the aircraft at a desired speed has been determined, a designer can a) established an appropriate $TV_1$ value and then a) determine the number of fans N, or b) establish a desired number of fans N and then determine the appropriate $TV_1$ and thereby the power for each fan stage.

For now we will begin using a most preferred embodiment for the fan module and that most preferred embodiment has three fan stages, or N=3, which has been arbitrarily chosen by the Applicant from potential N values reasonably listed as between 1 and 5 inclusive. The Applicant believes that this allows a moderate (relative to the weight of an occupant) power to be used for each fan stage, one that in fact would be able to propel the occupant via a single fan stage in a normal fixed-wing (or flying wing) forward flight by itself.

However, since if a standard thrust T is that producible from a single fan stage with a moderate power, and N*T is the thrust of the fan module with N stages (based on the equations provided earlier for a given fan power), then the thrust of a 3-stage fan module is 3T (it seems intuitive but theoretically proving it by the Applicant, leading up to filing, had pitfalls that will not be gone into here). The applicant believes that now that the number 3 has been settled upon for the most preferred embodiment's fan stage count, the weight W of the aircraft (with passenger) can be predetermined, and if we tentatively determine that a thrust of 1.5 times the weight W will be a good value capable of rapid VTOL, then a designer can choose a power for each stage that by itself can create a thrust of 0.5 times (1.5 W/3) the weight, and this power will be that which can create a given $TV_1$ based on pre-established intake area, etc. This power, chosen as a function of the weight of the aircraft and the intake area of the fan module, cannot be determined at this time. The non-variables need to be determined before the variables can. We don't know yet how large the aircraft will be or how massive.

The foregoing paragraph was provided to pre-establish the basis for why we will use the number of fans as a multiplicand for tangential velocity and thereby thrust. Being able to multiply the tangential velocity (and thereby thrust) by the number of stages is an extremely powerful tool and arguably the most important aspect of the present invention. Yes, doubling the number of prime movers on an aircraft will of course double its thrust, but at the expense of twice as many prime mover volumes and their corresponding intakes and drive systems. A small and optimized aircraft does not have room for several fan systems or large intakes, so we are here taking a single power plant and just doubling, tripling, etc. its power by stacking more fans in series, in a way that the tangential velocity (and therefore the eventual thrust of the overall system) just keeps incrementing up with every stage we add. Since each stage we add contributes to the added mass and complexity much less than it adds to the power of the aircraft (i.e. the obverse being to keep installing more power plants), the benefits of the arrangement begin to compound, so long as we do the mental work to figure out a way to drive the system that does not itself detrimentally add to the complexity, volume, and mass of the aircraft. The Applicant is not aware of any other system in the prior art that can do this, and more details of this and why it all matters will be discussed in the detailed description.

As an aside, it is probable that the dimensions of some or all of the elements shown for the fan module in this application are exaggerated (too large/massive for a single passenger). Applicant has chosen to retain the possibly-exaggerated elements in the drawings to show them in better profile/context for depiction's sake, and to establish that there can be no objection on the grounds that the fan module cannot have sufficient muscle to fulfill the application's broadest expectations. As shown, the fan module probably has a thrust-to-lift ratio for an adult-laden flight of more than 2:1, which is probably undesired at the time of filing according to the preferred embodiment of max airspeed being roughly 300 mph while we are being conservative, but which might be seen as incentivizing faster airspeeds in the future. Going over 300 mph would probably increase fuel consumption (somewhat, but not too much—these considerations are dealt with later in the application) for a given flight, and it would also increase user interest (marketability), but we won't get into it here.

The fan module has a frustoconical outer profile, with each diagonal fan stage having an intake diameter smaller than its outlet diameter and each successive stage being greater in diameter than the preceding stage, such that the intake diameter of the successive stage corresponds to the outlet diameter of the preceding stage. By this design, the air passing through the stages will be subject to constant centrifugal forces that pump the air through the fan module, but not too quickly, so that the diagonal fan stages each have their shot at accelerating the air flow, to impart each successive stage's rotational velocity (or more) to the airflow in the form of the airflow's resulting tangential velocity post-stage.

The radial height of the airflow space in the stages along the fan module's axial length must decrease. This radial height is the radial distance, at any axial point of the fan module, between the inner wall and outer wall of the respective stage at an axial point. In other words, the air flow passage itself narrows along each stage, such that as we move axially along each stage, the inner annular wall tapers to be closer to the outer annular wall. As mentioned, the radial height (air flow passage) must decrease as the air flow moves deeper into the fan module from the upstream direction toward the downstream direction. The radial height must decrease because the average radius of the airflow is becoming larger, such that the airflow cross-sectional area would otherwise grow, which cannot be allowed to happen.

A drive system is proposed for driving the fan stages, wherein each fan stage, being quasi-annular, is attached on its inside diameter (ID) to a cylindrical rotor. The rotors contain electrical windings that drive the fan stages. The rotors of a single fan module can be stacked or nested one inside the other such that the 1$^{st}$ fan stage's rotor is longer than the others and extends all the way through the fan module. The 2$^{nd}$ fan stage's rotor is not as long as the 1$^{st}$ fan stage's rotor, and this allows it to envelop the 1$^{st}$ fan stage's rotor while keeping the 2$^{nd}$ fan stage in an intermediate position downstream of the 1$^{st}$ fan stage. The 3$^{rd}$ fan stage's rotor is even shorter than that of the 2$^{nd}$ fan stage's rotor, and this allows the 3$^{rd}$ fan stage to be at a downstream position of the 2$^{nd}$ fan stage, while all of the fan stage's rotors' distal edges can be aligned at a base-end, near a base wall that supports three or more cylindrical stators, wherein each cylindrical stator is interspersed been pairs of rotors, so as to form a pattern of stator-rotor-stator-rotor-etc. as we move away from the fan module's axis of rotation. The stators contain permanent magnets or magnetizable windings that cooperate with the windings in the rotors to rotationally drive the rotors when the latter are energized with electricity. The nested arrangement allows each two adjacent stators to put magnetic flux on the rotor between them by using unshielded magnetized elements.

Because the fan stages of the fan module, as was mentioned previously, are all spinning in the same rotational direction, a flywheel module is provided to offset the Coriolis forces of the fan stages. The flywheel module can be unitary (or there can be plural flywheels) and it will spin inside or outside the fan module and will share an axis of rotation with said fan module and all its fan stages. The flywheel module should be a fraction (for example less than one eighth) of the weight/mass of the fan module but it should spin much faster (more than for example eight times the rotational rate of the 2 nd fan stage) in a rotational direction opposite the fan module stages' rotational direction.

To effectually simplify the device and, importantly, permit extremely high rotational velocities for the fan stages, the rotors, and the flywheel module, all of them will and probably must be levitated by, and axially immobilized by, active magnetic bearings. The active magnetic bearings for these elements will be variously configured for radial-bearing and thrust-bearing functions, and will be set up so that the rotors and flywheels are levitated in a manner to maintain a constant and perfect air gap between them and their respective magnetized stator elements. It is possible that the flywheel will need to spin in a near-vacuum in which case means has been herein disclosed for effecting such a near-vacuum. It is possible that the windings in the rotors (and stators, potentially) will need cooling and a means has been provided herein for cooling the rotor windings with air. As a side note, the Applicant has attempted to create the fan module drive system such that it, if equipped with a small pump that conducts air out of its core, can maintain a partial vacuum inside the core to reduce the air drag on the rapidly-spinning rotors and the inner diameters of the fan stages.

As described during the discussion of the shape of the fan module, the successive fan stages simultaneously radially expand or taper outward (as viewed moving toward the downstream direction) while the flow area radial height within them shrinks. What this means is that at the downstream end of the 3$^{rd}$ fan stage, the exit area of the fan module is a narrow circular slit. The air spinning within the 3$^{rd}$ fan stage is constantly pushed out of the downstream end of the 3$^{rd}$ fan stage (circular slit) and it finds itself still moving tangentially but now it is inside an annular duct called herein a fan exhaust volute, having migrated forward (along the flight direction) through another circular slit or annular intake in the fan exhaust volute that faces the circular slit that is the 3$^{rd}$ fan stage outlet.

The fan exhaust volute guides the air flow through a complete traversal of the outer perimeter of the system, almost 360°, before it bends the air flow inwardly to a splitter box that can selectively direct the air flow in two different directions by passing the air flow into two different ducts. Of these ducts, a first (or forward) fan exhaust duct passes forwardly in the aircraft toward the front of the aircraft and a second (rear) fan exhaust duct passes rearwardly in the aircraft toward the rear of the aircraft. The first fan exhaust duct guides the airflow in a manner to eject it straight downward from the center of the aircraft, and the second fan exhaust duct guides the air flow in a manner to eject it straight backward from a rear area of the aircraft. If the splitter box is actuated to deliver air to the first fan exhaust duct, the airflow being blasted downwardly from the center of the aircraft can levitate the aircraft. If the splitter box is actuated to deliver the airflow to the second fan exhaust duct and out the back of the aircraft, thrust is created to propel the aircraft in a forward flight direction. This system is too complicated to describe in the summary of invention and will be described in more detail, in accompaniment with the figures, in the detailed description.

The Aircraft

The aircraft in a preferred embodiment is longitudinally elongated, with a centralized hollow volume constituting or comprising a passenger cabin or cargo hold. In a most preferred embodiment, the mid-to-rear area of the cabin/hold contains at least one passenger seat. The at least one passenger seat is reclined such that the passenger's legs extend lengthwise toward the nose of the aircraft, yet the passenger's torso is leaning back to reduce the vertical height of the aircraft.

The fan module in a most preferred embodiment is "flipped" such that its intake is rearward (relative to the flight direction) of the fan module, such that the airflow within the fan module, while being tangentially accelerated, migrates forward through the fan module toward the front of the aircraft. This allows the first/forward fan exhaust duct to direct the air toward the downward (vertical thrust) direction very easily from the center of the aircraft since the fan exhaust is already in that general area, while giving the second/rearward fan exhaust duct more elbow room to twist around and by utilizing the fact that the annular fan module is hollow, direct the rearward thrust through the hollow tail of the aircraft. A secondary benefit of having the fan module flipped is that it allows a variable-geometry outer sleeve to be used at the fan intake module to control the amount of passing air flowing into the fan intake module at all times, wherein the rear end of the sleeve by dilating restricts and by contracting admits airflow (i.e. modulates volumetric throughput or volumetric flow) through the fan module, thereby serving as a valve that continuously regulates the volumetric throughput of the fan module, as well as serving to close off and to literally shut the fan intake during stationary modes (pre-takeoff) so that during pre-takeoff the fan module can run up to max speed in a self-created vacuum.

In the nose of the aircraft, forward of the feet/legs of the passenger, is a front stabilizer. The front stabilizer entrains (i.e. via intake flaps) ambient/passing/incoming air and utilizes rotating components (fans or compressors) to accelerate and/or pressurize the passing/incoming air into ducts/nozzles which allow the front stabilizer to eject air in bursts or constant streams, when needed, upward and downward and laterally outward from each of the two front corners of the aircraft. Also, other ducts/nozzles can direct the front stabilizer exhaust air forward for thrust reversal. This allows the front of the aircraft to be pushed in almost every direction, either to effect desired aircraft repositioning, aiming, etc., or to eliminate unwanted aircraft motions caused by external forces (mostly wind) or by the controller overshooting during other maneuvering actions.

Continuing with the front stabilizer module, it is capable of manipulating the overall pitch, roll, and yaw of the aircraft in two ways. The first way is forcibly changing the pitch or roll or yaw to perform some act demanded by the controller based upon the flight path and predicted troubles or needs; for instance, steady wind, wind gusts, a person or vehicle coming too close to the aircraft, taking off from or hovering on an inclined surface, rotating/turning the aircraft to face in the direction of the destination during the completely vertical initial stage of takeoff, rolling the aircraft while executing a regular turn during aerodynamic flight, the list goes on. The controller will order the front stabilizer module's ducts/nozzles to activate and the controller will control their respective thrusts by varying their exhaust flow either with intermittent bursts or by proportionately modulating their flow. The second way is reacting to sensed, unpredicted accelerations and activating the appropriate stabilizer module ducts/nozzles in a modulated way to offset unwanted linear or rotational movement of the aircraft before it happens, and in a worst case, if preemptively reacting after sensing acceleration but before unwanted movement takes place does not solve the problem by immobilizing the aircraft in the face of particularly harsh predicaments, reacting with additional thrust from certain stabilizer module ducts/nozzles to correct and/or reverse the unwanted movement.

The means for operating the front stabilizer ducts/nozzles has two components, one for sensing acceleration and the other for using the acceleration data to create a movement or preemptively offsetting an unwanted or unexpected acceleration (these are not necessarily synonymous).

Firstly, said acceleration needs to be sensed. This is simple, as there are inexpensive, accurate, lightweight, and small sensors on the market that can be easily incorporated by affixing at least one of them to some part of the aircraft, preferably but not necessarily near the center of mass of the aircraft. The most common is the inertial measurement unit (IMU) which provides a continuous readout of all accelerations experienced by it in real time. Other devices can be utilized as well, but of them the preferred devices all have three gyrometric sensors and three linear accelerometers, and are otherwise known as six-DOF (six degree of freedom) sensors and no further discussion should be needed here to describe them, as they are in wide use in many of the mechanical arts. In short, both of these groups of sensors report all accelerations (not velocities) in real time to the controller. The velocities accomplished by the accelerations over time can also be inferred from the accelerations by integrating them using differential equation computer codes, but especially for unwanted rotational movement (and the changes to pitch, roll, and yaw that result), the linear accelerometers can be used to sense the direction of gravitational pull and constantly report the pitch, roll, and yaw, and the pitch rate, roll rate, and yaw rate, in real time. When the gravitational pull is not sufficient to estimate position/orientation, the acceleration data stream can be double-integrated to estimate it. This should not always be necessary, because the aircraft will also include a GPS unit for other reasons, which should always provide position/orientation data, but in the event that the aircraft is shoved by a wind gust or is sliding down a hill or whatever and the GPS cannot pick up this movement accurately, the IMU/six-DOF sensor's acceleration data can be double-integrated to find out how much it has slid laterally or risen or dropped.

Importantly, it is believed by the Applicant that in most situations the accelerometric/gyrometric data can be used to offset unwanted movement before the movement happens. To repeat, before the movement happens. Because the sensor is sensing the unwanted acceleration, it just preemptively cancels it. In situations for which this is not the case, such as in heavy winds or when the aircraft is struck by, or strikes, something, the IMU/six-DOF unit will be used to sense the pitch, roll, and yaw, the controller will ramp up the stabilizer module's appropriate ducts/nozzles at a reactionary (high) flow initially and then the IMU/six-DOF unit will be used to gauge and track the subsequent counter-accelerations, and then a furtherly subsequent deceleration/cessation of the counter-movement will be performed, to stabilize the aircraft within several microseconds of the unwanted movement.

Now, these aforementioned counter-accelerations and other reaction thrusts need to be effectuated. In a preferred embodiment there are at least three stabilizer module ducts/nozzles at each corner of the aircraft, with at least one aimed upwardly (for pitch and roll control), at least one aimed laterally outwardly (for yaw control), and at least one aimed downwardly (for pitch and roll control). The Applicant has only so far mentioned a front impeller module with three ducts/nozzles on each of the front corners of the aircraft, but much better performance, and tighter control, would be achieved by having three ducts/nozzles on each of the rear corners of the aircraft, and the Applicant has gotten as close to this as he was able, by including within this application a rear stabilizer module, which has also been disclosed in further detail in the detailed description.

At the tail of the aircraft is an empennage. The empennage comprises multiple stabilizer vanes that are independently pivotable to yaw and roll the aircraft, pitch the aircraft up and down, and brake the aircraft, as well as to by maintaining non-pivoted positions inherently stabilize the aircraft such that it always points substantially forward, in a flight direction, at all non-zero airspeeds.

The aircraft comprises wing modules with short fixed outer wings that create a minor portion of lift at low airspeeds (and most lift at high airspeeds) while being hollow on the inside to create lateral pockets within which telescoping inner wings can be nested, wherein the telescoping inner wings can move outward to augment lift, or inward to decrease lift. In their maximum extended position the inner wings considerably increase lift such that they can produce a major portion of the lift component of the overall aircraft. But this is not necessary. The telescoping inner wings when completely retracted can extend inwardly not only all the way through the outer wings/pockets but further, such that they extend into the area of the cabin, and are seated at their innermost ends in a space below the elbows/forearms of the passenger. The inner wings can contain batteries inside them, and the inner wings when their batteries are spent can be removed from the aircraft and replaced with inner wings with fresh batteries, such that the charging of the aircraft's batteries is performed externally, such that the aircraft never has to stop working. This greatly increases the profitability of each individual aircraft in the scenario where it is an air taxi or other type of ride-sharing vehicle.

So, to repeat the most important aspects of the invention so far (using "impeller" instead of "fan module"), in the most preferred embodiment of the impeller of the present application, there is no counter-rotation of the multiple fan stages. All of the impeller's fans (a fan cluster of two or three or more axially aligned diagonal fan stages) rotate in the same rotational direction. Importantly, Coriolis effects are countered/offset in the most preferred embodiment by a single internal super-fast-spinning flywheel module that rotates within the general area of the fan cluster in a rotational direction opposite to the rotational direction of the impeller's rotational direction.

Once the Coriolis problem has been solved by the internal fast-spinning flywheel (intelligently controlled wherein the averaged rotational velocity of the fan stages times the averaged MOIs of the fan stages always equals or is near the rotational velocity of the flywheel times the MOI of the flywheel), the fan stages can be placed end-to-end, outlet-to-inlet, to create a swirling/tangential flow of air that just keeps accelerating the air as if the air were in a particle accelerator of sorts.

Now that we are mechanically uninhibited from powering up this novel concept of the co-rotating serial fans, no intermediate passages or guide vanes are necessary. The air in the 1$^{st}$ diagonal fan stage is rotated by the 1$^{st}$ diagonal fan stage to be mostly spinning in a tangential direction and when the air exits the 1$^{st}$ diagonal fan stage mostly tangentially it is picked off immediately (adjacently) by the 2$^{nd}$ diagonal fan stage (no intermediate passages or guide vanes) that is spinning at a rotational velocity much higher than the rotational velocity of the 1$^{st}$ diagonal fan stage, and the acceleration and velocity of the air are hereafter highly and increasingly tangential.

To repeat, an important feature that must be kept in mind during this discussion is that, even though the diagonal fans look like compressors in the drawings, they are not acting like compressors. Once the air has entered the inlet of the 1$^{st}$ diagonal fan stage it is constantly accelerated in the tangential direction such that by the outlet of the 3$^{rd}$ diagonal fan stage the average vector of the air molecules has a negligible axial velocity. In this tangentially-accelerating continuous drive scheme, the air's movement can be seen as linear, as if it were in an array of parallel helical ducts. The idea of a fan, compressor, or blower is just gone. We're now living in a world where we constantly accelerate a spirally wound flow of air within what is, except for the fact that it is spiraling, for engineering considerations effectively linear. From this point of view, the air is positively accelerated across at least six, if not fifteen or more feet of an arcuate line/curve. It just keeps getting pushed faster and faster and there really doesn't at the time of filing seem to be a way to look at it in which there arises significant drag or flow interruption.

For that reason, it does not matter whether we put the impeller inlet module at the front or the back of the impeller module. And because of this the Applicant has chosen to flip the whole configuration such that the axial flow direction of the air flow is from back to front (spirally along the aircraft's longitudinal axis). This allows us to locate the impeller module's exhaust flow nearer to a mid-section of the aircraft, to be handled within the previously unused cavity between the passenger and the impeller module, for bending the impeller module's exhaust flow toward a downwardly vertical thrust nozzle, to effectuate vertical takeoff and landing.

It must be stated now and in various other sections of the present application that because the air entering the fan module (impeller) during takeoff or landing is migrating into the fan module, specifically into the 1$^{st}$ diagonal fan stage, at a few hundred miles per hour, and the air exiting the fan module, specifically out of the 3$^{rd}$ diagonal fan stage, is traveling at thousands of miles per hour, the outlet cross-sectional area of the fan exhaust volute (and thus also the cross-sectional or flow area through all of the fan module exhaust ducts) is, due to conservation of matter, inherently capable of being, and necessarily required to be, greatly reduced in cross-sectional area. For instance, during VTOL with the most preferred embodiments shown in this application, the outlet cross-sectional area of the fan exhaust volute, or any duct downstream thereof, can have a cross-sectional area of less than 20 square inches, perhaps as little as 10 square inches. This allows us to duct, twist, and eject the fan exhaust in any manner and direction we wish to. It also allows us to not lose the kinetic energy accumulated by the fan stages.

The aforementioned 1$^{st}$ or forward fan exhaust duct branches into several sub-ducts whose outlets/nozzles are arrayed along the centerline of the bottom of the aircraft. By switching among the use of one outlet/nozzle or another, the downward thrust can be variably implemented, either a) from different areas near the currently located center of gravity (which changes) of the aircraft, or b) at different angles relative to the vertical axis, to create variable thrust vectors. The sub-ducts, in conjunction with the movement of flaps or other diversion means that select between one sub-duct and another, can be selectively and strategically used to provide different types of vertical takeoff, to be described much later. The front stabilizer can be used to burst or stream air out in different lateral or vertical directions from the front of the aircraft to stabilize the aircraft during such a vertical takeoff, as well as to provide downward thrust from the front of the aircraft when the aircraft is front-heavy, such as when a passenger is over a threshold weight.

The branching sub-ducts of the front fan exhaust duct can be of different forms. They could all emanate from a single switching valve that by moving (i.e. rotating, pivoting, etc.) delivers an incoming airflow to a first, second, third, or fourth sub-duct (and to only one at a time) wherein each sub-duct is aimed downwardly from different locations on the bottom of the aircraft, and/or at different angles relative to the vertical. The sub-duct system preferred by Applicant at the time of filing is that shown in FIGS. 4A-9C of the present patent application and will be disclosed later in the application. Another way to accomplish this would be to have a single outlet for the front fan exhaust duct that is repositionable to angle the downward VTOL thrust vector in any desired downward direction. The downward thrusts in all of these examples would preferably include a thrust angle of 0° (straight down, all angles herein being in a vertical plane that passes through the longitudinal axis of the aircraft), or anywhere from −10° to +10° which would allow the aircraft to controllably move rearwardly or forwardly while levitating, taking off, or landing, and it would also be useful for keeping the aircraft still and stable while taking off or landing in windy conditions. The downward thrusts in all of the above examples could also include thrust vector angles from 30° to 60°, which would simultaneously provide levitation or takeoff thrust while quickly accelerating the aircraft forward. The downward thrusts in all of the above examples could also include thrust vector angles from −80° to −20° to provide forward thrust, which would decelerate the aircraft to act as a brake and/or thrust reverser. And, although it is not discussed in the present application, the downward thrusts in any of the above examples could include thrust vector angles not along a vertical plane that passes through the longitudinal axis of the aircraft—in short, the downward thrusts could be used to provide lateral acceleration to the aircraft in order to travel sideways or counteract a sidewind.

The aforementioned fan intake module not only includes means for sealing it off and throttling the intake flow between zero and maximum airflow, it is designed to scoop the passing air, during high airspeeds, inward toward the 1$^{st}$ fan stage while reversing the air's flow direction (relative to the aircraft's frame of reference) from substantially rearward to substantially forward (toward the flight direction), such that the 1$^{st}$ fan stage is inherently charged with boost air. This boost air reduces the work required of the 1$^{st}$ fan stage, reducing the energy consumption during cruise flight by roughly the same amount that the scooping-in of air by the fan intake module expends energy (requiring more thrust from the fan module) by its drag on the passing air. As airspeed increases, this boost air also threatens to be excessive in a way that could choke the fan intake module, so the fan intake module should close its intake by an amount proportional to airspeed to keep the pressure on the 1$^{st}$ fan stage inlet at an optimal level. This will consequently reduce the air drag on the aircraft caused by the fan intake module, and it will also allow the fan module's fan stages to always be spinning at their optimal rotational velocities.

The fan intake module further includes shunt ducts aimed rearwardly that, when activated (opened), allow air (in cooperation with the main intake) to enter the fan intake module from both front and rear directions, such that the voracious ingestion of air won't suck the aircraft forward during VTOL when it would be desired that the aircraft rise and fall without any horizontal acceleration. Of course, if the aircraft is taking off from a large field or plane with no nearby obstacles, the shunt ducts could be kept inactive, since it would then probably be desirable to begin accelerating the aircraft forward immediately after liftoff, whereupon the thrust vector would also be diverted away from completely vertical (i.e. hybrid thrust) via the sub-ducts of the branched aforementioned 1$^{st}$ or forward fan exhaust duct, such that the thrust vector would have a horizontal (rearward) component, described a few paragraphs and in much more detail later in this application.

The tail of the aircraft tapers inward for aerodynamic reasons, and it is hollow to allow the main (rearward) thrust from the fan module, via the aforementioned 2$^{nd}$ (rear) fan exhaust duct, to exit through the tail for main thrust. The tail also comprises the empennage which in a most preferred embodiment has two identical stabilators and two vertical stabilizers (one up, one down), all four of which are independently pivotable. The use of these will be described in further detail later in the application—they are designed for when the aircraft is traveling forward as a fixed-wing aircraft, such as when executing a turn or during passive braking (where they are feathered toward each other to create drag) and at times it will be desirable to neutralize their presence during VTOL, such as by feathering the horizontal stabilators to be vertical during liftoff and touchdown, and by feathering the vertical stabilizers to align with a crosswind, also during liftoff and touchdown, so that the front stabilizer can quickly aim the nose of the aircraft in any direction desired by the controller without interference from said crosswind.

To round out the discussion of the proposed novel aircraft, some auxiliary features will be summarily listed, with a quick note that most of these items are discussed in the detailed description in more detail.

Landing gear are provided that have a flexibility or cushioning feature to allow the aircraft to experience soft landings and sit, when idle, low to the ground. A parachute is provided to save the aircraft and its passenger from crashing when part of the aircraft fails unrecoverably.

The batteries do not need to be in the wings. For a larger, differently-purposed aircraft, they could be removably inserted at any convenient location, preferably dead-space locations where their presence as ballast is beneficial.

The drive system described in this application is not necessarily the only way to drive the fans at the speeds required, although it seems to be the one that takes up the least amount of volume and even provides newly-created, useable space within its quasi-annulare structure, where the Applicant has decided to place the flywheel and the 2 nd (rear) fan exhaust duct.

Because the fan module exhaust passing through all the fan exhaust ducts and sub-ducts is traveling at an enormous linear velocity, the diverter flaps, valves, etc. (those in the fan exhaust ducts and sub-ducts) should probably be made of such flexibility that they flex or bow outward when impinged with said high-velocity exhaust in order to create a smooth and continuously curved bridge (outer wall) of the duct they are part of. Otherwise, turbulence would likely occur and detrimentally affect the flow profile of the exhaust, thereby reducing the efficiency of the overall system, and perhaps even prohibiting the enormous linear velocities that we desire to use for the fan exhaust. As shown in the drawings, some of the diverter flaps already have the desired curvature they will need when activated to a new position, so these should be stiffer and not made to flex.

To extend a given flight and increase the aircraft's capabilities for those entities that would desire it, since chemical energy storage is still much more lightweight than battery energy storage, the Applicant has proposed herein fuel storage in the form of compressed gaseous fuel, and accompanying the disclosure of them, has also proposed an internal combustion (i.e. turbine-based or piston-based) engine that drives a electrical generators to provide the electrical energy required by the fan module drive system. In these scenarios most of the electrical power would still be coming from the battery during takeoff and ascent, but this would allow the battery to be disengaged from the electrical bus during cruise flight and descent, and it is perhaps even possible that the battery could be partially or completely recharged by the generators, depending on the length of the flight, the amount of fuel onboard, and the predicted nature of the subsequent flight/hop the aircraft is scheduled to perform, in order to avoid pitstops.

About pitstops, obviously the aircraft has to be resupplied with fresh batteries (and potentially fuel in the embodiment of the previous paragraph) frequently. This would be best accomplished by professional attendants who are located at sites designated for servicing such an aircraft, but of course this is not necessary. It is definitely preferred, since it will inevitably result as incurring the least cost option per user, that most of the passengers are hiring their ride, as in paying a fare, and are not the owners of the aircraft themselves.

Also, it is preferred that the infrastructure, including the designated service stations, are not financially tied to the passengers. A market-driven approach would be the fastest way to implement what the Applicant is proposing, and the most likely to end up creating a world where rides are on-demand, cheap and fast, with the least amount of waiting around and passenger responsibility, but of course there are instances where everything in this paragraph is not the best approach, such as if a municipality or county were to install the infrastructure, purchase its own fleet, and structure the fee system according to popular consensus, modeling, and/or professional analysis. Of course the market-driven approach will be patchwork in many areas for a long time, and the municipality version would be its own set of patches overlapping with the rest, but this problem was solved for cellular phones, and it will be solved for this, because the two concepts are not that dissimilar (devices provided by one set of manufacturers, infrastructure developed by service providers).

Referring once more to the fan module and the fan exhaust ducting arrangement, this should preferably be an unpressurized system. The air on the inside might in fact be at a lower static pressure than the air on the outside. Also, since the pressure does not rise, heating of the air should be minimal. As a consequence of the last two conditions all of the walls or elements that form a physical barrier between the internal area of the fans/walls and the rest of the system can be relatively thin and lightweight, with material selection being made from among fiber-reinforced resins and plastics, and not from among metal alloys. Likewise for the fans and any stator vanes we end up needing as well. The only metal needed in this whole system (outside of the magnets themselves) should be the motor rotors, the motor stators, conductors, and actuators, and most of these will probably be made of various aluminum alloys for structural elements, and copper for conductive elements. It is becoming incontrovertible, without even starting to design the prototype, that this aircraft is going to be very lightweight.

The Airframe

The airframe of the aircraft is built around a main frame, which probably consists of two, parallel, main longitudinal beams along its floor. The beams would either have cross-beams and/or cross-braces, or they could use the frames/housings of the front stabilizer module and the fan module as rigidifying structures. The seat base could also be part of the rigidifying regime. The outer shell is a monocoque shell, meaning, it resists compressive and tensile forces acting to bend the main frame, which is primarily used to bear the load of the aircraft. The outer shell wholly encompasses the passenger, who can be recumbent, with shoulders, upper back, and head propped up somewhat for comfort, and the fan module, the fan intake module, and the fan module exhaust ducts are all behind the passenger. In the current embodiment discussed herein, which should not be seen as limiting the scope of the design, the nose of the outer shell will encompass front stabilizer and the feet of the passenger and the shell then widens in a manner conforming to the body of the passenger as it progresses from front to rear.

The shell begins to taper again after the passenger's shoulders, inwardly, converging toward the outer diameter of the fan module's 1$^{st}$ fan stage (which in the preferred embodiment is the rearmost fan stage), thus forming a tail that extends a little further back than that. The more that the shell can be made to conform to the passenger's body, without making her/him uncomfortable and while still allowing for large occupants and safety concerns, the more efficient and fast the aircraft will be. There is no getting around the breadth and height of the passenger's torso and the impeller system, so the shell is more or less tubular in shape, with the fan module system behind the passenger's torso.

The head area of the outer shell protrudes, unless it is decided that this is not mandatory for some reason (it seems desirable to the client that the passenger can witness the journey), and the shell before and after the head can protrude upward somewhat (forming a bulge) without affecting the drag too much. The head portion of the outer shell of the aircraft, where it "sticks up" to create a bulge for the head, is preferably made of transparent material.

The shape of the aircraft's monocoque shell could be further modified to create more inherent lift (even to the point of its being a flying wing), but again, the aircraft is intended to go moderately fast. At high airspeeds, extra lift would turn into energy loss (lift is drag is a force, whether it is desired or not, and therefore will suck energy). So, the applicant has backed off of some more exotic shapes, as well as taken measures to reduce the lift.

Furthering the discussion of unwanted lift, the applicant set out to make a wingless aircraft by creating a shell that would provide adequate lift but not until an intermediate airspeed (i.e 100 mph) had been reached. What this turned into, when a fan module was invented that would fit into this aircraft and be lightweight enough for use but was more powerful than expected, was a further desire to push the limits of the aircraft's airspeed. However, as the airspeed pushes well past 250 mph the lift cannot be made, really, to go away, and the aircraft will keep rising higher and higher into the air, instead of traveling flat or at least along the desired route, and this just gets worse as the airspeed pushes past 350 mph, 500 mph, etc.

So, the applicant smoothed out the shell to give less lift and the extra, unexpectedly powerful thrust of the new impeller system simply has to help more during the blended thrust (transition from downward thrust only to rearward thrust only) period. Mathematical calculations, or at least back-of-the-envelope ones, have been provided later in the detailed description to showcase the possibilities and expose the restrictions of blended thrust, and particularly, some preferred downward-thrust vectors, and their angles relative to the vertical, have been proposed herein that allow the aircraft to reach certain, threshold horizontal airspeeds before transitioning to fixed-wing flight.

In the areas under the arms of the occupant, on both sides, but still within a part of the outer shell that is elsewhere herein described as being made to be of an airfoil cross-section, there is a cavity or pocket, the cavity facing laterally outward. It is sized such that another body, also of an airfoil cross-section, can be slidably received therein. This other body is the previously mentioned telescoping inner wing.

The first purpose of the telescoping wing is to provide supplemental lift during blended thrust. There is a first transient airspeed range, where the downward VTOL thrust from the fan exhaust is being ejected at a thrust vector of, say 40-something degrees from vertical (almost as much rearward component as downward component). The telescoping inner wings probably should not be extended here, because they would only create drag, but that drag would be small due to low airspeed, so perhaps they should be extended here, because if the telescoping inner wings are heavy with batteries, their extension to their outermost positions would increase the moment of inertia of the aircraft around the all three axes, which would offer stability to the aircraft which is still in a quasi-precarious stage of the takeoff (or landing) sequence.

There is a second transient airspeed range, say above around 100 mph, where supplemental lift from the fan exhaust ducts is of less service to us than simply switching to main (rearward) thrust and popping out the telescoping inner wings. So, as this second transient airspeed range is achieved, the telescoping inner wings can both pop all the way out. As the airspeed continues to increase, they slowly slide back in. During this second transient airspeed range, the telescoping inner wings, by sliding in as airspeed increases, will allow the lift to be maintained at the same amount, instead of it increasing, and thus the aircraft will not begin to rise yet, unless that is wanted. Thus, when entering the second transient airspeed range, thanks to the telescoping inner wings, the popped out inner wings provide enough lift (between 100 mph and 300 mph, for instance) for the main (rearward) thrust vector to be sufficient to accelerate the aircraft in fixed-wing mode, while retracting the wings as a function of airspeed.

The second purpose of the telescoping wings could be to serve as virtual ailerons. When the controller decides to roll the aircraft for a turn, for example, a single telescoping inner wing on the side opposite of the turn direction side begins to slide out until it is creating enough lift on that side to roll the aircraft to the extent required for the turn. The applicant is unsure exactly how to push the other side down or if that is necessary. However, several options can be contrived that do not add to the weight or volume of the aircraft. The first option is that the turn-direction side stabilator could pitch down. The second option is that a flap or upside-down-airfoil-shaped baffle could slide out of the outer shell on the turn-direction side to reduce the lift on that side. This will create drag and a small loss of energy, but it should be kept in mind that the aircraft (discussed elsewhere herein) will begin its journey aimed at the destination and most of the flight should be in a completely straight line, such that these turns should be very rare. The third option would be to use options one and two together; pitch the turn-direction side stabilator up and actuate a flap or baffle on the turn-direction side to reduce lift. There are obviously many more options for executing a turn, including the use of the front and rear stabilizer modules and/or the stabilators, and these options are discussed in the detailed description.

Commencing a Flight/Hop

The aircraft will arrive to the passenger vacant, having been hailed by the passenger, in a geographical space indicated by the passenger or, if the passenger has chosen a poor spot, the aircraft will land at the nearest known suitable location or use its cameras and sensors, combined with GPS and other local and topographical data, to locate one. It is likely and desired by Applicant at the time of filing that the passenger's phone will have downloaded thereon a dedicated ride-hailing app, and this app will utilize all advantageous technology from the ride-hailing app arts to perform all the important aspects of that technology apropos its relation to the present invention. An added feature, however, could be that the passenger's phone could flash its flashlight in a telltale (coded) pattern toward the ground while the passenger points the phone's flashlight at the landing spot, or a Bluetooth connection could be made between the phone and the aircraft such that the aircraft would land at a certain position relative to the phone, which, for example, will have been laid down on the ground, such protocol having been previously made known to the passenger and established among the interested entities.

Upon arrival and landing of the vacant, hailed aircraft, its fan module will shut down immediately after touchdown. A top hatch will unlatch and the passenger can raise it, climb into the seat, pull the top hatch down until it latches, and get comfortable. The top hatch can have an electronically activated 2$^{nd}$ redundant sealing latch, and a harness that then presses down on the occupant's torso and lap. The harness could be an elastomeric mesh that squeezes the occupant slightly down into the seat. The harness could be made to quickly tighten (the seat belt art is analogous here) in an emergency, said emergency being, probably, when a collision or parachuting event would otherwise knock the occupant about and cause undue bodily injury. An airbag could be located above or about the passenger's head to envelop it during the moment of a collision (after parachute deployment of course) between the aircraft and an external object such as the Earth, or perhaps the airbag about the passenger's head could activate at the moment the parachute is deployed. It is noted that the historical record of air travel, once this system is perfected, more or less guarantees that there will be no crashes, and much less ones where the parachute does not safely slow the aircraft and return the aircraft and passenger intact to a safe unofficial landing site instead of the passenger dying, but these safety (harness, airbag) elements will alleviate the fears of the potential passengers (remembering that the aircraft has a parachute, or as many as 5 parachutes, will hopefully alleviate mortal concerns).

Other Considerations

The following paragraphs represent a list of secondary considerations that might become important during implementation of the concepts of the present application. The following discussion does not have any particular form and is simply a string of ideas that have not been rounded out into a proper discussion.

1. Redundancy of Communication and/or Logistics:
   - A. Internet of the airborne (IOTA) being a wide area network (WAN) using preferably radio frequency (RF, but not necessarily) communications such that every aircraft communicates a certain amount of digital information with every other aircraft within a prescribed radius (depending on the power of the IOTA antennas and power supplies).
   - I. Said digital information including the heading, bearing, and elevation of every IOTA aircraft within the general geographic area (radius<10 miles) of each aircraft.
   - II. IP addresses are used, each aircraft in the system comprising an IP address and a networking modem to pass all information among all IOTA aircraft at-will, and always, such that once the number of aircraft aloft within the general geographic area of a single IOTA module at any given time becomes more than a given threshold, the system will operate as an internet, but one insulated from all external encroachments (meaning it will have distinct JAVA-equivalent scripts and modem protocols that are un-hackable via proprietary code or simply gated-ingress features such as usernames and passwords).
   - III. Airport beacons and purposefully placed geographical beacons can anchor the map of the global IOTA such that when a beacon is picked up by any aircraft, the IOTA can place all the aircrafts on the map each for each other's use, and each for its own use.
   - IV. Remote pitot, IMU, anemometer, compass, and other mechanical sensors can be used on each aircraft for elevation, bearing, and airspeed information.
   - V. A small radar assembly can provide information on external large airborne objects (helicopters, planes, etc.) to be shared among the local fleet.

B. Ordinary wayfinding and position control using conventional means.
I. Standard aircraft communications addressing and reporting system (ACARS), air traffic control (ATC) systems, and Aviation Communication (AC) systems.
II. Geolocation deterministic (GPS/GNSS/QZSS/GLONASS) systems.
III. Cell sites (CS otherwise known as cell phone towers, cellular base stations, or otherwise connotated commercial cell-phone base stations), although all are suspended a small distance (100-200 feet) above the ground, their information is not unusable by aircraft operating under 1000 feet.
C. Wherein elements A and B work together during normal operation, and wherein one of them can fail completely while leaving the other with enough information to safely land every aircraft and perhaps even successfully deploy later flights, in the event that one of A or B fails due to energy grid outage, computer virus or AI attack, electromagnetic pulse, or another seemingly catastrophic scenario. What this really means is that by increasing the number of aircrafts of this type within a (i.e. metropolitan) zone does not add to the danger of increasing the number of aircrafts of this type (apropos their running into each other), it in fact decreases the danger possibly hundred-fold. One way or another, these aircrafts will be aware of each other and of each other's future positions, and act accordingly.
D. Not mentioned so far is the age-old practice of flying an aircraft at a certain altitude depending upon its heading and bearing. In all likelihood the aircrafts (once the skies are saturated with these) will cruise at an altitude that depends upon bearing, meaning (for convenient example) that if an aircraft is traveling at 0 degrees (true north) it shall do so at X+0 feet altitude, while an aircraft that is traveling at 5 degrees (N-NE relative to true north) shall travel at X+2.5 feet altitude. An aircraft that is traveling at 180 degrees (true south) will do so at an altitude of X+90 feet or X-90 feet. Following this enumerative function for all aircrafts in the sky at any moment, the chances of any aircrafts running into each other are effectively nullified. Applicant is currently ignorant of what X should be, but it is probably high enough such that if a catastrophic event were detected, the aircraft could be quickly and easily salvaged by routine parachute deployment. And at a glance, X is surmised to be between 400 and 800 feet, since we don't have a real basis to ground it without further modeling.

2. Larger or More Massive (Multi-Passenger or Long-Range) Embodiments:
A. The preferred embodiment is a stripped-down, ultra-economical iteration of the imagined array of potential inventions envisioned by the Applicant. In the event that more volume and weight are desired to be the proposed invention(s) available for larger, more luxurious, or multi-seated aircrafts, there are many options available to practitioners of ordinary skill in the art, as follows (only a small sub-set of options can be included herein due to time constraints, but many more should seem obvious).
I. A hybrid/blend of the systems shown herein and the dual-intake dual-impeller system (100, 100A, and 100B) of the 1st impeller modules of US 20220363378 A1. Without counterrotating flywheels the impeller systems would create Coriolis up on one side and Coriolis down on the other side, twisting the aircraft against its will during maneuvering in a worst case, and possibly catastrophically or at least unpredictably or inefficiently. So the flywheels might be included or, in their absence, it is possible that the Coriolis effects will not add up to much since their torques around the longitudinal axis will be offset by other means, negligible by themselves due to their short moment arms relative to the ratio of (the aircraft length plus or times airspeed) divided by the 2' or 3' moment arms they have by being laterally close to the longitudinal axis of the aircraft, remediable via simple countermeasures, or
II. Best—for a 2- or 4-seater (or 6 or 8 seater, etc.), provided a larger-radiused impeller system (with greater tangential velocities and also greater centrifugal forces than the main embodiment proposed in this document), and a much larger aircraft cross-section (generally breadth times height)—yes, larger form drag will ensue but that is probably mostly canceled out by the doubling, quadrupling, etc. of passenger flight minutes per hour. Much preferred (at the time of filing, and this is not canonical or dogmatic, everything is for sale here!), let us put a single, semi-large impeller system (something like the preferred embodiments proposed herein but volumetrically expanded due to intrinsically allowed gains in volume, due to the aircraft being now larger in most dimensions than the primary embodiment proposed herein—lots of embodiments not presented herein are very obvious to anyone who might attempt to think about the concepts proposed herein), with a counterrotating flywheel inside it, on one lateral side of the aircraft (behind one passenger or one row of passengers), with the exhaust volute blasting from the aircraft's lateral median straight downwardly, rearwardly, or via angled thrust/exhaust, from the mainline of the aircraft, while on the other side of the aircraft (directly next to the single, semi-large impeller system and behind the other passenger or row of passengers) there is a large useful high-density mass, the latter useful high-density mass being preferentially, but not exclusively, a removable power supply (battery, etc.) module that has the same mass as the impeller system+flywheel, and which serves double duty as 1) ballast and 2) power.

So, let us pause. We just proposed locating the propulsion system in a location and orientation that does not have the fan module's rotational axis concentric/coaxial with the longitudinal centerline of the aircraft, such as is shown in the drawings.

What this potentially means is that the fan modules proposed herein, or some alternative versions of them or something like them, could be installed anywhere on/in an aircraft of any size or body-type, in such a way that the air intake module is in any area or surrounding any area that leads air from outside the aircraft to the proposed fan module(s), and wherein the fan exhaust volute(s) eject(s) air from the rear of the aircraft or from any part of the aircraft in the rearward direction for thrust. It should not be overlooked that multiple fan modules could be placed in various spaces within larger (than the proposed embodiments) aircrafts, to work together to eject air rearwardly and downwardly in schemes that are not capable of being listed herein, since this disclosure must be finished within a few hundred pages and this application must be furnished and filed by Nov. 17, 2023.

B. Continuing with the various future improvements that should be considered obvious to ordinary practitioners in the art, the fan modules could operate front to back, have a vertical rotational axis, have a longitudinal rotational axis, or have a transverse rotational axis, and could pump air from front-to-back or back-to-front. The fan exhaust volute/ducting system(s) could be inverted, shifted, or rotated to meet design requirements for any type of aircraft, it could also be simpler or more complicated than that/those shown herein. The air intakes could come in from exterior surface zones that are cantilevered/stuck out to be scoops from one lateral side or the top side or the other lateral side or even the bottom of the aircraft, and the main fan exhaust/thrust could be directed rearwardly from 1-6 different locations that are not all necessarily parallel to the aircraft travel direction longitudinal axis or axial direction. The fan exhaust ducting system(s) could curl, split, or bend air in any number of ways that the Applicant does not have the time or space to enumerate herein. As shown, it is limited to something easy to draw and depict in a patent application. In reality, as "modules", which is an important word, the fan module and splitter module should be able to accept air from outside an aircraft and eject it at thousands of miles per hour in any way imaginable, once the embodiments provided herein have been proposed and ingested by the interested public. The Applicant can only present so many, so he has chosen those in his mind that are most amenable to the most fundamental problems of VTOL flight and electrifying commercial aircraft.

Since the fan module, with counterrotating flywheel, can be seen as an inert quantity apropos all mechanical considerations, except having a mass and spatial coordinate, and a side/corner of the airframe where the air has to come in from, the proposed fan module could be paired with another fan module, it could be part of a pack of fan modules, or it could simply be interposed ad-hoc into the various zones or pockets of any conceivable aircrafts of any type, the main considerations come down to how many fan modules are in an aircraft, where is/are their inlet(s), where is/are there outlet(s), and at what angle relative to the aircraft's longitudinal axis it/they are/is might be. The answer to how the main considerations come down to is, at filing, all of them, all those possible, all those conceivable, all those that invite themselves. Importantly, the proposed fan module(s) is(are) a tool that can be used anywhere on any moving body to push the moving body in a direction or directions desired by the controller that is responsible for controlling the moving body. It need not be utilized by itself and in many instances should be used in combination with other fan modules like it or in combination with other types of fluid impellers, such as stabilizers.

C. The fan modules proposed in the present application can be interposed to/on conventional or unconventional vehicles according to the following clauses:

Whereas the proposed fan module(s) could be located under or over the wings of a medium-to-large winged aircraft, affixed via pylons that contain VTOL ducting or other ducting, or affixed via other means that do not have pylons with VTOL ducting within them;

D. Wherein the proposed fan module(s) could be part of an inboard or outboard marine propulsion system (the Applicant when considering the fan module cannot find any inherent obstacles to using the proposed fan module for water, other than the obvious mechanical modifications).

E. Wherein the proposed fan module(s) could be located on, or all over, or in the front and/or back of, a non-fixed-wing personal craft, a dirigible, or a submersible vehicle for propulsion-on-demand or control-on-demand in every or any direction needed for proper travel;

F. Wherein the proposed fan module(s) could be part of a personal travel suit, such as a backpack style (Ironman-type) embodiment, not shown herein;

G. Wherein the proposed fan module(s) could be implemented as part of an air-crane or air-hoist system designed to lift and transport inanimate (freight or construction-site) objects;

H. Wherein the proposed fan module(s) could be part of a military jet or personal vehicle, whether VTOL-capable or not, for naval defense or for flying generals or admirals or troops from one arena, or base area, to another.

3. Non-Conical Fan Module:

A. The fans of the fan module are probably not completely required to taper outwardly along/across the fan module's longitude. Their intake scoop effect which is a residual of the scoop-angle (the angle of attack of the leading edges thereof) is probably powerful enough to drive the system without centrifugal forces being overridingly important or essential. Although this is not the preferred embodiment at the time of filing, doing without the centrifugal forces and their accelerative effects might be seen as a minor concession to getting the geometry of a fan module to fit within an optimized geometry of an aircraft or within an optimized geometry of any piece or zone of an aircraft wherein the fan module (or fan modules) is/are designed to reside.

B. Outer composite jackets for the latter (3rd or 4th) fan stages. The faster-spinning fan stages could, if needed, be radially constrained by fibers wrapped tangentially around their outer diameters, like the flywheel is.

C. It should be obvious to experienced or knowledgeable practitioners in the arts that the fan module exhaust, once registered into a volute or duct (or volutes or ducts) that conducts (or conduct) the fan module exhaust in a stream (or streams) that flows (or flow) from the fan module, can be ducted, diverted, twisted, split, or otherwise manipulated, in order to use the thousands-of-mph air flow coming out of the fan module to enable thrust (or pressure) in almost any direction, selectively or jointly, to effect almost any aim or solution sought by a designer.

D. The fan module exhaust stream needn't be in theory or expectation synonymous or commensurate with viability of the practical (shown) embodiments proposed herein. In fact, the practical embodiments proposed herein are from one point of view simply a necessary expo apropos industrial applicability for the fan module, as required by the US codes applicable (35 USC's 101 and 112). Further in fact, the proposed fan module, or any adaptation of it, could be used for any purpose in which objects need to be moved, full stop; with "any adaptation of it" (above) including among infinite immediately obvious or unobvious measures a) a novelty box that jumps around in someone's yard or in a street, to illustrate the inane potentialities of the potential endeavor; b) a means for propelling a land vehicle; c) a means for shifting the elements (i.e. wings) of an enormous or small aerial vehicle; d) a means for pushing any aerial or terrestrial object in any direction for any purpose; or e) an important component of a supersonic aircraft with or without VTOL. The primary embodiments provided herein can be employed to fulfill any pushing objective or narrative required by humankind, and should be when doing so is optimal, beneficial, entertaining, or merely more efficient than some other thing that is more complicated, monetarily expensive, or heavy.

4. Backpack Embodiment

A. As the current state of the relevant background art (at the time of filing) is in the curious position of providing few alternative embodiments for on-demand vertical flight with fast forward acceleration, Applicant has noticed that the preferred embodiments of the present application can be described, with reference to FIG. 1A, in an alternative terminology circumscribed as a "backpack engine" theory. A secondary look at FIG. 1A makes the system seem like the impeller module could be used, or is being used, as a backpack impeller.

B. In this non-drawn and non-preferred but still potentially useful embodiment, the fan module could in theory be made to be part of a backpack, with its thrust downwardly directed at times and rearwardly directed at other times, along the wearer's torso and legs via ducts, maneuverable by the legs or arms of the wearer, and also directed by other elements, to make the passenger fly without the fixed-wing elements and constraints proposed herein.

5. For a given impeller system outlet velocity (air jet or thrust velocity) of 3,000 mph;

A. 3,000 mph=50 miles per minute 50 miles per minute=264,000 feet per minute (hereafter fpm)

B. And with the radius of the last fan stage being in this example 1 ft (using $C=2\pi R$) we have circumference being 6.28 ft C. So the rotational velocity of the last fan stage is around: 264K fpm/6.28 ft=approximately 40,000 RPM.

D. This corresponds to a low-to-moderate rotational velocity for traditional turbochargers of smaller radiused fans, so it probably correspond to a moderate rotational velocity for similarly-radiused compressors (or fans), such as for 1-ft-radius diagonal fans.

In other words, completely reasonable for our purposes, especially since it is the copper-based coils, which are relatively light, that are spinning at 40K RPM, and none of the magnets move since they are parts of the stators.

5. Pondering High-Airspeed Travel Possibilities

A. Throughout the present application, the Applicant has proposed a maximum airspeed of 300 mph. This is/was simply a convenient tactic to establish a standard or easily envisaged maximum airspeed and it was arbitrary, insomuch as it makes the relevant mathematical considerations easily understandable and/or robust. Of course the aircraft should not be limited to 300 mph or any "maximum" airspeed because it has all the attributes and capabilities to go much faster than 300 mph without breaking too far away from the primary embodiments proposed herein.

So let us say for example that the aircraft was modified to have as its maximum airspeed 600 mph (10 miles per minute). This is twice the 300 mph (5 miles per minute) airspeed described elsewhere within this document as the nominal maximum.

A period of cruise wherein the aircraft travels at 600 mph has several engineering comparisons with one that travels at 300 mph. The aeronautical modifications are considered obvious but will be necessary for this. For instance, the inherent lift of the aircraft should probably be reduced (except where it is desirable to allow the aircraft to climb for much of the flight).

The comparisons for the 600 mph cruise scheme versus the 300 mph cruise scheme come down to a summation of the total counter-forces on the aircraft.

B. Those counter-forces break down as follows:

$$F_{counter}=\text{Skin Drag}+\text{Form Drag}+\text{Lift drag}$$

The skin drag across the aircraft's outer surfaces is directly proportional to airspeed, which means it is also directly proportional to distance traveled. It doesn't matter how fast the airspeed is, the skin drag through a complete flight always multiplies to the same integer, the integer being a coefficient reflective of the shape of the aircraft times the distance traveled. So the Skin Drag component of the above equation only depends on the distance traveled and therefore is not effected by the airspeed. So far, traveling faster does not cost us. Skin drag can be removed from the time-dependent considerations that follow.

The form drag, by being a square function of the airspeed (airspeed-squared), will be quadrupled by traveling twice as fast. So, traveling 600 mph might take 36000 units per second of energy, while traveling 300 mph only took 9000 units per second. However, since the aircraft will travel 600 mph for only half as long (time) as when it travels 300 mph, the energy consumption is 18000 (half of 36000) over 9000. So, the form-drag penalty for traveling twice as fast will probably always be two-to-one (2:1) except where aerodynamic modifications lead to considerable amelioration (which is not unforeseen at this time). This is only for form drag but it is important. This is a large loss and would ostensibly only be justified for emergency or luxury use, since other options are available. However, there remains the last drag of the above equation to determine how the aircraft should be appropriately used.

C. If the aircraft proposed herein was redesigned a little bit to have a lift-neutral cruise at 600 mph instead of 300 mph, its lift drag would be halved per unit travel-distance of cruise. This is because a substantial amount of the fan module's energy at cruise is spent suspending the aircraft in the air (in addition to fighting form drag), so if we reduce by half the amount of time that the aircraft spends in the air during cruise mode, the lift-drag contribution to total energy consumption per travel-distance is cut in half. Thus, the amount of energy losses we accrue from form drag due to high-airspeed travel is partially offset or negated by the fact that the aircraft is spending half as much time in the air.

So it is completely a considered feature of the proposed embodiments of the present application that the aircraft can (and probably should at times) maintain cruise airspeeds of over 300 mph and perhaps as high as 600 mph or 750 mph. While this could be detrimental to lighter versions of the aircraft and possibly should be avoided for about-the-town (hop-on-hop-off) embodiments, the added mass to the aircraft of long-range versions (extra batteries) and/or EMS functions (or luxury) makes it obvious to anyone of ordinary skill in the art that very high speeds are not necessarily impermissible or unwarranted, but in certain situations should be availed of.

On the Battery-Consumption "Surprising Result" of Doubling the Thrust Capability of an Aircraft Propulsion System and Running Said Aircraft Propulsion System at Max Power Throughout More of the Flight The Applicant predicts (a hypothesis) that greatly increasing the mass and power of the fan module's motors (from what would be required to have a thrust-to-weight ratio of 1.2:1) could cut the energy reserve/battery consumption per mile by up to half. Although a graphical and theoretical model is presented overall herein, it perhaps is insufficiently convincing to the reader so far.

In attempts to find evidence of this hypothesis in the prior art, the Applicant was not able to find a proof of the hypothesis he has put forth. There are likely several small practicality adjustments that need to be factored into the equation, such that the Applicant has merely put forth an ideal-situation model. In other words, the battery consumption will probably not be able to be pushed down to 50% per mile traveled just by having a very high airspeed.

Nonetheless, an entry in Wikipedia was found that seems to back up the theory, although it is not exactly the same concept. The article can be found at https://en.wikipedia.org/wiki/North_American_XB-70_Valkyrie and is from the discussion of the North American XB-70 Valkyrie, a strategic bomber. Per Wikipedia: Designed in the late 1950s by North American Aviation (NAA), the six-engined Valkyrie was capable of cruising for thousands of miles at Mach 3+ while flying at 70,000 feet (21,000 m).

To quote the article:

"This work led to an interesting discovery: when an engine was optimized specifically for high speed, it burned perhaps twice as much fuel at that speed than when it was running at subsonic speeds. However, the aircraft would be flying as much as four times as fast. Thus its most economical cruise speed, in terms of fuel per mile, was its maximum speed. This was entirely unexpected and implied that there was no point in the dash concept; if the aircraft was able to reach Mach 3, it may as well fly its entire mission at that speed. The question remained whether such a concept was technically feasible, but by March 1957, engine development and wind tunnel testing had progressed enough to suggest that it was."

This does not prove Applicant's version of the hypothesis, but apparently his hypothesis and the "discovery" from the above-cited article derive from a supra-theory (and are sub-theories under it) that seems to follow the same rules. The math is generally the same, with some starting-point differences.

The prior art scenario is the result of having an impeller system with enough (say 2× the ordinary) thrust to push the aircraft to four times the "ordinary" airspeed and keep it there. Applicant's scenario is that by having an impeller system with that (double) amount of thrust, the acceleration is four or more times the standard flight acceleration.

But they're the same in a certain way—Applicant's aircraft, if allowed to accelerate at 4× the standard acceleration, will on average be going four times as fast while using twice as much battery reserve per second. It is for this reason that Applicant would prefer to let the aircraft in a most preferred embodiment push into supersonic, since, having no 3-dimensional surfaces to cause shock waves, having no combustion, and via electricity the ability to run the $2^{nd}$ fan stage at two times the rotational rate of the first stage, the Applicant is just getting figuratively pulled into supersonic pretty much de facto, not necessarily against his will, as a consequence of the new motor design and the power consumption equation. Our system holds up, subsonic, for a short trip of two minutes where M1 is not crossed. However, in a longer trip, Applicant's fuel consumption advantages begin to taper off in subsonic travel. They do not if there is no M1 boundary on the airspeed.

It seems to be becoming increasingly apparent that this supersonic endeavor should start to be taken as imperative regardless of the cost, once the prototype has proven itself and the public and/or industry has taken notice. Not only to keep the battery consumption down to that 50%-of-the-prior art level (thus further reducing the mass of the aircraft and increasing its acceleration in a feedback loop) but to keep the time-of-flight very, very low. Earlier calculations by the Applicant had a DC-to-NY flight down to (using 10-miles-a-minute via 600 mph) 22 minutes. Now that can be cut further in half, without even going past 1200 mph. The ability to go from a DC parking space to a NY rooftop in 13-14 minutes is itself beyond disruptive. It is fantastical. Of course, the aircraft has non-negligible drag and air displacement, so for various reasons to be determined/encountered by prototyping and testing, the 1200 mph purported here might not be preferred due to considerations unforeseen by the Applicant. Then again, due to the length and missile-like geometry/profile of the aircraft, it's also possible that 1200 mph might one day in the future seem poky.

It is the inventor's belief that there are no qualitative obstacles to pushing the design, based on the contents of this document with improvements—improvements unforeseen at this time but undoubtedly having clear parallels, antecedents, and analogs in the other pursuits of trans—toward supersonic flight, such that they would be obvious to one of ordinary skill practicing in those arts, once said one viewed this document. There are several quantitative, and of course many geometric, incremental improvements that must be figured out by experts in aeronautics, but the payoffs would inordinately compound.

Although this whole thing is an aside right now, since we'll have to proceed with a subsonic prototype, it is stressed that the diagonal-type fans (with no compressors/turbines or coolant/combustion/lubricant), by not facing the air with a 3-dimensional surface, can be shaped to scoop the air and, even if variable pitch angle means are required for the leading edges of the vanes and special stator elements are required somewhere, can be made such that no matter how fast the stages rotate, no matter how fast the air is coming in, there is negligible shock. The vane leading edges will cut through the air like a knife, and for this reason may need to be sharpened on their fore edge, or even provided with small dentitions or serrations on their front edges, to buffer the constant air-vane collision in order to diffuse the sonic emission. In other words, among all the problems that will be encountered in trying to go supersonic with this aircraft, the chief aeronautical conundrums of supersonic flight have been precluded inherently by the design of the motor/fan being used herein. The rest should be simply a matter of wind-tunnel testing, computer modeling, and know-how from other aeronautical arts. A pre-swirler can and probably should also be used for supersonic flight.

However, attempting to make this aircraft go supersonic is too much to deal with at this time. Further, the applicant simply doesn't understand that technology. Therefore, the drawings provided herein, although the aircraft nose is depicted with subsonic features, does not completely rely on those features and it should not be seen as limiting to have the geometries shown. It is possible that all of this is rubbish and the only workable aircraft has a rounded front edge, and M1 bounds the maximum airspeed for all practical sensibilities. The applicant must leave it to aeronautical engineers to try to make super-high velocity flight a reality, using the presently disclosed aircraft and impeller system as a platform.

The only thing that is dynamic in the power requirements is the weight of the occupant, and her/his presence/absence. Suffice it to say, a person larger than 200 or 240 pounds will slow it down, but due to the near-doubling of the thrust, this is just an inconvenience of several seconds' lag. The absence of a person, such as when the aircraft has dropped off one person and is going to pick up another or switch out its batteries for new ones, will further increase the aircraft's acceleration/speed by a considerable factor.

Thus, it is not inconceivable of this aircraft/pod picking someone up (in an intra-city or intra-suburb scenario), flying someone where they need to go in under two minutes, and being at the next passenger's pickup point less than two minutes later. At full demand, even provided two minutes of idleness due to the human/societal component, a "ride" can be performed every six minutes. This results in ten rides per hour. The value of such an aircraft, in dollars/revenue alone, is more than we could ask for.

At first (in a few years), when there are only a few thousand of these on a continent, such a "ride" could be charged $100 for. Say a wealthy person (helicopter and limo lifestyle) wants to go from their driveway in New Jersey to a rooftop in Manhattan, right next to the elevator shaft. The limo/taxi would cost $100 and it would take 1 hour. This invention does it in 3 minutes, adding almost 2 hours to the person's day. At 5 rides per hour, 10 hours per day, $100 per ride (much less than a helicopter, and way less than owning a helicopter), it will generate $5000 per day for the owner. If it is used for 300 days per year, it will generate $1.5M per year for its owner. These are conservative numbers (it is likely it could get used for 10 rides per hour, 15 hours per day, 350 days per year, more than tripling the amount of income). If it is used for just under 3 years, it will generate around $4M. The applicant estimates that, after the first few years, when economies of scale obliterate the economical drawbacks of batch manufacturing, due to massive scale, one of these aircraft, as described herein and with improvements, can be manufactured for less than $1M, and probably less than $100,000.

Later (in several years), when there could be hundreds of thousands of these on each continent, and the applicant guesstimates 1 for every 50 households will suffice, it is foreseeable that a short ride (10 mi) could cost on average $3, an intermediate-length ride (40-90 mi) could cost $5-10, a moderately-long ride (100-150 mi) could cost $11-16, and a long ride (180-220, which is the distance from DC to NYC) could cost $18-22. It is at first hard to accept this as possible. So, let's just say we charge $1 per minute, which is possible because there is negligible operating cost (labor and energy). The longer rides actually become cheaper, per mile, at an exponential rate, for the first few minutes, because of the quadrupling of the acceleration we are going to do by doubling the mass of magnets and stator coils, discussed elsewhere in this document. They will also be cheaper because there will be less "down time", which includes waiting to be hailed, getting to the next fare, and periodically landing to get the batteries switched out. Most importantly, it will be the 3$^{rd}$ minute of the ride that completes miles 10-20 of the trip (not supersonic, unfortunately, at this point in the discussion), it will be the 4$^{th}$ minute of the ride that completes miles 20-30, etc. So, apart from the 2 minutes used to lift, accelerate, and drop the aircraft, the aircraft is going 10 miles a minute (at 600 mph) or more (20 miles per minute at 1200 mph), such that we just lose the 2 minutes for lifting, accelerating, and dropping, during which its average airspeed will be 5 miles per minute.

So, for a 50 mile trip (as the crow flies, so really 80 driving miles), we only need 5 minutes at 600 mph, with 3-5 minutes of down time. If we charge $6 for this, the aircraft will earn approximately $40/hour. At 16 hours/day this leads to $640/day, or $224,000/year if it is used this heavily for 350 days in a year. Again, it is believed by the Applicant that this device could be made for less than $100,000. So even at rates that were probably seen at the beginning of this paragraph as absurdly inexpensive, the aircraft pays for itself in less than 6 months. What this means if the device is made to last 5 years, the price is pushed down below $100,000, and production is scaled up, and the apps and telecommunication hardware and software are perfected to get in as many trips per day as possible per aircraft, is that the profits are immense even when the price is kept down to less than the current energy cost of the average person's one-way commute or a bus trip/commute.

Skepticism should kick in now and question whether this is to be believed on face value. So, let's try another odd scenario where the aircraft keeps getting used to go from DC to NYC. At 10 miles per minute, it can get in a full round trip every hour, 22 minutes for the trip and 8 minutes for down time. That turns into, again, around $40 per hour. There is no reason to believe the aircraft doing this could not just be reassigned to commuter duty during rush hour, so now it will be getting $3 every 4-5 minutes, which again around $40/hour. The Applicant has devised a theoretical pricing structure to show off the potential profits, but of course this is only one of myriad potential pricing structures that could incentivize manufacture, demand, and use of the present invention. This pricing structure should not be held against the Applicant as being in any way a limitation. However, it does contribute to the claims of industrial applicability, as it means we (all humans everywhere) could be flying around the world at a whim, no longer confined to our automobiles and airports, in ⅛ to 1/15 the time per trip, using no fossil fuels, for much less than the yearly cost of our cars and airplane tickets.

It is noted that if the present invention were not attempting to convey something other than a single comfortably seated occupant, the scheme for intaking air would typically be best manifest by ingesting the incoming air at the area shown in the drawings. This is quite obvious once the shape of a occupant seated quite comfortably is no longer the pursuit, such as in the case wherein the payload is: 1) a person on a gurney; 2) a package or a set of packages queued up to be dropped off on successive porches, driveways, roofs, or lawns; 3) an organ transplant; or wherein said aircraft is 4) a fighter drone or anti-ballistic-missile defense shield agent wherein the aircraft only houses an air-to-air missile or a missile array, or both an air-to-air missile or missile array and at least one gun, such as a 50-caliber anti-aircraft machine gun. These modifications are presumed by the Applicant at this point to be unworthy of further exposition because they are and mostly will be obvious. The present embodiment, that shown in this application, is concerned with making people fly around for the goodness of humanity.

Other intake schemes in conformance with the present invention will actually and in practice be simpler in those other environments, and they will inevitably be fabricated and used now that this application has been published. But that does not mean that they are unobvious. The present application has actually foregone discussion of the simpler embodiments to focus on the present embodiment, which is more complicated because it has always and heretofore been proven difficult to intake air for a powerful impeller system that is conjoined to a seated occupant in a way that is fast and efficient for propulsion of said occupant.

It is vaguely presumed by the inventor that multi-passenger embodiments of the present invention might be popular, especially for long-distance trips, but it is beyond the scope of the present discussion. It is foreseen by the Applicant that several of the aforementioned alternative embodiments would utilize impeller systems of 1) greater diameter and/or 2) more stages, such as three stages, each of these packages providing nearly-parabolic increases in thrust-per-weight per aircraft, and thereby requiring a modicum of additional structure, basically more fiber-reinforced-composite fan material and more magnets. The technological foray wherein the impeller system must be multiplied (i.e. one on each side of the aircraft) only becomes imaginable when the payload rises to more than a handful of tons, such as for small wide-body aircraft. Where the present invention is to be applied in such a way, the downward exhausts would be distributed differently, but predictably, in such ways that balance the torque around the center of mass amongst the tail, wings, and front.

In other words (going back a few paragraphs), part of what the Applicant is saying herein is, whether or not the aircraft is supersonic long-range equipped or simply subsonic short-range, it might be desirable to provide a fan module that gives the aircraft a 2:1 (or anywhere from 1:6 to 3:1) thrust-to-weight ratio, considering the added weight/mass of such a fan module and its drive system would become less detrimental since the aircraft spends so little time in the sky.

A Distilled Summary of the Invention

Having explained the many important aspects of the present invention hereinabove, some of the most important aspects of the present invention will be reiterated in another albeit redundant way, summarizing what is seen at the time of filing as the most important features.

In the simplest terms, proposed herein for a first embodiment is an aircraft comprising an electrically powered fan module, said aircraft further comprising a longitudinal forward flight direction and a longitudinal rearward direction parallel to said longitudinal forward flight direction and opposite to said longitudinal forward flight direction, said aircraft further comprising a vertical downward direction that is orthogonal to said longitudinal forward flight direction and toward the Earth and a vertical upward direction that is also orthogonal to said longitudinal forward flight direction and opposite to said downward direction; said aircraft being configured to be forwardly propelled toward said longitudinal forward flight direction by at least one longitudinal rearward thrust ejected from said aircraft substantially toward said longitudinal rearward direction, wherein said electrically powered fan module impels an exhaust air, wherein said electrically powered fan module comprises a rotational axis and an axial direction parallel to said rotational axis, and wherein said electrically powered fan module further comprises a tangential direction that is tangential about said rotational axis and circles around said rotational axis and is centered on said rotational axis; wherein said electrically powered fan module impels said exhaust air in a curve around said rotational axis and substantially along said tangential direction; wherein said electrically powered fan module expels said exhaust air into at least one air duct that conducts said exhaust air away from said electrically powered fan module substantially along said tangential direction.

The electrically powered fan module comprises at least two fan stages in series flow, said at least two fan stages in series flow including at least a $1^{st}$ fan stage spinning at a 1st fan stage rotational velocity and a $2^{nd}$ fan stage spinning at a $2^{nd}$ fan stage rotational velocity, wherein said $1^{st}$ fan stage feeds air to said $2^{nd}$ fan stage, and wherein a ratio of said $2^{nd}$ fan stage rotational velocity to said $1^{st}$ fan stage rotational velocity is greater than 1.5; wherein said electrically powered fan module expels fan module exhaust air into said at least one air duct or into an air duct system that conducts said exhaust air away from said electrically powered fan module and ejects said exhaust air out of said aircraft for thrust to accelerate said aircraft toward said longitudinal forward flight direction, or toward said upward direction, or simultaneously toward both said forward direction and said upward direction, or toward said longitudinal rearward direction.

The electrically powered fan module can include a $3^{rd}$ fan stage spinning at a $3^{rd}$ fan stage rotational velocity, wherein said $2^{nd}$ fan stage feeds air to said $3^{rd}$ fan stage, wherein a ratio of said $3^{rd}$ fan stage rotational velocity to said $1^{st}$ fan stage rotational velocity is greater than 2.2.

The air duct either ejects said air directly downwardly along said downward direction to accelerate said aircraft in said upward direction or leads to a splitter module that ejects said air directly downwardly along said downward direction to accelerate said aircraft in said upward direction.

The air duct leads to a splitter module that ejects said air directly downwardly along said downward direction to accelerate said aircraft upward toward said upward direction, and said splitter module can be manipulated to eject air rearwardly along said longitudinal rearward direction to create said at least one longitudinal rearward thrust to accelerate said aircraft toward said longitudinal forward flight direction.

The aircraft air duct leads to a splitter module that ejects said air directly downwardly along said downward direction, at 0° relative to said vertical downward direction, to accelerate said aircraft upward toward said upward direction, and said splitter module can be manipulated to eject air downwardly at a non-vertical $1^{st}$ angle, said non-vertical $1^{st}$ angle being between said downward direction, 0° from said downward direction, and said longitudinal rearward direction, 90° from said downward direction, to accelerate said aircraft upward in a direction along an oblique non-vertical $2^{nd}$ angle.

The electrically powered fan module comprises at least one fan stage including a $1^{st}$ fan stage spinning in a $1^{st}$ fan stage rotational direction, and wherein at least one of said aircraft and said electrically powered fan module comprises at least one flywheel module spinning in a flywheel module rotational direction that is opposite to said $1^{st}$ fan stage rotational direction, wherein said $1^{st}$ fan stage has a $1^{st}$ fan stage axis of rotation and said flywheel module has a flywheel module axis of rotation wherein said $1^{st}$ fan stage axis of rotation is also said flywheel module axis of rotation.

The electrically powered fan module has a hollow portion and said flywheel module resides within said hollow portion, and the electrically powered fan module comprises at least two fan stages including a $2^{nd}$ fan stage spinning in a $2^{nd}$ fan stage rotational direction about said $1^{st}$ fan stage axis, wherein said $2^{nd}$ fan stage rotational direction is the same as said $1^{st}$ fan stage rotational direction and opposite to said flywheel module rotational direction.

The electrically powered fan module comprises at least one fan stage including a $1^{st}$ fan stage that is a diagonal fan stage having a large hollow central portion; wherein said electrically powered fan module further comprises a spinning $1^{st}$ drive rotor to drive said $1^{st}$ fan stage, wherein said $1^{st}$ drive rotor is located within said large hollow central portion of said $1^{st}$ fan stage and fixed for rotation with said $1^{st}$ fan stage to form a unitary spinning body, wherein said $1^{st}$ drive rotor also comprises a hollow center, such that said unitary spinning body spins about said hollow center of said $1^{st}$ drive rotor in a shaftless manner.

The electrically powered fan module comprises at least two fan stages including a $1^{st}$ fan stage comprising a $1^{st}$ diagonal fan and a $2^{nd}$ fan stage that comprises a $2^{nd}$ diagonal fan, wherein said $2^{nd}$ diagonal fan is placed coaxial with and closely adjacent to said $1^{st}$ fan stage such that air passes through said $1^{st}$ diagonal fan to said $2^{nd}$ diagonal fan and then through said $2^{nd}$ diagonal fan along a helical path.

The electrically powered fan module comprises at least two fan stages and at least one of said two fan stages is levitated by active magnetic radial bearings and said at least one of said two fan stages spins at a rotational velocity of more than 40,000 revolutions per minute.

The aircraft has a front end and a rear end according to said longitudinal forward flight direction and said longitudinal rearward direction, and wherein said front end comprises a front stabilizer that can emit bursts or streams of stabilizing air to control the orientation of the aircraft, wherein said bursts or streams of stabilizing air are emitted by the front stabilizer in multiple directions including at least one of said downward direction and said upward direction.

The aircraft comprises an air intake for said electrically powered fan module, said air intake having an intake area, wherein said intake area is the total measure of an open cross-sectional area of said air intake, through which all air that passes into the electrically powered fan module must pass, and wherein said intake area is actively constricted in order to vary the amount of air that reaches said electrically powered fan module.

The air duct leads to a splitter module that ejects said air substantially rearwardly along said longitudinal rearward direction to accelerate said aircraft forward toward said longitudinal forward flight direction, and said splitter module can be manipulated to eject air forwardly at an angle of 35° or less from said longitudinal forward flight direction, to decelerate said aircraft relative to said longitudinal forward flight direction.

The electrically powered fan module impels said fan module exhaust air, wherein said electrically powered fan module comprises a rotational axis and an axial direction parallel to said rotational axis, and wherein said electrically powered fan module further comprises a tangential direction that is tangential about said rotational axis and circles around said rotational axis and is centered on said rotational axis; wherein said electrically powered fan module impels said exhaust air in a curve around said rotational axis and substantially along said tangential direction; wherein when said electrically powered fan module expels said exhaust air into said at least one air duct or air duct system, said air duct or air duct system conducts said exhaust air away from said electrically powered fan module substantially along said tangential direction.

The electrically powered fan module comprises an air intake comprising an intake area which is the total measure of an open cross-sectional area of said air intake, through which all air that passes into the electrically powered fan module must pass; wherein said air duct or air duct system has an air-duct cross-sectional area that passes 100% of said exhaust air out of said aircraft during an operating state; wherein a ratio of said intake area to said air-duct cross-sectional area is greater than 5:1, and preferably is greater than 10:1.

The aircraft air duct leads to a splitter module that ejects said air directly downwardly along said downward direction to accelerate said aircraft upward toward said upward direction, and said splitter module can be manipulated to eject air rearwardly along said longitudinal rearward direction to create said longitudinal rearward thrust to accelerate said aircraft toward said longitudinal forward flight direction.

BRIEF DESCRIPTION OF THE DRAWINGS

FIG. 1A depicts a left-hand-side lateral view of the aircraft perceived toward the right-hand-side of the aircraft, lateral to the flight direction and horizontal, while FIG. 1B shows the aircraft from above, looking down toward the earth and vertically, such that FIG. 1B is a top-plan depiction of the elements from FIG. 1A and of the aircraft overall but viewed from the top.

Figures 1A, 1B:
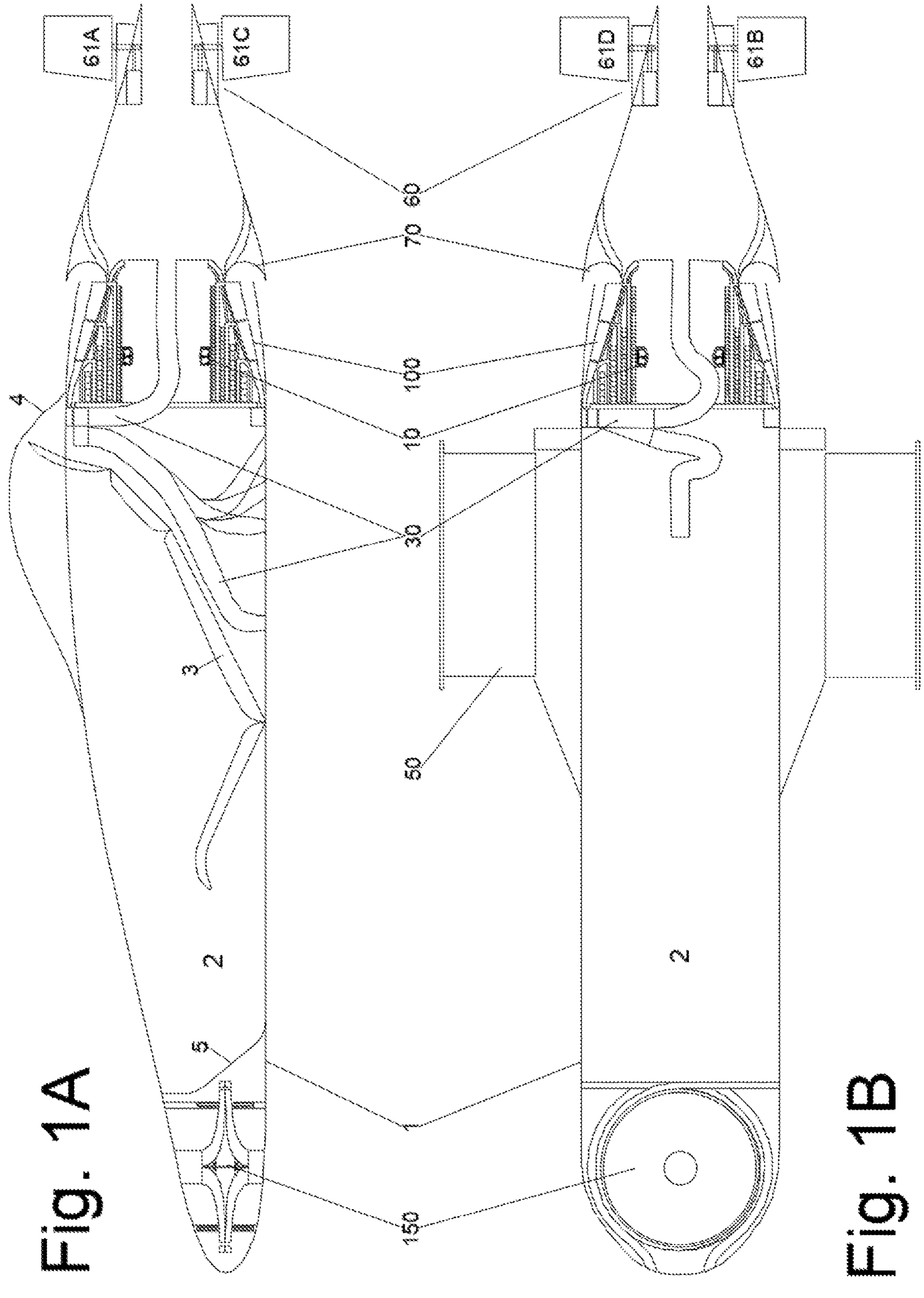
FIGS. 1A and 1B jointly illustrate the overall scheme of the aircraft, with all the germane elements described in the description of each figure being visible and all objects not germane to the description of each figure being invisible.

In the foregoing brief description of FIGS. 1A-1B, the Applicant recited and/or interjected the observation/disclaimer "with all the germane elements described in the description of each figure being visible and all objects not germane to the description of each figure being invisible". This recitation is inherently part of and inherent in most of the descriptions of the drawings that follow in this brief description of the drawings and also in the detailed description of the drawings. There seems no ostensible or intuitive benefit to keep reciting it over and over again when patents are meant to describe the things they are describing, so in all of the descriptions of the drawings that follow, the Applicant is only depicting visibly the things being described by the appended textual descriptions while omitting every surface, edge, intersection, mechanism, context, and movement not being apropos to the elements being described in the detailed description portion for that given part.

In FIGS. 1A-1B there are reference numerals that refer to both FIGS. 1A and 1B simultaneously and in such instances (across the overall system and often in some of the figures being described herein) a single reference numeral is provided between adjacent figures with multiple leaders leading to two or more figures at once. This is a well-established practice in US patents and published applications and should not be objected to, and it will hopefully be deemed useful by the Examiner or anyone trying to understand this invention and it is in many cases herein unavoidable due to the Applicant's desire to use multiple adjacent figures to establish a functional commonality between or among adjacent figures. This will be the established regime going forward.

Figure 2A:
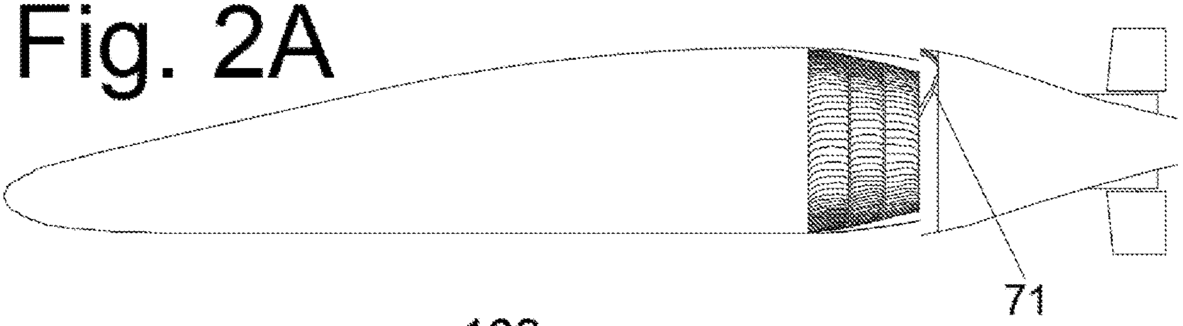
Figure 2B:
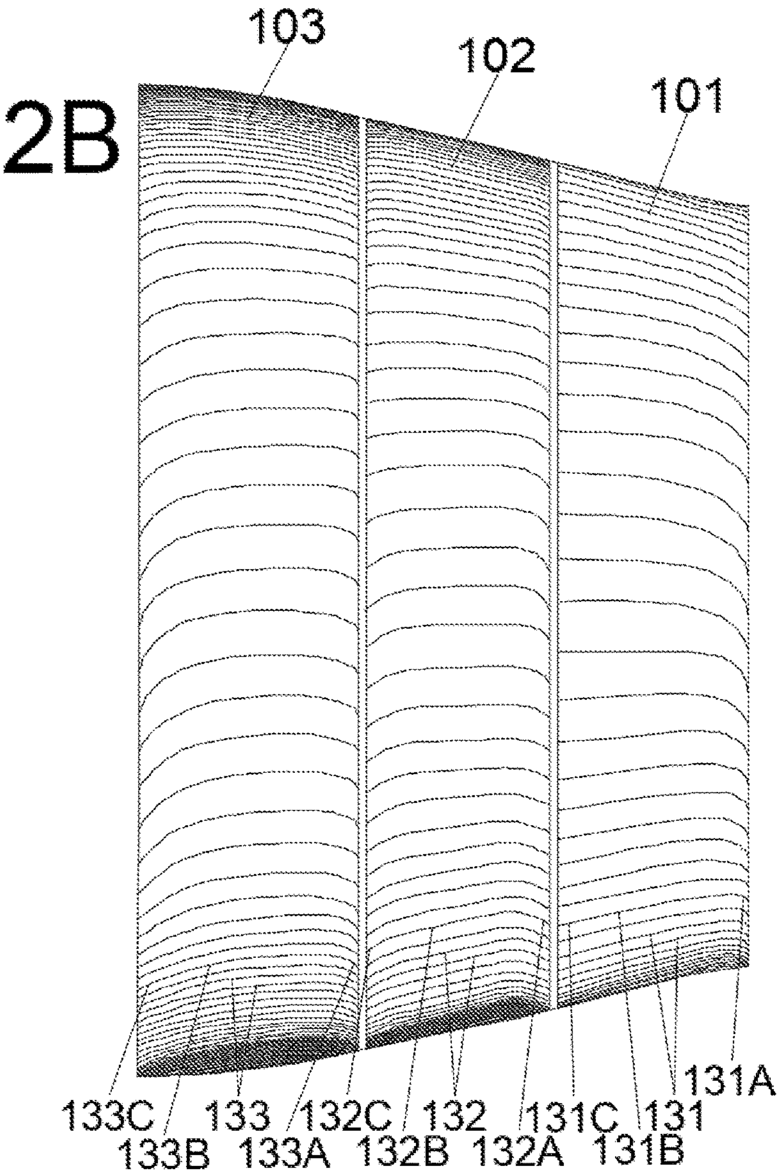

FIGS. 2A and 2B jointly illustrate the currently preferred embodiments of the diagonal fan stages of the preferred embodiment, with FIG. 2A showing where on the aircraft the diagonal fan stages are located and FIG. 2B depicting the outer outlines/shapes of the diagonal fan stages and also the two-dimensional geometries of all of their vanes' outer edges.

FIGS. 3A-3G depict various viewpoints and features of the fan module drive system, and most of the content of FIGS. 3A-3G is employed for aiding descriptions of the fan module drive system, multiple fan module bearings (i.e. a levitation scheme), and a fan module core evacuation system.

Figure 3A:
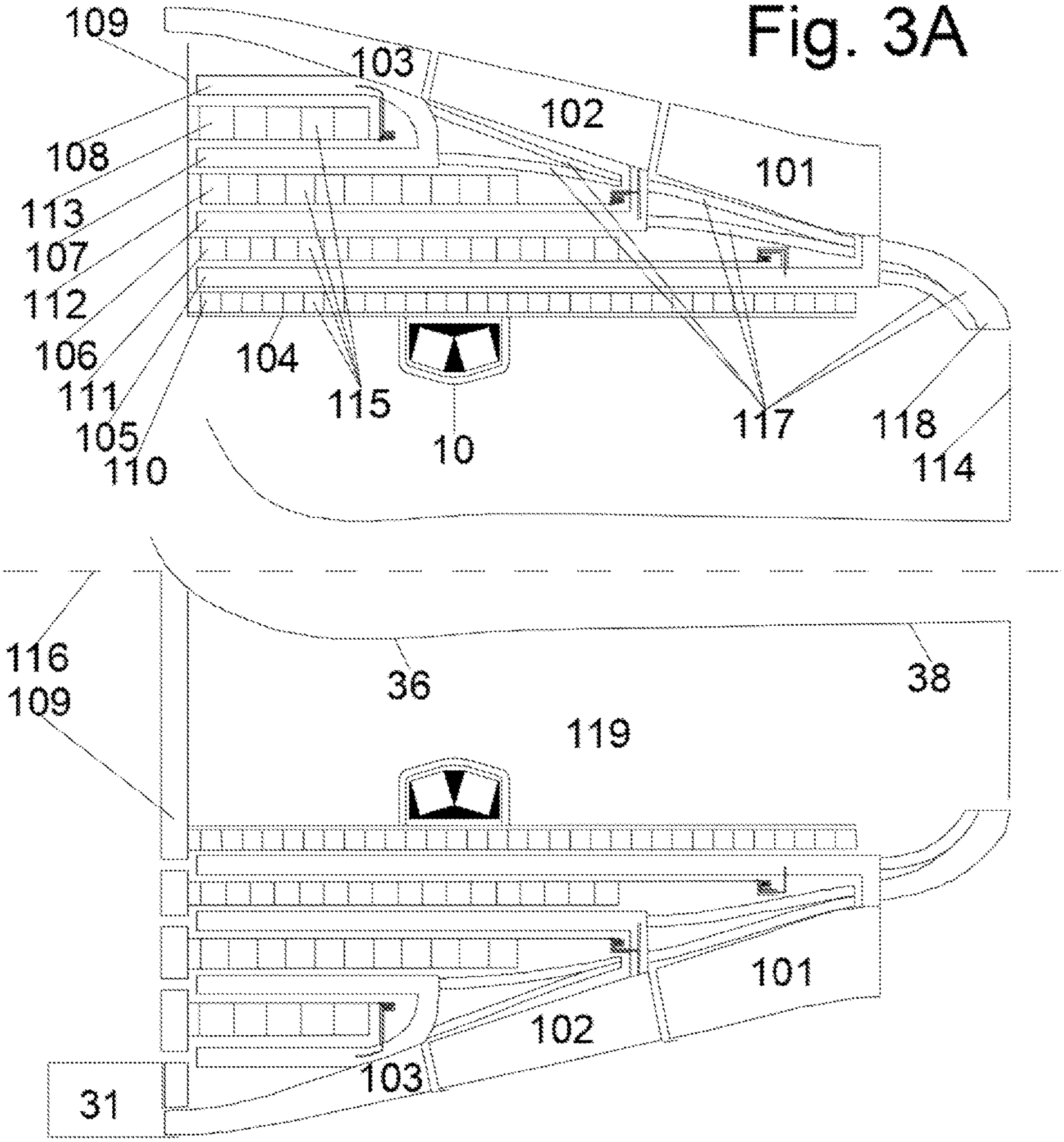

FIG. 3A is a cross-sectional view through the diagonal fans and it illustrates a currently preferred embodiment of the fan drive system, viewed as an annular system rotating about a rotational axis 116 and also viewed from the sides or bottom or top of the aircraft. Since the diagonal fans are annular and also radially symmetrical, a cross-sectional view from any one lateral vantage will be identical to any other vantage of them. A flywheel module 10 is prominent among the various annular stator and rotor members, which are concentrically nested within each other.

Figure 3B:
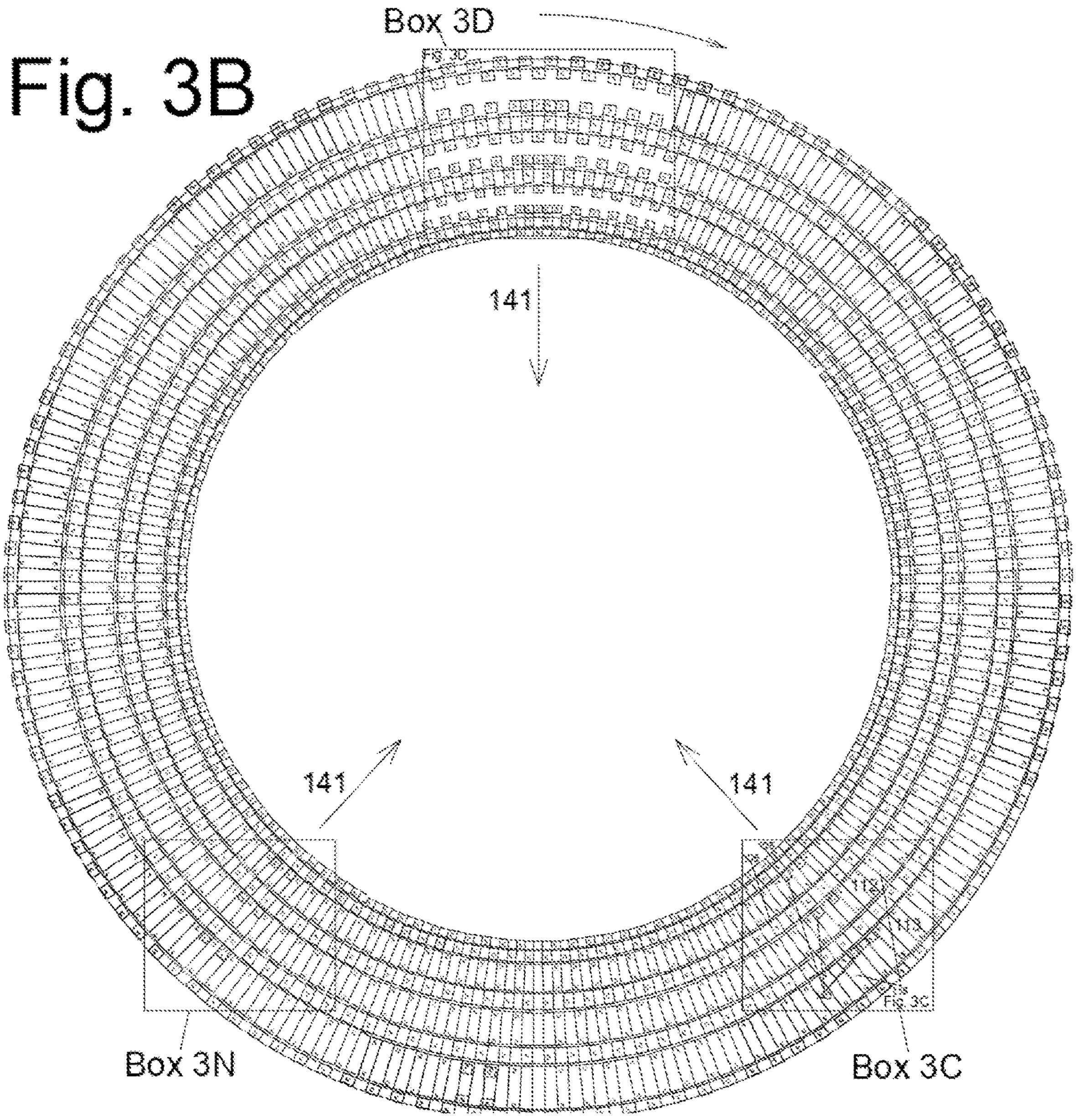

FIGS. 3B-3D jointly illustrate axially-viewed, currently preferred embodiments of the fan drive system and the fan levitation system (electromagnetic bearings). Within FIGS. 3B-3D, FIG. 3C is a close-up of the contents of "Box 3C" from FIG. 3B, and FIG. 3D is a close-up of the contents of "Box 3D" from FIG. 3B, all of these depicting the radial magnetic bearings, with FIGS. 3C and 3D also illustrating alternative embodiments of the drive magnets.

Figures 3E, 3F:
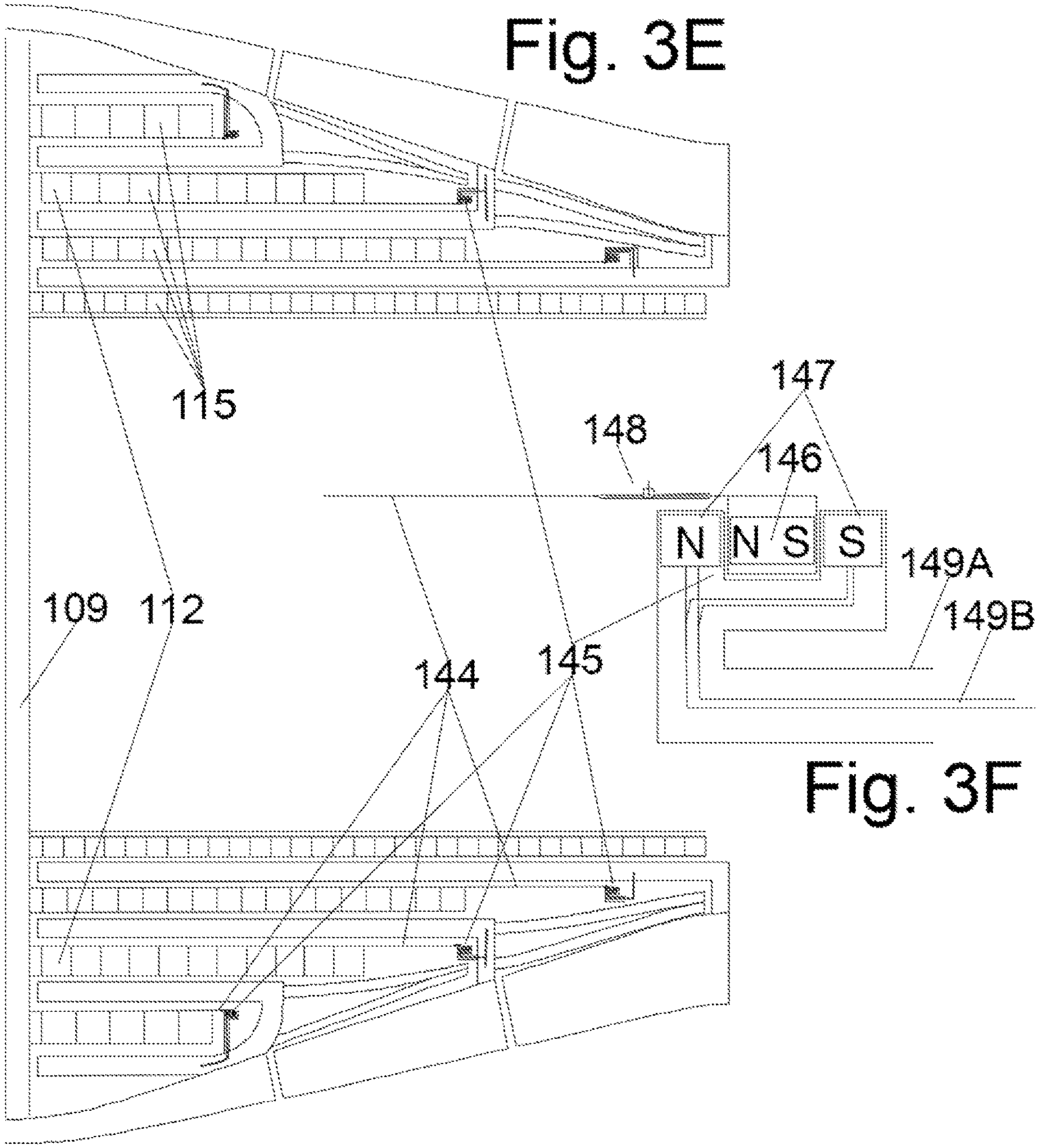

FIGS. 3E-3F jointly depict a proposed embodiment for thrust bearings usable for all of the rotors of the fan module.

Figure 3G:
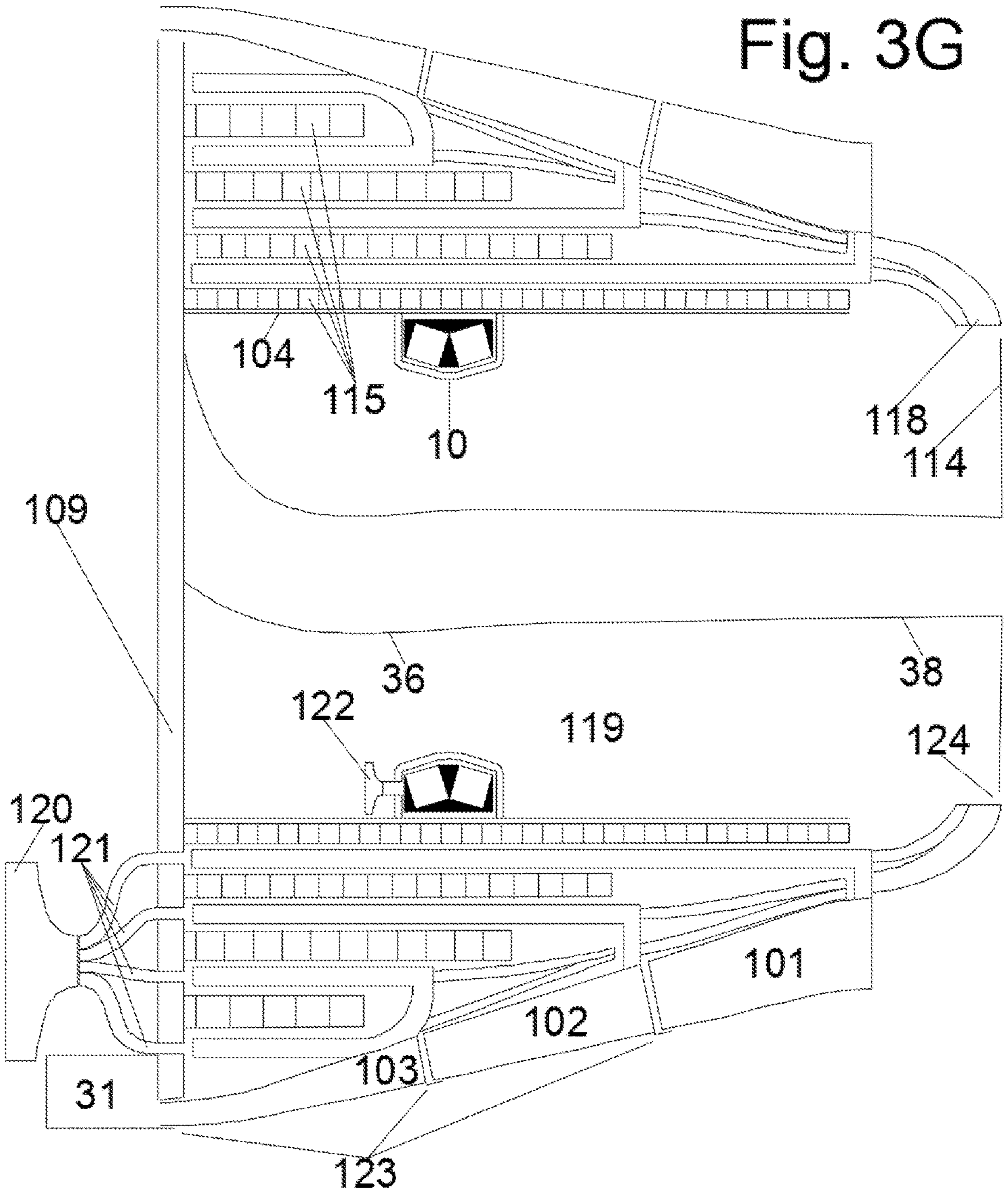

FIG. 3G illustrates an embodiment of an evacuation means for the core of the fan module and also an embodiment of an evacuation means for the flywheel module, as well as fan exhaust seals.

Figures 4A, 4B, 4C, 4D, 4E:
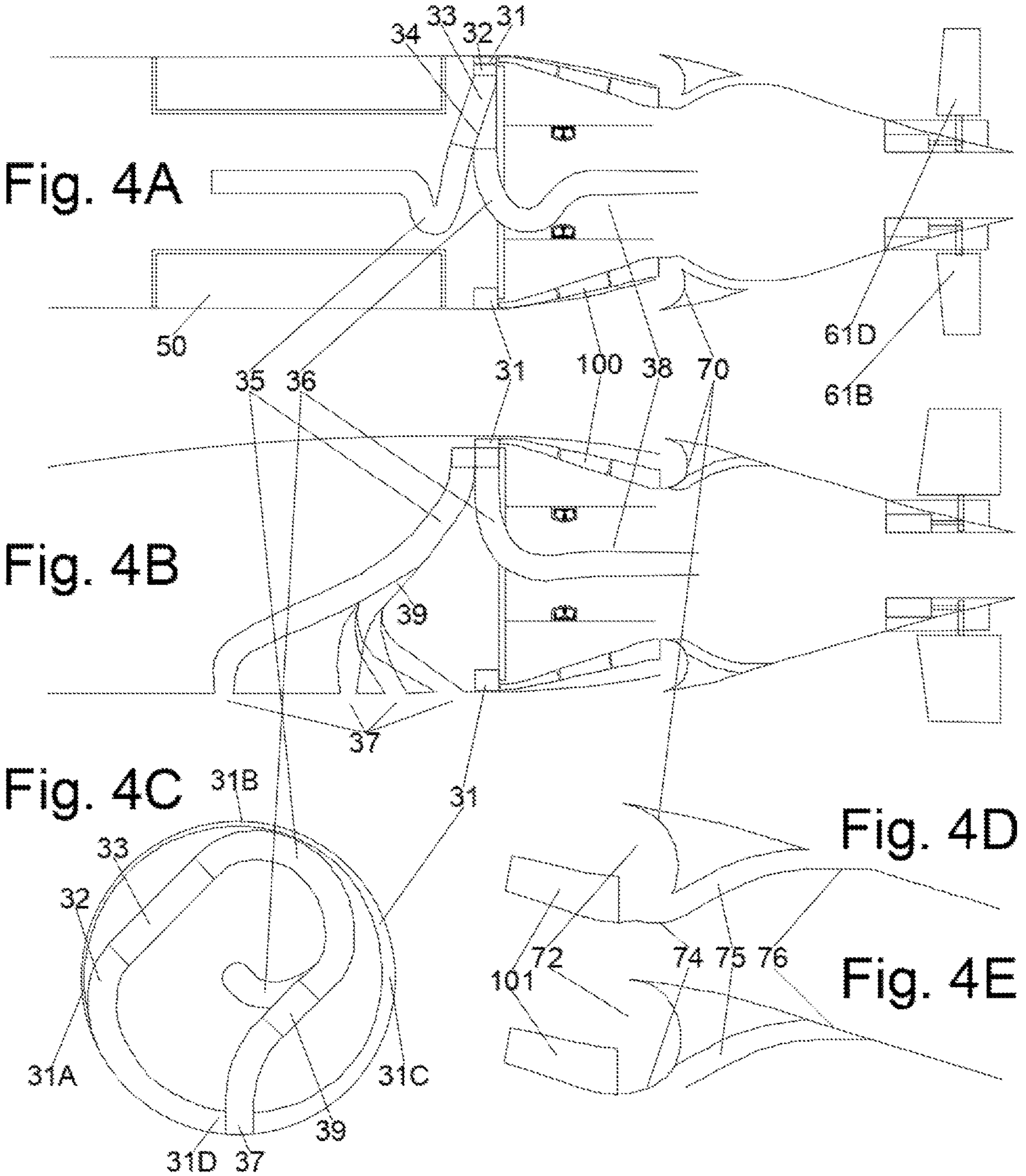

FIGS. 4A-4H jointly illustrate the fan intake module, the splitter module, the reciprocation of the wings, and the empennage module, with FIG. 4A depicting a completely vertical VTOL thrust configuration viewing the system from above, FIG. 4B depicting a mostly/mixed vertical VTOL thrust configuration vantage from the left-hand side, FIG. 4C depicting the VTOL system from the front looking rearwardly, and FIGS. 4D and 4E being successively proffered sub-drawings of the parts of the fan intake module during different important stages of VTOL operation.

Figure 4F:
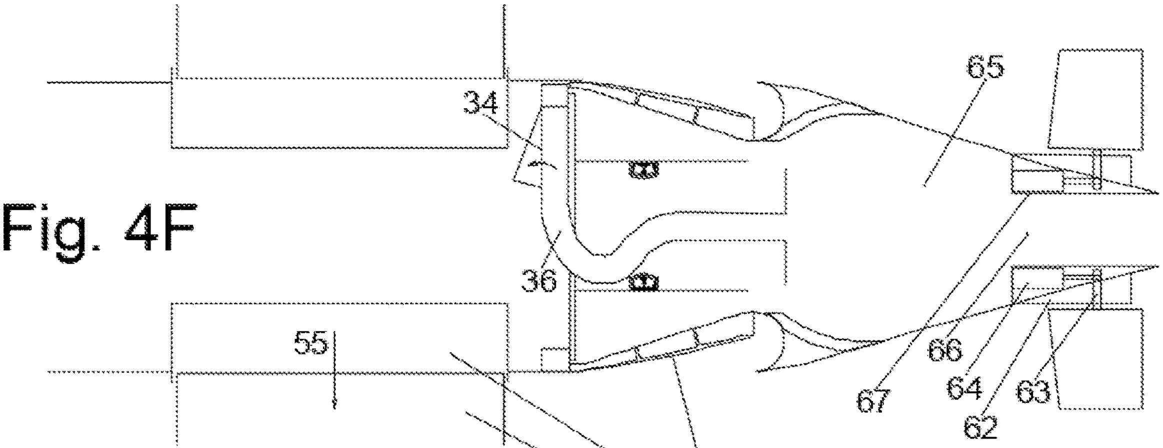
Figure 4G:
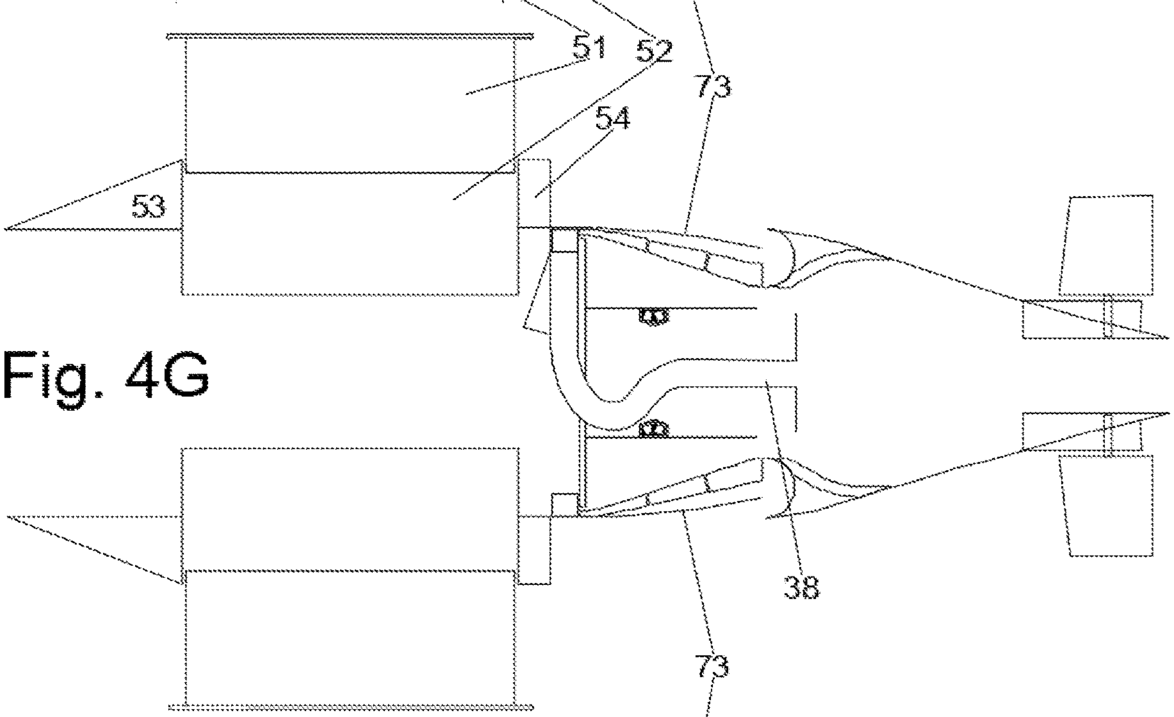
Figure 4H:
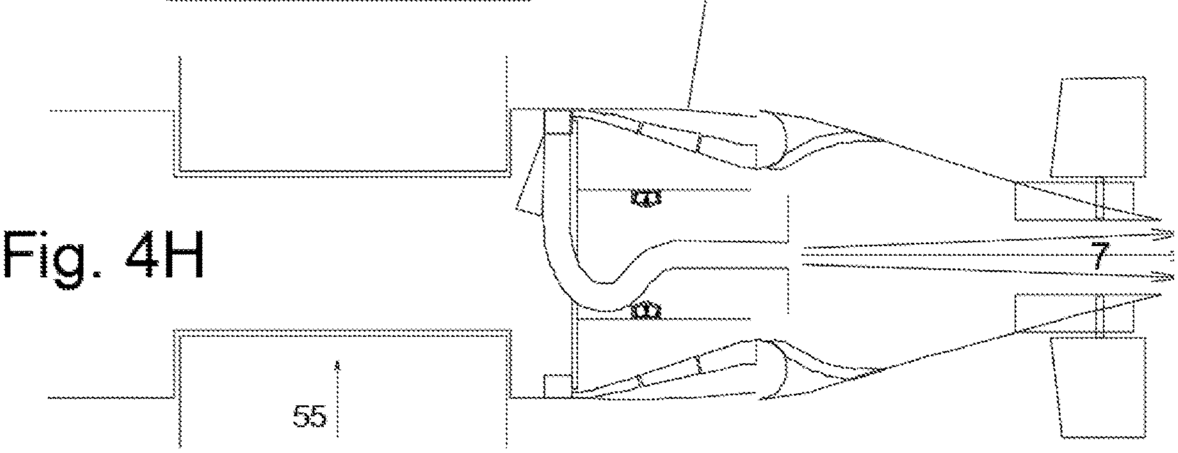

Continuing in the discussion of FIGS. 4A-4H, only FIGS. 4A-4E having been dealt with already, FIGS. 4F-4H are snapshots of the inventive embodiment as it transitions from a state that is already accelerated to over a threshold airspeed (i.e. 100 mph), and through the transition to full airspeed (i.e. 300 mph), FIG. 4F being the snapshot of where the aircraft has achieved more than the threshold airspeed (i.e. 100 mph) and the thrust is completely rearward, wherein the telescoping inner wings start shuttling outward toward their outermost extents to provide maximum wing lift; wherein FIG. 4G shows the aircraft when the aircraft airspeed is above said airspeed threshold (i.e. 100 mph) and the telescoping inner wings have shifted laterally completely outward and the fan intake valve is somewhat radially expanded to accept less air.

FIG. 4H represents a state wherein the aircraft is traveling at an airspeed beyond another threshold airspeed (i.e. 300 mph) and the wings are completely retracted and the fan intake valve is spread almost completely out to minimize air inlet acceptance/intake to the fan module. FIG. 4H also shows the rearward thrust from the fan module exiting the tail of the aircraft.

FIG. 4F further illustrates the parts of the empennage module with appropriate labeling being included therein.

FIGS. 5A-5H jointly illustrate an aggressive takeoff scheme with all the flaps of the splitter module shown in their various sequential stages/states in such a way that the reader can envision the takeoff sequence by viewing FIGS. 5A-5D in conjunction with FIGS. 5E-5H, wherein one of ordinary skill in the art can figure out what the aggressive takeoff scheme accomplishes given the ample description provided later in this document.

FIGS. 6A-6E jointly illustrate a (currently unpreferred) more comfortable and less harrowing (than that shown in FIGS. 5A-5H) takeoff scheme for the splitter module wherein the aircraft does not need to aim upwardly to achieve its desired forward velocity within a short period of time. FIGS. 6A-6E focus on the $1^{st}$ VTOL duct/nozzle 42 and the many ways it could play out or be leveraged in practice. The first embodiment shown is not a conclusive solution to the various problems these figures are attempting to solve, but FIGS. 6A-6E mainly deal with an embodiment, proposed herein, that splits the $1^{st}$ VTOL duct/nozzle 42 (or another duct or passage that is normally aimed downwardly but can be deflected non-downwardly) between a totally-downward thrust and a combination of a) majorly-downward thrust mixed with b) a minorly-rearward thrust.

Figure 7A:
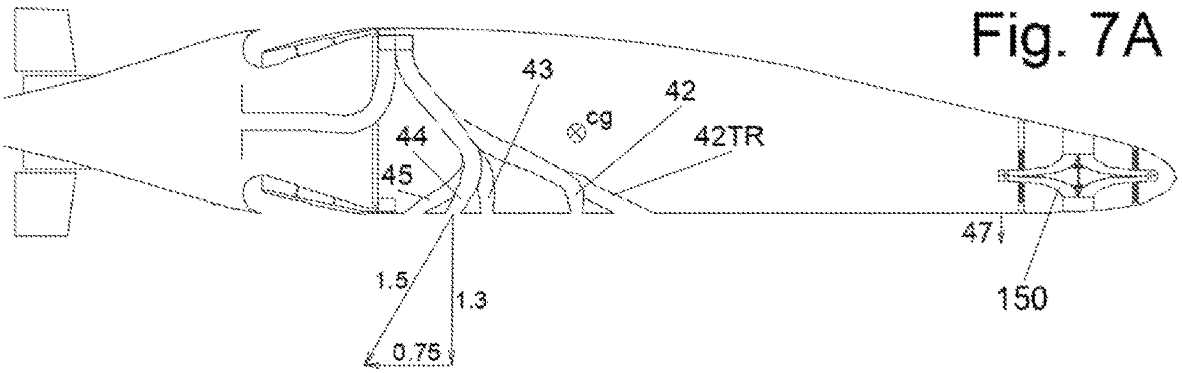
Figure 7B:
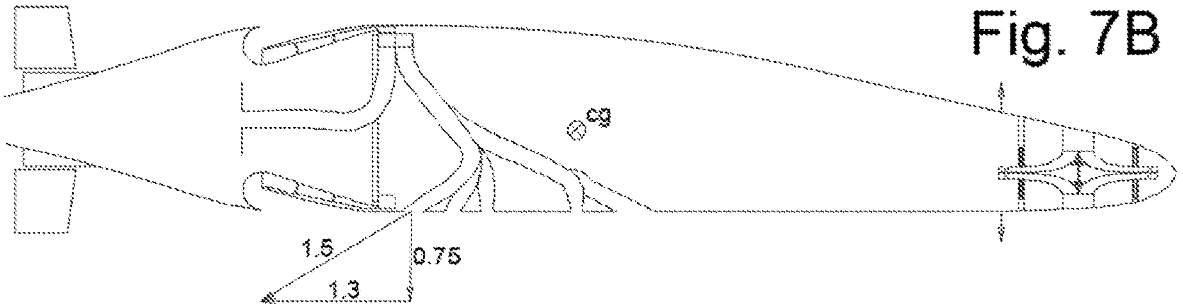
Figure 7C:
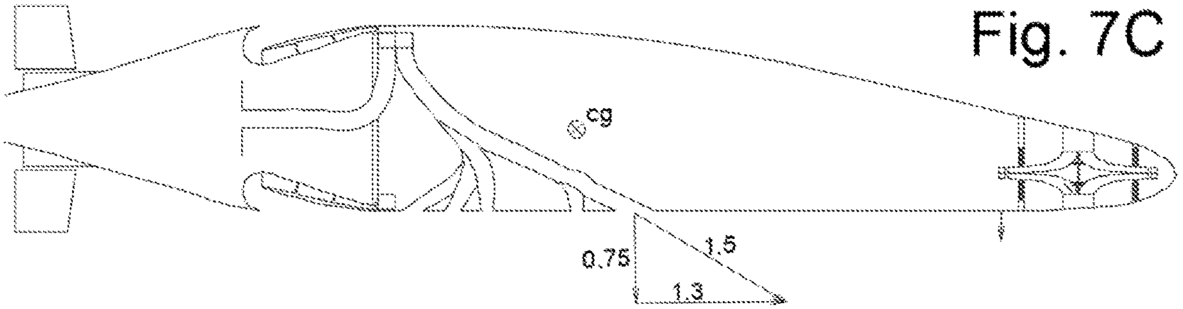

FIGS. 7A-7C jointly illustrate the aircraft, its center of gravity (when laden), the diagonal fan stages of the fan module (unlabeled), the splitter module, a first proposed ducting embodiment for the splitter module comprising multiple fan exhaust/thrust outlets, a flap system for selecting amongst the multiple fan exhaust/thrust outlets, and the trigonometric results (scalar ratios) of various distinct fan exhaust thrust vectors being broken down into their vertical and horizontal components, including a thrust reverser.

Figure 8A:
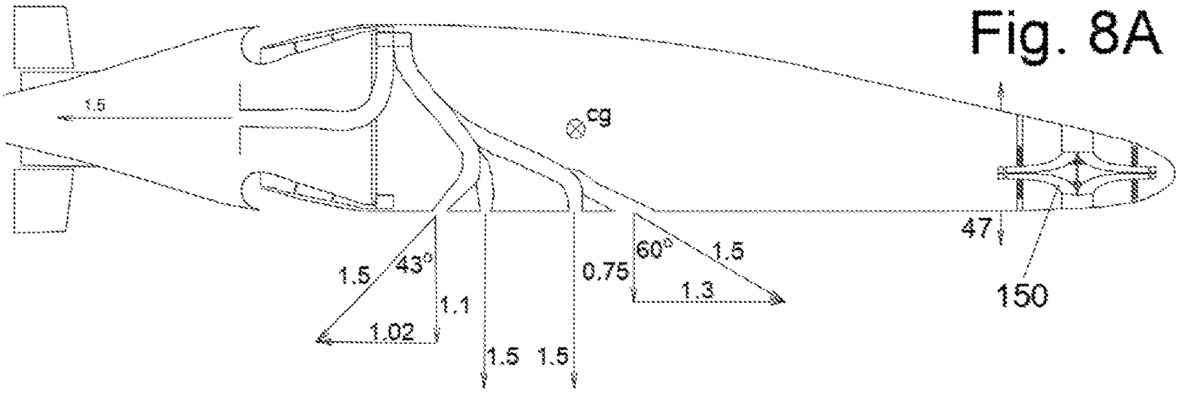

FIG. 8A illustrates the aircraft just like FIGS. 7A-7C did, locating its center of gravity and showing a second proposed ducting embodiment for the splitter module comprising multiple fan exhaust/thrust outlets, and the trigonometric results (scalar ratios) of various distinct fan exhaust thrust vectors being broken down into their vertical and horizontal components.

Figure 8B:
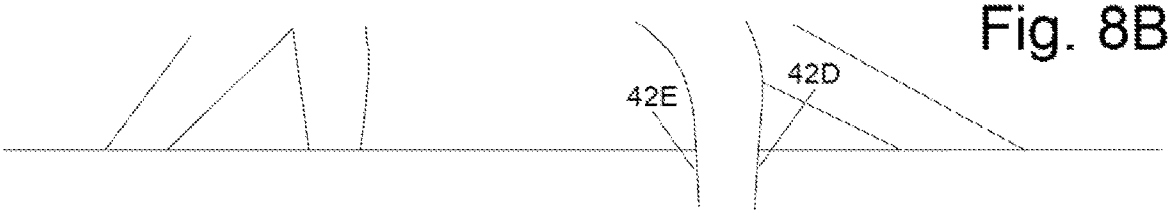
Figure 8C:
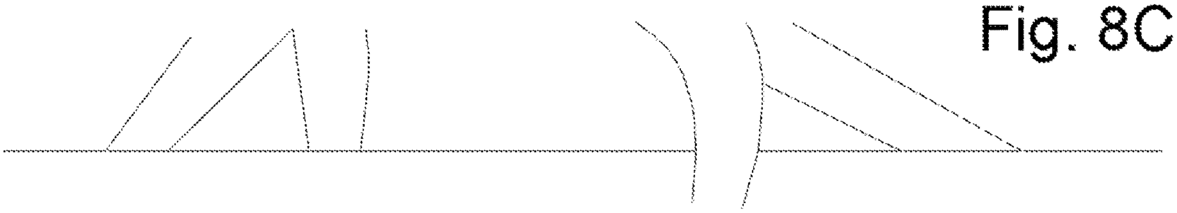
Figure 8D:
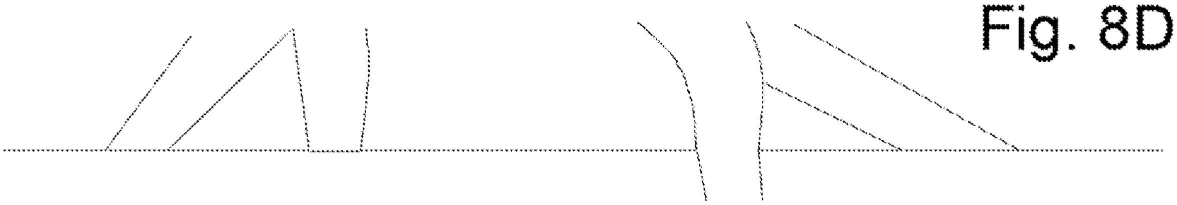

FIGS. 8B-8D are enlargements of the bottom portion of FIG. 8A showing the main downward thrust, which is usually completely vertical, being manipulated (i.e. to offset wind) via flaps or other control elements between/among completely-downward-thrust mode (FIG. 8B), slightly-rearward-thrust mode (FIG. 8C), and slightly-forward-thrust mode (FIG. 8D).

Figure 9A:
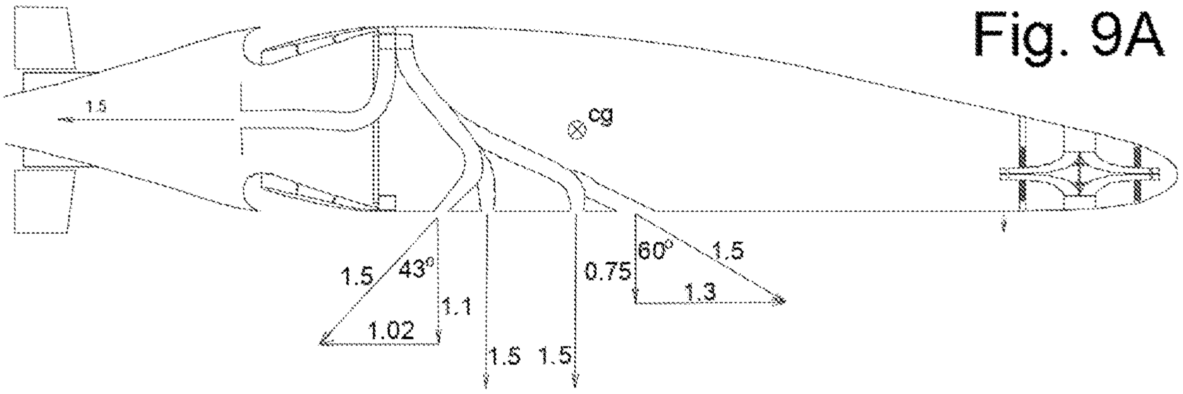
Figure 9B:
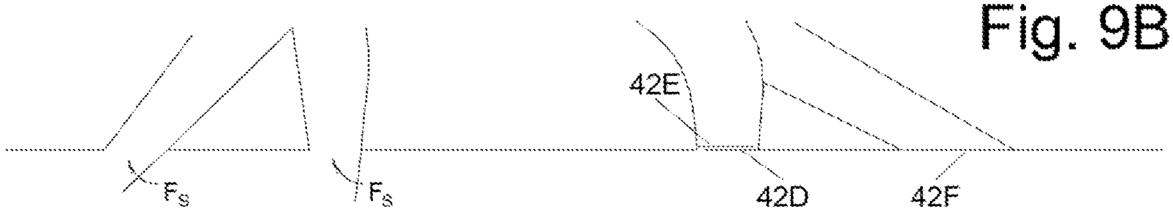
Figure 9C:
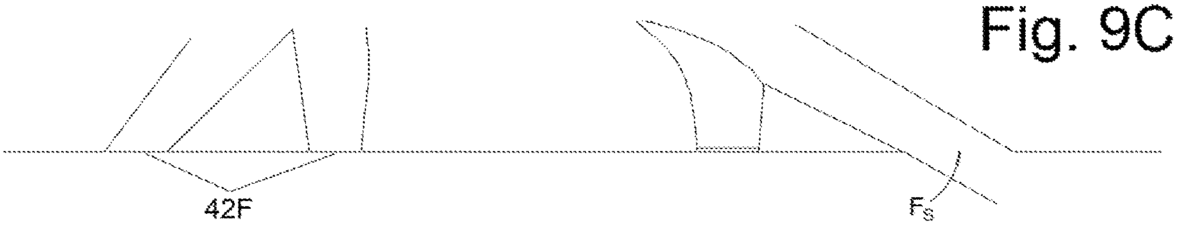

FIG. 9A, being basically identical to FIG. 8A, shows a complete array of fan exhaust thrust possibilities used during the method of the preferred embodiment of the present application, and has been re-included to append FIGS. 9B-9C below it. FIGS. 9B-9C are enlargements of the bottom portion of FIG. 9A and they depict outlet flaps that automatically close when the fan exhaust (thrust) is not pushing the outlet flaps outward against their spring return force ($F_s$).

FIGS. 10A-10E combine to portray the important flywheel module in multiple embodiments, so that one of ordinary skill in the art can understand it and how it (the flywheel, whichever embodiment is utilized) relates to the fan module, especially by being electromagnetically driven to spin in a rotational direction opposite to the rotational direction of the fans of the fan module while being concentric with said fan module and having an identical axis of rotation with said fan module.

Figure 11A:
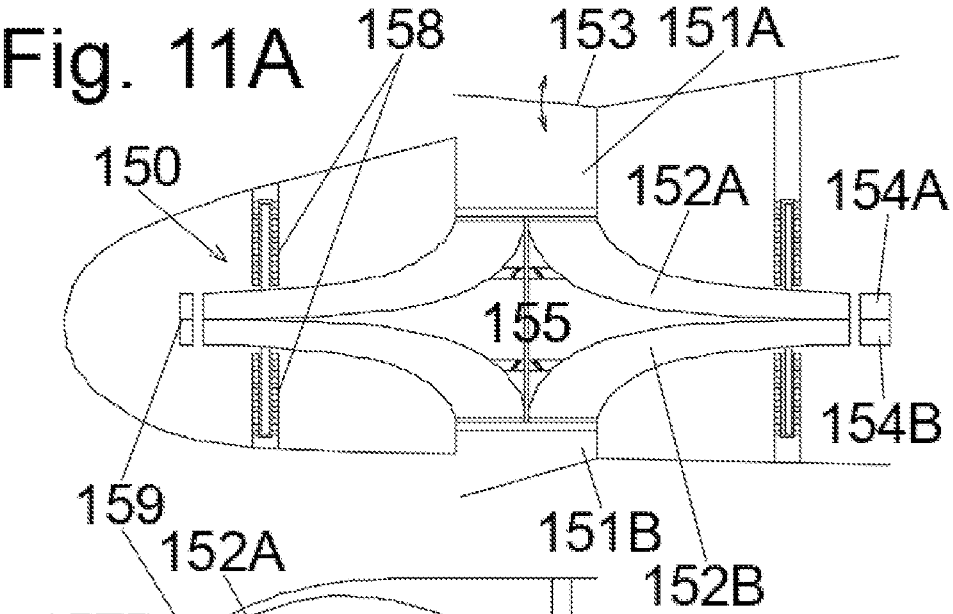
Figure 11B:
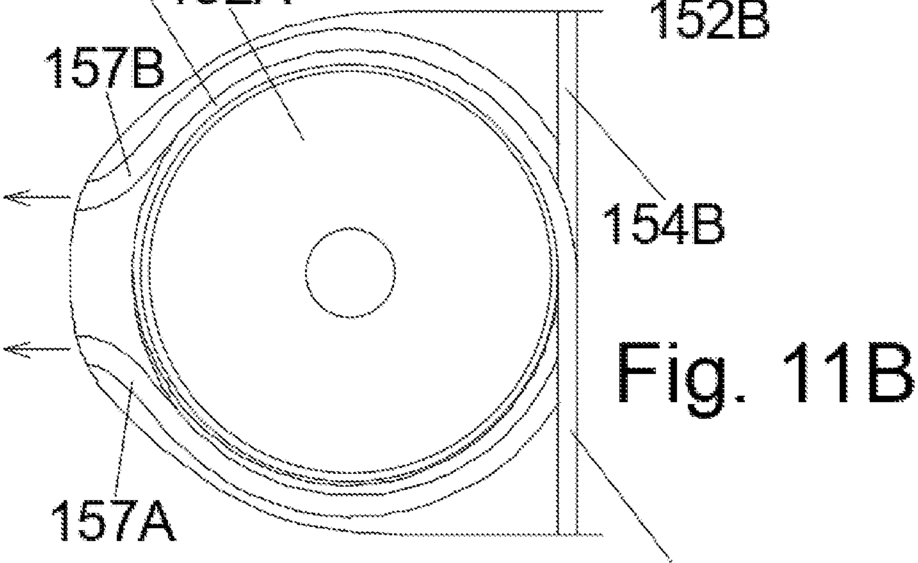
Figure 11C:
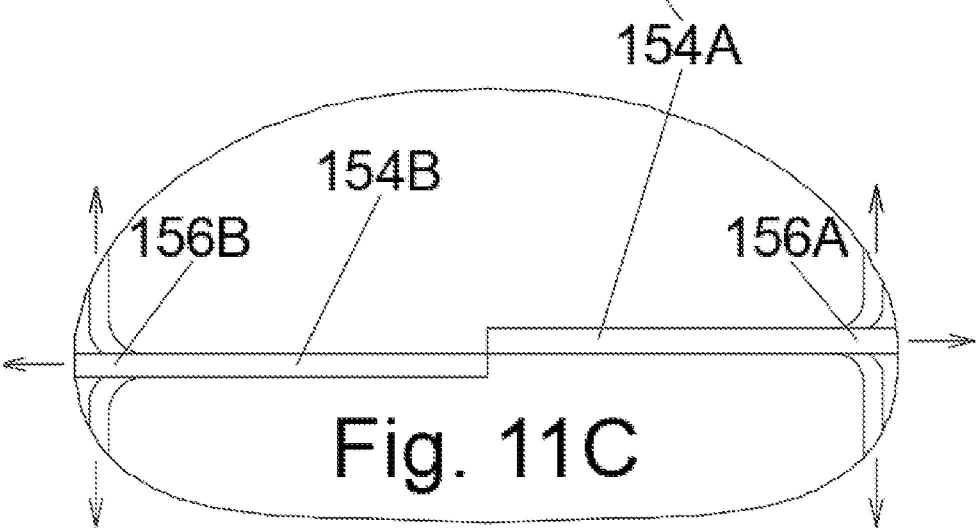

FIGS. 11A-11C cooperate to illustrate the front stabilizer module from the side (FIG. 11A), the top (FIG. 11B), and the front (FIG. 11C) vantages, again all things germane to the description provided in the specification relevant to FIGS. 11A-11C being visible, while the other elements of the aircraft are not visible in these drawings for not being germane to the discussion.

FIGS. 12A-12F proffer a complex but understandable insight into an embodiment for a rear stabilizer module (or modules) of the present invention, wherein the embodiment is shown in the appended drawings but it is only an example of the many ways the desired effects of rear stabilization can be realized.

Figures 13A, 13B, 13C, 13D:
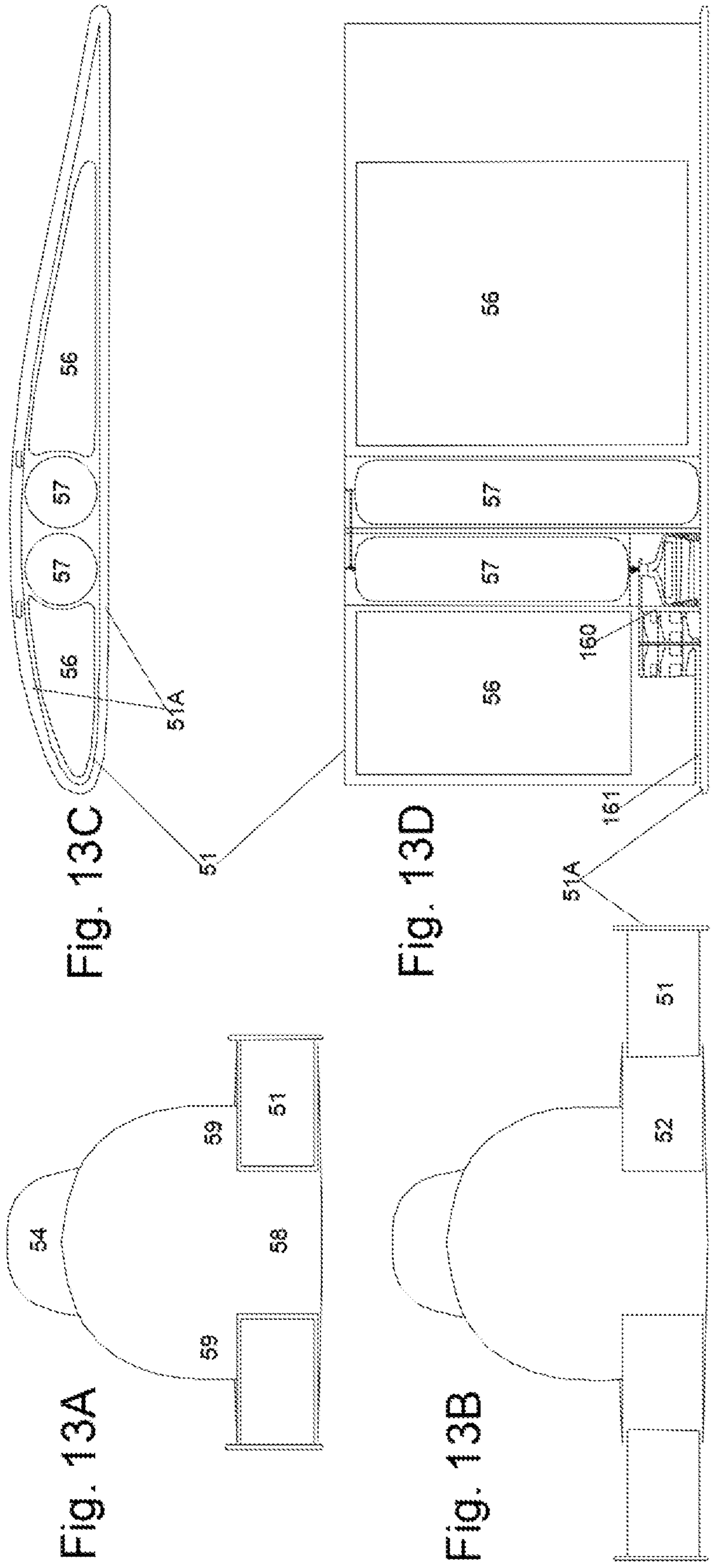

FIGS. 13A-13F deal with the wing modules with a specific focus on the removable and telescoping inner wings, the in-wing batteries, and a hypothetical $H_2$ turbine or turbogenerator module. FIGS. 13A and 13B are front-end-views of the aircraft looking rearward along the longitudinal axis of the aircraft, and they show the inner wings in their (respectively) retracted and extended positions. FIG. 13C is a cross-section of a wing module from its outer end looking inward while FIG. 13D is a cross-sectional view of a wing module from the top, while both FIGS. 13C and 13D portray possible locations (and the possible existences) for batteries, fuel supplies, and a turbogenerator that runs on compressed hydrogen (or other) gas as a fuel.

Figure 13E:
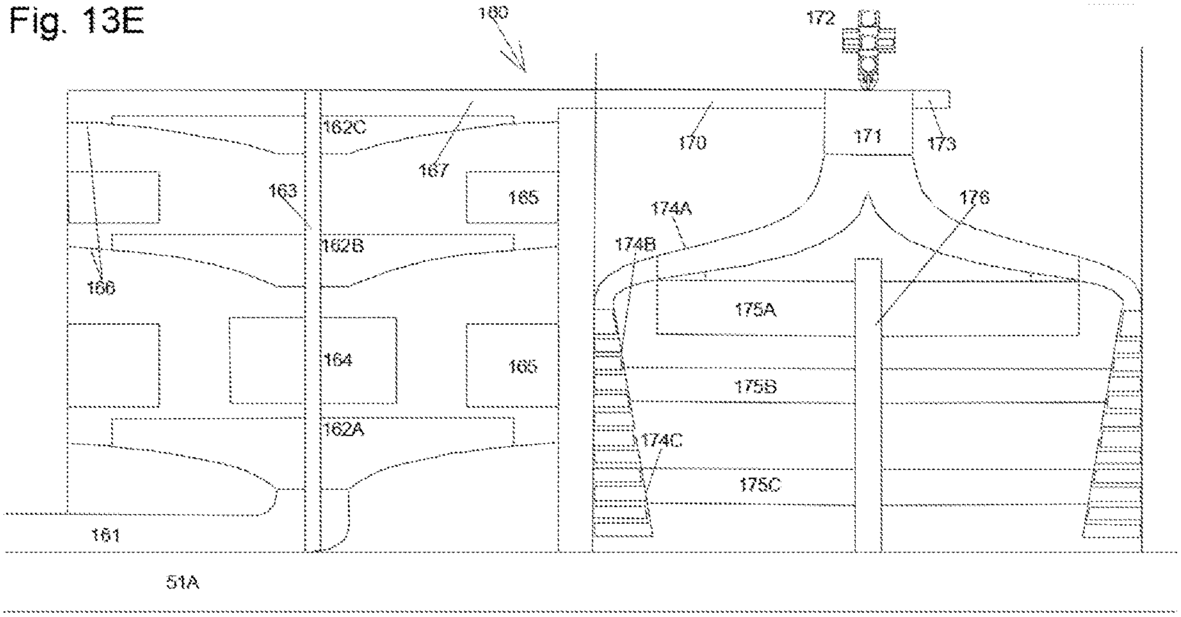

FIG. 13E shows a partial cut-away and enlarged view of the lower-left-hand-corner of FIG. 13D, depicting a portion of the wing from the top down in order to show the turbogenerator housed within that part of the telescoping inner wing. It is noted that the embodiment of the aircraft that is preferred at the time of filing does not have a fuel supply or fueled engine/generator at all, but it might be desirable once the prototype has been perfected to consider including them in order to achieve longer flight distances, wherein they power a low-consumption cruise mode between takeoffs and landings, while the batteries provide most or all of the electrical power during said takeoffs and landings.

Figure 13F:
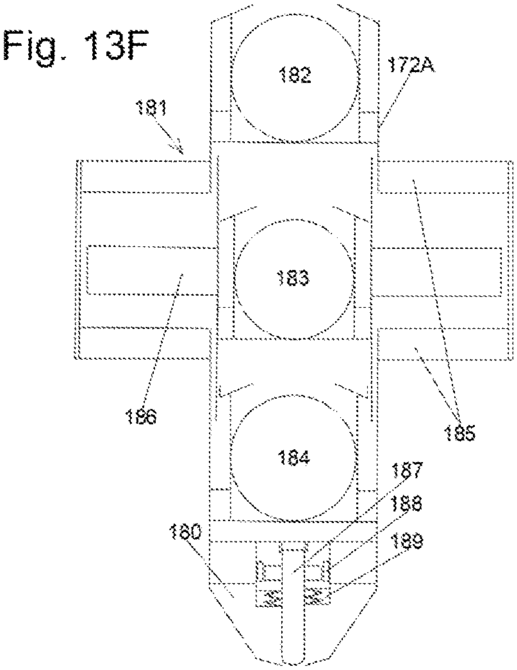

FIG. 13F illustrates a novel gaseous fuel injector for the turbogenerator and has been included not because such a device is unknown in the art, but because it is an intriguing device and perhaps could turn out to be the most advantageous fit for its specific purpose in the context of where it is and what it's trying to do, to be explained later.

Figure 14:
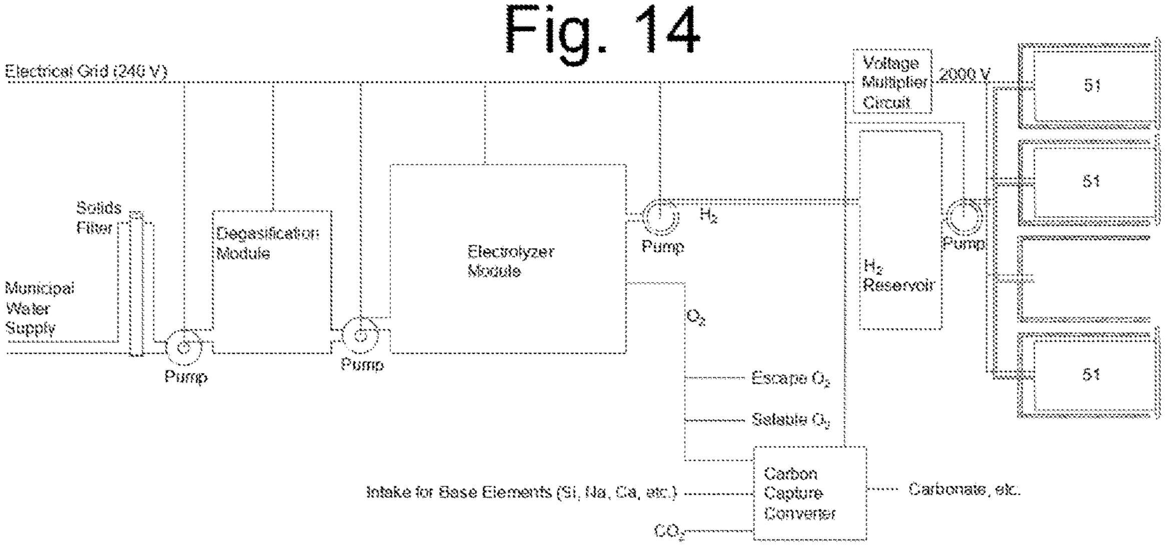

FIG. 14 illustrates a proposed recharging station for simultaneously recharging the batteries and the compressed fuel gas cylinders of multiple wings that have been removed from aircrafts such as the aircraft of the invention(s) described herein, wherein the source of electrical energy is a municipal electrical grid, and the source of hydrogen fuel is a municipal water supply.

Figure 15:
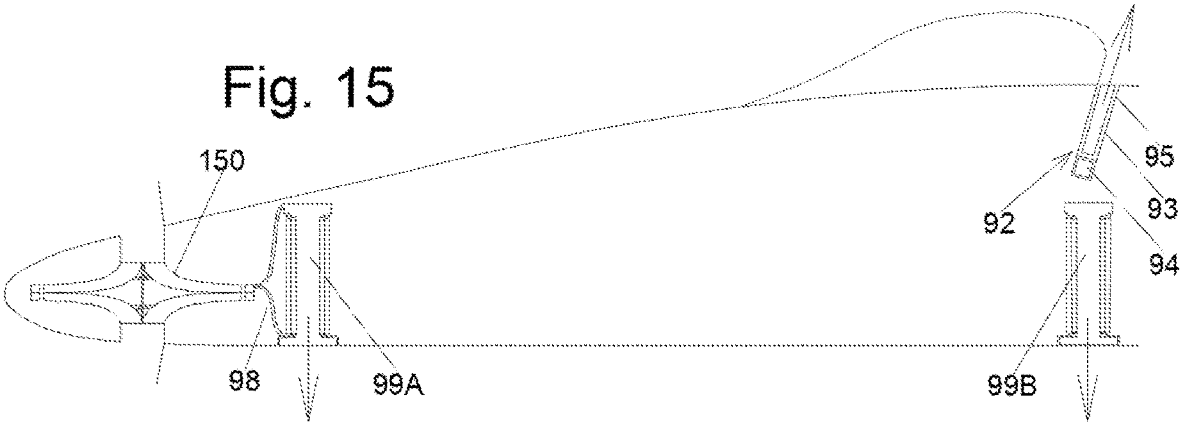

FIG. 15 is another side view like FIG. 1A but instead of showing the front stabilizer module, seat, etc., it shows proposed landing gear modules and a parachute module.

FIG. 16 is a spreadsheet developed to estimate how much power is required of the fan module, and how it arrives at said power, such that different masses of drive systems are compared with each other and with different electrical voltages.

Figure 17:
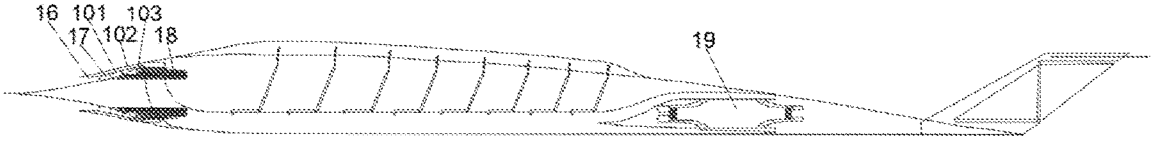

FIG. 17 shows a proposed, or possibly necessary, interpolation or interposition of the fan module of FIG. 18C into the overall system of the invention of US 20220363378 A1 (incorporated by reference herein) and this, the combination shown in FIG. 17, is currently viewed by the Applicant as a better system than the way it was described in US 20220363378 A1. FIG. 17 should be retrofitted into the figures of the prior publication and any modifications that need to be made in order to do this should be done because the improvements to the fan module that the Applicant has invented (and disclosed herein) since the prior application was filed are real and probably extremely effective at increasing capabilities and reducing complexities.

FIGS. 18A-18G jointly illustrate a $2^{nd}$ embodiment of the fan module and its manifestation in or on a small commercial airliner or private jet.

FIG. 18A depicts a top view of a small-to-moderate sized commercial aircraft from the top looking down, the commercial aircraft having attached to its rear fuselage portion on both the left- and right-hand sides a fan module that is a $2^{nd}$ embodiment of the fan module, which is to be unveiled with the help of FIGS. 18A-18G in conjunction with the later portions of the specification that describe these figures.

FIG. 18B is a left-hand-side view of the small-to-moderate sized commercial aircraft from FIG. 18A. The left-hand-side view shows the longitudinal position and vertical elevation of the left-hand-side fan module relative to the aircraft it is attached to.

FIG. 18C is a side (or top) cross-sectional view through the $2^{nd}$ embodiment of the fan module from FIGS. 18A and 18B showing diagonal fans, fan driving rotors, rotor driving stators, nacelle outer profile, fan module exhaust module, pre-swirler, and closeable intake. FIG. 18C can be compared with FIG. 3A for comparison between the $1^{st}$ and $2^{nd}$ fan modules (although FIG. 3C moves air from right to left and FIG. 18C moves air from left to right). Anything that is needed for functionality but not shown in FIG. 18C can be found in FIGS. 3A-3G. The Applicant does not feel the need to redraw all of the elements for the $2^{nd}$ embodiment since they have all been described in a way that they can be applied to FIG. 18C via modification that requires no more than an ordinary skill in the art.

FIG. 18D is similar to FIG. 2B in that it depicts the outer outlines/shapes of the diagonal fan stages of the $2^{nd}$ embodiment of the fan module and also the two-dimensional geometries of all of their vanes' outer edges.

Figure 19A:
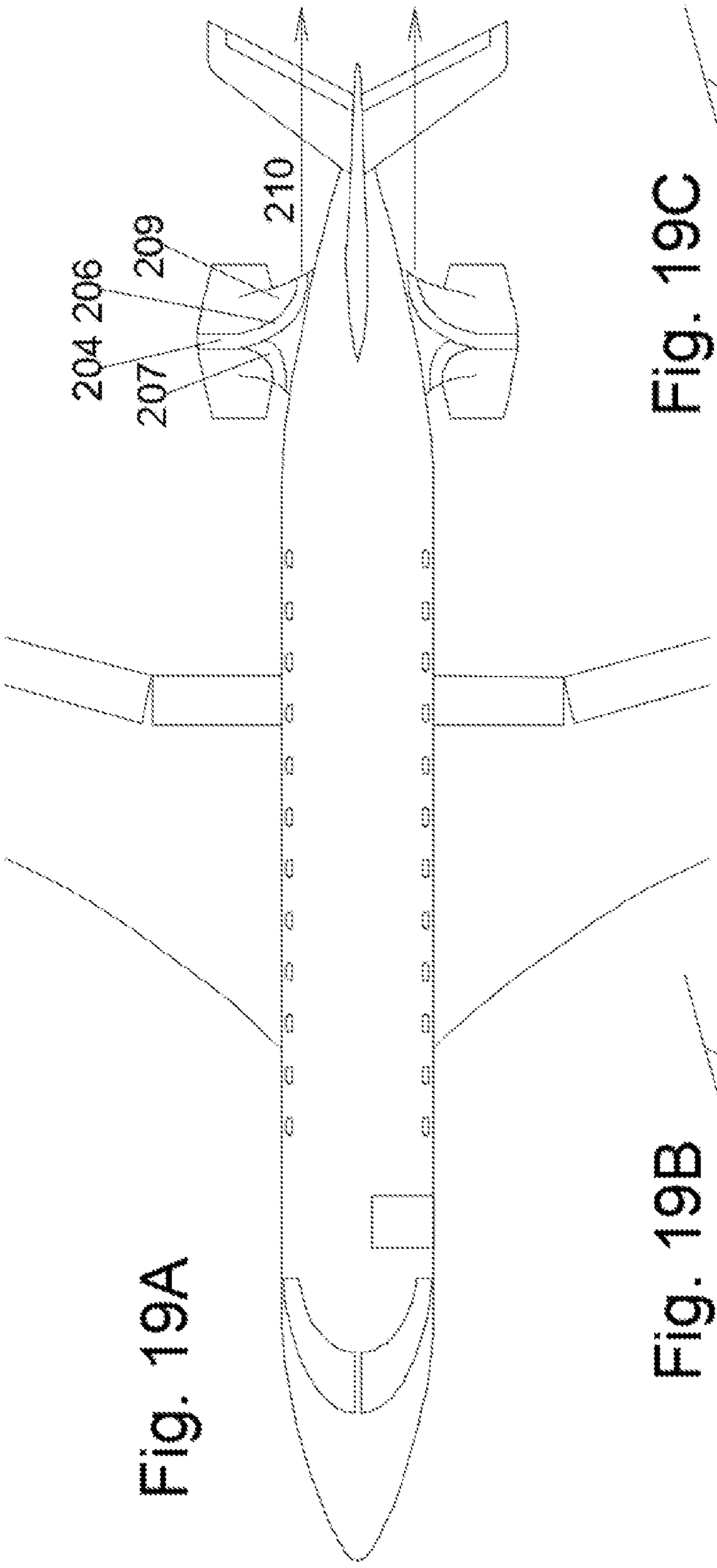

FIG. 18E is another left-hand-side view of the small-to-moderate sized commercial aircraft utilized to show potential locations of removable battery cartridges, compressed gaseous fuel storage in the wings, and a piston-engine generator, all for supplying electrical energy to the $2^{nd}$ embodiment fan modules which, unlike the $1^{st}$ embodiment, are probably best used by being on the outside of the fuselage of the aircraft, but could also be housed inside the aircraft or suspended above or below the wings by pylons of a configuration different from FIGS. 18F and 19A.

FIG. 18F is a rear view that should be considered in conjunction with FIG. 18B, looking at the small-to-moderate sized commercial aircraft and its fan modules from behind, in a forward direction, in order to show how the fan modules can be affixed to the fuselage via a dual-pylon configuration, wherein at least one of the pylons has a duct within it for routing fan module exhaust from the fan module exhaust volute to be ejected rearwardly for thrust.

FIG. 18G is a view of the front of the small-to-moderate sized commercial aircraft that has been included to illustrate how a removable battery could be extracted (in order to recharge it) from one of several spaces in the aircraft that are not needed for passengers.

Figure 19C:
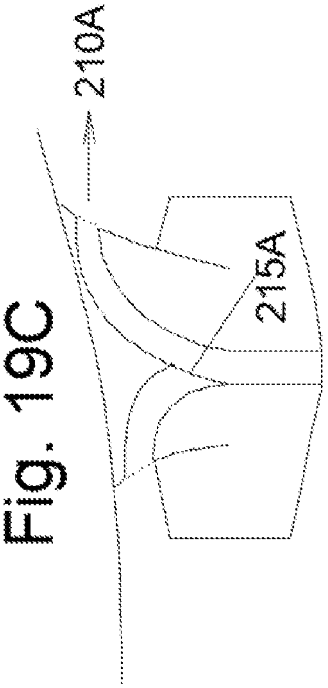
Figure 19B:
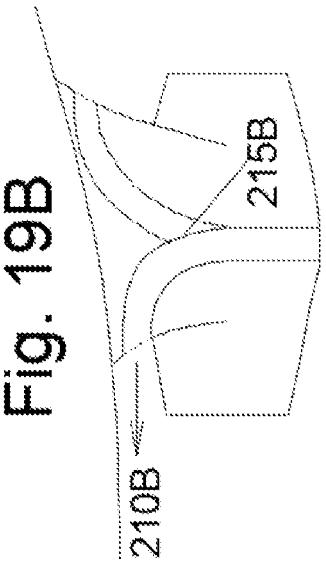

FIGS. 19A-19C jointly illustrate the small-to-moderate sized commercial aircraft with 2 nd embodiment fan modules attached to the sides of the rear of the fuselage, wherein unlike FIGS. 18A-18B the nacelles and fan modules are not transparent to show internal parts, but the pylons are transparent to show the ducts for routing the fan module exhaust rearwardly for main thrust and forwardly for reversed thrust.

Figure 20A:
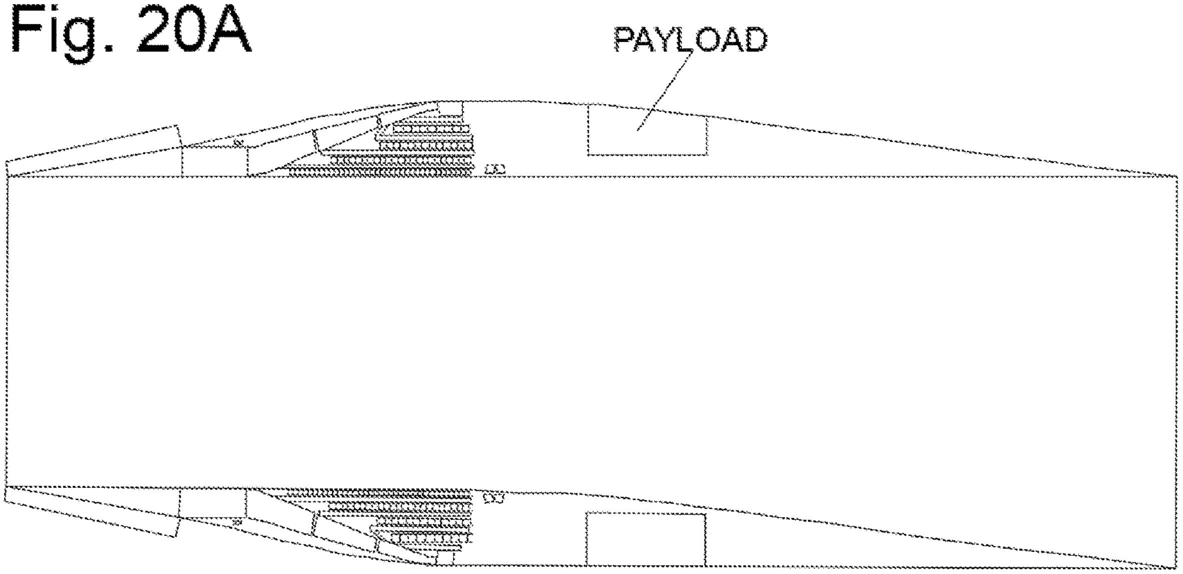
Figure 20B:
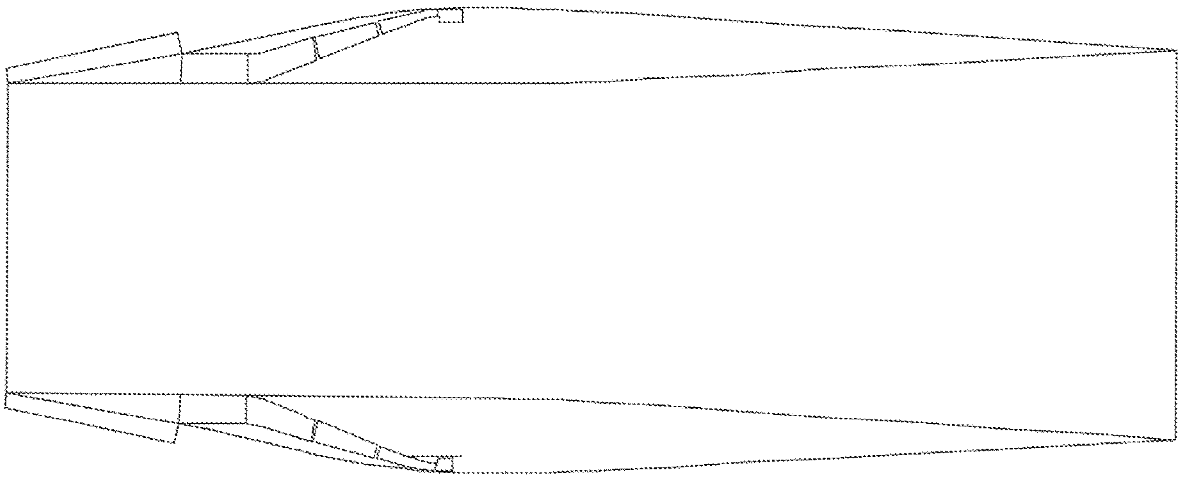

FIGS. 20A-20B show the disembodied soul of the essential element of the present invention, meaning that if one were to remove the fan module from the "body" it is pushing through the air, it could simply, with various modifications that will not be gone into herein, fly itself around using stabilizers and/or control surfaces (not shown) for control and rearwardly curved fan module exhaust ducts for thrust. FIG. 20A shows a side cross section that is transparent to various elements in order to show the fans, fan module drive system, and the shapes of the nacelle outer profile and inner wall. Their respective shapes should cooperate to create lift at high airspeeds. Similarly, FIG. 20B shows a top cross section also transparent to various elements in order to show the fans and the shapes of the nacelle outer profile and inner wall. Their respective shapes do not cooperate to create a force in any direction.

DETAILED DESCRIPTION OF THE PREFERRED EMBODIMENTS

FIGS. 1A and 1B jointly illustrate the overall scheme of the aircraft, including the most important modules, with all the germane elements described in this description of each figure being visible and all objects not germane to this description of each figure being invisible. FIG. 1A depicts a left-hand-side lateral view of the aircraft perceived toward the right-hand-side of the aircraft, lateral to the flight direction and horizontal, while FIG. 1B shows the aircraft from above, looking down toward the earth and vertical, such that FIG. 1B is a top-plan depiction of the elements from FIG. 1A and of the aircraft overall but viewed from the top.

Broadly speaking, the aircraft consists of an airframe 1 and in the embodiment shown in FIGS. 1A-1B, the airframe contains or otherwise encompasses (although it is not necessary by any means that everything must be inside the airframe) a cabin 2, where the payload resides and is supported, and in the event the payload is a human passenger or occupant, the cabin further comprises at least one seat 3 to support said passenger. The number of seats is not limited to one and could be any number (in the event that the number is more than a classic "2 abreast", the aircraft would have to be modified significantly), but for the embodiment that has been chosen to illustrate the invention the Applicant has decided on a single passenger economy module that is the simplest, lightest, and least expensive to build.

As the Applicant has chosen an economy model as his preferred embodiment for explaining the invention, it further follows that the seat is a minimalist structure such as a few hoop frames stretching webbing or mesh elements from their respective hems as is known from office chairs, wherein the hoop frames are supported by a seat support, not shown in the drawings. In the preferred embodiment, although it is not necessary, the seat is reclined, actually nearly supine or recumbent. The seat could be designed to hold the passenger more upright or, in the event that the invention is to be used for medivac or very high speed applications, the seat could be designed to be of a completely supine nature, such as for example, it could be a stretcher, in which case modifications to the shown preferred embodiment would necessarily ensue.

Provided the overly reclined posture of the passenger due to the excessively slanted seat 3, an elongated yet aerodynamically efficient airframe 1 results, with a considerable length portion of the aircraft being occupied by the passenger, and this is at the time of filing preferred for the economy model. It does not take an aeronautical engineer to understand why the airframe should be narrowed in every way possible along the vertical and horizontal axes, even at the expense of lengthening it in the longitudinal direction. In other words, this is a common practice and should not need further explanation.

Thus, for the preferred embodiment the seat 3 supports the passenger and the passenger resides in the cabin 2 which is bound, naturally, by walls on the sides of the airframe 1 and in the front by a footboard 5 and on top by a passenger head distended space 4. These are not necessary as the invention could be used for a more luxurious model that is more robust and designed with less considerations for efficiency. Although not shown, there is a wall directly behind/under the seat 3 to separate it from other working elements of the aircraft and also to complete the enclosure of the cabin and isolate it from the environment when desired.

Still referring to FIGS. 1A and 1B, there is provided as the ultimate source of propulsion for the aircraft a fan module 100. As will be discussed later with reference to FIGS. 2A, 2B, and 3, the fan module is a novel contraption that forms the kernel of the inventive concepts proposed herein. In this preferred embodiment it consists of multiple diagonal fans in series that spin in the same rotational direction, wherein fan n feeds air in a swirling manner to fan n+1, and wherein fan n+1 spins at approximately twice the rotational velocity of fan n and wherein when there is a fan n+2, fan n+2 spins at approximately three times the rotational velocity of fan n or 1.5 times the rotational velocity of fan n+1. This will all be delineated in further detail with reference to FIGS. 2A-2B and 3.

The result of this arrangement for the fan module 100 is that the final air exhaust from the fan module 100 is mostly tangential, preferably with a tangential-to-axial ratio greater than 10:1 but not necessarily so great, such that there really is no need to have the air intake in the front of the fan module and the air exhaust in the rear of the fan module, since the air being captured by the fan module is going to be longitudinally detained (in the reference frame of the aircraft itself) or accelerated forwardly (in the reference frame of the ambient air or the ground) anyway, such that it can be constantly accelerated in the tangential direction for a brief but not-so-brief period of time (for each molecule experiencing the journey, that is). So, because of this and because the fan module's profile expands frusto-conically from its intake end to its exhaust end, the Applicant has chosen to position the intake to the fan module longitudinally aft-ward relative to the fan module exhaust, in order to have its shape conform to the profile of the tail-end of the aircraft. In FIGS. 1A and 1B this takes place as part of a fan intake module 70 which not only encompasses the relative area of the fan module intake, but also includes other elements that will be described later and, as shown in FIGS. 1A and 1B, can include structures to scoop an annular portion of passing air and redirects its course inward and into the fan module 100. Of course, all of this is not necessary and the fan intake module 70 could longitudinally precede the fan module 100 and be of various other forms not described herein but easily conceivable now that the "kernel" has been disclosed in this Application.

To summarize the preceding paragraph, the "worm" model that almost all higher orders of zoological life have relied on, from the worm through the fish, amphibian, mammal, and thence to the aircraft engine, no longer applies. The consumption no longer need be in the front and the excrement in the rear. The velocities to which air is accelerated in the present invention are so high compared to the passing air, and the fan module of the present invention ingests so little air overall, that there is no reason to constrain the fan module to a standard orientation. It could be placed anywhere on any aircraft, with its intake next to it, behind it, above it, etc., and the exhaust could come out from anywhere. It could have its axis of rotation vertical, longitudinal, transverse, anything. There could be two or more of them, with separate exhausts or converging exhausts. The list of possibilities is inexhaustible. Still, we must return to the preferred embodiment to move the discussion to additional important features.

The fan module 100 is symmetrical about its rotational axis and for that reason there is no difference between its appearance in FIG. 1A and its appearance in FIG. 1B. Importantly, all of the fan stages of the fan module spin in the same rotational direction, each one spinning faster than the one upstream of it, such that even though the fan module does not have very much mass, it will generate enough Coriolis force to adversely affect the stability and controllability of the aircraft.

To offset the Coriolis effect discussed in the last paragraph, a flywheel module 10 is positioned within the fan module 100. The flywheel module 10 comprises a flywheel, described later, that spins in a rotational direction opposite to the rotational direction that the fan stages of the fan module 100 spin. Another way to avoid Coriolis force would be to have pairs of fan stages spinning in opposite directions, but this would require stator guide vanes to (tangentially) reverse the flow between every fan stage. These would increase overall flow resistance through the fan module and consume significantly more volume than the proposed preferred embodiment does without them, not to mention the problems that would ensue in an attempt to always have the Coriolis forces balance. Removing the stator guide vanes qualitatively improves the device, and is worth the quantitative mass/cost additions associated with providing the flywheel module, which will be described in further detail with reference to FIGS. 10A-10E.

All that need be definitively said about the flywheel module 10 here before moving forward with attempting to finish the description of FIGS. 1A-1B is that the flywheel module 10 must be positioned coaxially within (or perhaps even outside of) the fan module, and it will need to be shifted forward from 1 somewhat to be closer to the latter fan stages because they will be spinning so much faster than the $1^{st}$ fan stage. Also, the speed of the flywheel within the flywheel module will be continuously adjusted by a controller to offset the Coriolis force of the fan module, which can be constantly calculated by the controller. In an overly simplified example where the moment of inertia of the fan module is ten times the moment of inertia of the flywheel and the rotational velocities of the fans is of the 1:2:3 relationship described earlier, the flywheel would spin at a rotational velocity of ten times the average rotational velocity of the fans of the fan module 100. By spinning the flywheel at extremely high rotational velocities, the flywheel module can be implemented and Coriolis effect can be neutralized with a near-negligible addition of mass, and no addition of volume, to the aircraft and, most importantly, obviating the need for counter-rotating fan stages and stator guide vanes, which would be no less than unwieldy in a best-case scenario. Again, the flywheel module will be further detailed in FIGS. 10A-10E.

Still referring to FIGS. 1A-1B, a splitter module 30 is located in front of the fan module 100. As can be deduced from FIG. 1A the splitter includes multiple flow paths and, by accepting the tangentially flowing exhaust air from the fan module 100 as centrifugal force pumps air from the fan module forwardly from the fan intake module 70 toward the splitter module 30, directs the exhaust air in various outward directions depending on the mode of operation. As the splitter module will need more figures and much more detailed description (provided later in this application) to be understood by a reader, not much can be said about it here except that the air can be exhausted downwardly for VTOL thrust from different locations on the bottom of the aircraft and in multiple different directions. The splitter can also, in an alternative mode of operation, eject the entire exhaust air stream rearwardly in a direction opposite to the flight direction in order to create thrust. As can be seen from FIGS. 1A-1B, the fan module 100 is annular and hollow, as are the tail and empennage module 60, such that the rearwardly exhausted air stream passes unimpeded out the rear end of the aircraft at which point the aircraft becomes a standard fixed-wing aircraft and uses airfoils (wings or to some extent and in some instances a flying-wing body shape) to maintain flight. Like was stated above, most of the discussion provided later on will allow a reader to understand the splitter module, but it should already be clear to a reader that a single propulsion means is the source of both VTOL thrust and forward flight thrust, such that, unlike most VTOL aircraft, only a single prime mover is needed to accomplish all of the modes of a typical vertical-to-horizontal-to-vertical flight.

Still referring to FIGS. 1A-1B, the aircraft is provided on its tail or tail end with an empennage module 60. Although various different empennages were considered for the preferred embodiment, some pretty standard and some a bit unorthodox, the Applicant has settled upon a simple torpedo-like set of 4 cantilevered pivotable stabilizer vanes. The stabilizer vanes 61A, 61B, 61C, and 61D are independently actuatable by the controller to controllably pitch and yaw the aircraft for steering and attitude control, and also independently actuatable by the controller to passively brake the aircraft toward the end of a flight. The vanes include an upper vertical stabilizer 61A and a lower vertical stabilizer 61C that can additionally serve as rudders when they are turned together in the same direction, as well as a left horizontal stabilizer 61B and a right horizontal stabilizer 61D that are actually what are known as stabilators. Stabilators are well known in the art, as are rudders and vertical stabilizers, so these features will not be described in much more detail.

One very significant feature to note about the configuration consisting of the horizontal stabilizers/stabilators 61B and 61D and the pivotable vertical stabilizers 61A and 61C is that if any pair of adjacent ones is pitched (pivoted) away from each other to a certain extent (meaning an adjacent rudder-and-stabilator pair would pivot in opposite directions) and the opposite pair of adjacent ones is also pitched away from each other to the same extent, the result would be a resistance brake whose braking force would be neutral as concerns torquing the aircraft around its center of gravity in any direction, and the braking force would be proportional to the amount of pitching. As the aircraft approaches a landing zone, this activity could be used to slow the aircraft down without twisting, turning, or pitching it, and this could actually be very effective at higher speeds, and it would require no energy to perform. In fact, the Applicant believes it would use very little excess energy as a mode of completing a flight, and it would save on cost, for the controller to act like the it was going to overshoot the targeted landing zone and then deploy this brake to quickly slow the vehicle, than it would to begin a glide sequence several miles before that, in that the former activity would result in less time spent in the air, and it would shorten the trip by a minute or so, allowing for the same aircraft to do more hops per hour.

Before leaving the empennage module 60, and still referring to FIGS. 1A-1B, the most obvious thing about the vanes 61A-61D is that they offer stability, such that once the aircraft has attained a threshold airspeed (i.e. 50 mph), the aircraft cannot go out of control, even if there is a major failure of one of the modules. Like a dart in the air, no matter what happens to it, the aircraft will right itself and eventually be flying in a straight line with the nose aimed forward, and at some point it will be right-side up at which instant a parachute can be activated. Much of this will be described in more detail later in the application. The stability of the aircraft provided by such an empennage module, as well as the ability to brake the aircraft on demand using the empennage module itself, do hint at the potential for very-highspeed flight, which saves even more energy and cost, but the Applicant is going to continue treating this discussion as if there is a 300 mph ceiling on the aircraft's airspeed.

With one final look at FIGS. 1A-1B we must discuss the item at the very front, in the nose of the aircraft and beyond the floorboard 5, in an area where any air bursts/jets ejected in any direction would exert the maximum effect in pitching and yawing the aircraft when desired. This item is the front stabilizer module 150. Its discussion will lurk in the application waiting for the woeful moment we will have to deal with it so in short, it is a stacked pair of counter-rotating centrifugal fans whose oppositely directed exhaust streams, one toward the left side of the front of the aircraft and one toward the right side of the aircraft, can be diverted in pretty much every direction, such that on the left- and right-hand sides of the front of the aircraft bursts or jets of air can be released by the controller upwardly, laterally outwardly, and downwardly, to pitch, roll, and yaw the aircraft at the controller's whim and according to desired trajectories and responsive to inertial measurement units or other sensors detecting the attitude of the aircraft in contrast with a desired attitude of the aircraft both during VTOL and forward flight. In summary, the aircraft might not be properly positioned in airspace during takeoff or other slow travel and, since the empennage module cannot correct its bearing, heading, pitch, etc. during these transition stages, the front stabilizer module uses spinning fans to pressurize ducts that have outlets that, when opened, fling the air out in various directions to offset unwanted movement of the aircraft and to actively reposition the aircraft, as well as to yaw or roll the aircraft during a turn.

The penultimate thing to be said for FIG. 1B (FIG. 1A is done for now) has to do with the wing modules 50. Only the right-hand-side one is labeled but we can't use it without the unlabeled one at the very bottom of the page, the left-hand-side one. The wing modules comprise telescoping inner wings that slide inwardly toward the bottom-center of the aircraft right after takeoff and then outwardly away from the bottom-center of the aircraft when the aircraft accelerates to successive increases (i.e. 100-300 mph) in airspeed. In FIG. 1B the inner wings are shown in the extended (outward) position and this will have to suffice for now, until we meet the wing modules 50 again in FIGS. 4F-4H.

The last thing that will be said about the aircraft's preferred embodiment as shown in FIGS. 1A-1B, even though many alternative embodiments could be used in accordance with the inventive concepts presented herein, is that the recumbent passenger and the seat 3 that supports the recumbent passenger in such wise allow for the aircraft to be of an aerodynamically advantageous overall shape, such that, with the fan module 100 behind the seat 3 and of a diameter commensurate with the shoulder-to-buttock "diameter" of a taller-than-average human, and the fan intake module 70 positioned behind the fan module (in the longitudinal direction), and with the front stabilizer module 150 in the front/nose of the aircraft, the airframe 1 can be shaped in such a way that the aircraft passes through incoming ambient air with very small air displacement and minimal external surface area resulting in minimal drag (comparable to and actually less than a motorcyclist on a racing motorcycle at all speeds and especially at over 150 mph). The airframe 1, availing of the inventive modules proposed herein and the positioning of the seat 3 and of the positioning of the inventive modules proposed herein, is very nearly a "dart" at low-to-moderate airspeeds (less than 150 mph) and not substantially more than a ripple in the wind at over 150 mph. It is acutely pointed in the shapes/profiles of the front and rear and widely bowed out about the midsection, with no aerodynamically detrimental external pieces, projections, or contours, and although it is not designed for supersonic flight, it seems at the time of filing that there can be nothing pointed out among FIGS. 1A-1B that can be serious potential culprits for heavy drag that would be obstacles to the aims of the present invention at any subsonic airspeed. It is estimated by the Applicant that the proposed invention will fly at around 300 mph with less drag than a racing motorcycle driving at 150 mph, so unless the prime mover and supporting elements can be shown to be somehow fraudulent vis-à-vis their immediate appeal and prima facie calls for positive attention being made herein, the primary factors for consideration or doubt after FIGS. 1A-1B have been revealed to the world are the mechanics of the internal parts, namely the "modules" that are repeatedly referred to herein, and which will be adequately and probably redundantly and repetitively recited in this application.

Turning now to FIGS. 2A and 2B which illustrate the currently preferred embodiments of the diagonal fan stages of the preferred embodiment, with FIG. 2A showing where on the aircraft the diagonal fan stages are located and FIG. 2B depicting the outer outlines/shapes of the diagonal fan stages and also the two-dimensional geometries of each of their vanes' outer edges. FIG. 2A shows the outer profile of the aircraft from the left-hand side wherein nothing else is shown except the three fan stages of the fan module 100. Notably, FIGS. 2A-2B do not show any other elements of the aircraft nor do they even show other parts of the fan module such as the drive system, intake, or outlet. All that is shown are the outer edges of the fan stage vanes 131, 132, and 133 of the fan stages 101, 102, and 103, respectively. Each fan stage 101, 102, and 103 has an inner wall and an outer wall (not shown in FIGS. 2A-2B) and the vanes extend from the former to the latter and each vane has an outer edge where it is joined with the outer wall, such that FIGS. 2A-2B show that outer edge of each vane with the outer wall removed for clarity.

Such removal of the outer wall reveals the shapes of the fan stage vanes 131, 132, and 133 and it allows a reader to imagine the fan stages 101, 102, and 103 spinning and pumping air axially through the system while accelerating the air, which passes through the fan module 101 in a single annular flow, to an increasingly tangential velocity, while the axial flow velocity will not change much although it will fluctuate at various points between inlet and outlet due to the imperfect shapes of the vanes apropos the various shapes the air flow will assume during various stages of a typical flight.

The diagonal fans in the preferred embodiment (although the opposite would be just as effective) are spinning in the clockwise direction (viewed from the front of the aircraft) so the fan stage vanes as viewed in FIG. 2B are traveling down the page. To get an idea of the real shape of each vane, a reader should focus on the vanes nearest the center of each fan stage.

Each fan stage vane 131, 132, and 133 has a fan stage vane leading edge (131A, 132A, 133A), a fan stage vane main segment (131B, 132B, 133B), and a fan stage vane trailing edge (131C, 132C, 133C). As one imagines the $1^{st}$ fan stage vanes 131 moving downward at a fast speed (and then around and upward on the other side), it becomes clear that the $1^{st}$ fan stage leading edges 131*a* will cut into the intake air and entrain the intake air within the $1^{st}$ fan stage 101 and the intake air will be separated into dozens of flow paths each identical and passing between adjacent $1^{st}$ fan stage vane main segments 131B.

If these were axial flow fan stages, the 1$^{st}$ fan stage vane main segments 131B would be greatly truncated relative to those shown in FIG. 2B because their job would be to simply deflect the air captured by the 1$^{st}$ fan stage vane leading edges 131A and throw it axially downstream, which in FIG. 2B would be from right to left. According to the novel technology being proposed at this point, the Applicant has chosen to abandon the axial flow fan and proceed with something a bit counterintuitive. The 1$^{st}$ fan stage vane main segments 131B have been lengthened considerably such that the intake air streams in the flow paths between and among the 1$^{st}$ fan stage vane main segments 131B cannot escape right away and ends up spinning around inside the 1$^{st}$ fan stage 101 such that by the time the air streams in the flow paths reach the 1$^{st}$ fan stage trailing edges 131C they have the same tangential velocity as the outlet (left-hand-side) of the 1$^{st}$ fan stage 101.

Importantly, the fan stages 101, 102, and 103 are diagonal fans, otherwise known as mixed-flow fans, meaning they rely not only on the vanes to entrain and accelerate air, but they utilize centrifugal force, by becoming larger in diameter as they progress from inlet to outlet, to impart additional acceleration to the air. Since we are mostly concerned with tangential acceleration of the air, the centrifugal acceleration is in the present invention being used to pump the air through the 1$^{st}$ fan stage 101. This centrifugal acceleration, plus the axial acceleration inherently being provided by the 1st fan stage leading edges 131A, pushes the air axially through the 1$^{st}$ fan stage 101 at a moderate speed, but we don't want it to pass through the 1$^{st}$ fan stage 101 too quickly lest it moves out of the 1$^{st}$ fan stage 101 before the 1$^{st}$ fan stage 101 has performed all the work on it that it can, namely by giving the air streams the same tangential velocity that the 1$^{st}$ fan stage 101 itself has. This 1$^{st}$ fan stage velocity will be moderately high, such as for example between 800 mph and 1600 mph, although this range should not be seen as limiting.

There are some unobvious benefits of this system. One is that the air will only experience skin drag as a function of its axial flow velocity and not its tangential flow velocity, since the air molecules or boxed inside a unitary structure that is moving with them. Each flow path will be rectangular in cross-section (viewed from the front of the aircraft) and other than the fact that is slipping axially through the fan module 100 as is necessary for it to be worked on, the air and the material of the inner and outer walls and vanes of the fan stages 101-103 are moving together, round-and-round, and not interacting in any meaningful way. This places the fan module 100 in the unexpected (the Applicant did not intend this) position of being able to boast that the vast majority of acceleration it imparts to the air flowing through it is done without internal drag on the airflow, which should make the fan module extremely efficient compared to any comparably powered system. Another way to look at this is to imagine each air molecule traveling in a helix through the fan module 100 such that it completes a few 360° rotations during a single traverse through the fan module, and while imagining this air molecule doing so, to realize that it is experiencing along the curve of the helix a linear acceleration. In other words, the fan module can be seen as a linear accelerator for air molecules that utilizes a helical flow path for want of another way to work on so much air within such a tight space.

But this linear accelerator module seems to suffer an obstacle in that once the air streams exit past the 1$^{st}$ fan stage vane trailing edges 131C they have already been tangentially accelerated to a high velocity and to complete the spiral like this through the 2$^{nd}$ and 3$^{rd}$ fan stages 102 and 103 would not further accelerate them. The traditional prior art solution to this would be to space the 2$^{nd}$ stage from the 1$^{st}$ stage and with guide vanes or other structures halt it or shock it out of rotation to trigger a self-pressurization of the air so that when the 2$^{nd}$ stage picks it up again, the stages work as compressors and with the 2$^{nd}$ stage spinning a similar speed to the 1$^{st}$ stage, the successive stages increase the pressure, not the speed, of the air. This is pitfall we will choose to ignore. Pressurizing the air is a long road to get to something that is only a short distance away and would complicate our endeavor by an order of magnitude, but how to get around this.

Firstly, and importantly, we omit the guide vanes between the 1$^{st}$ fan stage 101 and the 2$^{nd}$ fan stage 102 and we simply get rid of any spacing between them such that once the air has left the 1$^{st}$ fan stage 101 with a very high tangential velocity, the 2$^{nd}$ fan stage leading edges 132A swoop in on it and repeat the process that happened inside of the 1st fan stage 101, but this time in the 2$^{nd}$ fan stage 102. How we do this here might or might not be novel in the art but the Applicant is unaware that it has been thought of before.

Importantly, and this must be understood to digest the overall concept of the present invention, the 2$^{nd}$ fan stage 102 spins at twice the rotational velocity that the 1$^{st}$ fan stage 101 spins. This was mentioned in the description of FIGS. 1A-1B and it probably doesn't sink in when that part is being read, so we'll go into very minute detail here of what is actually happening in the junction between the 1$^{st}$ fan stage 101 and the 2$^{nd}$ fan stage 102.

Looking at FIG. 2B and imagining all the fan stage vanes 131-132 moving downward on the page, we will further envision the 2$^{nd}$ fan stage vanes 132 moving downward at twice the velocity of the 1$^{st}$ fan stage vanes 131. What does this mean for the air passing from the 1$^{st}$ fan stage vane trailing edges 131C to the 2$^{nd}$ fan stage vane leading edges 132A? Well, in the relative rotational frame of the 2$^{nd}$ fan stage 102, the tangential velocity of the air coming off the 1$^{st}$ fan stage trailing edges 131C is effectively zero, meaning if we want to use the 2$^{nd}$ fan stage 102 on the air exhausted from the 1$^{st}$ fan stage 101, the 2$^{nd}$ fan stage vane leading edges 132A encounter the air at the same relative standstill (ignoring now for simplicity the axial velocities of all air flows) that the 1$^{st}$ fan stage vane leading edges 131A encountered the air entering the fan module 100 coming from the fan intake module 70.

So, given that the 2$^{nd}$ fan stage 102 is spinning at twice the rate of the 1$^{st}$ fan stage 101, the air inside the 2$^{nd}$ fan stage 102 will experience the same thing it experienced inside the 1$^{st}$ fan stage with the 2$^{nd}$ fan stage 102 consuming the same amount of power that the 1$^{st}$ fan stage 101 consumes. From the relative frame of the air molecules, by the time they reach the 2$^{nd}$ fan stage vane main segments 132B, not much is happening to them other than the fact that they are subject to a mixed force field that for some reason makes them continuously build up speed in the relative frame of the airframe 1.

But this is not completely true since the 1$^{st}$ fan stage was the one that provided the axial flow velocity that is still being used gratis by the 2$^{nd}$ fan stage, and also, since the 2$^{nd}$ fan stage 102 is spinning at twice the rate of the 1$^{st}$ fan stage 101, the centrifugal force field the air is experiencing is twice as powerful as the air was experiencing in the 1$^{st}$ fan stage 101. Although there are other ways to deal with this, the Applicant finds it most convenient to increase the angle of attack of the 2$^{nd}$ fan stage vane main segments 132B, as is visible in FIG. 2B. Still the air would continue to build up axial velocity which we absolutely do not want, so the Applicant has swept forward in the rotational direction the 2nd fan stage vane trailing edges 132C, also clearly visible in FIG. 2B.

In so configuring the 2nd fan stage vane main segments 132B and 2nd fan stage vane trailing edges 132C, we have harnessed the extra force and potentially resulting axial flow velocity excess and turned it into more tangential velocity, such that when the air flows escape their flow paths between and among the 2nd fan stage vane trailing edges 132C, the air has a tangential velocity even higher than the rotational velocity of the 2 nd fan stage 102, which is likely to be found in the range of 1600-3200 mph, although this range should not be seen as limiting. This means that the 3rd fan stage 103 will spin a little faster than 1.5 times the rotational velocity of the 2nd fan stage 102 to avail of the free energy that has already been provided by the 1st and 2nd fan stages 101 and 102, but to keep it simple we are just going to overlook that for now and stay with our idealized numbers and ratios.

Without trying to be redundant the Applicant reminds the reader that no matter how fast the air is traveling in the relative frame of the airframe 1 or any other object not within the fan module 100, the skin drag experienced by the air as a result of interaction with the vanes and walls of the 2nd fan stage 102 is still only a function of the axial flow velocity, which is substantially unchanged from that of the 1st fan stage and is, at this point as a fraction of the work being done on the air by the 2nd fan stage 102 and the tangential air flow velocity numbers being thrown around here, vanishing to negligible.

So, we have gone through two fan stages and we have put quite a spin on the (relatively) slowly migrating flow of air through one fan stage and then the next fan stage. We could easily entrain the air and utilize its high tangential velocity by transposing the latter into an equally high linear velocity after the 2nd fan stage 102 by increasing the horsepower of the 1st and 2nd fan stages, which would offer a less costly alternative to the three-stage fan module proffered in the instant application and as shown in FIGS. 2A-3 and elsewhere. However, the drive system that the Applicant has devised to drive the fan module 100, and which will be discussed with reference to FIG. 3A, has space that begs to be filled by drive means for a 3rd fan stage 103, because the more rotors the drive system has, the more it can double-utilize the stacks of magnets of the stators, which will be described later.

Of course a person of ordinary skill in the art could come back with the obvious (which is a non-preferred 2nd embodiment that by description in this paragraph becomes art of record and shows that any number of fan stages could be used, each with its own corresponding number of coiled rotors) option of having two coiled rotors per fan stage and then four rotors could double-utilize the stacks of magnets, but FIG. 3A is what the Applicant drew so we're going with that. In all seriousness, though, the Applicant instinctually favors a 3-stage system, and although he can't figure out why, he believes it has something to do with being able to run the system more efficiently at low power consumption (when the aircraft is not taking off, it consumes very little power) and also it probably creates better flow conditions at the transition points within the fan module 100, namely in the small spaces between the stages where the 2nd and 3rd fan stage vane leading edges 132A and 133A pick off the air from the 1st and 2nd fan stage vane trailing edges 131C and 132C, respectively. The more stages we have, the slower is the relative tangential speed ratio between each stage and the one before it.

Following on the end of the last paragraph and before moving onto a full description of the 3rd fan stage 103, it was mentioned a moment ago that there could be flow problems for the air in the small spaces between the stages wherein the 2nd and 3rd fan stage vane leading edges 132A and 133A pick off the air from the 1st and 2nd fan stage vane trailing edges 131C and 132C, respectively. Although the Applicant has been careful to never consider any vane other than a 2-dimensional bent plate for the vanes 131-133, in order to preclude shock waves (since the vanes will probably be cutting into air at over Mach 1), at full power we must recognize that it is almost impossible to have zero interstage interfaces within the fan module 100 where a vane is slicing into air at a velocity greater than Mach 1 relative to the local air flow velocity.

If this creates noise, that is something we can tolerate or otherwise deal with, but surely there are going to be constant sonic booms and if this is not accounted for, the invention will not perform as desired, at least during takeoff. During non-takeoff the system could slow down to keep all velocity differences to less than Mach 1. Also, we could keep increasing the number of fans while making each one less powerful, such that we can achieve the requisite (for VTOL) fan module exhaust air speed while no particular leading edge would have to enter air at over Mach 1. All these are options that make sure the present application stays viable and surmounts any objections based on the sonic booms that could abound in the areas of the leading edges. However, the simplest solution would likely be to file down the tips of the leading edges to be razor thin. Also, there are other well-known solutions for leading edges (of both wings and compressor vanes) to make them usable in supersonic conditions, and although the Applicant isn't going off running around looking for them just to prove a point here, he has seen several of them and they include various treatments to the leading edge tips that include imparting sawtooth or scalloped patterns on the tips themselves. Applicant proposes that making the leading edges razor thin should do the job, but that if it doesn't, there are ample prior art solutions that could be implemented during manufacture of a prototype that inexpensively and efficiently mitigate or eliminate the sonic obstacles addressed in this paragraph, that it would be obvious to one of ordinary skill in the art to manufacture the fan module 100 using any available modification along these lines, and also to choose the best one that is viable while keeping costs down, and in proposing the foregoing we get to advance the discussion instead of getting hung up on a potential objection that has been solved dozens or hundreds of times over in the prior art history.

Finally turning to the 3rd fan stage 103, it should now be no surprise what its functionality will be. Although tempting, we can't spin it at twice the rate of 2nd fan stage 102. That would require twice as much work as is being used to power 1st and 2nd fan stages 101 and 102. The way its 3rd stage vane leading edges 133A encounter the tangential velocity of the air flow coming off the 2nd stage vane trailing edges 132C is identical to the way the 2nd stage vane leading edges 132A encounter the tangential velocity of the air flow coming off the 1st stage vane trailing edges 131C. So if we want to do the same amount of work on the air flow that was done on it by the 1st and 2nd fan stages 101 and 102, which would keep us from having to soup up the 3rd fan stage's drive system (the latter is actually a serious option that could be used since the 3rd fan stage drive is on the outside of the nested drive system and is the most opportune one for installing extra magnets and coils), we will add about the same amount of tangential velocity to the air flow that we did with the $2^{nd}$ fan stage 102, by spinning it about three times as fast as the $1^{st}$ fan stage 101, and thus we will keep the power and mass of the drive systems for all three fan stages roughly the same.

Of course, not all of the foregoing is necessary and, once the present invention has been published and its concept understood by practitioners in the art, the powers of the fan stages don't have to relate to each other for any foreseeable reason. Perhaps one stage should be more powerful than the other two, or perhaps they should all be the same. Only by modeling the system and/or making a prototype and testing it does it seem possible to determine these things. The Applicant cannot find a conceptual basis for adjusting the power balance other than, for convenience, describing them all here as equally powerful, and since that produces nice numbers and pretty drawings that are easy to use in a patent application, it conduces to the project at hand and that project has as a modus operandi of getting a good, reasonably understandable document published soon. The Applicant does not feel negligent in failing to branch out in every direction because there is a time constraint on when this application must be filed with USPTO. However, there are myriad opportunities for switching up, adjusting, and adding to the various modules and sub-modules of the present application and they should be pursued, even though the resulting advances should be seen as obvious to one of ordinary skill in the art unless they evince the magnitude of inventiveness that is being used to create the aircraft being described herein to begin with.

So, the exhaust air flow tangential velocity exiting the $3^{rd}$ fan stage 103 will likely be in the range 2400-6400 mph, although this range should not be seen as limiting. As a side mention, the Applicant did a back-of-the-envelope calculation once using a reasonable volumetric throughput and came up with the lower limit of 2400 mph as being generally adequate to get around 500 pounds of thrust, so although the calculations will not be rehashed here since the Applicant is making no claims about the actual throughput or thrust, the 2400 mph is a quite generous one as it allows for only a very light aircraft taking off with a very light person inside it and it probably doesn't require more than 120 horsepower to get the stated thrust.

Still it seemed that a range would be helpful to the discussion so that one was provided. On the high end of the range, although the air is traveling as much as 6400 mph inside the $3^{rd}$ fan stage vane trailing edges, said air won't find this out until it passes into the fan exhaust volute 31 (described later—also, the Applicant could find no prohibitions against anthropomorphisms in the MPEP). Whatever problems occur at such a juncture are things that will have to be dealt with in testing and prototyping because it would involve heavy lifting in the world of aerospace engineering to form a theoretical basis and establishing the latter might be more difficult than just testing the thing and seeing if we can't just get away with it, wherein we perhaps get lucky and it's just fine as it is (probably not), or other people come up with other solutions, for instance maybe expanding the fan exhaust volute and ducts downstream of the exhaust volute to allow some pressurization to lower the air velocity, with depressurization at an outlet thrust nozzle.

However, we'd prefer to keep the exit volute and ducts as narrow as we can so perhaps aerospace engineers can solve any boundary layer problems that arise without expanding the ducts. It is also possible (again, getting lucky) that the boundary layer problems of having such quickly moving air inside such a narrow duct only result in heat and backup pressure, in which case the heat and backup pressure might aid the explosiveness of the air as it exits the VTOL or thrust nozzles, or simply pass out of the aircraft altogether, resulting merely in a negligible detriment to efficiency.

So, still referring to FIG. 2B and rounding out the description of the $3^{rd}$ fan module 103. Like the other fan modules it has a $3^{rd}$ fan stage vane leading edge 133C whose angle of attack is not quite so pronounced as the leading edges of the other fan stages and the Applicant forgets why he did this but it's already drawn so we're keeping it, and using the leading edges shown for the $1^{st}$ and $2^{nd}$ fan stage vane leading edges 131A and 132A is possibly the more reasonable way they should be disclosed. Although he has done a lot to mitigate the length-wise (across the fan module 100) accrual of air flow axial velocity, nonetheless the Applicant believes that the air flow axial velocity is going to creep up and up unless we do something about it, so although the $3^{rd}$ fan stage vane main segments 133B don't have much that needs to be said of them, the $3^{rd}$ fan stage vane trailing edges 133C have been aggressively swept forward in the rotational direction and this not only should soak away any excessive air flow axial velocity, which we no longer need at this point, but it puts the air flow direction in conformance with the fan exhaust volute 31 it is about to enter and we don't want to lose any kinetic energy by bouncing the air off the frontmost wall of the fan exhaust volute 31, described later with reference to FIGS. 4A-4C. It should be said in passing that another way to keep down the air flow axial velocity creep would be to decrease the cone angle of at least one fan stage, the cone angle being a function of the ratio of a fan stage's outlet diameter over its inlet diameter.

The Applicant has decided not to use a pre-swirler for the fan intake module 70 of the present embodiment of the invention (unless the device is used for much greater airspeeds, in which event he would prefer to use one), but he has added a few lines/vanes of one in FIG. 2A and labeled it 71. The pre-swirler concept was described in full detail in US 20220363378 A1, so it won't be described herein, although it is clear that the pre-swirler in the prior art document cannot be directly used herein, due to the inversion of the air flow by the fan intake module 70, but anyone of ordinary skill in the art could figure out how to implement a pre-swirler in this aircraft, especially given the few lines that the Applicant has drawn in FIG. 2A to hint at what it would look like (it can't be drawn in two dimensions anyway).

To summarize FIG. 2B, which is a blow-up of the fan module shown in context in FIG. 2A, three similarly-designed fan modules 101-103 feed air from upstream to downstream, or from right to left in the view provided in FIG. 2B, wherein $1^{st}$ fan module 101 sucks in air using $1^{st}$ fan stage vane leading edges 131A spinning at moderately high rotational velocity and accelerates it along a helical path to obtain a moderately high air flow tangential velocity and a moderately small air flow axial velocity, the latter of which ejects the air flow to the $2^{nd}$ fan module 102 which spins at two times the rotational velocity of the $1^{st}$ fan module 101 and sucks in the exhaust air from the $1^{st}$ fan stage 101 using $2^{nd}$ fan stage vane leading edges 132A. The $2^{nd}$ fan module 102 accelerates the air flow along an even tighter helical path to obtain a very high air flow tangential velocity. The $3^{rd}$ fan module 103 which spins at three times the rotational velocity of the $1^{st}$ fan module 101 sucks in the exhaust air flow from the $2^{nd}$ fan stage 102 using $3^{rd}$ fan stage vane leading edges 133A and accelerates the air flow to an extremely high air flow tangential velocity. Means are provided on the $3^{rd}$ fan stage trailing edges 133C to bend the residual air flow axial velocity (the product of the shapes of the leading edges and the centrifugal forces caused by the constantly expanding cone angle of the fans) forward to inject it into the fan exhaust volute 31 which will be our entry point to FIG. 4A and the splitter module that the tangentially swirling air inside the fan exhaust volute 31 feeds with a constant stream of fast-moving air that will be used as described later with reference to FIGS. 4A-4C and 5A-8A.

Before turning to the fan module drive system of FIGS. 3A-3G, the Applicant is aware that it is at this point, or at least somewhere in the last few paragraphs, where a reader might object to the extreme air flow velocities that have been proposed to exist within the latter stages of the fan module 100 and in downstream ducts. They do seem preposterous and/or impossible but this is not so given the context within which we are working on this air in such a manner.

During VTOL the fan module 100 is naturally aspirated. At the rotational velocities proposed herein they will create a near-vacuum at the fan intake and within the fan intake module 70. The inlet to the 1$^{st}$ fan module 101 is a narrow annulus of relatively small radius. Even if the fan module 100 were to create a complete vacuum, the fact that the aircraft is not moving forward to force induction of air into the fan module 100 means that the maximum flow of air into the fan intake, and therefore also the maximum volumetric throughput, is completely constrained by the pressure of the ambient air, and for us that pressure is 1 atm or 14 psi (which is pretty low). The fan module 100 no matter how powerful it is made to be is entirely reliant upon the ambient air "falling" into the vacuum of its own creation and how much can be sucked into the fan module is simply a function of the mathematical product of the 1$^{st}$ fan stage's intake cross-sectional area and an ambient pressure of 1 atm.

What this means is that there is very little air entering the fan module compared with regular forward flight. On the one hand this offers the fan stages a very small and predictable amount of resistance to their running up to any speed they want (meaning any speed the designer wants in terms of the horsepower s/he provides for it). On the other hand this offers us only one way to achieve significant thrust (throughput-times-velocity or m-dot*v, with m-dot being constrained to a small value), and that is to run up the exhaust speed (v) by running up the rotational velocities of the fan modules 101-103, wherein not only are we capable of running up exhaust speed (v) to offset the scarcity of throughput (m-dot) by maximizing the rotational velocities of the fan stages, but we have to do so. Applicant is not saying this will be like spinning the fan stages in an actual vacuum and we have free reign to pick any speed. In reality we can keep increasing the horsepower of the fan module until the exhaust speed (v) overwhelms the limited throughput (m-dot) in the equation, and at some point adequate thrust will happen, when the rotational velocities of the fans reach equilibrium with the resistance their rotation faces. So in hindsight it is not so far-fetched to have fan module exhaust exiting the fan module 100 at thousands of miles per hour, it is entirely possible, especially once we understand the subsequent paragraph.

It was mentioned earlier that the air flow velocities through the fan exhaust volute 31 and downstream ducts could suffer flow problems, and we can retroactively try to solve some of the boundary layer obstacles (or predicted ones) by reminding ourselves that yes, the air is moving very fast, but there isn't much of it, in fact there's hardly any when one compares it to the fan of a regular aircraft during takeoff. Bernoulli's principle says that while we increase the velocity of the air through the ducting that is downstream of the fan, the pressure within the ducting will be reduced. Well, we are already working with a very low pressure because of the low throughput, so we should be able to keep the ducting very narrow without the boundary layer problems because as the static pressure of the air flow diminishes to the miniscule values that seem to be predicted by this discussion, there simply might not be enough static pressure to form a boundary layer since hardly any molecules, per unit of time, will actually contact the walls of the ducting. All the same, every effort has been made herein to make said ducting as short as possible in order to eliminate as much as possible the chance that the flow will slow down (due to its low static pressure) while it still inside the aircraft.

As will be discussed elsewhere within this document, as the aircraft attains significant airspeed, we will have the opposite problem in that the forced induction of air coming in at a few hundred miles per hour promises to choke the fan stages 101-103 unless we preemptively choke the intake module 70, which we will do.

Referring one last time to FIG. 2B, the fan stages 101-103 have been depicted with a small space between the stages in order that the fan stage vane leading edges 132A and 133A do not cooperate with the fan stage vane trailing edges 131C and 132C to create air pulsations when they pass each other.

The last handful of paragraphs suggest that the reasons for avoiding interstage stator guide vanes are starting to pile up. Now that we know how much greater the tangential velocity of the 2$^{nd}$ fan stage exhaust air flow is than the air flow axial velocity, it is difficult if not impossible to even imagine interstage stator guide vanes interposed into the fan module 100 in any meaningful way that does not break down the air flow and/or completely block it between the 2$^{nd}$ and 3$^{rd}$ fan stages 102 and 103. In other words, omitting interstage stators, which is only made possible by spinning the fans in the same direction, which is only made possible by using a flywheel, might be the only feasible way to achieve the rotational velocity for the 3$^{rd}$ fan stage 103 that is high enough to overcome the lack of throughput. One alternative, which was provided in US 20220363378 A1, is to use twin or paired parallel fan modules whose fans spin in opposite rotational directions, and although that will be considered elsewhere herein, it does not suffice for enabling the economy single passenger single fan module aircraft that is the subject of the preferred embodiment.

Turning now to FIG. 3A which is a cross-sectional view through the diagonal fans and it illustrates a currently preferred embodiment of the fan drive system, viewed about a fan module axis of rotation 116 from the sides or bottom or top of the aircraft or of the fan drive system. Since the diagonal fans are semi-annular and radially symmetrical, a cross-sectional view from a lateral vantage will be identical to any other vantage of them.

In FIG. 3A the fan stages 101, 102, and 103 are no longer depicted as outer vane edges but as individual cutaway cross-sections that are bound on their outer extents by outer walls (not labeled) and on their inner extents by inner walls (not labeled) and they are in this figure bound on their intake sides by the vane leading edges and on their exhaust sides by the trailing edges, and in the cross-sectional view of FIG. 3A, this just leaves them looking like quasi-polygons lined up in a row that lies along the cone angle and when you add them up (top and bottom rows above and below the fan module axis of rotation 116) to form a single shape, you get a frustoconical shape whose outer taper angle we have already, earlier, begun to refer to as said cone angle.

As it is common practice in the turbofan, turbojet, turbocharger, blower, etc. arts to depict rotating bodies in this way (some patents don't even show the rotational axis), the Applicant does not expect to have to further describe or justify the style of view shown in FIG. 3A. Anyone of ordinary skill in the art would understand the fan stages, how they rotate into and out of the page around the fan module axis of rotation 116, and how the same goes for everything else in this figure.

As partly described with reference to FIG. 2B, the 1$^{st}$ fan module 101 rotates around the fan module axis of rotation 116 at a 1$^{st}$ fan stage rotational velocity, the 2$^{nd}$ fan module 102 rotates around the fan module axis of rotation 116 at about twice the rotational velocity as the 1$^{st}$ fan module 101, and the 3$^{rd}$ fan module 103 rotates around the fan module axis of rotation 116 at about 3 times the rotational velocity as the 1$^{st}$ fan module 101. The air migrates from right to left in FIG. 3A just like it did in FIG. 2A. The 1$^{st}$ fan stage 101 is supported by and locked for rotation with a 1$^{st}$ annular energized electromagnetic rotor 105. The 1$^{st}$ annular energized electromagnet rotor 105 is a hollow cylinder with a wall thickness of perhaps an inch or two and wherein the rotor 105 is arrayed with an annular stator bank of parallel electromagnetic rotor coils or windings (not shown) as is well known from various types of rotary motors. If shown in FIG. 3A they would extend horizontally on the page. The peripheral spacing of the windings relative to each other would be substantially regular.

The windings of the 1$^{st}$ annular energized electromagnet rotor 105 are connected in series in the pole-pair style and electrified by a brush-style mechanism wherein electrical energy arrives to the rotor 105 in such a way that, even though the rotor 105 has literally no point of connection to the aircraft or any other support structure, the electrons in the windings are made to oscillate as a function of how much voltage is applied. A voltage regulator, a power inverter, and/or other electrical equipment could be on/in the rotor or on/in a stationary element elsewhere on the aircraft. Also, the inverter could be part of the brush mechanism. A controller regulates the voltage to increase or decrease electromotive force while the inverter accomplishes the primary phasing of the oscillations.

Nested within the 1$^{st}$ annular energized electromagnet rotor 105 and coaxial with it is a 1$^{st}$ annular stator bank of permanent magnets 110. Surrounding the 1$^{st}$ annular energized electromagnet rotor 105 and coaxial with it is a 2$^{nd}$ annular stator bank of permanent magnets 111. Both the 1$^{st}$ annular stator bank of permanent magnets 110 and the 2$^{nd}$ annular stator bank of permanent magnets 111 encapsulate the 1$^{st}$ annular energized electromagnet rotor 105 but they do not touch it. All of the annular stator banks of permanent magnets 110 and 111 (and 112 and 113 too) comprise rows of permanent magnets 115. An air gap is established between the rotor 105 and annular stator banks of permanent magnets 110 and 111 and this is visible in FIG. 3A. Each row of permanent magnets 115 in the 2$^{nd}$ annular stator bank of permanent magnets 111 (this also goes for banks 112 and 113 but not bank 11) has all of its magnets' polarity aligned in one direction (i.e. north in—south out) while each adjacent row on each side of that row has all of its magnets' polarity aligned in the opposite direction (south in-north out). This type of motor is well known and, even though the Applicant has probably drawn much of it incorrectly in an attempt to use Neodymium cubes to increase the magnetic flux on the windings (described in US 20220363378 A1), it doesn't need to be overly explained.

What happens is that the pole-paired rows of permanent magnets 115 create a flux field across the air gap such that when the winding poles of the 1$^{st}$ annular energized electromagnet rotor 105 are energized to have their electrons oscillating, push-pull relationships are cyclically applied on the windings of the rotor 105 as the rotor 105 spins. Again this is well known and doesn't need to be gone into much further detail.

However, the permanent magnets 115 of the 1$^{st}$ annular stator bank of permanent magnets 110 are arranged in a Halbach array in order to create all the magnetic flux on the internal side of the 1$^{st}$ annular stator bank of permanent magnets 110. Applicant already discussed this feature and its usage in exactly this type of system in his prior application US 20220363378 A1, which has been incorporated by reference herein, so no further discussion will be made of Halbach arrays. Since the 1$^{st}$ annular stator bank of permanent magnets 110 surrounds and is coaxial with a magnetic shield 104, the Halbach arraying of its magnets 115 lenses all of the magnetic flux across the air gap and onto the 1$^{st}$ annular energized electromagnet rotor 105 such that the magnetic flux is confined to maximize the EMF per voltage applied to the 1$^{st}$ annular energized electromagnet rotor 105.

As already described, the magnets of the 2$^{nd}$ annular stator bank of permanent magnets 111 are not in a Halbach array because, by leaving this bank unshielded with air gaps on both inner and outer faces, it is double-acting. A 2$^{nd}$ annular energized electromagnet rotor 106 surrounds the 2$^{nd}$ annular stator bank of permanent magnets 111 and it does the same thing as the 1$^{st}$ annular energized electromagnet rotor 105 does, experiencing EMF by oscillations being driven by applied electrical voltage (the annular energized electromagnet rotors 105-108 are identical except that they are different diameters) across another brush assembly from the aircraft.

What this means is that, with the exception of the Halbach arrayed 1$^{st}$ annular stator bank of permanent magnets 110, all of the magnets 115 of the fan drive system are putting magnetic flux out in both inner and outer radial directions from the annular stator banks of permanent magnets 111-113 for multiple annular energized electromagnet rotors 105-108 to utilize for electromotive force. This should mean that for all of the annular energized electromagnet rotors 105-107 (not 108), each one is getting magnetic flux from both a radially inwardly disposed magnetic source and a radially outwardly disposed magnetic source. The annular energized electromagnet rotor 108 only receives flux from the inside, from the 4th annular stator bank of permanent magnets 113. This arrangement should double the magnetic flux across the rotors for each individual magnet 115 and it should further mean that for each unit of voltage applied to each annular energized electromagnet rotor, the electromotive force (EMF) should be doubled as compared with a similar system wherein there is only one annular stator bank of permanent magnets per rotor. This hopefully will severely reduce the amount/mass of magnets and windings required to accomplish the torque (or horsepower) needed for the flight modes prescribed elsewhere within this application. Of course, it will suck the voltage faster but increasing the voltage of the energy source(s) does not increase the weight of the aircraft nearly as much as more magnets does.

The Applicant is not an electrical engineer but he believes there is prior art showing how to accomplish this type of electrical motor without permanent magnets, or that some electrical engineer could create a magnet-less (i.e. synchronous, asynchronous, etc.) motor for customized use in this application, the main requirements being merely that the system be cylindrical (i.e. hollow and open ended, with no shafts, discs, bearings, etc.). For now, the permanent magnets are a nice (and heavy) placeholder to get the concepts into the public for future improvement.

The use of permanent magnets also allows or requires the use of progressively larger magnets for the larger-diameter annular stator banks. As shown in FIG. 3AA, the permanent magnets 115 of annular stator bank 113 are larger than the permanent magnets 115 of annular stator bank 112, which are larger than the permanent magnets 115 of annular stator bank 111, which are larger than the permanent magnets 115 of annular stator bank 110. In this way the nested concentric system can be set up such that pole pairs of adjacent annular stator banks are always pulling on the same winding pole while pushing its adjacent winding pole, and the rotor windings always find themselves passing between the same inner and outer poles (i.e. both N or both S) at the same time, such that there is no magnetic flux interference which would cut down on the efficiency of the system. Although not drawn, if one looked at an endwise cross section of the nested assembly (say from left-to-right) one would see radially emanating lines or sectors of magnets wherein for each line or sector, each north pole faces another north pole and each south pole faces another south pole.

It must be conceded by the Applicant at this point that the foregoing description of FIG. 3A, although technologically intact and having dealt with various hard-to-describe features of the fan drive system, is bewildering from a general understanding perspective and the application must revert to simpler terminology for most of the elements being described in reference to FIG. 3A. The discussion will be restarted at a point before where it left off, wherein the entire fan drive system will be described using shorter descriptions of the germane elements, and at the cost of being redundant, the application will here recommence the description of FIG. 3A while wielding simpler terminology (now that the lengthier terminological terms have laid the theoretical groundwork for the most important aspects of the fan drive system).

So, still referring to FIG. 3A, the fan drive system comprises an annular electrified 1st rotor 105 that supports a $1^{st}$ fan stage 101 for rotation therewith and it is spun by windings that oscillate electrical current in said $1^{st}$ rotor 105 between concentrically adjacent stators $1^{st}$ stator 110 and $2^{nd}$ stator 111 which each comprise permanent magnets 115, as is known in the electrical engineering arts. Similarly, the fan drive system comprises an annular electrified $2^{nd}$ rotor 106 that supports a $2^{nd}$ fan stage 102 for rotation therewith and it is spun by windings that oscillate electrical current in said $2^{nd}$ rotor 106 between concentrically adjacent stators $2^{nd}$ stator 111 and $3^{rd}$ stator 112 which each comprise permanent magnets 115, following the example of the $1^{st}$ rotor 105. Similarly again, the fan drive system comprises an annular electrified $3^{rd}$ rotor 107 that supports a $3^{rd}$ fan stage 103 for rotation therewith and it is spun by windings that oscillate electrical current in said $3^{rd}$ rotor 107 between concentrically adjacent stators $3^{rd}$ stator 112 and $4^{th}$ stator 113 which each comprise permanent magnets 115, following again the example of the $1^{st}$ rotor 105.

The $4^{th}$ stator 113 could be shielded on its outside and provided with Halbach arrays, but the Applicant believes more energy can be gleaned from it by including a $4^{th}$ electrically energized rotor 108 coaxially outside of said $4^{th}$ stator 113, and which could be of any type insofar as it utilizes the magnetic flux being outwardly exerted by the $4^{th}$ stator 113. This is simply another way of rendering for energy the magnetic flux from the large magnets of the $4^{th}$ stator 113 and is not necessary, other options are available, but it seems to work and since the $3^{rd}$ rotor 107 is so short, perhaps the $4^{th}$ rotor 108 will be necessary to match the power of the $3^{rd}$ rotor and thus the $3^{rd}$ fan stage to the powers of the $1^{st}$ and $2^{nd}$ rotors 105 and 106, respectively, or $1^{st}$ and $2^{nd}$ fan stages 101 and 102, respectively.

Still referring to FIG. 3A, the rotors and stators are nested or interdigitated such that most of the rotors (specifically rotors 105-107) are experiencing, at every winding pole, almost double magnetic flux, such that the voltage across the rotors, if similarly almost doubled, achieves approximately ⅔ or more of the EMF than would prevail if each rotor was subjected to the EMF of a single shielded magnetic stator array. In this manner the voltage can be increased to at least 1.7 of what it would be across each rotor, with such increase facilitated by a high-voltage power source, during VTOL modalities, and with each voltage increase being consumed by the rotors that are placed in a double-flux annular force field. Again, increasing the voltage of the power supply should not increase the mass of the aircraft nearly as much as increasing the mass of the fan drive system would, so the highest available voltage should be sought when considering the power supply.

Reference numeral 109 depicts a base wall. The base wall should be designed as very rigid and strong. It is stationary and fixed to the airframe 1 in some way as to make it very secure. It must be rigid, strong, and secure because it supports the stators 110-113, which are not only heavy but which support the rotors 105-108, whose movement must be tightly constrained to prohibit the fan stages from touching each other. Also supported by the base wall 109 is the magnetic shield 104, which supports the flywheel module 10, so the structure of the magnetic shield must also be very rigid, strong, and secure.

Cooling means are provided for internally air-cooling the rotor windings. This method was described in US 20220363378 A1 but it has been modified to be used for the present invention and the discussion will be brief. Cooling ducts 117 lead from cooling duct intakes 118 which are open to the internal air within the tail of the aircraft. The cooling duct intakes 118 will have intake vanes with a leading edge angle of attack that captures and blows the air along the cooling ducts. If the cooling ducts 117 are divided by internal longitudinal walls, each duct acts as a quasi-centrifugal (diagonal) blower such that the air that is captured by the cooling duct intakes 118. The cooling ducts 117 for rotors 106, 107, and 108 will have at their intake ends (right-hand-side in FIG. 3A) curved blades like the cooling duct intakes 118 because the air will have to be pumped through them just like it is being pumped through the fan stages 101-103. Un upper row of ducts for each stage leads air to the ducts for the next stage while a lower row of ducts for each stage leads air directly into its rotor. The cooling air flow will pass longitudinally along the winding poles or between pole pairs as described in US 20220363378 A1. The Applicant has chosen not to show how the cooling air passes from one cooling airflow duct 117 to the next but it should be obvious that the wall connecting the rotor to the fan stage will have an annular gap in it with blade-like struts that support the rotor but let the air pass through.

As stated above, the flywheel module is fixed to the inner wall of the magnetic shield 104. As shown in FIG. 3A, it is not positioned directly within the $2^{nd}$ fan stage 102. Due to the fact that the $3^{rd}$ fan stage 103, and rotors 107 and 108, will be spinning at three times the rotational velocity of the $1^{st}$ fan stage 101 and rotor 105, the flywheel module 10 has been moved forward (in the flight direction) a few inches to reside roughly between the interface between $2^{nd}$ fan stage 102 and 3$^{rd}$ fan stage 103. The flywheel module 10, described in more detail later in the application, should by being placed here be capable of completely negating the Coriolis effect being created by the fan stages 101-103.

FIG. 3A shows two features of the present application better than any other drawing in this application. The two features have been part of the development of the invention by the Applicant and although they do not need to be discussed, they are indeed discussed herein because they further the enablement of the speed and power claims the Applicant has put forth earlier in the application.

These two features are a) the fans only deal with the outer rim of air and do not work on air in the inner radii and middling radii like other fans in the prior art do; and b) the electromotive forces on the rotors are also radially out in the neighborhood of the large exclusive radial annuli of the fan stages. The benefits of these features will now be explained.

Most ducted fans and propellers that spin and work on ingested air do most of their best work on the air passing through the outer radii of the fans and almost no work on the air passing through the inner radii and only moderate work on the air passing through the middling radii. The applicant simply made the decision to only work on the air passing through the outer radii, came up with an annular fan, and after that, attempted to get rid of a disk or support structure to hold the annular fan on a drive shaft. The extant solution that resulted was the drive system proposed herein, where the entire structure of the electric motors has been reinvented to place the fan stages 101-103 directly on the rotors 105-108 that drive them. This in turn resulted in a device that is all working parts and only working parts. There is just the drive and the fan, with a simple, robust, and minimalist mechanical link to interconnect them. No shafts, no bearings, no lubricants, etc. The only thing that is left is electricity. The extra benefit resulting from this is that the electromotive force on the rotors is also radially "out there" in the outer radii where it can generate the most torque, said torque being delivered directly to the fan stages without any bridging mechanical systems.

To finish the discussion of FIG. 3A, a few items in it are better described with reference to other figures, but need to be mentioned here. A sealing wall 114, which is basically a disc with an opening in the center, plugs the space between the rotor cooling airflow duct intakes 118 and the main exhaust thrust nozzle 38, which is the terminus of rear fan exhaust duct 36. As shown in FIG. 3A (and also FIG. 3G), the sealing wall 114 is attached to the main exhaust thrust nozzle 38 and extends radially outwardly therefrom. Although there is no functional way to make it abut the rotating elements, the sealing wall should get as close as possible to the rotor cooling airflow duct intakes in order to partially seal the core 119 of the fan module. The rectangle in the bottom left-hand corner of the drawing is the fan exhaust volute 31, which will be described in greater detail with reference to FIGS. 4A-4C.

As was mentioned in the last paragraph, there are no mechanical bearings. The Applicant is relying on electricity to do everything in an attempt to rid the present invention of every heavy, unreliable, complicated, and/or inefficient elements possible. The result so far is that we have electrified annular rotors nested within and among annular stators, and a bearing system is required to keep the rotors spaced from the stators by a precise distance already described as, and known in the art as, the air gap. Not only that, but the fan stages 101-103 are imparting different pressures upstream and downstream of themselves and so they are going to suck and/or push themselves into each other and/or into the base wall 109 or try to separate themselves away from the stators in a longitudinally rearward direction. In other words, we need both radial bearings and thrust bearings for each stage, but they cannot be mechanical bearings due to the high rotational velocities of the fan stages.

Roller bearings and ball bearings are obviously out of the question because they would require a lot of space in FIG. 3A and there is none for them. Additionally, since we have no shaft, any roller or ball bearing would have to contact the spinning parts out where they are at speeds that a bearing system would already struggle to handle in a shafted system, which means that the balls/rollers of the bearings would be spinning at thousands of miles per hour and would basically instantly fail, unless they were made with the strongest alloys and provided with the greatest lubrication system known to man. This sounds costly, and it sounds heavy. Not only that, the surface tension of and cavitation within the lubricant would render the bearing useless and perhaps even a great liability.

FIGS. 3B-3D jointly illustrate axially-viewed, currently (at the time of filing) preferred embodiments of the fan drive system and the fan levitation system (electromagnetic radial bearings). Within FIGS. 3B-3D, FIG. 3C is a close-up of the contents of "Box 3C" from FIG. 3B, and FIG. 3D is a close-up of the contents of "Box 3D" from FIG. 3B, all of these depicting the radial magnetic bearings, and also alternative embodiments of radial magnetic bearings.

FIG. 3B is an axial or longitudinal view of the fan module drive system as if one were looking at it from the base wall 109 (from FIG. 3A). The concentrically nested rotors and stators are shown as concentric rings with a hollow space (the core 119 from FIG. 3A) inside the inner ring. An arrow has been provided at the top of FIG. 3B to remind a viewer/reader that from this point of view the rotors are all spinning in a clockwise direction, which will be important when we get to the magnetic polarities shown in FIGS. 3C-3D. Each of the boxes 3C, 3N, and 3D show the locations where radial magnetic bearing windings/coils could be placed in the embodiment proposed herein. This of course is not the only configuration possible for radial bearings. There could be more than three or perhaps even less, and the only thing that matters is that their position points about the axis of rotation should be bilaterally symmetrical about a vertical plane extending into and out of the page in FIG. 3B.

Continuing with the currently preferred embodiment of three radial bearings of FIG. 3B, if placed within the areas of boxes 3C, 3N, and 3D and designed, as in the embodiments of FIGS. 3C and 3D, to be repulsive inwardly toward the axis of rotation, the resulting centering forces or radial magnetic bearing repulsive forces 141 will comprise two lower force vectors pointed upward and one upper force vector 141 pointed downward. The two upward-pointing force vectors 141 will bear the weight of the rotors 105-108 (and thus also the fan stages 101-103, respectively) in either a steady-state or controllable fashion, while the downward-pointing upper force vector 141 can be modulated to maintain precise air gaps between all the stators and rotors. If one upward-pointing radial bearing on each side is insufficient, more could be added on each side and/or one or more could be placed at the very bottom, also pointed upward. As it is, the Applicant believes that the weight of each fan stage with integral rotor will not be too much for a single radial bearing on each side (to be more specific, each radial bearing will consist of an electromagnetic pole pair, so each radial bearing is actually two bearings; so, to say "two radial bearings" would actually mean "four pole pairs").

The Applicant has labeled Box 3C so that it can be discussed first and has labeled Box 3D so that it can be discussed second. The designation 3N means that Box 3N does not have its own figure, and this is because that figure would be a mirror image of Box 3C and anyone of ordinary skill in the art can understand, based on Box 3C and the description accompanying Box 3C, what is going on within Box 3N, even though it cannot be seen clearly in FIG. 3B.

When we zoom out on the axial view of the fan drive system as we have for FIG. 3B, we simply cannot see the details of the rotors 105-108, stators 110-113, or radial magnetic bearing windings/coils 140. That is why the Applicant has included FIGS. 3C and 3D, and having already shown the radial bearing repulsive forces 141 and with us keeping FIG. 3B and its three boxes in mind, we will move to a discussion of Box 3C via FIG. 3C.

Once we zoom in on the longitudinal view of the fan drive system in FIG. 3C, we can now make out the stators (only stators 112 and 113 are labeled) and the rotors (only rotors 105 and 106 are labeled), as well as all of the permanent magnets 115 within this sector.

As the rotors are spinning in the clockwise direction, the applicant has for convenience shown all of the rotor poles in a state where they are all directly between upstream and downstream stator poles, although this will almost never occur in practice. So, for each one that is excited at the moment of this screenshot to be in a north state (N), it is being repelled forward by two permanent magnet north poles (N) behind it (one on the adjacent inner stator and one on the adjacent outer stator) and it is being attracted forward by two permanent magnet south poles (S) ahead of it. Likewise for each rotor pole that is excited at this moment to be in a south state (S), it is being repelled forward by two permanent magnet south poles (S) and attracted forward by two permanent magnet north poles. As known to practitioners in this space, the polarities of the rotor windings will sinusoidally oscillate such that as the windings approach the permanent magnet poles (S, N), the lose their polarity and as they pass between permanent magnet poles, they have no polarity with respect to the permanent magnet poles. So, the magnets have been spaced in FIGS. 3B-3D to be (Applicant hopes) in perfect harmony with the excitation (via a brush-style DC inverter) of the rotor poles. However, Applicant is not an expert in this field so he leaves it to future work to determine a best mode here. Again Applicant must point out that the rotors will almost never be simultaneously in the maximum-torque orientations shown in FIGS. 3C-3D. He just drew them this way to make the figures easier to understand.

Continuing to refer to FIG. 3C, the spacing between radially adjacent permanent magnets, and thus the spacing between their pole pairs, allows us to insert radial magnetic bearing windings/coils 140 in the interstices between permanent magnet poles (N, S).

For instance, a single pole pair (paired pole) of two windings/coils 140 rests in the interstices of the inner permanent magnet poles of stator 113. Both of these have been labeled. Only one winding/coil 140 of the equivalent radial magnetic bearing windings/coils of stator 112 and stator 111 has a leader line landing on it, but anyone of skill in the art can see the other ones and know what they are.

Let us use rotor 106 and stator 112 for the discussion of the radial bearings. As shown in the snapshot moment of FIG. 3C, one downstream bearing winding/pole on stator 112 is excited to be in the north state (N) while the passing/adjacent rotor winding/pole on rotor 106 is at its maximum north state (N). Likewise, the other, upstream bearing winding/pole on stator 112 is excited at the same moment to be in the south state (S) while the passing/adjacent rotor winding/pole of rotor 106 is at its maximum south state (S). What this means is, if the rotor 106 is spinning fast enough and its poles/windings are oscillating their polarities at a constant (predictable) frequency corresponding to the rotor's rotational velocity, this sector of the rotor 106 will be pushed upwardly and to the left, toward the axis of rotation of the rotors, if the bearing winding pole pairs are controllably oscillated by a designated electrical source to correspond to the oscillation of the rotor's poles/windings.

As shown, the bearing windings (pole pairs) 140 of the lower bearing clusters (of Box 3C) are located at an angle of greater than 120° from the vertical, and the corresponding opposite lower bearing clusters (of Box 3N) are located at an angle of less than 240°. The lower bearing clusters could be shifted to be even closer to the 180° mark, if desired. In fact, this would be preferable insomuch as it would require less voltage for each, however if they are pushed too close together (near the 180° mark), the rotors would be allowed to oscillate too much laterally, to the detriment of the air gaps. It is possible that the bearing windings/coils will need to be magnetically shielded from their adjacent permanent magnet poles, and perhaps elsewhere, as the configuration shown in these figures seems likely to suffer heavy flux losses, so let us also assume that adjacent rotor windings/poles on the same rotor might also need to be shielded from each other.

Turning now to FIG. 3D, which is an exploded view of Box 3D from FIG. 3B useful for depicting the upper radial magnetic bearing windings/coils 140. In this figure, unlike FIG. 3C, all of the bearing windings/coils 140 have been labeled. The rotors and stators have not been labeled. This figure serves two functions. One, which should be obvious, is to show the location of the downwardly-repelling upper radial bearings (of which magnetic bearing windings/coils 140 are the essence), and since the functioning of them relative to the rotor coils/windings is the same as what was described in FIG. 3B, a discussion of that will be omitted herein. The other function is to imagine what the fan module drive system might look like without permanent magnets.

As it would require magnetic shielding (such as at 142 in FIG. 3D, on the sides of the stator magnet poles facing away from the rotors) and many other things that the Applicant is not an expert in and does not understand, a permanent-magnet-less embodiment has not been wholly proposed herein. However, due to the significant weight of permanent magnets and the fact that the desiderata of our little project here are all functioning aircrafts, the Applicant felt the need for at least one attempt at disclosing something quasi-feasible and put it out there (via FIG. 3D) in the event that it could be modified to be useful by experts in the electrical arts. The weight/mass savings per aircraft would be drastic and the energy savings would probably be more than proportional to weight/mass reduction, perhaps as much as 25% or more energy conservation, since lower aircraft weight leads to less required thrust which leads to a smaller/lighter fan module drive system (and smaller/lighter wing modules and batteries), which lead to lower overall aircraft weight, which leads to even less required thrust . . . and so on to an asymptote, not defined herein because 3 iterations do most of the mathematical work and hopefully the proposed quasi-embodiment of FIG. 3D (or something like it) cuts the energy requirement per passenger-containing flight by at least 20% and perhaps as much as 30% or more, and cuts the energy requirement of each passenger-less flight by 30-40%, or perhaps even more. It should be no secret that the Applicant hopes for someone to solve the permanent-magnet-less problem, whether using this application's contents as a springboard, or just simply by figuring out something new. It is so advantageous, yet the Applicant has spent his wad in the foregoing consideration of it, and he really needs to type a lot more to finish this application within a reasonable amount of time. So, someone else figure it out, please.

So, without going into detail, the Applicant in FIG. 3D has replaced the stator permanent magnets 115 of FIG. 3C with stator windings/poles that would be energized in a manner similar to the bearing windings/poles 140, discussed above with reference to FIG. 3C.

However, because using electrical current to generate magnetic flux from the stator windings/poles continually flips the polarities of the stator windings/poles, the model of FIG. 3C cannot be followed completely (although it seems like a non-oscillating DC current would just short the battery, it wouldn't do so because of the large amount of work the current would be doing via induction, so maybe such a DC current could be used to make FIG. 3D very much like FIG. 3C—in fact, instead of inverters or rectifiers, the non-oscillating DC current for the stators would actually work, probably, but only if a switch were provided to interrupt/zero the voltage during any part of the oscillatory cycle that was not providing flux when the rotor windings/poles were in the torque-maximizing orientations . . . ).

Anyway, this like many other things is left to the public for future consideration, the Applicant having put forward a scaffolding upon which a workable permanent-magnet-less fan module drive system might be made to work, in an effort to greatly reduce the weight of the fan module, and thus the aircraft overall. With one more glance at FIG. 3D, Applicant presumes magnetic shielding will be needed all over the place (between windings, behind windings like ref. #140, etc.), but doesn't know where to draw it and/or whatever else needs to be added to make this "embodiment" work.

It is possible that someone else could one day soon come up with a nested concentric annular electrical motor device analogous to FIG. 3C or 3D that does not have permanent magnets and functions well and efficiently, and it is possible that in certain scenarios, the electrical motor would not necessarily have to be of the nested concentric annular type as shown in FIGS. 3A-3G. So, with all that said, it is noted that if FIG. 3D were shown with permanent magnets like 3C, it would simply be a rotationally shifted replica of FIG. 3C, meaning that the radial magnetic bearing windings/coils 140 repulsively force their respective rotors downward toward the axis of rotation to offset the upward force vectors of the lower bearing windings/coils 140 of Boxes 3C and 3D.

Just as the fan stages 101-103, and their respective rotors 105-108 need to be stabilized against unwanted lateral and vertical oscillations away from the axis of rotation and this has been so far accomplished with radial magnetic bearings (also known as active magnetic radial bearings or active electromagnetic radial bearings), they also need to be stabilized against unwanted axial (fore-to-aft) oscillations toward and away from their axial home positions, seated with the forward edges of each rotor spaced just a millimeter or two from the base wall 109. FIG. 3E shows the Applicant's magnetic-based plan for attaining this goal, which is important, because if the rotors can be levitated magnetically and also axially immobilized magnetically, the fan stages will make no contact with any stationary elements of the aircraft or its frame, thereby allowing us to spin them at any rotational rate we desire without frictional resistance, wear, lubricants, and various modes of failure known to be associated with prior-art mechanical bearing systems operating under such punishing conditions (tens of thousands of RPMs).

FIG. 3E reverts back to showing the transverse cross-sectional view of the fan module, and particularly its stators and rotors (unlabeled except for the 3$^{rd}$ stator 112). Just like we utilized magnetic windings/coils to make radial bearings, we will use magnetic windings/coils to make thrust bearings. The thrust bearings 145 have a single reference numeral for FIG. 3E and FIG. 3F (which is an exploded view of a single thrust bearing) with three leader lines leading to all three (one per rotor) thrust bearings 145 in FIG. 3E and a single leader line leading to the single exemplary thrust bearing 145 shown blown-up in FIG. 3F. One more leader line leads upwardly to the top half of FIG. 3E to show that the thrust bearings on the top, one for each rotor, are mirror images of the ones on the bottom, since they are annular and extend all along the rear edge of each stator. In fact, each stator has an annular extension 144 extending rearwardly from the magnetized zone so to provide a platform for the thrust bearing in the place where it needs to be, namely the most convenient area from the point of view of the rotors, such that each thrust bearing is slightly different in that each one requires a different way to be supported by and get electrical current from its respective rotor. The different ways will not be discussed herein because with just the slightest modification of any part of the fan module drive system, they would all be obsolete, so we'll just slap in here something that works for now to show in FIG. 3E where they will be, and then we can focus on FIG. 3F which shows their functional elements.

In FIG. 3F, the annular/cylindrical stator extension 144 supports an annular ring of alternating polarity thrust bearing permanent magnets 146. Completely decoupled from the stator extension 144 and thrust bearing permanent magnets 146, a thrust-bearing-to-rotor coupling 149A is shown coming in from an unseen right hand side where it attaches to a (fan drive) rotor and is fixed for rotation therewith. It extends to a point where it surrounds the annular area of the ring of thrust bearing permanent magnets 146, where it serves as a frame for inwardly disposed parallel arms, each of which contains a ring of thrust bearing rotor coils/windings 147, which are also arranged in an annular ring of alternating polarity poles. The two annular rings of alternatingly-poled windings axially surround the ring of thrust bearing permanent magnets 146, one in front of it and the other behind it. The thrust bearing rotor coils/windings are excited by oscillating electrical current from thrust-bearing-to-rotor electrical wiring 149B that is somehow ducted in a raceway within the thrust-bearing-to-rotor coupling 149A, such that when the rotors are spinning, the alternating/oscillating current within the thrust bearing rotor coils/windings can be modulated at will by the controller to maintain a constant air gap between the permanent magnets 146 and the coils/windings 147.

By maintaining an exact air gap on each side of the permanent magnets (either via an equilibrium of constant repulsion from both sides or by actively controlling the air gaps by varying the current through 147), the cylindrical stator extension 144 is axially immobilized such that the rotors and fans cannot tend or drift in any axial direction, all the while maintaining the contactless condition whose benefits have already been discussed but which should also be obvious. The odd little contraption shown at 148 is a thrust-bearing-to-stator detachable coupling that will not be discussed in detail. Let it simply be said here that the thrust bearings are the only part of the fan module that might make it difficult to assemble. In a preferred embodiment the integral fan/rotor assemblies should be able to be prefabricated and then serially slid into their seats between the annular stators.

The thrust-bearing-to-stator detachable coupling 148 allows the stator portion of the thrust bearing (namely the ring of permanent magnets 146) to be prefabricated as part of a fan/rotor assembly. When the fan module is being assembled and the integral fan/rotor assemblies are slid into place, the thrust-bearing-to-stator detachable coupling 148 (which is annular itself and contains inner and outer sleeves with an annular female gap/pocket between them) mates with the cylindrical stator (male) extension 144 in a very tight manner (very little tolerance and perhaps even with a lot of friction) and some type of temporary latch is then activated to fasten the thrust-bearing-to-stator detachable coupling, and thus the thrust bearing, to the cylindrical stator extension 144. It is possible also that instead of mechanically latching the two together in their completed form, they could be permanently bonded via a solidifying binding agent or heat-settable adhesive. Other removable connections include bayonet or the like quasi-permanent fixation means that can be undone by certain combinations of successive motion, rattling it or subjecting it to an acceleration event, applying heat or microwave radiation, the list goes on. In short, the Applicant believes it would be beneficial to make the coupling reversible so that the fan module could be disassembled for repair or replacement of individual parts, so that the entire fan module isn't otherwise of a disposable nature. That is the whole point of 148.

FIG. 3G is another revisit to the transverse cross-sectional view of the fan module 100, and this time we're going to use it to attempt to show how the core 119 of the fan module (the core including the air gaps between stators and rotors) can be partially or hopefully even substantially evacuated to reduce air drag on the spinning internal parts.

In FIG. 3G the base wall 109 has been redrawn in its most basic form, without cutting any of it away to show figure numbers or leader lines, and without showing the port where the rear fan exhaust duct 36 passes through it and is held in place by it. Ignoring for now the bottom-left-hand corner of the figure, we can provisionally say that base wall 109, in combination with the fans 101-103 and the rotor cooling airflow duct intakes 118, and further in combination with the sealing wall 114, create an imperfect but useful hermetic seal for the core, such that ambient air at 1 atm cannot freely enter the core from many places even when the core has a pressure lower than 1 atm. It is noted that the air passing from fan stage 101 to fan stage 102, from fan stage 102 to fan stage 103, and from fan stage 103 to the fan exhaust volute 31, will be traveling at very high speeds, such that even though a gap is shown between the fan stages 101-103, the high-speed air passing along the gaps will actually pull air from the core 119 into it, instead of vice versa, as is well known from Bernoulli's principle.

The sealing wall 114 cannot directly abut the rotor cooling airflow duct intakes 118 because of the relative rotation between them, so there exists a seal gap 124 which is the only real way ambient air can enter the core (it is noted with reference to FIG. 4H, that ambient air will not really be able to enter the core when the aircraft is traveling at more than 100 mph airspeed but perhaps some eddies of the thrust in FIG. 4H might get caught up within the system and available to pressurize the core).

As drawn in FIG. 3G, the only real way for ambient or otherwise outside air to enter the core 119 is to pass across the seal gap 124. So in part due to serendipity the seal gap is adjacent the rotor cooling airflow duct intakes 118, such that any air that makes it way to the seal gap 124 is instantly sucked into the rotor cooling airflow duct intakes 118 and thence it travels through the rotor cooling airflow ducts 117, all of them in series, such that when the air has passed across the seal gap 124 and been ingested by rotor cooling airflow ducts 117 (via rotor cooling airflow duct intakes 118), it exits the rotor cooling airflow ducts 117 in a zone near the base wall 109.

To this point we have not proposed a generic approach to partially/substantially evacuate the core 119 or describe how this should be done. In the embodiment that is preferred at the time of filing, the evacuation should be positively attained by a core evacuation pump 120. The core evacuation pump 120 should probably be a single centrifugal pump that spins at relatively high speeds and, as shown in FIG. 3G, it could potentially have a bank of branch ducts or core evacuation ducts 121 that lead from apertures in the base wall 109 to the intake of the core evacuation pump 120. This allows the core evacuation pump 120 to extract pressure from the core 119 particularly in the zones where the cooling flows from rotor cooling airflow ducts 117 (labeled in FIG. 3A) are exhausting their cooling airflows. The cooling airflow ducts 117 (from FIG. 3A) spin so fast, each being integral with a rotor of the fan module drive system, that all air emitted by them, which has as its source the air extraction near the seal gap 124, will quickly enter the vicinity of the core evacuation ducts 121, whereupon it is sucked away by core evacuation pump 120. In such wise does core evacuation pump 120, regardless of the overall configuration of the fan module drive system or its internal elements, reduce the static pressure within the fan module core 119 such that the fan module's internal components can spin at ridiculous rotational velocities without suffering internal air drag on those internal components. The drag savings of doing this will far outweigh the costs of providing and utilizing the core evacuation pump 120 and its ducts 121.

But let us forget the rotor cooling airflow ducts 117 and simply concentrate on the existence of the core evacuation pump. Regardless of the embodiments chosen, by the maker of a prototype, the core evacuation pump 120 as shown in FIG. 3G is probably sufficiently robust to (by centrifugal pump 120 spinning at a substantially high rotational velocity) moderately evacuate the core 119 to less than 4 atm, hopefully much less than 4 atm.

This allows all of the rotors and fans to spin at enormous rotational velocities while experiencing a considerable alleviation of the wind drag that would otherwise be experienced by the rotating internal elements of the proposed fan module drive system. The reasons for locating the core evacuation pump 120 near the bottom of the base wall 109 are related to the other consequential parts (ducts) of the present application—meaning, this is where we can fit them in the currently preferred embodiment, which is not definitive. The core evacuation pump 120 could be placed anywhere in the rear half of the aircraft, insofar as it can partially or mostly evacuate the core 119.

FIG. 3G also shows a set of fan exhaust seals 123 which are simply outer semi-annular or frusto-conical rearward extensions of each downstream fan's outer circumference in a direction and slope angle whereby all of the spinning airflows within the fan stages 101-103 are prohibited from escaping the system. A quasi-cylindrical extension of a downstream fan outer surface simply overlaps in a non-contacting way the outlet side/end of an upstream fan outer surface. This is the simplest of things and will be skipped over in this discussion, because it is obvious to the Applicant that, once drawn and labeled in FIG. 3G, any practitioner of the relevant art will understand what the fan exhaust seals 123 are doing and why they are present.

Back to the core evacuation pump 120, it has been drawn in FIG. 3G as a manifold with multiple ducts 121 leading to different radial zones of the base wall 109. Of course this is simply a tentative solution and the Applicant has included it just to get the idea across such that we can move past this drawing. In brief, the core evacuation pump 120 and core evacuation ducts could be implemented anywhere on/near the base wall 109 or in any other place that achieves the partial evacuation of the core 119, since doing so will reduce energy consumption. However, the core evacuation is not completely necessary and the proposed embodiments would function without evacuating the core.

Also shown in FIG. 3G is the flywheel module 10, which is omnipresent in all the Applicant's thoughts while typing this application, because it is probably extremely important if not necessitated. The flywheel within the flywheel module 10 might need to exceed rotational velocities of greater than 100K RPMs, so the flywheel module absolutely must be nearly completely evacuated. FIG. 3G provides a means for doing this, specifically a flywheel evacuation pump 122 that drains on a bottom sector of the flywheel module 10, in order to reduce the static air pressure therein to be much less than 1 atm, such that the flywheel within the flywheel module will spin in a manner completely liberated from air drag, and since it is also magnetically levitated, the flywheel within the flywheel module 10 should perform its duty with negligible energy loss.

So, to summarize the discussion of the bearings, the fan stages 101-103 and their appended rotors 105-108 (respectively) are suspended for free rotation and held in place against unwanted forward and backward (axial/longitudinal) movement by active magnetic radial bearings and by active magnetic thrust bearings. Now that this has been described in the application, the extremely high rotational velocities discussed for the fan stages have been fully enabled in compliance with 35 U.S.C. 112(a). The moving parts of the fan module 100 and what they do to the air has been adequately described, how they are driven by a drive system has been adequately described, how the drive system is electrified has been adequately described, and how the drive system (and thereby as a consequence the fan stages) is supported for unencumbered and completely drag-free high-speed rotation has been adequately described, such that one of ordinary skill in the arts to which the discussion pertains could create a working protype of the fan module, its systems, and its methods, so far described in this application.

Referring now to FIGS. 4A-4H which jointly illustrate the fan intake module 70, the splitter module 30, the reciprocation of the telescoping inner wings 51, and the empennage module 60, with FIG. 4A depicting a completely vertical VTOL thrust configuration viewing the system from above, FIG. 4B depicting a quasi- or mixed-vertical VTOL thrust configuration vantage from the left-hand side, FIG. 4C depicting the splitter module 30 from the front looking rearwardly, and FIGS. 4D and 4E being alternative sub-drawings of the parts of the fan intake module 70 during different important stages of VTOL operation.

FIGS. 4A, 4B, and 4C include three different views of the splitter module 30 and FIGS. 4A-4B are a good place to start because they show the fan module 100 and the fan exhaust volute 31. The fan exhaust volute 31 has been labeled on the right- and left-hand sides of the aircraft in FIG. 4A and on the top and bottom of the aircraft in FIG. 4B. The fan module 100 is pumping air from right to left in FIGS. 4A-4B, toward the front of the aircraft, while spinning it such that when it arrives in the fan exhaust volute 31 via air escaping into the fan exhaust volute 31 via a rearward facing circumferential slit (not shown) in the volute that faces the circumferential slit of the outlet end of the 3rd fan module 103. As shown in the front view via FIG. 4C, the fan exhaust volute 31 is scroll-shaped and the air will be entering it from behind while swirling in the clockwise direction. The fan exhaust volute 31 is narrowest at right-hand-side-of-the-aircraft position 31A and it steadily expands as it transitions through the top-of-the-aircraft portion 31B, a left-hand-side-of-the-aircraft portion 31C, and a bottom-of-the-aircraft portion 31D. This way, the air that is already moving along the volute can be joined by new air entering through the slit and they do not interfere with each other, they just merge and flow together in the same direction. This is why in FIG. 4A, 31 is very narrow on the right-hand-side of the aircraft and much broader on the left-hand-side, and why in FIG. 4B, 31 is narrower at the top of the aircraft than it is at the bottom of the aircraft.

The point of the fan exhaust volute 31 is to get all of the air migrating out of the fan module 100, corral it such that there is no more axial (longitudinal) movement beyond the front wall (not labeled) of the exhaust volute, and deliver it to downstream ducts that perform useful functions, without slowing down the air or letting it expand.

As best shown in FIG. 4C, when the fan exhaust volute has extended around a circular path to the point where it is almost back to the right-hand-side-of-the-aircraft position 31A, the air is conducted inwardly away from the circular path by volute exhaust bend-in passage 32, a small segment of which can also be seen in FIG. 4A. The bend-in passage 32 has a small enough radius of curvature that it allows for a straightened path to be assumed for a little part. This is where the Applicant has located a fan exhaust diverter box 33.

In FIG. 4C the fan exhaust diverter box 33 is a straight passage with upper and lower walls, but in FIG. 4A (looking down on the fan exhaust diverter box 33 from above) it is clear to see that the fan exhaust diverter box 33 widens to an outlet breadth twice its inlet breadth via a front wall (left-hand side in FIG. 4A) that tapers outwardly, such that the single inlet box expands to be a dual outlet box with two outlets, allowing the fan exhaust diverter box 33 to feed the fan exhaust to a front fan exhaust duct 35 in a first (VTOL) mode or, alternatively, to a rear fan exhaust duct 36 in a second (forward flight) mode. A diverter flap 34, hinged between the two outlets, can pivot to touch either the rear wall of the fan exhaust diverter box (FIG. 4A), in which situation fan exhaust air will pass into the front fan exhaust duct 35, or the front wall of the fan exhaust diverter box (FIG. 4F), in which situation fan exhaust air will pass into the rear fan exhaust duct 36.

In FIG. 4B we cannot see the two outlets of the fan exhaust diverter box 33, but we can see the parallel, adjacent ducts 35 and 36 right after they have taken the air from it, and before they start to diverge. And they do diverge. At this point the reader needs to look at FIGS. 4A, 4B, and 4C together, and in doing that it can be seen that the front fan exhaust duct 35 immediately begins to curl around the longitudinal axis with a small radius of curvature while being angled away from the vertical (viewed from the side) so that when the front fan exhaust duct 35 stops curling it has achieved some considerable forward extension as it attempts to get the air ducted toward the middle of the aircraft in a smooth manner. The front fan exhaust duct 35 then straightens out to allow unconstrained pivoting movement of a 1st VTOL flap 39, as shown in FIGS. 4B and 4C and described later with reference to FIGS. 5A-5D. After straightening out for the 1st VTOL flap 39 the front fan exhaust duct 35 then curves again to get the air inside it aimed as smoothly as it can toward a completely downward direction, as shown in FIG. 4C via VTOL exhaust nozzles, which will be described later with reference to FIGS. 5A-5D.

So, in the 1st (VTOL) flight mode as understood from FIGS. 4A-4C, best visualized by first looking at FIG. 4C and keeping in mind that the fan is on the other side of the side we're seeing everything from, the air coming from the fan module 100 gets entrained within the fan exhaust volute 31 which curves while becoming broader/deeper to account for air that is entering it via a circumferential slit. The fan exhaust volute 31 guides the air in almost a complete circle and then the air is bent inward by a volute exhaust bend-in passage 32 to enter a fan exhaust diverter box where a diverter flap 34 diverts the air into the intake of the front fan exhaust duct 35 which simultaneously drifts forward toward the front of the aircraft and curls around past the vertical and, after the air has traveled through another straightened segment, the front fan exhaust duct bends downwardly to be vertical, at which point it branches into VTOL exhaust nozzles, described later. In this way we have harnessed the tangential-only thrust airflow and directed it toward a vertically downward direction such that when the air leaves the front fan exhaust duct 35, if the air is traveling fast enough, the aircraft will rise.

Conversely, still referring to FIGS. 4A-4C, if the free edge of the diverter flap 34 is pivoted to touch the front wall of the fan exhaust diverter box 33 (momentarily referring to FIG. 4F), the fan exhaust air traversing the fan exhaust diverter box will enter the intake of the rear fan exhaust duct 36, which, referring simultaneously to FIGS. 4A and 4C, curls around just like the front fan exhaust duct 35, but instead of drifting forward while it curls, it drifts rearward toward the rear of the aircraft. Also, instead of straightening out for flaps or anything else, it begins to uncurl somewhat while being bent to end up completely horizontal and aligned with the longitudinal axis of the aircraft, such that the air that has been guided through it, if it is moving fast enough, will pass through the hollow tail of the aircraft and create thrust to push the aircraft forward. FIG. 4C actually helps with an understanding of this, where the rear fan exhaust duct 36 can't be seen until the front fan exhaust duct 35 straightens out and gets out of the way of our view of 36, which can now be seen curling its way towards its rearmost extreme. It is noted that rear fan exhaust duct 36 pokes through the base wall 109, and it is possible that the base wall 109 has no other apertures other than where 36 passes through it, just in case we desire to keep the area surrounding the main exhaust thrust nozzle 38 (within the interior of the hollow tail of the aircraft) at a reduced pressure, which might be advantageous, and this will be discussed later in the application.

So, in the 2nd (forward flight) flight mode as understood from FIGS. 4A-4C, best visualized by first looking at FIG. 4A, the air inside the fan exhaust diverter box 33 is not diverted by the diverter flap 34 and instead enters the rear fan exhaust duct 36 where the air is simply twisted around until it's lined up with the aircraft's longitudinal and, since the end of the duct 36 is open, the air is allowed to escape at very high velocity to create the thrust that propels the aircraft during fixed-wing forward flight. At the terminus of the rear fan exhaust duct is a main exhaust thrust nozzle 38, which could be a) almost completely open, b) tapered a little to nozzle the air gently and recoup some energy that was lost to backpressure buildup, c) tapered a lot to nozzle the air more aggressively while purposefully building up backpressure, or d) a variable nozzle outlet could be installed to allow for all three of the previous options to be utilized during different operational modes of operation.

The fan intake module 70 is shown in FIGS. 4A-4B, but a blown-up view of it has been provided in FIGS. 4D and 4E. The 1st fan stage 101 is visible on the left-hand side of each, and an annular fan intake 72 is shown and is where air is collected from the passing ambient airstream and routed first inward and then forward, in the flight direction, to be fed directly to the 1st fan stage 101. Behind the annular fan intake 72 is a wall that gives the annular fan intake 72 its shape and provides a curved surface to reroute the air as described, and in that wall are 10-30 openings that lead to reverse fan intake ducts 75 which create a shunt flow for air to enter the 1st fan stage 101 directly via a rearwardly directed opening, such that if the flaps 74 and 76 are closed (FIG. 4E), all of the air entering the 1st fan stage 101 is forced to arrive through the annular fan intake 72, whereas if the flaps 74 and 76 are open (FIG. 4D), air surrounding the tail of the plane will plunge into the 1st fans stage 101 along with the air coming through the annular fan intake 72.

The configuration shown in FIG. 4D is for VTOL. Without the reverse fan intake ducts, during VTOL, the extremely low pressure experienced at the surface of the wall (forward facing) of the annular fan intake 72 would create a pressure gradient (with a relatively higher pressure on the wall of the tail of the aircraft behind the wall of the annular fan intake 72) that would tug the aircraft forward during takeoff and landing, at exactly the moments we want it to have no airspeed at all. In other words, without a rearward-facing intake for the fan module 100, the aircraft is going to "suck" forward. So, by taking in air from the rear, we can offset this predicted phenomenon (which might turn out to not even happen in which case this feature is not needed) by "sucking" in the opposite direction. However, during forward flight we wish to create forced induction for the fan module 100 (meaning we want to feed it air and we also want it to suck forward) so we close flaps 74 and 76 which recreates the seamless contours of the walls of the airframe 1 and the annular fan intake 72, making for efficient flying. FIG. 4A is shown with the flaps 74 and 76 open, since the diverter flap 34 is in its VTOL position, while FIG. 4B is shown with the flaps 74 and 76 closed, for no reason other than that is how they will usually be during most operation.

Continuing in the discussion of FIGS. 4A-4H, only FIGS. 4A-4E having been dealt with already, FIGS. 4F-4H are snapshots of the inventive embodiment as it transitions from a state that is already accelerated to over a threshold airspeed (i.e. 100 mph), and through the transition to full airspeed (i.e. 300 mph).

At the beginning of a takeoff, the telescoping inner wings 51 should be completely retracted inside wing-receiving pockets 52, which are under the elbows of the passenger at their innermost extent, and inside the stationary outer wings (only the outer wing leading edge 53 and outer wing trailing edge 54 have been shown for the outer wing) at their outermost extent. Keeping the inner wings 51 inside the pockets 52 for several seconds during takeoff has a few benefits. Firstly, this reduces the footprint of the aircraft, allowing it to land and/or park more easily in car parking spots or driveways or simply on a small landing pad someone has put on their roof or in their yard, without the wings bumping into anything or otherwise causing mischief. Secondly, it reduces the drag caused by the inner wings 51, especially as the aircraft rises straight up but also as it is trying to accelerate forwardly while still ejecting thrust downwardly, at which point we want as little resistance to the acceleration as possible.

However, at a certain threshold moment the inner wings 51 will become desirable to provide lift (they didn't before), such that while the aircraft accelerates forwardly yet expending so much energy by hanging itself in the air, we will wish to extend the wings to their fully deployed positions and switch all thrust to rearward-only thrust (through main exhaust thrust nozzle 38) as early as possible. The Applicant cannot predict at which threshold forward airspeed it will be possible to shut off the downward thrust and rely on the wings. Of course, this is actually a function of how long the inner wings 51 are. The longer they are, the quicker we can get to rearward-only thrust, but longer wings have a tradeoff in that they will not retract as far inwardly, and we want them to retract inwardly pretty far. So, for now all we can do is guess at what the aircraft would do if we used the drawings of this application, presuming the laden aircraft will weigh about 500 pounds. A good guess seems to be somewhere around 100 miles per hour.

Although not shown in the drawings or discussed much herein, to increase the length of the inner wings 51 in order to switch to winged flight very early, the inner wings could be double-telescoping, meaning each one could be inside a wing-shaped sleeve that pops out from its wing-receiving pocket, and then the inner wing 51 pops out of the wing-shaped sleeve. Likewise, the wings could triple-telescoping, quadruplet-telescoping, and so on. The Applicant believes that the aircraft would, in the long game, be better off with the system described and drawn as the preferred embodiment, without being multi-telescoping, since the wing-shaped sleeves (intermediate telescoping elements) provide complexity and reduce reliability, and they reduce the volume within the wings, which will be used to store the power supply. But it most certainly would reduce power consumption to be able to extend the wings further than is shown in the drawings.

So, going more into detail, and using FIG. 4F as a snapshot of the moment the aircraft has achieved more than the threshold airspeed (which could be anywhere between 50 and 100 mph) and the thrust has been switched to be completely rearward, through the rear fan exhaust duct 36, by pivoting the diverter flap 34 (a small arrow shown in FIG. 4F illustrates the pivoting movement). The telescoping inner wings 51 pop quickly outward (small arrow 55 illustrates this linear movement) toward their outermost extents to provide maximum wing lift. A fan intake valve 73, which regulates how much air is allowed to enter the fan module 100, has been so far, up to this point or a few seconds before this point, collapsed around the body of the fan module 100 to allow a high fan module air intake, but will now begin to expand to reduce the airflow into the fan module 100.

FIG. 4F serves as a good point to label all the elements of the empennage module 60 since not much else is going on in FIG. 4F to interfere with the description of the empennage module 60. As the empennage's stabilizer vanes 61A-61D move through their various angles of attack during a typical flight, the stabilators 61B and 61D may be feathered during initial takeoff toward the vertical, as shown in in FIG. 4A, to reduce drag during the aircraft's vertical climb during takeoff or during drop while it is vertically landing. During forward flight modes along a straight line, the empennage's vanes/stabilizers are typically stationary and aligned without an angle of attack, parallel in every way to the flight direction, simply stabilizing the aircraft from unwanted movements.

But the upper, lower, left, and right stabilizers 61A-61D of the empennage module 60 must be designed for all rotational motions and effective states, such that the controller can pivot them independently to whatever angle they need to be in at any point in time, even though most of the time the aircraft will be traveling along a straight line, since it can choose its destination during takeoff, and point straight at it from the very beginning of the flight. To do the pivoting the Applicant proposes a system which at the time of filing seems the simplest effectual embodiment for accomplishing the aims expressed herein, even though various obvious (to practitioners in the aerospace arts) alternatives are available.

Still referring to FIG. 4F, the empennage comprises (i.e. four) stabilizer pedestals 62 which provide the structural support for the vanes/stabilizers 61A-61D and for some of the drive elements therefor. The empennage further comprises splined axles 63 extending radially outwardly through the thickest or broadest areas of the stabilizer pedestals 62 and upon which the vanes 61A-61D pivot, since the stabilizers/vanes 61A-61D are fixed for rotation on said splined axles 63. Worm drives 64 each use an electric motor to rotate a worm screw (threaded shank) to interact with the splined (or fluted) axles 63 to pivot them controllably to position said vanes/stabilizers 61A-61D at whatever angle is desired for the vanes/stabilizers 61A-61D at any given instant. The aircraft has a hollow tail 65 and an annular wall 67 separates a hollow exhaust expansion tube 66 (which allows the rearward thrust to exit the aircraft unimpeded) from the motor empennage drive system 63-64. It is noted that the splined axles are joined to the vanes/stabilizers 61A-61D at a central location thereof (a center of the root of the vanes/stabilizers) so that the motors never experience too much resistance to rotation at high airspeeds. Also, the empennage system has been designed such that the worm drives 64 do not protrude from the aircraft, which allows the use of robust worm drives that do not have to be intricately designed to avoid failure.

FIG. 4G shows the aircraft when the aircraft airspeed is above said previously mentioned airspeed threshold (i.e. 100 mph, not being limitative) and the telescoping inner wings 51 have shifted laterally completely outward, the diverter flap 34 is still (like in FIG. 4F) pivoted to the position whereby the fan exhaust air flow is entrained in the rear fan exhaust duct 36 and is being ejected rearwardly via the main exhaust thrust nozzle 38, and the fan intake valve 73 is somewhat radially expanded such that it accepts considerably less passing intake air into the fan module 100 than was accepted into the fan module 100 during initial takeoff.

In FIG. 4G, reference numerals 53 and 54 illustrate the outer wing leading edge 53 and the outer wing trailing edge 54 of the main outer wings (not shown or labeled) within which the inner telescoping wing 51 can disappear into or come back out of, with a portion of the pocket being an inner cavity in the outer wings. It is noted in passing that the outer wing trailing edge 54 could serve as an aileron or flaperon during cruise and descent.

FIG. 4H represents a state wherein the aircraft is traveling at an airspeed beyond or at another threshold airspeed (i.e. 300 mph) and the inner wings 51 are completely retracted and the fan intake valve is spread almost completely out to minimize air inlet acceptance/intake to the fan module.

So, referring simultaneously to FIGS. 4G and 4H, we are looking at two ends of a continuous sequence that sees the aircraft accelerate from one threshold (wings freshly emerged, low airspeed, max wing lift, moderate fan air induction intake area) to another threshold (wings retracted, max airspeed, minimum wing lift, greatly reduced fan air induction intake area). At the first threshold (FIG. 4G) marks the beginning of the sequence. Once all of the thrust is being ejected out the rear of the aircraft, acceleration should be high (via a thrust nearing 1.5 times, in pounds, the weight of the aircraft). The inner wings 51 begin the sequence fully extended and the fan intake valve 73 begins the sequence at an intermediate position where it provides a fan air induction intake area commensurate with the airspeed. At this low airspeed of less than 100 mph, the air being inducted into the fan module 100 is not enough to slow the fan modules down too much and the fan modules will still be operative, but it is enough that we can't have the fan intake completely open as it was in FIG. 4F.

As the aircraft accelerates to over 100 mph, and toward 200 mph, and then toward 300 mph, the inner wings 51 and fan intake valve 73 slowly move to adjust to the changing airspeed conditions. If the inner wings 51 were left all the way out, the increasing airspeed would cause too much lift on the wing modules 50 and the aircraft would rise continuously. In the event that it is desired for the aircraft to gain altitude at the beginning of this sequence, the inner wings 51 can be left fully extended for a little while. Otherwise, the inner wings 51 should slowly retract from the fully extended position (FIG. 4G) at the lowest airspeed, through intermediate stages of less and less extension commensurate with more and more airspeed, until finally, when the aircraft has reached a max airspeed (i.e. 300 mph), the inner wings 51 are fully retracted (see small arrow 55 in FIG. 4H) and the outer wings (and also perhaps the shape of the aircraft) are providing all the lift.

In parallel with the inner wing retraction sequence, the fan intake valve 73 is going through another sequence as airspeed increases. The Applicant believes that the fan module 100 he has designed would be most efficient when run at very high rotational velocities. As the aircraft gains airspeed the amount of air flowing into the fan intake module 70 will start to become too much for the fan stages 101-103, meaning the power of the fan stages will not be enough to maintain their rotational velocities (the fan module was designed firstly for VTOL knowing that winged flight would be a secondary consideration) and if something preventative is not done, the fan stages will simply slow down, causing a loss of efficiency more and more and by about 150 mph if not much earlier the fan module 100 would fail. Trying to solve this problem, the applicant has provided a quasi-cylindrical element around the fan module 100 that has a fixed circumference at the front where it is connected to the airframe 1, but a variable taper angle and a variable circumference at the rear. This is the fan intake valve 73, already mentioned.

As the airspeed increases from the state shown in FIG. 4G, the variable circumference rear portion dilates slowly, which continuously reduces the cross-sectional area of the annular fan intake 72, and thereby the amount of air entering the fan module 100 stays relatively the same throughout the sequence, until, as shown in FIG. 4H, at the max airspeed the variable circumference rear portion has reached its maximum expansion, and only a sliver of passing air is inducted into the fan module 100. This allows the fan module 100 to operate according to its design specifications, which is with extremely high rotational velocities for the fans, as if it were still in the VTOL sequence.

However, it is noted that after the max airspeed has been reached, the airspeed should stop increasing, and at this point of cruise flight (from here until deceleration) the amount of required thrust plumets to a small level. There are two primary ways foreseen by the Applicant to reduce power during cruise flight. The options are a) dilate the fan intake valve 73 even more to reduce the load on the fan while maintaining the extremely high fan stage rotational velocities, and b) reduce the rotational velocities of the fan stages and see if that doesn't choking the fan exhaust volute 31, and if the fan exhaust volute 31 or any of ducts 32, 33, 36 do start choking, dilate the fan intake valve 73 anyway. Of course, there are other ways to reduce the power but they will not be gone into herein. And it should be obvious that if we don't reduce the power, the aircraft will continue to accelerate to even higher airspeeds, but for the purposes of this application we will not go into that.

Figure 5A:
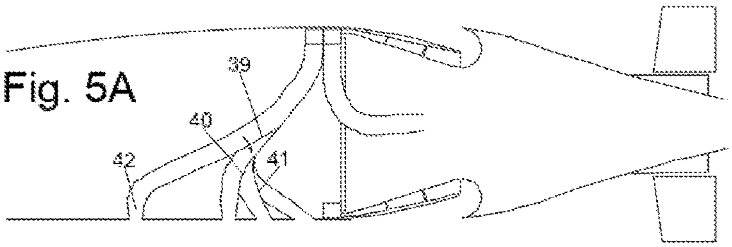
Figure 5B:
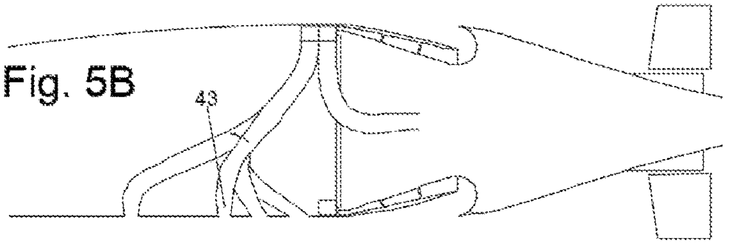
Figure 5C:
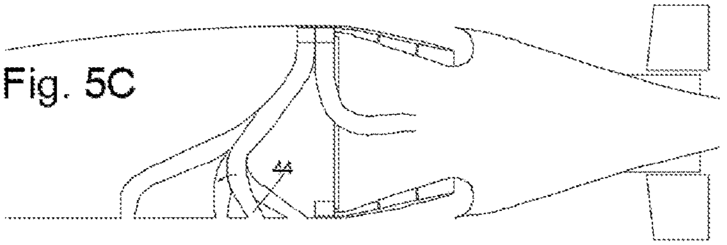
Figure 5D:
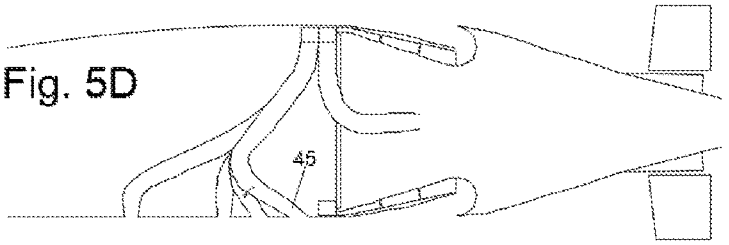
Figure 5E:
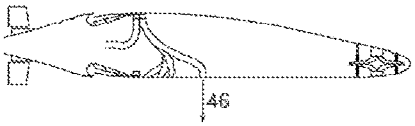
Figure 5F:
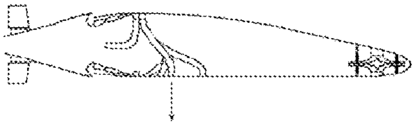
Figure 5G:
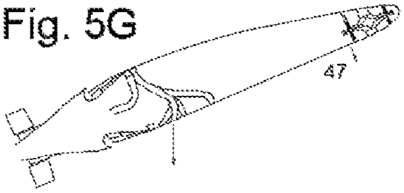
Figure 5H:
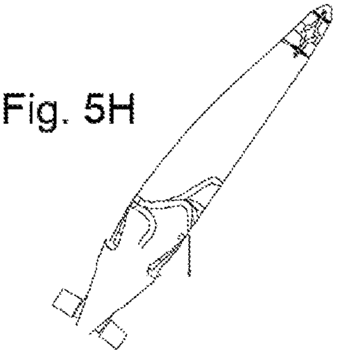

Turning to FIGS. 5A-5H which jointly illustrate a first proposed takeoff scheme with all the flaps of the splitter module 30 shown in their various sequential stages/states in such a way that the reader can envision the first proposed takeoff sequence by viewing FIGS. 5A-5D in conjunction with FIGS. 5E-5H, wherein the splitter module configuration of FIG. 5A corresponds to the status of the aircraft as shown in FIG. 5E, the splitter module configuration of FIG. 5B corresponds to the status of the aircraft as shown in FIG. 5F, the splitter module configuration of FIG. 5C corresponds to the status of the aircraft as shown in FIG. 5G, and the splitter module configuration of FIG. 5D corresponds to the status of the aircraft as shown in FIG. 5H.

There are a lot of elements disclosed in this application and there are more than one or two ways to use them to perform a vertical takeoff using these elements. Only three or four of these ways are disclosed in any meaningful detail herein. The first proposed takeoff scheme (more will be discussed later) of FIGS. 5A-5H can be referred to as an aggressive takeoff scheme because it does not hold back in using all the available onboard tools and their maximal powers to raise the aircraft off the ground and transition it to fixed-wing (or flying wing) forward flight mode as quickly as possible while consuming the least amount of power, even though a person might find the experience of taking off via the first proposed takeoff scheme harrowing if not outright nauseating. The aggressive first takeoff scheme will be very useful because often there will not be a human passenger in the aircraft and in fact some people might "enjoy the ride" so it would be an option made available to them if they wished to opt for it.

Regardless of what proposed takeoff scheme we are going to use, we must first describe the features of the splitter in FIGS. 5A-5D that have not been described yet in the application. We are really discussing the front fan exhaust duct 35 from FIG. 4B but it has not been labeled in FIGS. 5A-5H.

As shown in FIG. 5A, the front splitter module comprises a 1$^{st}$ VTOL flap 39. When 1st VTOL flap 39 is in its lowered position (shown pivoted down by the small arrow), the exhaust air coming from the fan module 100 is conducted forward to the splitter module's frontmost extent, beneath the torso or lower back portion of the seat 3, where the fan exhaust air is ejected straight downward for takeoff thrust at a 1$^{st}$ VTOL duct/nozzle 42.

The 1$^{st}$ VTOL duct/nozzle 42 is located in an area that the Applicant estimates to be below the center of mass of the aircraft when it has a medium-sized adult passenger in the seat 3, and this (still referring to FIG. 5A) is the situation envisioned for the 1$^{st}$ VTOL duct/nozzle 42 to be the one that is active, blasting air at extremely high velocity along a vertical vector that passes substantially through the center of mass of the aircraft when there is a passenger, wherein the resulting aircraft acceleration vector is vertically upwardly directed and the sum of forces through the aircraft is, or can be adjusted to be, one that lifts the aircraft straight up in a stable manner. As shown in FIG. 5E, which corresponds to FIG. 5A, the aircraft is horizontal and a vertical thrust exhaust 46 is emitted down from the center of the aircraft.

However, when a very light person (such as a small child) is in the aircraft, or when no payload is present or only a small payload is present in the aircraft, the 1$^{st}$ VTOL flap 39 pivots up as shown in FIG. 5B, which contains a small arrow to show where the 1$^{st}$ VTOL flap 39 has moved up to. In this configuration, with reference to FIGS. 5B and 5F, the fan exhaust air coming through the front fan exhaust duct 35 passes to a 2$^{nd}$ VTOL duct/nozzle 43.

The 2$^{nd}$ VTOL duct/nozzle 43 is located in an area that the Applicant estimates to be below the center of mass of the aircraft when it has no payload or a small payload, and this is the situation envisioned for 2$^{nd}$ VTOL duct/nozzle 43 to be the one that is active, blasting air at extremely high velocity along a vertical vector that passes substantially through the center of mass of the aircraft when there is no payload/passenger, wherein the resulting thrust vector is vertically upwardly directed and the sum of forces through the aircraft is, or can be adjusted to be, one that lifts the aircraft straight up in a stable manner. As shown in FIG. 5F, which corresponds to FIG. 5B, the aircraft is horizontal and the vertical thrust exhaust 46 is emitted down from an area behind the center of the aircraft.

As shown in FIG. 5A, there are two more VTOL flaps, a 2$^{nd}$ VTOL flap 40 and a 3$^{rd}$ VTOL flap 41. Turning now to FIG. 5C, wherein the 2$^{nd}$ VTOL flap 40 is pivoted to a forward position as shown by the small arrow in FIG. 5C, and because of this new third flow pattern, the fan exhaust air coming through the front fan exhaust duct 35 passes to a 3$^{rd}$ VTOL duct/nozzle 44. As shown in FIG. 5G, while the 2$^{nd}$ VTOL flap 40 is pivoting, or slightly before that moment, the front stabilizer 150 emits air bursts or jets 47 downward from each side of the front of the aircraft (to be clarified later with reference to FIGS. 11A-11C) to raise the front of the aircraft relative to the rest of the aircraft, in other words pitching the nose of the aircraft up, so that when the 2$^{nd}$ VTOL flap 40 lands in its forward position, shown in FIG. 5C, the fan exhaust air starts being ejected through the 3$^{rd}$ VTOL duct/nozzle 44, which is at an acute angle relative to the aircraft's vertical axis, such that the aircraft, as shown in FIG. 5G, can be pitched to an angle that is acute relative to a horizontal plane yet still supported by the entire lift thrust 46.

Likewise, as shown in FIG. 5D, the 3$^{rd}$ VTOL flap 41 can also pivot to a forward position as shown by the small arrow in FIG. 5D, and because of this new fourth flow pattern, the fan exhaust air coming through the front fan exhaust duct 35 passes to a 4th VTOL duct/nozzle 45. As shown in FIG. 5H, while the 3$^{rd}$ VTOL flap 41 is pivoting forward, or slightly before that, the front stabilizer 150 ceases emitting air bursts or jets 47 downward such that the pitching up of the nose of the aircraft continues under its own momentum so that when the 3$^{rd}$ VTOL flap 41 lands in its forward position, the fan exhaust air starts being ejected through the 4th VTOL duct/nozzle 45, which is at an obtuse angle relative to the aircraft vertical axis, such that the aircraft, as shown in FIG. 5H, can be pitched to an angle that is obtuse relative to the horizontal plane yet still supported by the entire lift thrust 46.

At this point there are multiple viable and not dissimilar modes of completing the maneuver to fixed-wing forward flight after reaching the stage shown in FIG. 5H, but only a first mode will be discussed. Said first mode is one wherein the system remains in the state shown in FIGS. 5D and 5H during the rest of vertical takeoff, until the aircraft has reached an airspeed (albeit upward) near the lower threshold airspeed (described earlier) where the wings can be effectively deployed, and then they can extend to their maximum outward configuration, shown in FIG. 4G. This should only take a handful of seconds (i.e. 5-15 seconds after initial liftoff).

Once the inner wings 51 have popped out like is shown in in FIG. 4G, or preferably before they have done so, the aircraft uses the stabilators 61B and 61D and/or the front stabilizer module 150, which now jets/bursts air upwardly from each side of the front of the aircraft (described later with reference to FIGS. 8A-8C), to pitch the nose of the aircraft downwardly such that the aircraft reassumes a horizontal posture, that shown in FIGS. 5E-5F, or a pitch angle slightly inclined relative to the horizontal, such that when the fan exhaust diverter box 33 switches the fan exhaust air flow from the front fan exhaust duct 35 to the rear fan exhaust duct 36, the fan exhaust flow is now allowed to eject rearwardly via the main exhaust thrust nozzle 38, the inner wings 51 are extended outwardly to their broadest extent, such as is shown in FIG. 4G.

There are benefits to doing this, primarily in the fact that this aggressive takeoff scheme of FIGS. 5A-5H avoids the drag associated with pushing the aircraft up in a crosswise orientation that is not aerodynamic in nature, meaning, the thrust does not push the aircraft straight up against a horizontally postured airframe whose entire design has been primarily established to travel more along the longitudinal direction. By utilizing the 4th VTOL duct/nozzle 45 for the latter stages of the takeoff, the aircraft will lunge forward due to its pitch/inclination without excessive drag, such that when the lower threshold airspeed (where the inner wings become effective) is reached, the aircraft is ready, in altitude and airspeed, to transition to fixed-wing (or flying wing) forward flight without any (or many) extra considerations that have not already been established herein.

The second envisioned mode of completing the maneuver to fixed-wing (or flying wing) forward flight after reaching the stage shown in FIG. 5H, for getting to and through that moment when the fan exhaust diverter box 33 switches the fan exhaust air flow from the front fan exhaust duct 35 to the rear fan exhaust duct 36, is to firstly tilt the aircraft almost completely nose-up via its inherent rotational momentum or actively via the front stabilizer 150, until the aircraft has attained the lower threshold airspeed (where the wings become effective) traveling straight upward, and then just push the nose down (via 150) while the aircraft is still accelerating so that the fixed-wing forward flight mode is fait accompli after another second or two.

FIGS. 6A-6E jointly illustrate a more comfortable and less harrowing (than that shown in FIGS. 5A-5H) takeoff scheme for the splitter module 30 wherein the aircraft does not need to pitch upwardly at all to achieve its desired forward velocity within a short period of time.

FIGS. 6A-6E focus on the 1$^{st}$ VTOL duct/nozzle 42 and some of the many ways it, or any of the VTOL ducts/nozzles, could be leveraged for additional functionality. The first embodiment shown is not an exhaustive solution to the various problems these figures are attempting to solve. FIGS. 6A-6E mainly deal with an embodiment, proposed herein, that bifurcates the terminus of the 1$^{st}$ VTOL duct/nozzle 42. The bifurcated 1$^{st}$ VTOL duct/nozzle 42 splits the fan exhaust air inside it into two sub-flows that can each be ejected in different directions.

Figure 6A:
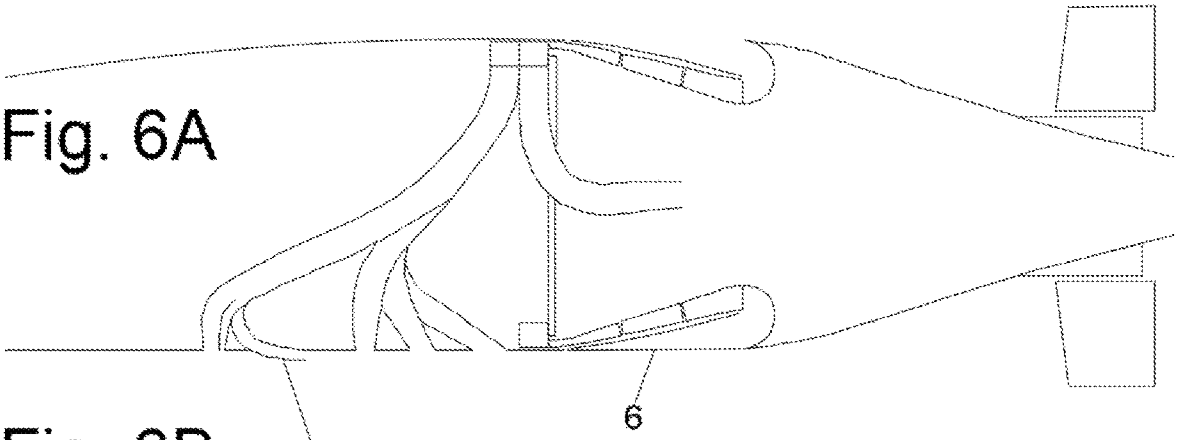
Figure 6B:
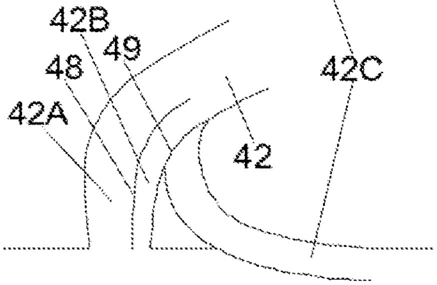
Figure 6D:
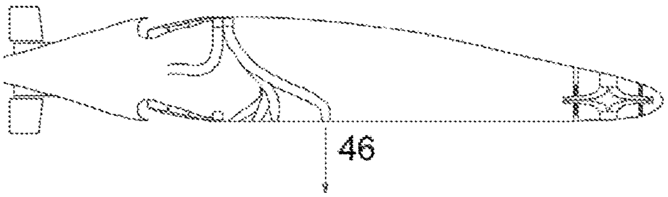
Figure 6C:
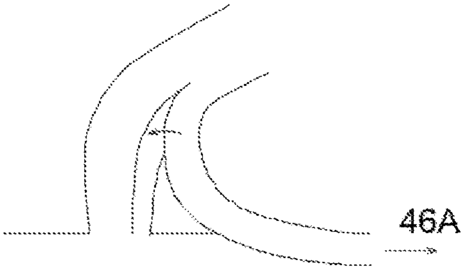

FIG. 6A is a repeat of FIG. 5A but it includes the bifurcation and associated features for the 2$^{nd}$, so-called "comfortable", takeoff scheme, and shows where they are located relative to the front fan exhaust duct 35 (not labeled in this drawing), mainly to show the location of them so that we can focus on FIGS. 6B and 6C, which show them blown up to a larger size so that we can discuss them in more detail.

In FIG. 6B we can see an enlarged view of the terminus of the 1st VTOL duct/nozzle 42 where it intersects the bottom surface (floor, not labeled) of the airframe 1. In FIG. 6B the fan exhaust is entering 42 from the upper right-hand corner and exiting 42 vertically downward, in a vertical flow direction orthogonal to the floor (not labeled but shown as a horizontal line).

The aforementioned bifurcation is accomplished by a flow divider plate 48, which extends between the sidewalls of the 1st VTOL duct/nozzle 42, and dividing the latter into two sub-ducts, front or 1st VTOL sub-duct 42A and rear 2nd VTOL sub-duct 42B. The cross-sectional area of 1st VTOL sub-duct 42A should be roughly twice the cross-sectional area of the 2nd VTOL sub-duct 42B, such that 1st VTOL sub-duct 42A captures and guides approximately ⅔ of the flow of the 1st VTOL duct/nozzle 42, and rear 2 nd VTOL sub-duct 42B captures and guides approximately ⅓ of the flow of the 1st VTOL duct/nozzle 42. As shown in FIG. 6B, when a flow divider flap 49 is unactuated, which is the position it is shown in in FIG. 6B, the divider plate 48 splits the flows into 1st VTOL sub-duct 42A and 2nd VTOL sub-duct 42B, but 42A and 42B run in parallel and the fan exhaust air in the sub-ducts 42A and 42B just meet in confluence after exiting the aircraft to create a single vertical thrust exhaust 46 as if the flow divider plate 48 did not exist. In this configuration, nothing has changed from the original conception of the 1st VTOL duct/nozzle 42, and the single vertical thrust exhaust 46 is as shown in FIG. 6D, which is identical to FIG. 5E.

However, if the flow divider flap 49 is pivoted forward as shown in FIG. 6C (this completed activity being shown by a small arrow in FIG. 6C), the flow divider flap 49 closes off the 2nd VTOL sub-duct 42B, such that the ⅔ of the flow from 1st VTOL duct 42 that is in 1st VTOL sub-duct 42A is the only fan exhaust air being ejected downwardly for vertical thrust exhaust 46, thereby reducing by ⅓ the thrust being used to levitate the vehicle after it has been raised to an acceptable transition elevation. The aircraft will continue to rise under its own momentum but no longer due to the overpowering vertical thrust exhaust 46 that accelerated it up to this point. The overall thrust value resulting from the fan exhaust air velocity should be chosen so that when ⅓ of it is removed from downward ejection, the ⅔ that remains is enough to a) make sure the aircraft doesn't drop back down or, b) to continue to maintain a small upward velocity.

The reason we have robbed the vertical thrust exhaust 46 of as much as ⅓ of its thrust power is because we want to use that surplus thrust power to create a rearward or mostly-rearward auxiliary thrust by scooping that ⅓ of the fan exhaust air into the now open 3rd VTOL sub-duct 42C, which, as is shown in FIGS. 6A-6C, curves such that its exit is substantially horizontal or rearward, such that the ⅓ of the fan exhaust air that has been split off from the main flow through 1st VTOL duct/nozzle 42 is ejected substantially rearwardly, to create a rearward horizontal thrust exhaust 46A which will, as should be obvious to ordinary practitioners in the art, forwardly accelerate the aircraft.

Figure 6E:
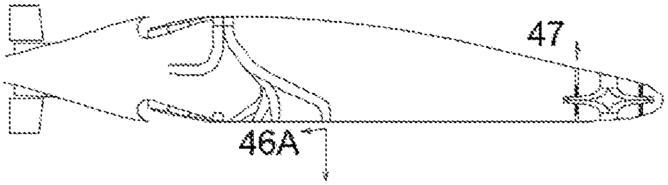

The overall status of the aircraft shown in FIG. 6E corresponds to the operational configuration shown in FIG. 6C. The main vertical thrust exhaust 46 is still there from FIG. 6D but it is only about ⅔ as great, while a new thrust has come into being and is labeled 46A in both FIGS. 6C and 6E. Importantly, the aircraft is still horizontal relative to the ground, but it is no longer on the ground and it is moving upward. The Applicant is unsure when this transition (pivoting the flow divider flap 49 forward to open up 42C and create forward thrust) should happen. One raw guess is after an altitude of 100-200 feet has been attained, or perhaps this not conservative enough.

On the other, more liberal end, the full vertical thrust exhaust 46 of FIG. 6D is an accelerating one, it is much higher than the weight of the aircraft, and therefore once the aircraft has reached an upward airspeed of 20-30 mph, the thrust will begin to get wasted as the aircraft will experience heavy drag since the airspeed vector is not along the aircraft's longitudinal axis. So, in most instances the Applicant believes (unless the aircraft is taking off between high-rise buildings or from a well) that it would be safe to begin the transition to FIG. 6C after only 3 or 4 seconds from liftoff, before or around the time the aircraft is nearing or clearing treetop altitude. This should give the front stabilizer plenty of time (say 6 seconds) to orient the aircraft so that it is aimed at its destination before the aircraft's horizontal airspeed reaches 10 mph.

The upward momentum of the aircraft at the transition moment of FIG. 6 should be enough such that it rises, against a downwardly-acting drag, up to about 200-300 feet altitude, which might be a useful flight altitude and if it isn't, either the transition moment should be delayed or the aircraft could be made to climb after takeoff is completed.

It is clear from viewing FIGS. 6A and 6E that if the 3rd VTOL sub-duct 42C is used to create a rearwardly aimed thrust exhaust, that rearwardly aimed thrust exhaust will create a torque around the center of gravity of the aircraft. Two easy options come to mind and both involve using the front stabilizer 150. In one option, the front stabilizer 150 could create very minor jets or bursts of air upward (shown as 47A in FIG. 6E) from each side of the front of the aircraft. Because their radius from the center of gravity of the aircraft is about six-to-eight times the radius of the 3rd VTOL sub-duct 42C, the thrust 47A from the front stabilizer 150 need only be about ⅛ to ⅙ the thrust from the 3rd VTOL sub-duct 42C.

A second option for using the front stabilizer 150 to offset the horizontal torque from 3rd VTOL sub-duct 42C is to add ducts/outlets to the front stabilizer 150 (not shown anywhere in the figures) that direct the jets/bursts more rearwardly. This is shown with the arrow labeled 47B in FIG. 6E, and the interesting thing about this embodiment is, even though it will not be shown in the application, if 47B is used instead of 47A, the front stabilizer 150 will be adding to the forward thrust of the aircraft, which would reduce the time it takes for the aircraft to attain the threshold horizontal airspeed at which point the wings can be used to maintain lift.

So, once the state shown in FIGS. 6C and 6E has been reached, the aircraft simply accelerates forwardly and horizontally, without pitching up or down, until it reaches the threshold airspeed, at which point the wings pop out, and the diverter flap 34 (from FIGS. 4A-4C) will pivot to send all of the fan exhaust air along the rear fan exhaust duct 36, through the main exhaust thrust nozzle 38, and out the rear of the aircraft, at which point it will quickly accelerate (no longer fighting gravity) the aircraft from the threshold airspeed to the max airspeed while the wings telescope inwardly to offset the increasing lift.

If the front stabilizer has been offsetting wind and unwanted accelerations throughout the whole sequence described during this discussion of FIGS. 6A-6E, then it can be said that the takeoff will have been very comfortable indeed, as the passenger should have been exposed to no greater acceleration than would be experienced by flooring the pedal of a typical sedan. Except that, unlike the sedan, there doesn't seem to be an inherent cap to the speed it can attain, since the only way to stop accelerating it at its "max" speed (i.e. 300 mph) is to greatly reduce the intake are of the fan module and/or greatly reduce the voltage across the rotor stages.

In other words, the power required by the fan module to simultaneously levitate it and propel it forward is so great that if the power is not reduced during regular fixed-wing (or flying wing) forward flight, the fan module will quickly accelerate the aircraft past an airspeed such as 300 mph and although this is not the subject of the present application, options will have to be explored about what to do with this surplus power. Should we just cut it at 300 mph and assume that this will satisfy people? Should the industry streamline the aircraft and change its wing design so that it can comfortably cruise at 600-700 mph without inherently rising up into commercial travel altitudes, even though most of the time it will not have time to get up to such airspeeds before it has to start slowing down for approach. And most tantalizing, should anyone ever take the obvious next step of redesigning the airframe geometry to allow supersonic flight. This application does not address these future concerns, except to say that it is a fact that, once the takeoff has been completed, the aircraft is immensely overpowered, and future practitioners can do what they will with that information.

A few things must be said here about the front stabilizer 150 (even though we haven't completely described it yet) and its relationship with the front fan exhaust duct 35 and the downstream implements of the front fan exhaust duct 35, namely the VTOL exhaust nozzles 37 or 42-45. The front stabilizer 150 does actually have the capability of supplementing downward thrust for heavier passengers, even while fulfilling its other duties, and that is probably important to the possibility of creating a fleet of the proposed aircraft able to accommodate heavier-than-average passengers without modifying the specs of the fan module 100 or the airframe 1 or the wing modules 50.

Say for instance the passenger weighs 240 pounds (considerably more than the simple 180-pound passenger that the aircraft is ostensibly designed to convey efficiently). Most of that extra weight is of course not in her/his legs, but there still arises in this scenario a torque/lift imbalance. The front stabilizer 150 will in such an instance offset the resulting increased passenger-weight-based down-torque about the center of gravity by ejecting a lot more extra air downwardly from near the front of the aircraft, while still being on hand to eject the air bursts/jets required for taking off or landing during wind gusts or unexpected/unwanted accelerations. The heavier passenger slows the ascent and acceleration, but not to an unmanageable degree, and it is probable that the extra front stabilizer thrust 47B will not be used in the heavier-passenger scenario, which in such a scenario results in increased power consumption unless the heavier passenger opts for the aggressive takeoff mode of FIGS. 5A-5H.

Oppositely, say for instance the passenger is less than 180 pounds. The front stabilizer can use more of the aircraft's power (during the "comfortable takeoff scheme"), since the fan module will be operating on less voltage due to the reduced power demands of a lighter passenger, to provide the extra thrust 47B in proportion to the voltage not needed by the fan module 100 due to the reduced weight of the passenger. In this case the extra/auxiliary thrust 47B should be as powerful as allowed, and proportionately so, by the negation of power demands on the fan module 100 during such a state.

Knowing the weight distribution of the passenger in the seat 3 before commencing takeoff will be important for our purposes, and it is proposed that the weight distribution of the passenger can be sensed by load cells in the seat 3 or in its support framework, or via any known sensing means. Knowing the weight distribution of the passenger allows the controller to comprehend the weight distribution of the overall aircraft, and thereby the controller can adjust modalities to conform to eventualities, said eventualities including overweight passenger, lopsidedness of passenger, passenger misbehavior, and/or sundry anomalies apropos the mass distribution of the passenger or her/his activities or possessions.

FIGS. 7A-7C jointly illustrate the aircraft, its center of gravity (when laden), the diagonal fan stages of the fan module, the splitter module, a first proposed ducting embodiment for the splitter module 30 (from FIGS. 1A-1B and 4A-5D) comprising multiple fan exhaust/thrust outlets (37 from FIG. 4B and 42-45 from 5A), a flap system (39-41 from FIG. 5A) for selecting amongst the multiple fan VTOL ducts/nozzles 42-45, and the trigonometric results (in the form of directions and scalar ratios) of various distinct fan exhaust ejection/thrust vectors being broken down into their vertical and horizontal components, including a thrust reverser. The individual elements have not all been labeled since the figures are a mirror-image (the aircraft is now facing to the right-hand side in FIGS. 7A-7C) of FIGS. 5A-5D.

FIGS. 1A-1B and 4A-5H and the above discussion have established the existence and basic functioning of the splitter module 30 with thrust being directed by it selectively downwardly toward the ground, rearwardly in a horizontal direction like traditional fixed-wing aircraft, and at least one diagonal or angular thrust that blends downward and rearward thrust. However, the preceding figures and discussion have relied upon easily understood visual depictions of the splitter module, without the requisite mathematics. There is reason to expect from a technical document such as this is that the "numbers" will be discussed. The Applicant does not want to bog down the discussion with actual mathematics, so he has tried to adhere, when possible, to angles, speeds, ratios, etc., that are themselves handy round numbers or produce round numbers when they are used in a function.

For instance, in FIGS. 4B, 5A-5D, and 7A-7C, the 1$^{st}$ VTOL duct/nozzle 42 and 2$^{nd}$ VTOL duct/nozzle 43 have been drawn to be exactly vertical, or 0° from a vertical base line that will be used hereafter to form the basis of the angles to be discussed. Further, the 3$^{rd}$ VTOL duct/nozzle 44 has been drawn at 30° from the vertical base line (and therefore 30° from the 2$^{nd}$ VTOL duct/nozzle 43), and the 4$^{th}$ VTOL duct/nozzle 45 has been drawn at 60° from the vertical base line. The chances that someone would actually make the aircraft with exactly two diagonal/blended VTOL ducts/nozzles wherein one is at 30° and the other is at 60° is pretty much zero. However, it makes for a nice drawing and a good starting point for doing some trigonometry on the thrust vectors of the thrust coming out of them (which ideally are the same as the duct/nozzle angles). 30° and 60° are nice because they provide two thrust scenarios that on a rudimentary level seem like they will work, and whether or not they are efficient or effective for our purposes, they most certainly function and would effectuate a vertical-to-fixed-wing transition without the aircraft dropping or dipping catastrophically. Yes, the choice of 30° and 60° is almost completely arbitrary, but those angles more or less serve as a starting inputs for the 1st iteration of a feedback model wherein we will try to get at the most appropriate number of diagonal/blended VTOL ducts/nozzles and their appropriate angles.

So, as shown in FIGS. 7A-7B, the 3rd VTOL duct/nozzle 44 is at an angle of 30° from the vertical base line, and its thrust vector (referring now only to FIG. 7A) is also 30°. Another round number that is also somewhat arbitrarily chosen has already been thrown around a lot in this specification is 1.5 being the thrust-to-weight ratio of the aircraft during full power (full battery consumption). It not only serves as a guarantee that the aircraft will take off under any conditions, but it yields other round numbers for other use in discussion.

For instance, if 1 is the weight of the aircraft, the fan module is creating a thrust "acceleration" of a little more than 20 mph/s (just to levitate without upward acceleration) and so a thrust-to-weight ratio of 1.5 means that the aircraft can levitate while accelerating upward at a little over 10 mph/s (10 mph per second) during thrust coming from 1st VTOL duct/nozzle 42 and 2nd VTOL duct/nozzle 43. This of course might be too much acceleration but we will stick with it.

It is important to note that the acceleration due to Earth's gravity, g=9.8 m/s/s, as it is used in all physics and also in many mechanical engineering considerations, is transposed into the most convenient Imperial units as actually a little over 20 mph/s. That is 20 MILES-PER-HOUR (actually a little more) PER SECOND. Meaning, after 2 seconds an object falling to the earth from an elevated structure (without wind drag) is going over 40 miles per hour. We shall absolutely use this in a crazy way—overcoming gravity is an enormous obstacle, but if the system you are using to overcome it is no longer just overcoming it, but is overwhelming it and it still has the thrust and power supply it had while overcoming it, the acceleration potentialities are enormous.

So as shown in FIG. 7A the thrust vector has 30° from the vertical base line as its direction and the 1.5 thrust-to-weight ratio as its scalar value. Mentally we think of this vector just shoving the aircraft more upwardly and somewhat to the right and that the 60° shown in FIG. 7B impels the aircraft to the right but with not enough downward thrust to assist lift at low airspeeds.

A little trigonometry will show that our intuitions (unless the reader is already familiar with VTOL and/or rotorcraft theory) are not accurate on this. We will break down the thrust vector into its vertical (downward) and horizontal (rearward) components by using the 1.5 thrust-to-weight ratio as the hypotenuse of a right triangle. Without showing "our work", the resulting vertical component of a thrust vector of 30° is 1.3 while the horizontal component is 0.75. This means that the aircraft is still accelerating upward at about 6 mph/s (gravity having been subtracted out), which is too high but probably at least feasible for most conceivable scenarios, and the forward acceleration of the aircraft is 15 mph/s, which is just fine for now, we'll revisit that later. It means that it would take about 7 seconds to get to the threshold 100 mph where the inner wings can pop out and the splitter can switch to fixed-wing flight, but the upward acceleration of 6 mph/s upward acceleration throughout that duration might incur much wasted energy and raise the aircraft above its allowed ceiling so after a few seconds the splitter module would switch to the 4th VTOL duct/nozzle as shown in FIG. 7B.

In FIG. 7B the aircraft has just come off a cycle of high upward acceleration from FIG. 7A and is going forward at 30-60 mph. After the switch from 3rd VTOL duct/nozzle 44 to 4th VTOL duct/nozzle 45, the thrust vector will now be 60° from the vertical base line. Again without showing our work, the resulting vertical component of a thrust vector of 60° is 0.75 while the horizontal component is 1.3. This means that the aircraft has an upward acceleration of −5 mph/s (not a negative velocity, just a slowing of the ascent), which reflects a number wherein gravity has been subtracted out but does not reflect what the number would be if the inner wings popped out early, and is probably acceptable for most conceivable scenarios especially since popping out the inner wings would probably alleviate it completely, if it were even a problem and it probably wouldn't be, and the forward acceleration of the aircraft will be about 26 mph/s, which is so fast the aircraft would only spend two or three seconds in this state before transitioning to fixed-wing flight. An angle of 60° also means that the horizontal component of said thrust vector is 1.3 which translates to 26 mph/s forward acceleration, which is something we really like.

The pros of the embodiment shown in FIGS. 7A-7B are that it functions (gets the aircraft up to 100 mph without the it plunging to the earth) and establishes a basis for perfecting the method, perfecting being the operative word because the cons are that the takeoff described with reference to FIGS. 7A-7B would be jerky and uncomfortable, and there are several seconds wherein a lot of thrust is being wasted in the needless attempt to accelerate the aircraft upward when it already has too much acceleration (drag will become overwhelming after 40 mph/s, which it probably had already achieved because before the aircraft entered the blended/diagonal thrust of FIG. 7A, it had already gone through a vertical rise (to get it above treetop or building-top altitude) wherein it had already accrued more upward velocity than is necessary to keep rising at a useful velocity.

So, using the initial inputs of 30° and 60° for the vertical thrust vectors during diagonal/blended thrust, and discovering that they probably produce a takeoff transition that is awkward and inefficient, the Applicant actually proposes a second embodiment (shown in FIG. 8A) with a single diagonal/blended VTOL duct/nozzle aimed at a so-called "Goldilocks" angle whereby its resulting thrust vector satisfies lift requirements apropos its vertical component and backs off a little on the forward acceleration apropos its horizontal component.

Keeping in mind that before the aircraft reaches the state shown in FIGS. 7A and 8A, it has already accelerated at 10 mph/s upward for a few seconds, preferably until it is well above the height of any nearby obstacle such as high-rise buildings, trees, bridges, etc. Only then, in the preferred embodiments, does the splitter module pivot the 2nd VTOL flap 40 to eject thrust via the 3rd VTOL duct/nozzle 44, as shown in FIGS. 7A and 8A.

For this reason, and having already (in FIGS. 7A-7B) tried out a 2-duct embodiment that proved to be suboptimal (obviously because the best thrust angles were not used, so it should be obvious to one of ordinary skill in the art that 2-duct embodiments could, and probably are, more advantageous than the 1-duct embodiment about to be discussed with reference to FIG. 8A, if only some computer modeling were to be done on what the best angles are), the Applicant's 2nd embodiment for diagonal/blended thrust will be proposed with reference to FIG. 8A.

Turning then to FIG. 8A, the 4th VTOL duct/nozzle 45 has been omitted and the 3rd VTOL duct/nozzle 43 has been redrawn to have an angle of 43° relative to the vertical base line. The trigonometric breakdown of the thrust vector (still with the 1.5 thrust-to-weight ratio as the hypotenuse), the vertical component of the thrust is about 1.1, which provides an upward acceleration of about 2 mph/s, which considering the tolerance for error here, and wind resistance, is functionally negligible and merely sufficient to keep the aircraft rising at the rate it was before this current state was entered, and the horizontal component of the thrust is about 1.02, which provides a forward acceleration of about 20 mph/s.

So, the thrust angle for the 3rd VTOL duct/nozzle 43 being 43°, as shown in FIG. 8A, allows the aircraft to stabilize (no more upward acceleration, only a substantial upward velocity) while accelerating at a rate of about 20 mph/s which brings it to the threshold airspeed of 100 mph in about 5 seconds, at which point the diverter flap 34 pivots (see FIG. 4F) to close off the front fan exhaust duct 35 and conduct air into the rear fan exhaust duct 36 from whence it is ejected for rearward thrust (see FIG. 4H).

The Applicant has shown the rearward thrust 7 in FIG. 8A but instead of using its proper reference numeral, it has been labeled 1.5 to indicate that the thrust coming out of the main exhaust thrust nozzle 38 is 1.5*g, or an acceleration of about 30 mph/s. 1st and 2 nd VTOL ducts/nozzles 42 and 43 have also been given a vector coming downwardly from them with a magnitude of 1.5, to show that when they are in use they also have thrust coming out of them at 1.5*g, or an acceleration of 30 mph/s, which after gravity is subtracted out of it, means that either of these will produce an aircraft upward acceleration of 10 mph/s.

In the last few paragraphs a number emerged which should be considered imminently interesting to anyone, not just an engineer. The Applicant just proposed that by providing the fan module with enough thrust to have a 1.5 thrust-to-weight ratio (which shouldn't require very much more mass, cost, or complexity than to give it a 1.1-1.2 thrust-to-weight ratio which would be the standard, or paradigm approach), which, if provided, after a few seconds of completely vertical ascent, the aircraft attains 100 mph forward airspeed in about 5 seconds and (once the 1.5 is aimed directly rearwardly and lift is rendered completely by/via aerodynamic means) the aircraft's forward acceleration becomes an astonishing 30 mph/s (such is the power of gravity) and subsequently reaches an airspeed of 300 mph about 7 seconds after that. Of course, the values being used in this discussion are ideal and we have yet to account for losses.

FIGS. 7A-8A all contain a center-of-gravity location cg that is an estimate of where the center of gravity would be located, in 2D via the cross-sectional views, when an average-sized person occupies the aircraft. It is noted herein that the VTOL thrust vectors of FIGS. 7A-8A and the rearward thrust vector shown in FIG. 8A have all been drawn to be at a position and angular orientation such that an extension of said thrust vectors toward the aircraft's interior come as close to intersecting the point cg as is possible given the restraints of the instant application. In other words, the Applicant has made significant effort to try to get the thrust vectors to push toward the cg, but as currently envisioned, the effort was not perfect. Perhaps the thrust vectors could all be aimed directly away from the cg but this would only apply for a certain person of a certain mass.

Since the mass/weight of the occupant is unpredictable, the vectors shown in FIGS. 7A-8A are sufficient, with the provision that the front stabilizer 150 will always be controllably torquing the aircraft about the same center of gravity cg, to offset any undesired pitching, and that is why the front stabilizer 150 has been shown in FIGS. 7A-8A, with its little bitty thrust-up and thrust-down vectors inclusive. Provided that front stabilizer 150 is in place and operating properly with the ability to jet thrust air 47 upward and downward (in each instance from both sides simultaneously and equally) in a proportional manner, the misfires that FIGS. 7A-8A contain, all those examples where the thrust vectors do not aim directly away from the center of gravity cg, can be offset by opposing torque 47 from front stabilizer 150 with very little energy/thrust (since its moment arm from cg is so much longer than the misfires' moment arm from cg).

Of course, a better model and one which is not unforeseen by Applicant at the time of filing is one wherein the VTOL torque vectors all point directly away from cg as their shared (Cartesian) vector origin point. As drawn, the thrust vectors line up to intersect (if extended) a point very close to cg, and therefore the VTOL modes of FIGS. 7A-8A are fully functional, especially since 150 and its corrective thrust 47 have been included therein and within this discussion, and it is also possible that front stabilizer 150 is not the only way to offset the slightly lopsided torque from the thrust vectors, the latter not having (as drawn in FIGS. 7A-8A) as their origin the center of gravity cg, but this cannot be gone into herein because this document is becoming too lengthy. Let it just be said that many ways are available to allow the lopsided torque (unwanted aircraft pitching) of the splitter module's various VTOL ducts/nozzles and their associated thrust vectors relative to the center of gravity to not be a significant issue during vertical takeoff or vertical landing.

FIGS. 7A-8A explicitly show an embodiment for a thrust reverser means primarily constituted by a thrust reverser duct/nozzle 42TR, labeled only in FIG. 7A. Its thrust vector is shown in FIGS. 7C and 8A as being 60° from the vertical base line. Of course, some flap or equivalent mechanism is required to shunt the fan exhaust from the 1st VTOL duct/nozzle 42 to said thrust reverser duct/nozzle 42TR, and this is shown in FIGS. 7B and 7C in its two relevant positions, but the flap or equivalent mechanism has not been labeled or described. It is similar to the other flaps proposed herein for the other parts of the splitter module 30. It is noted that the thrust reverser duct/nozzle 42TR can be used during vertical takeoff such as in emergency situations, but it is primarily intended to be used during approach and landing. Especially for achieving a full stop directly above the landing site.

Anyway, when the (thrust reverser) flap is in its standard configuration as shown in FIG. 7B, unpivoted, the air stream in the 1st VTOL duct/nozzle 42 simply gets curved downward to eject from the aircraft directly downwardly for standard vertically downward VTOL thrust, but when it is in its thrust reverser configuration, as shown in FIG. 7C, the air stream ejects more forwardly than downwardly (through thrust reverser nozzle/duct 42TR), again, as mentioned, at a provisionally preferred angle of 60° from the vertical base line. This allows it to provide the aircraft with a horizontal acceleration (when the fan module is fully energized as if a takeoff were happening) of −26 mph/s, a significant slowing force—the resulting vertical component of a thrust vector of 60° is 0.75 while the horizontal component is 1.3. This means that the aircraft has an upward acceleration of −5 mph/s (resulting in a controlled drop) which reflects a number wherein gravity has been subtracted out but does not reflect what the number would be if the inner wings are still extended outward, and the forward acceleration of the aircraft will be about −26 mph/s, which reflects a very powerful braking force on the horizontal airspeed of the aircraft in this scenario.

Someone reading this disclosure might wonder, if the embodiment of FIG. 8A provides adequate lift for the aircraft (without extended or popped-out wings) to adequately levitate the aircraft while providing it with 20 mph/s of forward aircraft acceleration, and the aircraft via the thrust reverser nozzle/duct, allows it to be braked at will, do we really need the telescoping (pop-out) inner wings 51? After all, FIG. 8A and the takeoff method (reliant upon the idealized 20 mph/s downward acceleration offset to gravity and the idealized 20 mph/s forward acceleration) associated with it do indeed mean that, without popping out the inner wings 51, the aircraft will attain a forward airspeed of 300 mph (which it is, in a preferred embodiment, designed to be as its most efficient mode) about 15 seconds after the state of FIG. 8A is initiated. The Applicant wonders the same thing.

Extant FIG. 8A and its description herein and the vector analysis accompanying the description of FIG. 8A, including the thrust reverser, it is quite possible that the aircraft would be more efficient, or at least as efficient or almost as efficient, if the aircraft did not comprise pop-out (telescoping) inner wings, and instead just went for the high airspeed mode right off the bat, such that it could achieve more than 300 mph in about 20 seconds (ideal, 25 seconds for real) whether it uses the pop-out wings at a point where the transition of FIG. 8A is completed via the splitter 30 switching to total-horizontal (rearward) thrust or, alternatively, whether it uses the slanted VTOL diagonal/blended thrust of FIG. 8A to get up to 300 mph in, also, about 20 seconds (ideal, 25 seconds for real).

The answer to the foregoing questions/considerations is, the Applicant does not know at all and can pass no verdict one way or the other. The telescoping inner wings, by sliding inwardly and outwardly (retracting and extending) when advantageous, provide a considerable and demonstrable efficiency, especially during the aircraft's end-of-flight coasting capabilities and descent/landing sequences. However, the aircraft as shown in FIG. 8A is capable of attaining 300 mph airspeed very quickly, all the way up to and including the 300 mph (or higher) cruise airspeed that is discussed throughout this disclosure, and then quickly decelerating at the end of cruise to quickly descend while braking, and then land on a dime. So, the telescoping inner wings should be considered as a complexity that is useful but no longer necessary to the functioning of the embodiments of the present application.

FIG. 8A shows the VTOL ducts/nozzles having intersecting the bottom panel (not labeled or described herein) of the aircraft as completely open passages. The Applicant believes that this would be aerodynamically disadvantageous (turbulence would be created) so FIGS. 8B-8D and 9B-9C have been included to show a potential solution to this and also.

FIGS. 8B-8D are enlargements of the bottom portion of FIG. 8A showing the main downward thrust, which is usually completely vertical, being manipulated (i.e. to offset wind) via diverter flaps 42D and 42D (or other controllable elements) between/among completely-downward-thrust mode (FIG. 8B), slightly-rearward-thrust mode (FIG. 8C), and slightly-forward-thrust mode (FIG. 8D). The cooperating diverter flaps include a 1st VTOL duct forward diverter panel 42D and a 1$^{st}$ VTOL duct rear diverter panel 42E, both being independently actuatable to various angles, such that they cooperate to nozzle the thrust through a continuum between slightly angled (such as 10°) forwardly and slightly angled (such as 10°) rearwardly.

Being able to temporarily bend the thrust slightly forwardly (FIG. 8D), slightly rearwardly (FIG. 8C), and/or to any angle therebetween during takeoff and landing allows the aircraft to maintain a zero horizontal velocity in adverse conditions, such as taking off from a slope, taking off into or landing in a headwind, taking off or landing with a tailwind, responding to being shoved by an external mechanical force, etc. The front stabilizer 150 can emit a sideward stream of air to rotate the aircraft to be aimed uphill or into the headwind and then stop it there with a stopping burst/jet of air in the opposite direction. Also, a heavy wind will naturally catch the empennage and treat the aircraft like a weathervane, so, the vertical thrust could simply at this point be bent rearwardly to allow the aircraft to ascend straight upwardly even though said heavy wind is trying to displace it laterally or rearwardly.

Since we have spoken in the previous paragraphs about how the aircraft could be manipulated "like a weathervane" due to the existence of the empennage module 60 when the aircraft is taking off in a cross-wind, the specification must now revisit the discussion of the empennage module 60, specifically the upper and lower vertical stabilizers 61A and 61C, respectively, and the left and right horizontal stabilizers 61B and 61D, respectively.

During vertical takeoff and landing, the vertical and horizontal stabilizers 61A-61D of the empennage module 60 (see FIGS. 1A-1B and 4F) need to be actively feathered such that they do not create any drag-induced moment about the center of gravity cg of the aircraft in any direction. Whether the reason for feathering them is cross-winds or headwind or tailwind or "other", the aircraft should be able to complete its strictly upward and strictly downward movements without the aircraft being adversely affected by the wind, and "wind" should be interpreted as not only naturally created wind, which the aircraft experiences passively when traveling through air at a non-zero airspeed, but also actively created wind, which the aircraft creates via its own trajectory and airspeed, meaning that the vertical and horizontal stabilizers 61A-61D of the empennage module 60 should be capable of changing their respective angles when the aircraft moves, during zero or low horizontal airspeed, in any desired way.

In fact, and still referring to FIGS. 1A-1B and 4F, the vertical and horizontal stabilizers 61A-61D should each be independently pivotable to any angle imaginable in order to align them with the passing airstream, to slice directly into any volume of air without air drag or sailing effect.

Whereas, when the aircraft is accelerating completely vertically upward or completely vertically downward, the horizontal stabilizers 61B and 61D can be actively feathered to be vertically oriented, such that their longitudinal axis is aligned with a vertical plane and the downwardly/upwardly passing air/wind (seen from the relative frame of the aircraft) passes along the horizontal stabilizers 61B and 61D with no effect on the aircraft's pitch, orientation, or movement.

Whereas, when the aircraft is ejecting angled/blended downward/rearward thrust to finish a takeoff, the horizontal stabilizers 61B and 61D align with the oncoming airstream vector and/or the 43° angle of the 3$^{rd}$ VTOL duct nozzle 44 from FIG. 8A. Considering this last state, and now considering again the previous ones, it is possible that the horizontal stabilizers 61B and 61D can be pivoted in order to, by resistance torque about the cg, reduce the duty of front stabilizer 150 during takeoff and landing, but this is a future consideration. The Applicant is looking uselessly far into an industry that does not yet exist.

Whereas, when the aircraft is taking off or landing during heavy winds or a crosswind that are not headwinds or tailwinds, the vertical stabilizers 61A and 61C can be actively feathered to align with the heavy winds or crosswinds, such that the heavy winds or crosswinds pass along the vertical stabilizers 61A and 61C with no effect on the aircraft's orientation or heading. And since the vertical stabilizers 61A and 61C are being pivoted to anodyne angles, it becomes apparent that they could be used, during heavy winds or a crosswind, to be used as sails, if the front stabilizer 150 were to offset the torque via outwardly (toward the left-hand side or the right-hand side) ejected thrust in a direction equal to the wind-flow direction. How strange. But it should be considered that the pod of the present invention could be used in the central planes of the US or the Steppes of Eastern Europe or on water or anywhere where there are no obstacles, so just about anything is permitted and possible for the vertical stabilizers 61A and 61C and horizontal stabilizers 61B and 61D, so long as they pivot to align with the passing air when required, and so long as they pivot to productive other effects using the passing air, when required.

FIG. 9A, being basically identical to FIG. 8A, shows a complete array of fan exhaust thrust possibilities used during the method of the preferred embodiment of the present application, and has been re-included to append FIGS. 9B-9C below it. FIGS. 9B-9C are enlargements of the bottom portion of FIG. 9A and they depict outlet flaps or duct covers 42F capping the termini of the various VTOL ducts/nozzles and which automatically pivot to close the VTOL ducts/nozzles when the fan exhaust (thrust) is not pushing the outlet flaps outward against their spring return force ($F_s$).

The duct covers 42F should, when closed, be flush with the bottom panel of the aircraft, and when open, should be an extension of one inner surface of their respective VTOL ducts/nozzles. FIGS. 9B-9C also show the 1$^{st}$ VTOL duct forward diverter panel 42D and the 1$^{st}$ VTOL duct rear diverter panel 42E tucked in together to close the 1$^{st}$ VTOL duct/nozzle 42. The 1$^{st}$ VTOL duct forward diverter panel 42D in this case would cover the 1$^{st}$ VTOL duct rear diverter panel 42E and would itself be flush with the bottom panel of the aircraft. So, as the aircraft travels at high airspeeds, the outer surface of the bottom of aircraft will be continuous and if constructed with this effect in mind, no turbulence should arise because of the VTOL ducts/nozzles.

FIGS. 10A-10E combine to portray the important flywheel module 10 in its multiple embodiments, so that one of ordinary skill in the art can understand the flywheel and how it relates to the fan module 100, especially by being electromagnetically driven to spin in a rotational direction opposite to the rotational direction of the 1$^{st}$-3$^{rd}$ fan stages 101-103 of the fan module 100 while being concentric with said fan module 100 and having an identical axis of rotation (13 in FIGS. 10A and 10D) with said fan module.

Figures 10A, 10B, 10C, 10D, 10E:
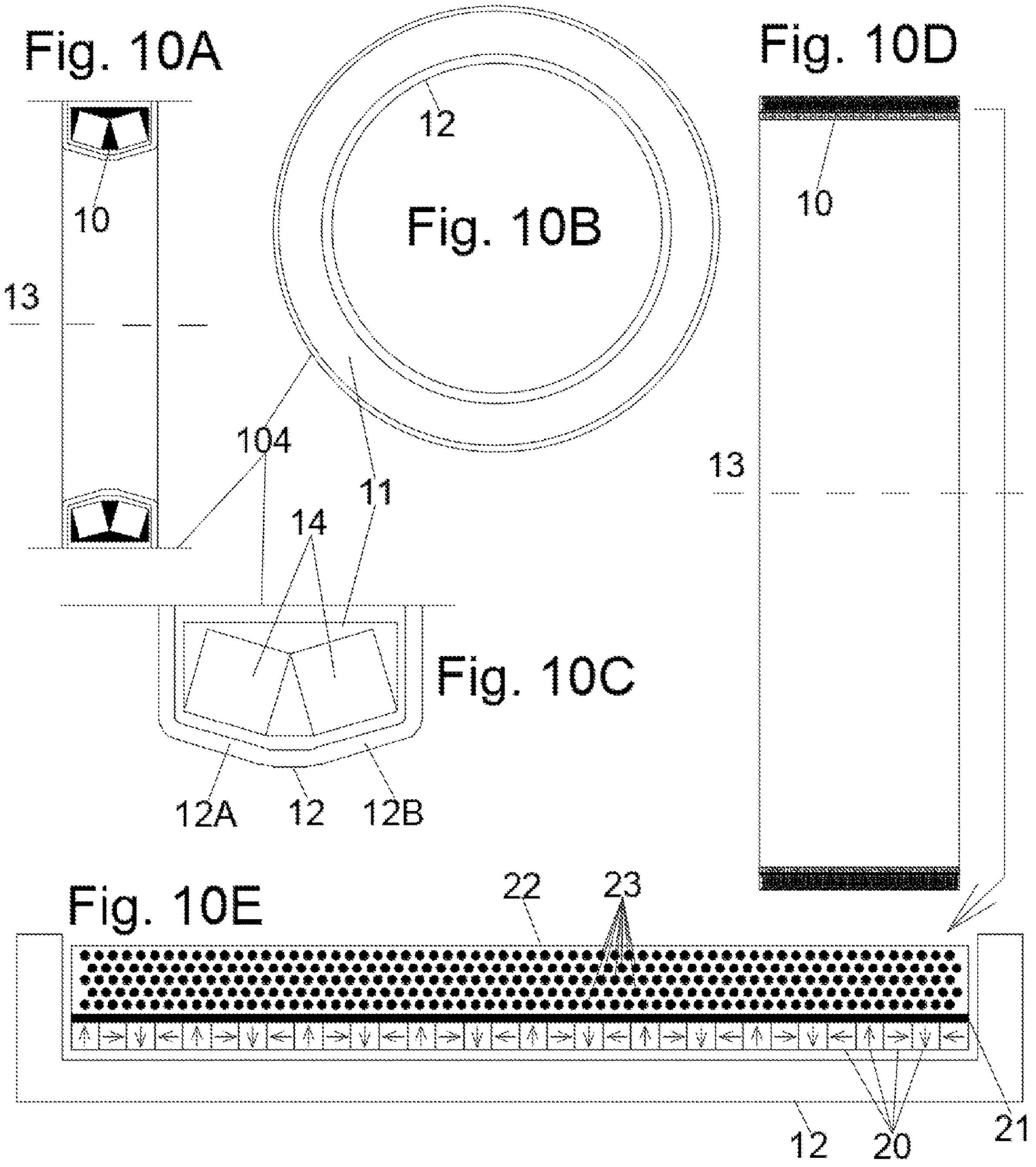

FIG. 10A depicts a cross-section of an embodiment of the flywheel module 10 that spins/rotates about a flywheel axis of rotation 13 (which is also the fan module axis of rotation). Nothing in FIG. 10A is labeled except the magnetic shield/jacket (inner diameter) 104 of the fan module 100 and the flywheel axis of rotation 13, the rest being informative, existing to locate the placements and natures of the elements of FIGS. 10B-10D. No matter which one, of many potential embodiments, is used for the flywheel module, the flywheel module should probably reside within the fan module 100, as shown in FIGS. 1A-1B, 3A, etc.

Concerning the weight/mass of the flywheel module, Applicant will here proffer (for example in an embodiment with a fan module 100 that has three fan stages 101-103) without mathematical evidence that if the flywheel module 10 is made to be extremely lightweight, it will spin at more than 20 times the rotational velocity of the 2$^{nd}$ fan stage 102. If it is made to be simply lightweight, it will spin at 14-20 times the rotational velocity of the 2$^{nd}$ fan stage 102. If it is moderately massive (as shown in FIGS. 10A-10C), it will spin at approximately 8-14 times the rotational velocity of the 2$^{nd}$ fan stage 102. And if for some reason it is made with no thought for weight/mass concerns, perhaps it could spin at less than 8 times the rotational velocity of the 2$^{nd}$ fan stage 102 and still be useful.

The inner magnetic shield 104 of the fan module drive system (from FIG. 3A) represents a cylindrical inner wall (irrespective of its magnetic function) of the fan module, and it is represented by two horizontal lines, one (104) at the bottom of FIG. 10A, and another one on the top of FIG. 10A, and the flywheel drive is affixed to the inner magnetic shield 104 all the way around where they meet, and the flywheel itself is levitated inside the drive, explained later with reference to FIGS. 10B-10C.

The top and bottom halves of FIG. 10A are mirror images of each other extending up and down from the axis of rotation 13, with the top half rotating out of the page and the bottom half rotating into the page. This all goes for FIG. 10D as well so it won't be repeated when we get to describing FIG. 10D. FIG. 10B is a side view of the flywheel module 10 and FIG. 10C is an exploded view of the top annulus cross section of the flywheel from FIG. 10A.

As shown in FIG. 10B, the flywheel drive includes an electrical coil stator 12 that is radially inward disposed of the flywheel and its cross section is C-shaped such that (non-energized) sidewalls extend outwardly on each side of the stator 12 to fuse the drive system to the inner magnetic shield/jacket 104 of the fan module drive system. The sidewalls in combination with the stator 12 and the magnetic shield/jacket 104 hermetically seal the space within them such that the flywheel module's permanent magnet rotor 11 can be levitated for high-velocity rotation within the space, and the space can be evacuated and kept at a near-vacuum such that the flywheel can spin at any velocity without draining energy from the power supply.

The electrical coil stator can have a stator first bevel portion 12A and a stator second bevel portion 12B, wherein the flywheel rotor 11 can have permanent magnets 14 abutting at respective outer adjacent corners but angled away from each other to create a rotor 11 with a chevron-shaped inner surface, which matches up with the chevron-shaped outer surface of the electrical coil stator 12, such that when the electrical coil stator 12 is energized, it not only drives the rotor 11 at a controllable rotational velocity, but if the stator is provided with coil/winding pairs (like 140 in FIG. 3 but wherein the arrangement of FIG. 3 would be inverted since the arrangement of FIG. 10D would be repulsive-outward instead of repulsive-inward like FIG. 3) to serve as radial magnetic bearing windings/coils, the coil-winding pairs would also inherently serve as thrust bearings, since the levitation coils/windings (radial bearings) would be exerting repulsive longitudinally forces to axially center the flywheel.

In FIG. 10C, the blank space of the permanent magnet rotor 11 (the outer mass of it) around and between the magnets would be of spirally wound carbon fibers in a cured resin and would serve as an outer shell/belt to fix and support for rotation, as well as radially inwardly constrain, the magnets 14. If the rotor 11 were spun at the moderately high rotational velocities that are envisioned for the embodiment of FIGS. 10A-10C, the centrifugal forces driving them outward (especially since magnets are relatively heavy) could be extreme, and so the outer "belt" areas of the rotor 11 must be very rigid and strong, and especially, with fibers characterized by very high tensile strength and rigidity.

FIG. 10B also shows the electrical coil stator 12 on the inner diameter of the flywheel module, the magnetic shield/jacket 104 on the outer diameter of the flywheel module, with the permanent magnet rotor 11 spinning between them (direction or magnitude not shown). The flywheel module of FIGS. 10A-10C is oversimplified because it is probably not the preferred embodiment. The Applicant believes it is too heavy and, although this means that it wouldn't have to spin as fast, it probably also isn't strong enough to keep itself from expanding radially outwardly or fracturing, which is not permissible in this situation.

So, the Applicant has redesigned the flywheel module 10 in order to, at the detriment of losing the appealing "inherent thrust bearings" of the embodiments of FIGS. 10A-10C, reduce its weight/mass and volume/size, and also to increase the strength of holding the flywheel rotor 11 together, to maintain its shape during high centrifugal forces, and to never rupture.

FIG. 10D shows a cross-section of a second embodiment of the flywheel module 10 that spins/rotates about a flywheel axis of rotation 13 (which is also the fan module axis of rotation). Nothing in FIG. 10D is labeled (even the magnetic shield/jacket 104, even though the flywheel module can be logically visualized as nesting within it and be affixed to it like in FIG. 10A) except the fan module 10 and the flywheel axis of rotation 13. Again, the top and bottom halves of FIG. 10D are mirror images of each other extending up and down from the axis of rotation 13, the cross-sectional view cutting through the annular flywheel module to show just the upper and lower extents in the lateral center portion (but also showing a the profile of the rest of the annulus for context), with the top half rotating out of the page and the bottom half rotating into the page, or vice versa. FIG. 10E is an exploded view of the top annulus cross section of the flywheel from FIG. 10D, and an arrow has been drawn nest to FIG. 10D to show what part of the FIG. 10D is being exploded to create FIG. 10E.

Referring now to FIG. 10E alone, the electrical coil stator 12 is similar to that of FIGS. 10A and 10C in that its sidewalls (not containing electrical coils except as needed for thrust bearings) extend radially outwardly (which is upwardly in FIG. 10E) to be fused at both upper ends to the magnetic shield 104 of the fan module drive system in order to hermetically seal for evacuation the area between the stator 12 and the magnetic shield/jacket 104, although this has not been shown in FIG. 10E, which is only being used herein to describe the elements of the rotor and its contents.

Again, the stator 12 contains multiple and multifarious electrified coils/windings to drive the flywheel while suspending the flywheel rotor for levitation. It does the driving via stator windings that are similar to, if not identical to, the rotor windings (106) of FIGS. 3B-3D, and it does the levitating via stator windings that are similar to, if not identical to, the stator windings 140, of FIGS. 3B-3D. The flywheel rotor can contain Halbach magnetic arrays 20 (only one bank is shown) which are linear banks of permanent magnets, preferably Neodymium or other rare-earth or similar high-performance magnets.

The Applicant explained Halbach arrays in US 20220363378 A1 which has been incorporated herein by reference, so a repeated explanation will be omitted, except to say, as shown in FIG. 10E, each isolated bank of magnets 20 only exerts magnetic flux downward (so, inward for the entire annular system) toward the stator 12 which is driving the rotor via electrical coils/windings that are electrified within stator 12 to accelerate the banks of magnets 20 in accelerative, constant-rotational-velocity, or decelerative states.

Reference no. 21 is being provisionally called a magnetic shield. Applicant is not sure whether a Halbach array requires a magnetic shield on the non-flux side to reduce the flux toward the flywheel reinforcement belt 22, but whether 21 is a magnetic shield having shielding properties or not, of course a rigid framework is needed to form an outer shell with spacing and locating means for retaining the Halbach arrays 20, and 21 will serve for this. In its simplest embodiment, 21 would be a very strong and thin (Al—Ti alloy or such) cylinder with shallow channels etched into its inner diameter for the banks of Halbach arrays 20, in such a way to provide a framework for the magnets and an outer shell for them that provides spacing and mechanical integrity, such that if radially combined with and constrained by the composite flywheel reinforcement belt/constraint 22, the combination will maintain the roundness of the rotor at extremely high rotational velocities.

The flywheel reinforcement belt 22 is also an annular structure that forms the outer portion of the rotor. The flywheel reinforcement belt 22 should implement the most advanced flywheel technology available, as can be found in any encyclopedia under the name of "superflywheel", and since the Applicant is not up to date on the latter technology, a simple structure/method is proposed via FIG. 10E wherein reinforcing fibers/filaments 23 are wound about the magnetic shield/shell 22, as shown 2-dimensionally in FIG. 10E. The reinforcing fibers/filaments 23 could be carbon fibers, glass fibers, etc. The method for constructing the superflywheel could include using the shell 21 (with or without the Halbach arrays 20 already attached) as a hub and, once a loose end of a single fiber 23 is adhered to 21, the shell (magnetic shield) 21 is spun on a spindle while the fiber 23 is guided onto it to form a spirally wound layer, and then again to form another spirally wound layer going in the opposite direction, and then this process is repeated until the appropriate outer diameter has been reached for the flywheel rotor 11, and then the fiber is severed and tucked in somewhere.

The fiber 23 as it is fed onto the hub/shell 21 could be continually wetted with resin as it is fed onto the rotating rotor, or, preferably, it could be intermittently wetted (i.e. such that the majority of the fiber-surfaces are not directly adhered to the fiber-surfaces next to them after curing) in order to create a lighter structure (since we are not trying to store energy like a traditional super-flywheel), and then once the flywheel structure has been completed, it is subjected to a cure cycle such that the resin hardens, locking the fibers relative to each other. Alternatively, the outer layers of fibers 23 could be cured individually after each has been wound onto the rotor.

As mentioned before, the flywheel rotor must be magnetically levitated by the stator 12 and the simplest-seeming embodiment for doing so would be to invert the radial magnetic bearings of FIGS. 3B-3D, wherein "invert" means that the radial magnetic bearing windings/coils 140 would be on the stator 12 instead of the rotor, in which case there would be two upper bearings (repelling the flywheel rotor upward and laterally outward) and one lower bearing (repelling the flywheel rotor straight downwardly).

As for the thrust bearings for the flywheel $2^{nd}$ embodiment of FIGS. 10D-10E, the Applicant has not decided how this would be accomplished. Most likely some poled permanent magnets could be positioned between paired banks of Halbach arrays 20, on both ends and with their alternating/paired poles facing outward (to the left-hand side and right-hand side in FIG. 10E) toward the sidewalls of the stator 12, and the sidewalls could each have a set of windings within them specifically designed and sinusoidally excited to repel the flywheel, via the permanent magnet poles, toward its axial zero-point from both axial ends, such that it cannot drift axially without encountering an axial magnetic repulsive force that pushes it back to the axial zero-point, thereby maintaining equilibrium and ensuring the flywheel never wobbles or touches the stator sidewalls.

FIGS. 11A-11C cooperate to illustrate the front stabilizer module 150 from the side (FIG. 11A), the top (FIG. 11B), and the front (FIG. 11C) vantages, all things germane to the description provided in the specification relevant to FIGS. 11A-11C being visible, while the other elements of the aircraft are not visible in these drawings for not being germane to the discussion.

FIG. 11A represents a side cross-sectional view of the very front of the aircraft, enlarged such that the individual elements of the front stabilizer module 150 can be seen and labeled. At its core, the front stabilizer module 150 comprises two counter-rotating centrifugal impellers, an upper centrifugal impeller 152A and a lower centrifugal impeller 152B. The upper and lower centrifugal impellers 152A and 152B are supported and for rotation by shaft and bearing assemblies 155, which are not described herein but should be obvious to one of ordinary skill in the art. The upper centrifugal impeller 152A intakes air via a vertical upper stabilizer intake 151A and the lower centrifugal impeller 152B intakes air via a vertical lower stabilizer intake 151B.

Still referring to FIG. 11A, both the upper and lower stabilizers intakes 151A and 151B can be opened and closed by intake valve flaps 153 (only the upper one is shown). Both the upper and lower centrifugal impellers 152A and 152B are driven by annular upper and lower front stabilizer drive motors 158, which have not been described herein other than to say that each could consist of an annular electrified rotor (with windings) that rides within/between concentric, annular sets of banks of Halbach arrays of permanent magnets. However, the front stabilizer does not need to be very powerful so it's possible (and probable) that industry regular electric drive motors should instead be incorporated in the area of, and sharing space with, the shaft and bearing assemblies 155, thus simplifying the apparatus shown in FIG. 11A and superseding the front stabilizer drive motors as shown at 158.

As mentioned above, the upper and lower stabilizer intakes are proportionally and pivotably opened, from a fully closed position where they are flush with the outer surface of the aircraft, by intake valve flaps 153. Only the top one is labeled, the bottom one (as is clear from FIG. 11A) a mirror image of the top one. When the front stabilizer 150 is not in use, the intake valve flaps are both closed. During the beginning of a takeoff and the end of a landing procedure, they are both completely open (vertical). During other transition periods they are probably best utilized by being in a partially open state, which is that chosen for depiction in FIG. 11A. It is likely that they should always be open the same amount as each other. When they are open, the upper and lower centrifugal impellers 152A and 152B suck in air through the intakes 151A and 151B and accelerate and pressurize it within (referring now jointly to FIGS. 11A and 11B) impeller volutes 159.

The volutes 159 surround the perimeters of the centrifugal impellers 152A and 152B in a way that is well known to practitioners in the art, so they will not be heavily discussed. In short, each volute leads to a volute exhaust duct, wherein the upper centrifugal impeller 152A has an upper volute 159 that leads to an upper volute exhaust duct 154A (now referring jointly to FIGS. 11A, 11B, and 11C) and the lower centrifugal impeller 152B has a lower volute 159 that leads to a lower volute exhaust duct 154B.

As FIG. 11B is a top view, looking down through the front of the aircraft, only the upper centrifugal impeller 152A is visible, and as it is spinning clockwise in this depiction, its volute 159 grows from narrower to broader in the clockwise direction such that when it has grown to full breadth it transitions directly to upper volute exhaust duct 154A and is led immediately to the left-hand side of the aircraft. Likewise, although not completely shown where it is blocked by the upper centrifugal impeller 152A and upper volute, the lower centrifugal impeller 152B is spinning counterclockwise in this depiction such that its volute grows from narrower to broader in the counterclockwise direction such that when it has grown to full breadth it transitions directly to lower volute exhaust duct 154B and is led immediately to the right-hand side of the aircraft. When the volute exhaust ducts 154A and 154B reach their respective sides of the aircraft they encounter a valve that is usually closed, such that the upper and lower centrifugal impellers 152A and 152B keep the volutes and volute exhaust ducts 154A and 154B charged with pressurized air.

FIG. 11C is shown with the centrifugal impellers 152A and 152B and their volutes removed such that we have a view, looking longitudinally from in front of the aircraft backward, such that we can see the upper and lower volute exhaust ducts 154A and 154B from where they pick up air from the impeller volutes 159 to where they reach the sides of the aircraft (shown in profile). At its terminal end the upper volute exhaust duct 154A comprises left-side stabilizer nozzles and diverters 156A that can conduct air to be ejected selectively upward, outward, and downward from the front left-hand corner of the aircraft. Likewise, at its terminal end the lower volute exhaust duct 154B comprises right-side stabilizer nozzles and diverters 156B that can conduct air to be ejected selectively upward, outward, and downward from the front right-hand corner of the aircraft.

It was already mentioned that the upper and lower centrifugal impellers 152A and 152B, by spinning at a moderately high rotational velocity (preferably each is spinning at the same rotational velocity), keep their respective upper and lower volute exhaust ducts 154A and 154B charged with pressurized air, such that when the nozzles/diverters 156A and 156B are activated in such a way that one of the minor passages shown in FIG. 11C, when opened, a burst or stream of air is ejected from each front corner of the aircraft, selectively by a controller, to manipulate the yaw, pitch, and roll of the aircraft, either to react to unwanted motion (detectable by a 6 DOF accelerometer/gyrometer or an IMU) at stopped or very low airspeeds, or to actively yaw, pitch, and/or to roll the aircraft during flight (wherein the intake valve flaps would be opened up an amount inversely proportional to the airspeed).

FIG. 11C has six arrows to show the different "thrusts" that can be created by the front stabilizer module 150, and they more or less speak for themselves, at least to one of ordinary skill in the art. If 156A bursts/streams air up and

156B bursts/streams air down, the aircraft is rolled clockwise, and vice versa. If 156A and 156B burst/stream air up simultaneously, the aircraft nose is pitched down. If 156A and 156B burst/stream air down simultaneously, the aircraft nose is pitched up. If 156A bursts/streams air laterally outward, the aircraft yaws right. If 156B bursts/streams air laterally outward, the aircraft yaws left.

Applicant has devised what he sees as the best approach (other than that simpler motors would probably be preferred) for fitting a moderately-powered air-ejection system for keeping the nose of the aircraft always aimed exactly in the direction the controller wishes it to be, all the while wherein said system fits into the nose of the aircraft in a way that allows all Coriolis forces to cancel each other out (counter-rotating impellers) and also is shaped such that it can be fit in front of the feet of a passenger and comport to the desired rounded/slanted nose. Obviously, there are other ways to accelerate/pressurize the air within the left-hand side and right-hand side exhaust ducts 154A and 154B, and of course there are other means beside such exhaust ducts that could be used, and many different systems could be utilized for varying the direction of the bursting/streaming air jets coming out of the front of the aircraft without taking away from the overall invention, described herein.

As a side note, as shown in FIG. 11B, the upper and lower exhaust ducts 154A and 154B both comprise arcuate split-off paths (which could be activated via flaps, not shown) that lead to reverse thrust ducts and nozzles 157A and 157B. If activated, the air streams from the upper and lower centrifugal impellers 152A and 152B could simultaneously be conducted around the volutes and ejected out the front of the nose of the aircraft in a forward direction, as shown by the small arrows of FIG. 11B, to decelerate the aircraft. This thrust reverser system could be used as a supplement to the thrust reverser nozzle/duct 42TR from FIG. 7A, as an alternative to the thrust reverser nozzle/duct 42TR, or it could be omitted.

FIGS. 12A-12F proffer a complex and perhaps unpreferred, but understandable, insight into an embodiment of a rear stabilizer module of the present invention, wherein the embodiment is shown in the appended drawings but it is only an example of the many ways the desired effects of rear stabilization can be realized.

FIG. 12A is yet another side cross-sectional view of the aircraft while FIG. 12D is another top cross-sectional view looking down at the aircraft, both included herein to depict a rear stabilizer module 80 in conjunction with the fan exhaust volute 31 (from FIGS. 4A-4C) which is annular and within the skin of the airframe 1, while the rear stabilizer is (except for a flap) outside the skin of the airframe 1.

Perhaps the best way to understand the rear stabilizer module 80 is to start with FIGS. 12E and 12F. FIG. 12E is a front view (looking rearwardly from the center of the aircraft toward the tail) of the fan exhaust volute 31, and we can imagine the fan module 100 on the other side of (behind the page) the fan exhaust volute 31 and leaking air into it via a round slit such that the fan exhaust volute 31 grows from narrower to broader in a clockwise direction. A rear stabilizer module 80 is on each lateral side of the aircraft and a window or aperture exists between each rear stabilizer module 80 and each side of the fan exhaust volute 31 such that when rear stabilizer intake flaps 91 are rotated inward (see FIG. 12F, which is an exploded view of the combination in the area around the left-hand rear stabilizer module 80), the extremely-high-speed air swirling within the fan exhaust volute 31 enters the slit thus created and pressurizes a pressurized air chamber 83 with high-pressure air which will inherently pressurize due to speed stagnation.

Returning to FIG. 12A, which shows the fan exhaust volute and the left-side rear stabilizer module 80, another view is provided via FIG. 12B which is an exploded view of the left-side rear stabilizer module 80. In both FIGS. 12A and 12B can be seen a rear stabilizer body, which is cylindrical, and a reverse thrust proportional nozzle/duct 81. As there have already been provided herein two different thrust reversers for the aircraft, this feature need not be incorporated within the rear stabilizer modules 80 but since it's there we will include it in the discussion. The top view of FIG. 12D has also been provided with an exploded top view of the right-side rear stabilizer module 80 in FIG. 12C, which also shows the reverse thrust proportional nozzle/duct 81 from the top.

Each cylindrical rear stabilizer body 82 is capped on its outer end by a wall, and the combination (body plus outer wall) has openings 86 in its top, bottom, and outer reaches (see FIGS. 112B and 12C together) for the upward and downward expulsion of stabilizing air bursts/streams, like the front stabilizer had in FIG. 11C. The top and bottom openings 86 (FIG. 12B) can be revealed for air expulsion upward and downward by rotating an inner rotating turret valve 85 (see two-way arrow in FIG. 12B), and the outer opening 86 can be opened by a sliding door or sliding outlet cover 87.

The rotating turret valve 85 and its turret valve housing 84 (which is basically just the rear stabilizer body 82) are shown enlarged, and from the front looking back, in FIG. 12F. Also shown in FIG. 12F are the sliding outlet cover 87, as well as the inner wall 31A and the outer wall 31B of the fan exhaust volute. The pressurized air chamber 83 is not only shown in FIG. 12F, but also in FIGS. 12B-12C, and the rear stabilizer body 82 has been further labeled in FIGS. 12C-12D. So, provided all the views of FIGS. 12E-12F, and using one's imagination a little bit, it should be clear to one of ordinary skill in the art that the rear stabilizer modules' pressurized air chambers 83, on each side of the aircraft, are charged with pressurized air form the fan exhaust volute 31 only when the rear stabilizer intake flaps 91 are open, and when they are not open the fan exhaust swirls around the fan exhaust volute 31 in a completely unimpeded sense. It should be noted that the rear stabilizer modules 80 will only be in use for about 0.01% of a typical flight, so all energy and turbulence considerations created when the rear stabilizer intake flaps 91 open can be put off for the prototype and, perhaps, permanently.

Continuing with creating an understanding of the rear stabilizer modules 80 and how they work, once the intake flaps 91 open high-velocity air enters the pressurized air chamber 83 whereupon it stalls/stagnates, such that its kinetic energy is converted to pressure energy.

When (on the left-side rear stabilizer module 80) a turret valve 85 rotates a little clockwise from the position shown in FIG. 12B, an opening appears in the bottom of the rear stabilizer body 82 (or turret valve housing 84) and air bursts/streams out of the bottom turret valve outlet 86 in a downward direction, pushing that side of the aircraft up. When the same turret valve 85 rotates a little counterclockwise from the position shown in FIG. 12B, an opening appears in the top of the rear stabilizer body 82 (or turret valve housing 84) and air bursts/streams out of the top turret valve outlet 86 in an upward direction, pushing that side of the aircraft down. Throwing into the discussion the obvious result of opening the sliding outlet cover 87 (see FIGS. 12C and 12F), and one can imagine FIG. 12E with the same set of arrows coming out of the rear stabilizer modules 80 that the front stabilizer had coming out of the front of the aircraft in FIG. 11C.

So, importantly since the rear stabilizers are not far enough back on the aircraft tail to be useful by themselves (of course it would be great to have a better system that was), using the rear stabilizer in combination with the front stabilizer will have the effect of allowing the controller to tightly control the orientation of the aircraft during takeoff and landing procedures, particularly at zero airspeed when wind and obstacles can be impediments. Also, if both front and rear stabilizers stream air out of the same side of the aircraft, the aircraft can slide sideways, or stay still in a side-wind.

If both front and rear stabilizers stream air upwardly on the left-hand side and downwardly on the right-hand side, the aircraft can be rolled rightward during normal fixed-wing flight. This could be augmented by pitching up the left horizontal stabilizer 61B and pitching down the right horizontal stabilizer 61D. Doing the opposite of everything mentioned in this paragraph would roll the aircraft leftward. The upper and lower vertical stabilizers 61A and 61C would in such an event still be available to use as a rudder, and this paragraph has now described how the aircraft could perform a turn without any external ailerons. Of course, it is possible to just use the front stabilizer module and the horizontal stabilizers to roll the aircraft, for it is quite possible that this aircraft does not need the rear stabilizer modules 80 of FIGS. 12A-12F.

During takeoff the front stabilizer module 150 could burst/stream air to one side of the aircraft while the rear stabilizer modules 80 could burst/stream air to the other side of the aircraft, in order to rotate the direction the aircraft is pointed, so that it could take off already having the heading aimed straight at the destination. During landing the same thing could be done to align the aircraft with certain features of the landing area, such as if the latter were a parking spot or a rectangular portal in the roof of someone's garage or emergency room.

Referring to FIG. 12C, a thrust reverser passage could be defined between two parallel reverse thrust entrainment walls 90, between which a pivoting reverse thrust cover can be opened up to various degrees to effectuate thrust reversal from both sides of the aircraft. Also, the turret valve housing 84 could have an opening on its rear such that if the turret valve 85 turned its open side toward the opening on the rear, the rear stabilizer modules 85 could accelerate the aircraft forward. This, (thrust reversal and forward thrust from the rear stabilizers 80) was actually a provision of the application, but when the downward-thrust-vectoring scheme of FIGS. 8B-8D (via VTOL duct diverters 42D and 42E) was instituted by the Applicant, he decided to stop trying to use the rear stabilizer modules 80 to push the aircraft forward. But, of course, now that this has been described, it can indeed be considered a useful embodiment that both the front stabilizer module 150 and the rear stabilizer modules 80 can be used for pushing the aircraft rearward, on demand, any time the splitter is in VTOL mode, and also, that the rear stabilizer modules 80 can be used for driving the aircraft.

In fact, using the front stabilizer module 150, with all its features/capabilities and as shown and described earlier (possibly with thrust reverser feature included), in combination with concurrently using the rear stabilizer modules 80, with all its features/capabilities and as shown and described herein, further in combination with concurrently the downward-thrust-vectoring scheme of FIGS. 8B-8D (via VTOL duct diverters 42D and 42E), in a coordinated way of course, the aircraft could be suspended at any desired height via downward thrust from 1$^{st}$ VTOL duct/nozzle 42, and just drive around like a wheel-less car (think land speeder but slow), without going into flight mode. It is almost possible to imagine the aircraft literally negotiating its way in 3D-space, through a forest or parking garage, not only driving around along a horizontal plane a few feet above the surface of the earth, but twisting and rising and dropping, as necessary, to get the aircraft to a VTOL-amenable location from a VTOL-unamenable location, or vice versa. One such instance of where this actually seems like it might be needed is one where VTOL is prohibited by law or ordinance, due to noise concerns or, for instance, near an airport.

Although the foregoing handful of paragraphs are by no means fantastical, they are left for future consideration, and we need to get back to more important matters. Using the aircraft as a wheel-less car is a huge waste of energy. The Applicant has not embellished upon the rear stabilizer modules 80 of FIGS. 12A-12F, or its discussion, because he believes there are many better ways to perform the functions attributed to it hereinabove, and some of them are going to be more effective. For instance, it seems that surely there is some way to duct air from the front fan exhaust duct 35 from FIGS. 4A-4B to be ejected from various directions to effectuate a rear stabilizer, the Applicant simply can't figure out how to do it, and even if he did figure it out, it would be too difficult to use 2-dimensional patent drawings to describe it. So, the specification will now focus on other, more important elements and features.

FIGS. 13A-13F deal with the wing modules with a specific focus on the removable and telescoping inner wings, the in-wing batteries, and a hypothetical $H_2$ turbine module.

FIGS. 13A and 13B are front-end-views of the aircraft looking rearward along the longitudinal axis of the aircraft. FIG. 13A shows the telescoping inner wings 51 in their retracted positions, seated within wing-receiving pockets 52 (labeled in FIG. 13B). Between the pockets 52 is a seat bottom area 58 where the bottom (this, buttocks, lower back) of the occupant can be comfortably settled. Above the pockets 52 are passenger arm/elbow areas 59 wherein there is a space for the elbows and upper arms of the passenger can comfortably reside and in such a way that rests are created on each side for the passenger to place her/his elbows and forearms.

Of course, still referring to FIGS. 13A-13B, the open space above 58 and 59 is the open area making up the rest of the interior of the passenger compartment (cabin), and toward the rear of which exists a torso space for the upper half of the passenger and the top of the seat. Above the upper open space is the passenger head distended space 4 from FIG. 1A. It is unfortunate that we had to wait so long after showing FIGS. 1A and 1B to view the aircraft cross section from the front (as in FIGS. 13A-13B) and make sense of some stuff, but there was a lot to explain along the way that was way more important.

FIG. 13B shows the telescoping inner wings 51 in their fully-extended positions, and also in FIG. 13B a wingtip fence 51A, known to practitioners in the arts, is labeled. The wingtip fence 51A is provided at the outer edge of the telescoping wings as a flange, and the flange should extend upward and downward sufficiently to laterally trap and entrain air along the upper and lower surfaces of not only the telescoping wings 51, but also sufficiently extensive (upward and downward height) to laterally trap and entrain air along the upper and lower surfaces of the outer wings (not labeled) for the wingtip fences 51A will be most useful during high-airspeed cruise, because the outer wings are so short. In short, the wingtip fences 51A keep air from slipping laterally outward along the wing modules and escaping the wing modules' ability to work on the air.

Each upper wingtip fence 51A (not labeled but shown via two oblong holes in the upper wingtip fence in FIG. 13C) should have two apertures that serve as handles and/or lift-truck hook-in loops. Either they could be ergonomically shaped and rounded such that each wing module could be pulled out manually, and carried to a charging rack, or they could be especially shaped as adapters into which protruding elements of a hoist mechanism could be inserted to pull them out by machine or end effector, and conveyed to a charging rack. Or, they could be shaped as ergonomically shaped and rounded handles and the end effector (hook, machine element, etc.) could be especially shaped and sized to interface with them anyway.

FIG. 13C is a cross-section of a wing module from its outer end looking inward while FIG. 13D is a cross-sectional view of a wing module from the top, looking down. In a primary embodiment, the simplest one imaginable, the telescoping (and removable) inner wings 51 contain a monolithic rechargeable battery module, or are stuffed to capacity with rechargeable battery packs, or a mixture of these two. FIG. 13C is the beginning of an intrusion on this battery-only concept, and the Applicant has no choice to allow it because there are going to be long-distance, fueled versions of this aircraft made, so an attempt should be made herein to propose one that uses a non-carbon-based energy, particularly a very light non-carbon-based fuel, and more specifically, compressed hydrogen gas, derived from electricity, such that the aircraft is still electrically powered. The discussion of fuels will wait until later in the specification. The applicant has chosen compressed hydrogen gas because it is extremely lightweight and does not require any of the accoutrements of liquid fuels (particularly liquefied gas fuels), it does not produce $CO_2$, and its storage means (metal cylinders) are well known and easy to fit into the wing modules 50. Of course, even if compressed natural gas, compressed kerosene gas, compressed propane gas, etc., were used, the aircraft would still create so much less byproduct $CO_2$ than a normal car, that it could still be part of $CO_2$ reduction worldwide.

So, the cross-section of the telescoping inner wing 51 in FIG. 13C shows that two compressed gaseous fuel cylinders 57 are located in the thickest, central part of the wing, and these are flanked by forward and rearward battery packs 56 which are shaped to conform to the fronts and backs of the airfoil geometry which the telescoping inner wings 51 are meant to make up. The batteries are placed in the fronts and backs of the telescoping inner wings 51 to increase the moment of inertia of the aircraft about its Y-axis (long axis) and to otherwise more evenly distribute weight around the $1^{st}$ VTOL duct/nozzle 42 from whence the downward exhaust will usually be coming. Of course, two central gaseous fuel cylinders flanked by shaped batteries is only an exemplary embodiment, and there are many ways to fit gaseous fuel and batteries into the same wing.

FIG. 13D is a cross-sectional view of a wing module from the top, looking down, and it has been sized and aligned on the page below FIG. 13C to show where and how the shared elements (them being different views of the same wing) are located relative to other parts. As shown, the rear battery 56 appears rectangular from the top, with an attempt being made to utilize every square inch of the inner wing's volume to advantage. Rear compressed gaseous fuel cylinder 57 extends the entire width of the inner wing, but the front compressed gaseous fuel cylinder 57 and the front battery 56 do not, being curtailed on their outermost extent to make room for a turbogenerator 160, to be further described later.

The turbogenerator 160 preferably, but not necessarily, runs on compressed hydrogen gas which is stored in the cylinders 57. The shorter front cylinder 57 has an outlet connected directly to the turbogenerator 160, while the longer rear cylinder 57 has an outlet connected to an inlet of the shorter front cylinder 57 (this is shown at the top of FIG. 13D but not labeled). The turbogenerator 160 has a compressor inlet 161 that leads forward from the turbogenerator 160 to the leading edge of the inner wing 51.

The point of this application is not to invent a new turbogenerator, but once it has been proposed that the rechargeable power supply could be included in removable wing modules, the Applicant has tried to fit everything having to do with energy storage and electrical power supply into them. So the discussion of the miniature turbogenerator 160 will be cursory.

Turning to FIG. 13E, which shows a partial cut-away and enlarged view of the lower-left-hand-corner of FIG. 13D, depicting a portion of the wing from the top down in order to show the turbogenerator 160 housed within that part of the telescoping inner wing 51. It is noted that the embodiment of the aircraft that is preferred at the time of filing does not have a fuel supply or fueled engine/generator at all, but it might be desirable once the prototype has been perfected to consider including them in order to achieve longer flight distances, wherein they power a low-consumption cruise mode between takeoffs and landings, while the batteries provide most or all of the electrical power during said takeoffs and landings.

A left-side wingtip fence 51A is shown defining the outer (lower in FIG. 13E) boundary of the inner wing 51. The left-hand side of FIG. 13E includes the compressor stages 162A-162C and their drive motor 164, while the right-hand side of FIG. 13E shows the combustor 171, fuel injector 172, and turbine stage groups 174A-174C. There are of course other elements that would be required to make this turbogenerator fully functionally, but this application will only deal with the main components.

Air enters the front of the inner wing via compressor inlet 161 which extends to the front edge of the inner wing 51 (the outer wing should have an orifice to allow the compressor inlet 161 to be open to incoming air during forward high-airspeed travel).

The air in the compressor inlet 161 is led to the $1^{st}$ compressor stage 162A, which can be a centrifugal compressor, which pressurizes the air. De-swirling baffles or vanes 165 can be placed near the outlets of the compressor stages if desired, to keep the air from swirling around the outer periphery of the compressor housing, which although not labeled is obviously cylindrical, and by stopping the air increasing its pressure to reflect the desired compression ratio for each compressor stage, which is well-known to be more than 3:1 for centrifugal compressors (interstage seals 166 keep this compression ratio intact). The air downstream of the $1^{st}$ compressor stage 162A is then sucked into a $2^{nd}$ compressor stage 162B, which can also be a centrifugal compressor, and the air downstream of the $2^{nd}$ compressor stage 162B, which can also be stopped by de-swirling baffles or vanes 165 after exiting the $2^{nd}$ compressor stage 162B, is sucked into a $3^{rd}$ compressor stage 162C, which can also be a centrifugal compressor. The air exiting the $3^{rd}$ compressor stage 162C passes along a compressor outlet 167 from the left-hand side of FIG. 13E to the right-hand side of FIG. 13E, along a combustor inlet duct 170, whereupon it enters a combustor inlet volute or nozzle ring 173.

The air within 173 is constricted from freely flowing into the combustor 171 by combustor inlet orifices (not shown) such that it is maintained at a very high pressure, since 170 and 173 will be a charged environment, with the air pressure inside them reflecting the total compression ratios of all compressor stages multiplied together, which for three stages each with a compression ratio of more than 3:1 will be more than 9:1, such that if the ambient air is at 1 atm, the air going into the combustor 171 will be doing so at a pressure in excess of 9 atm. The Applicant believes that a pressure of 9 atm is high enough such that if compressed gaseous fuel is injected via fuel injector 172, also at a pressure greater than 9 atm, and ignition is initiated, a very robust and stable combustion will result, one that oxidizes every di-hydrogen molecule (when compressed hydrogen gas is the fuel) before exiting the combustor 171.

The products of combustion from the combustor 171 will enter a series of turbine stages 174A-174C to rotate them, and the turbine stages, or groups of turbine stages, will drive electrical generators 175A-175C to produce electricity for driving the fan module 100. The Applicant has no reason to believe the embodiment of FIG. 13E is the best mode for doing this, but something had to be drawn, so, quickly, a 1$^{st}$ turbine stage group 174A drives a 1$^{st}$ electric generator 175A, a 2$^{nd}$ turbine stage group 174B drives a 2$^{nd}$ electric generator 175B, and a 3$^{rd}$ turbine stage group 174C drives a 3$^{rd}$ electric generator. The combustion products are then released to the atmosphere, preferably in a way that they are sucked out via Venturi effect when the aircraft is traveling at high airspeeds.

The compressor stages 162A-162C are driven by a shared electric compressor drive motor 164 via a shared shaft 163, the electric compressor drive motor 164 drawing energy from an aircraft electrical bus or from the electrical generators 175A-175C. On the turbine side, a generator shaft or stator mount 176 supports the electrical generators 175A-175C such that each generator will have a stator fixed to the stator mount 176 and a rotor, wherein the rotors of the electrical generators serve as the disks for the runners of the vanes of the turbine stages, such that the products of combustion drive the turbine stages 174A-174C for rotation, which thereby spins the generator rotors at high rotational velocities to generate electricity, which is fed directly to the fan module drive system or, alternatively, to an aircraft electrical bus that is also connected to the batteries, the fan module drive system, the front stabilizer 150, the ECU and other computers, and the drive motors (preferably worm gear drive motors for the majority) of all the moving parts of the aircraft.

As was shown in FIG. 13D, two compressed gaseous fuel cylinders 57 are connected to each other such that their internal pressures are the same, and the outlet of the shorter cylinder is connected to the combustor via the fuel injector 172. The Applicant is attempting to use the usually-high pressure of the gaseous fuel inside the cylinders to inherently pressurize the fuel inside the fuel injector 172, such that the fuel injector merely has to throttle the fuel gas at the point of injection. However, when the fuel level inside the cylinders 57 is low, the pressure inside them will not be high enough (i.e. over 9 atm), such that in such instances active pressurization must take place before injection.

The applicant has devised a simple and small fuel injector 172 that can be fit between the cylinder 57 and the combustor 171 that serves merely as an anti-backflow valve (and throttle) when cylinder pressure (fuel pressure) is high enough to charge the throttle valve, such as greater than 9 atm, and then kicks in as a fuel pressurization pump when the cylinder pressure (fuel pressure) drops below 9 atm, and does so in a way that is as simple and small as possible.

Turning to FIG. 13F, which is an expanded view of the fuel injector 172 of FIG. 13E. Gaseous fuel is meant to flow downwardly in FIG. 13F, through a fuel injector housing 172A that is basically cylindrical and elongated in the vertical direction. The fuel injector comprises a series of ball valves containing balls 182, 183, and 184, such that when the prevailing fuel pressure in the compressed gaseous fuel cylinders 57 is high, all of the balls 182-184 of the successive ball valves are in their lowed positions, which is what is seen in the regular operating configuration of FIG. 13F. The compressed gaseous fuel, after passing around the balls of the ball valves, enters a fuel injection needle valve 180, where it is controllably throttled, as a function of the desired fuel-to-air ratio and the pressure upstream of the needle valve 180, and/or closed off, by a needle 187.

The Applicant, in order to get through this as quickly as possible, is going to type this as if the reader were an expert in the mechanical arts and understands both needle valves and ball valves very well. The needle 187 of the needle valve can be driven upward and downward (as viewed in FIG. 13F) by being turned about its longitudinal axis by a rotary needle drive 188. The rotary needle drive 188 can be any type of electrical rotational drive, but is preferably a proportional one associated with an encoder wheel, which allows extremely precise control of the flow gap at the tip of the needle.

A threaded passive needle reciprocator 189 has been implemented, such that when the needle 187 is turned or twisted about its axis by the rotary needle dive 188, outer threads on the needle's intermediate extent, which are fixed for rotation with the needle, are driven vertically upwardly and downwardly by stationary inner threads that are connected to the housing somehow, and locked against rotation. When the needle 187 and the external threads on it rotate inside the stationary internal threads, the needle itself is also driven vertically upwardly and downwardly. Small angular displacements of the needle 187 by the rotary needle drive 188 thereby lead to minute vertical adjustments of the needle, and thereby extremely precise control of the fuel injection rate, which is important because the fuel is gaseous and at high pressure.

The gaseous fuel pressure inside the cylinders 57 will eventually drop below 9 atm and there will still be fuel to use. There is a need to pressurize the fuel such that it fills the fuel injection needle valve 180 at a useful pressure (such as above 9 atm since this is a possible lower limit for the incoming air pressure). If the air pressure inside the compressor is higher than the gaseous fuel pressure inside the needle valve 180, the flow of fuel into the combustor 171 will not only stop, but air will try to migrate through the needle valve 180 and upward through the injector housing 172A.

As a safety precaution, the lowest, 3$^{rd}$ ball 184, if the pressure downstream of it is higher than the pressure upstream of it, will rise to block the upward flow of air or air-fuel mixture into the fuel injector housing 172A. As a passive fuel pump or one-way valve, the balls 182-184 of the fuel injector 172 should stay in their lowered positions (as in FIG. 13F), but as an active fuel pump, the balls 182-184 serve a different purpose.

A push-pull solenoid 181 has been added around the valves but within an outward radial extension of housing 172A, and the 2$^{nd}$ ball valve (represented by the 2$^{nd}$ ball 183 within it), connected to it, shuttles up and down based upon the changing magnetic polarities of upper and lower stator magnet poles 185, which drive a yoke 186 up and down. The $2^{nd}$ ball valve, and $2^{nd}$ ball 183 within it, are fixed for reciprocation with the yoke 186, such that when the polarities of the poles 185 are flipped, the yoke 186, and the $2^{nd}$ ball valve nested concentrically within it, both shift from an uppermost position to a lowermost position, or vice versa. Looking at FIG. 13F, one can see that if the movable ball valve (represented by $2^{nd}$ ball 183 and yoke 186 and the elements accompanying them) was to quickly shuttle up, the $3^{rd}$ ball 184 would be sucked up against its lands, prohibiting backflow of fuel upward into the housing 172A, and the 1st ball 182 would be pushed up against its lands too, sealing off the inlet.

Meanwhile the space below $2^{nd}$ ball 183, the yoke 186 (the push-pull solenoid being hermetically sealed within the housing 172A), and the $2^{nd}$ valve elements will fill with the gaseous fuel that was above them before this maneuver, because $2^{nd}$ ball 183 is still separated from its lands (in its bottommost position). Now, when the polarities of the poles 185 are flipped again, the yoke and $2^{nd}$ ball valve rapidly shuttle downwardly, causing the $2^{nd}$ ball 183, via inertia, to get caught in its lands. This detaches $3^{rd}$ ball 184 from its lands (it drops in FIG. 13F) and the gaseous fuel in the space under the $2^{nd}$ ball and yoke and the $2^{nd}$ ball valve gets driven (analogous to a pneumatic piston) into the fuel injection needle valve 180. It is possible that at this state, if the fuel pressure in the cylinders 57 is very low, the $3^{rd}$ ball 184 will pop up into its lands to seal off the needle valve 180.

A pressure sensor inside the needle valve 180 can tell a controller the pressure inside the needle valve 180, which information can feed the controller with data that allow it to adjust the needle's drive algorithm. The frequency of reciprocation of the yoke/2nd ball valve at any given moment will depend upon the desired pressure within the needle valve 180, the pressure within the fuel cylinders 57, and the volume of the space between the upper and lower stator poles and the volume of the space between the 1st ball valve and the $2^{nd}$ valve.

So, to summarize FIG. 13F, a fuel injector 172 has been proposed that, when the gaseous fuel supply pressure is above a threshold, the gaseous fuel migrates automatically and without hindrance, while preventing backflow, to a fuel injection needle valve 180 for metering into the combustor 171. When the gaseous fuel supply pressure drops below said threshold, the fuel is pneumatically driven from the supply to the needle valve 180 by a plunger-like apparatus, electrically driven, that is in combination with a series of stationary and movable ball valves containing balls that seat on lands. Although this fuel injector may not in the end be preferred for accomplishing the fuel injection from a compressed gaseous fuel cylinder to a turbogenerator combustor, it serves as an adequate starting point for a prototype of the aircraft, because it fits in the space it needs to fit in, and because, as far as the Applicant can tell, it should work without problems by simply switching an electric voltage on it over and over again.

FIG. 14 is a schematic representation of a recharging station. As this application proposes an aircraft that could land on and take off from any flat surface, it follows that no explanation needs to be made for an airport or airfield for its utilization. However, the application has proposed removable wings that have rechargeable batteries in them, and these would be best utilized by having a designated apparatus or site for landing, swapping in fresh batteries/wings for spent batteries/wings, and then taking off again. Further, in the event that the aircraft is a hail-based ridesharing vehicle or other type of air taxi, this activity would best be performed between fares, while the aircraft has no passenger. In this case, recharging stations would be located around town, in unused or disused parking lots, on top of under-used parking garages, on top of gas stations or service stations or convenience stores, the list goes on.

So, the only absolute requirements seen by the Applicant for a recharging station are an electrical power supply, at least one charging rack for recharging the batteries, and at least one attendant or robot to move the wings between the wing pockets on the aircraft and the at least one charging rack. The preferred electrical power supply would be grid power, and it is presumed that this would be available just about anywhere, so anyone with a flat surface and some hardware could conceivably go into business as a recharging station. However, if the aircraft fleet were one that required gaseous fuel too, compressed gaseous (hydrogen) fuel could be trucked on site via tanks, and then one would need a way to connect the compressed gaseous fuel tanks to the charging rack such that the wings could be recharged with gaseous fuel at the same time they are being recharged with electricity.

The Applicant has devised a recharging station that provides both electricity from the electrical grid and pressurized gaseous hydrogen fuel from the municipal water supply, and that is the subject of FIG. 14. This reference foregoes reference numbers and its elements are simply labeled inside the drawing. The top-left-hand corner shows the grid power coming in at 240 V, from left to right, and the bottom-left-hand corner shows the municipal water supply coming in, at pressure, from left to right. The water first passes through a ultra-small-mesh-size solids filter, which will not be described. It then enters, after being pressurized by a pump (or not) a degasification module which removes chlorine and other gaseous molecules dissolved in the water. If needed, other molecules/additives could be removed here via other means, because the water passing into the electrolyzer needs to be almost 100% pure. From the degasification module the water is pumped into an electrolyzer module, which is well known to practitioners in the art and cannot be gone into here. The electrolyzer splits the water into its constituent atoms, hydrogen and oxygen, the only input to the electrolyzer being electrical energy. Electrical circuit lines are shown in FIG. 14 branching off from the main electrical line (top horizontal line) to power the water pumps, the water degasification module, and the water electrolyzer module.

The electrolyzer module has two outlets, one for gaseous $H_2$ and the other for gaseous $O_2$. Both are shown in FIG. 14 on the right-hand side of the electrolyzer leading out of it. The $O_2$ can be discarded (escape $O_2$), sold (salable $O_2$), combusted and fed to a turbine to create electrical energy (not labeled) in order to supplement the main electrical supply or another on-site electrical need, or, possibly, used in a carbon capture converter to remove $CO_2$ from the Earth's atmosphere. This will not be gone into here much because the Applicant is not a chemical engineer, but he hopes that someone of such background could devise one (because the $O_2$ should not be completely wasted if it cannot be sold—in fact, it is possible that there is someone out there that has invented, or will invent, a carbon capture method and the only thing holding it back is that it requires $O_2$ which is too expensive to justify the method) and he suspects it would involve a raw feed for base elements (Silicon, Sodium, Calcium, etc.—i.e. Group I or II elements from the periodic table, but provided in their cheapest form or molecular combination), another feed for $CO_2$ that has been isolated from the atmosphere, a $H_2$ intake, and possibly via the combination of heat and catalytic promotion, some form of powder, chalk, or brick could be formed in and extracted from the carbon capture converter of FIG. 14, such as for instance Calcium Carbonate, Sodium Carbonate, etc. The carbon capture converter has been a distraction and we'll get back to the battery/wing recharging station that is the main subject of FIG. 14.

Still referring to FIG. 14, the pure $H_2$, in gaseous form, is led out from the electrolyzer module and is pressurized by another pump/compressor and stored in a $H_2$ reservoir which can be drawn on by the charging rack. The charging rack is shown at the right-hand side of FIG. 14, and of four (shown) charging sockets, three currently have inner wings 51 in them, the $3^{rd}$ one currently being vacant.

The $H_2$ from the $H_2$ reservoir is pressurized to very high pressure and is split up into as many pipes as there are charging sockets in the rack. The electrical power line leads to a voltage multiplier circuit which converts the available voltage from 240 V to, for instance, 2000 V. The output line from the voltage multiplier circuit is split up into as many electrical wires as there are charging sockets. Thus can each socket of the charging rack have its own supply of electricity and Hz, such that when an inner wing 51 is pushed into a socket, its electrical leads would draw electricity from the electrical power supply terminals and a valve on the inner wing 51 would mate with a Hz pipe, which would have its own cutoff valve. In this way, we can potentially service aircrafts that require battery charging and Hz cannister recharging, without purchasing and/or transporting Hz from other sources. It is noted that a more advantageous version of this system would include using untreated freshwater, and would be near a source of untreated freshwater.

FIG. 15 is another side cross-sectional view like FIG. 1A but instead of showing the front stabilizer module, seat, splitter, etc., it shows proposed landing gear modules and a parachute module. The parachute module 92 preferably consists of a parachute seat and launch tube 95 behind the neck/head of the passenger, and angled rearwardly away from vertical somewhat. Inside the Parachute seat and launch tube 95 resides a parachute 93, folded up and wrapped with strings in the way that parachutes are, such that when deployed it encounters passing air and unfurls to save the aircraft from destruction when a component of the aircraft catastrophically fails.

The parachute 93 is forcibly deployed or launched by a pyrotechnic parachute ejection charge 94 which, when detonated (in response to a catastrophic fail signal from the controller or the pushing of a manual activation button or pulling of activation lever, etc., by the passenger, or a signal from a remote air traffic control officer) ejects the parachute 93 in the direction of the arrow extending upwardly out of the parachute seat and launch tube 95. Without saying much more about the parachute, Applicant will simply mention that it seems like this is a good location for it and that the launch direction of the arrow seems to be advantageous for its use. The parachute should be rated for the weight of the aircraft plus the weight of the heaviest potential passenger plus a safety tolerance. There could be more parachutes in addition to that shown, such as smaller parachutes with shorter strings ejected from both sides of the aircraft and/or from the top of the nose of the aircraft. It could also be preferable to put the parachute, or parachutes, somewhere else entirely.

FIG. 15 also shows landing gear including front landing gear 99A and rear landing gear 99B. They could each comprise multiple nested telescopic tubular elements, with the inner one having a foot at its bottom end for ground engagement, and a pneumatic supply such as via circuit 98 charged by a bypass duct from the front stabilizer 150 (the pneumatic supply for the rear landing gear 99B is left unspecified). During a landing, when pneumatic pressure is applied at the top of a landing gear pocket, the telescoping tubes would pop out in order that the feet of the multiple landing gear (four would be preferred but three suffice) reach the ground before the bottom of the aircraft, and the air that was used to push out the landing gear would then serve as a cushion, allowing a soft touchdown where, hopefully, the aircraft would end up low to the ground but not touching the ground.

FIG. 15 shows the front stabilizer intake flaps 153 opened up all the way since this was mentioned previously but never drawn, and now, since we are showing a landing (downward arrows indicate that the landing gear are about to deploy), we might as well show the intake flaps 153 opened up all the way since this is how they probably should be during landing, as well as during liftoff.

FIG. 16 is a spreadsheet developed by the Applicant to ballpark how much power is required of the fan module, and how it arrives at said power, such that different masses of different drive system trials are compared each other, and different electrical voltages provided to the drive systems are compared with each other. The Applicant created this spreadsheet such that if certain weights/masses of hypothetical magnetized elements were manually plugged into it, and also if certain hypothetical voltages were (manually entered) applied to it via the power supply, the spreadsheet would generate data useful to someone pondering the creation of a prototype of the aircraft (wherein, obviously, the passenger is not present but the aircraft airframe is constructed of aluminum or a material that is not the foreseen ultra-lightweight materials that would be appropriate and in the end, the only alternative.

The result of the returns in the spreadsheet of FIG. 16 seems to be that increasing the voltage applied to the fan module is much more effective than increasing the mass of its magnetized elements, but perhaps this is only the case when the magnetized elements are permanent magnets. Without further data to draw a conclusion, the Applicant presumes that when permanent magnets are used for the preferred embodiment, extremely-high voltage should be applied, thereby cutting down greatly the weight/mass of permanent magnets (and thereby the overall weight/mass of the aircraft), but when the fan module can be fabricated using magnetic elements that are not permanent magnets, it is possible that super-high voltage could still be useful, but that this is not necessary to cutting the overall weight/mass of the aircraft by the desired amount, and is perhaps not preferred, since lower-voltage batteries might have a higher life-to-mass ratio than higher-voltage batteries, and also they might entail less problems or increased longevity.

Turning During Fixed-Wing Flight Mode

Before moving on to other embodiments, the protocol for turning the aircraft needs to be addressed. Turning the aircraft while it is in fixed-wing flight mode, both at low speeds and at high speeds, can be performed in the traditional manner, by using the wing trailing edges 54 (FIG. 4G) and the vertical stabilizers 61A and 61C (FIG. 1A). Specifically, the wing trailing edges would pivot to be used as ailerons (one pivoted up while the other is pivoted down) and the vertical stabilizers would serve as rudders (both pivot in the same direction).

Another possibility would be to use the front stabilizer 150 (FIGS. 1A and 11A-11C) and the stabilators 61B and 61D (FIG. 1B) to roll the aircraft, and this has actually already been detailed during the description of the rear stabilizer 80 with reference to FIGS. 12A-12F. In short, there are many ways to roll the aircraft (stabilators, wing trailing edges, front stabilizer, and a rear stabilizer too), so any combination of them can be used, so long as they are pushing the aircraft downwardly on one side and pushing the aircraft upwardly on the other side. And in addition to using the vertical stabilizers 61A and 61C, the front stabilizer 150 can also push the nose of the aircraft to the right and left to yaw the aircraft. With all these tools in hand, anyone of ordinary sill in the art can understand how the aircraft has many different potential modes of executing a turn without adding any dedicated elements to the aircraft.

Flight Chronology

A typical flight begins when the passenger has seated her/himself in the seat (this particular summary of flight chronology will not use reference numerals) and personal restraints have been activated, and a "go" signal has been registered by the aircraft's controller. The fan module and front stabilizer then spin up to their maximum rotational velocities with their intakes hermetically sealed, such that they spin up to their max rotational velocities in a relative vacuum, and then the intakes (both forward-facing and rearward-facing) of said fan module open, such that massive thrust begins to be ejected downwardly from a position underneath the center of gravity of the aircraft.

A fan module exhaust duct then blasts air downwardly at a powerful downward vector such that the aircraft lifts off from the ground, while said front stabilizer's intakes are now opened and its outlet valves are operative such that the aircraft actively and purposefully asserts itself into the most advantageous airborne (yet rising) orientation via outbursts from said front stabilizer.

Said aircraft rises for a few seconds under the influence of fan module downward exhaust, with the front stabilizer (and probably also a rear stabilizer) controlling the pitch, yaw, and roll of the aircraft, and the aircraft is now preferably yawed/pivoted by said front stabilizer module (sideward thrust) to aim the aircraft toward the heading/direction of the final destination of the flight/hop.

Once all vertical obstacles (trees, high-rise buildings, etc.) have been cleared, elevation-wise, or even before that, the splitter module angles the downward thrust to be between 30° and 60° relative to a completely-downward (0°) direction, and preferably between 40° and 46° relative to said completely-downward (0°) direction, such that said aircraft begins to accelerate toward said flight destination (if a complete pivoting toward the destination was not accomplished previous to this, said pivoting toward said destination will continue to take place once the aircraft has attained a higher airspeed and then it will cease with possible counter-accelerations provided by said front stabilizer). The aircraft will then accelerate toward said flight destination at at least approximately 20 mph/s until the aircraft reaches 300 mph or higher airspeed. The aircraft will then cruise at a cruise airspeed of 300 mph or greater, directly toward said destination, wherein an airspeed of 300 mph traverses five miles per minute and an airspeed of 600 mph traverses ten miles per minute.

The aircraft will execute turns during its various fixed-wing modes of flight via rolling, pitching, and yawing said aircraft via means discussed elsewhere herein. The aircraft then approaches a landing site from far away, power to the electrically powered fan module is reduced or cut off, and the aircraft naturally slows down. The naturally occurring slowdown of the aircraft means that lift cannot be maintained at some point, and the wings slowly extend out to their outward position as a function of airspeed. Then, when the wings are fulfilling a minimal lift at (i.e. under 100 mph airspeed) a slow airspeed, they are completely retracted and the aircraft pivots its stabilators and vertical stabilizers toward each other, to create a large passive air drag. Then, when the aircraft is almost over its landing spot, having been slowed by passive means so far, a thrust reversal thrust is ejected forwardly from said aircraft to horizontally stop it (on a dime) directly over its intended landing site, preferably at a point only a hundred or so feet above said intended landing site.

FIG. 17 shows a proposed, or possibly necessary, interpolation or interposition of the fan module of FIG. 18C into the overall system of the invention of US 20220363378 A1 and this is currently viewed by the Applicant as a better system (the combination of FIG. 17 of the present application) than the way it was proposed in US 20220363378 A1. FIG. 17 should be retrofitted into the figures of the prior publication and any modifications that need to be made in order to do this, should be made because the improvements to the fan module that the Applicant has invented since the prior application was filed are real and probably extremely effective at increasing capabilities and reducing complexities.

The only things labeled in FIG. 17 are the 1$^{st}$ fan stage 101, the 2$^{nd}$ fan stage 102, the 3$^{rd}$ fan stage 103, a main intake 16, a pre-swirler 17, and an extended fan drive 18. The fundamentals of the fan module and its drive system can be deduced by anyone of ordinary skill in the art from FIGS. 18C and 18D.

Inspired by FIG. 2E from US 20220363378 A1, as was the fan module of the present application, when the combined system of FIG. 17 of the present application is used, FIGS. 1E-2A and 3 of US 20220363378 A1 are superseded, wherein the fan module from FIGS. 18C-18D of the present application should be retrofitted in for the 1$^{st}$ impeller module 100 of FIGS. 1A-1B of US 20220363378 A1, and further wherein the 2$^{nd}$ impeller module of FIGS. 5C-5F of US 20220363378 A1 should also be retrofitted in for 2$^{nd}$ impeller module 200 of FIGS. 1A-1B of US 20220363378 A1, which has been labeled rear fan/impeller system 19 in FIG. 17. The resulting patchwork version of FIG. 1A of US 20220363378 A1 has been redrawn as FIG. 17 of the present application, and further discussion will not be had herein, because FIG. 17 only makes sense when looked at from the point of view of US 20220363378 A1 and it can only make sense to someone who has read that document—that person, if of reasonable experience in the relevant arts, would see FIG. 17 of this application for what it is and would understand how to make and use it.

2$^{nd}$ Embodiment

Turning now to FIGS. 18A-18G which jointly illustrate a 2$^{nd}$ embodiment of the fan module and its manifestation in or on a small commercial airliner or private jet.

FIG. 18A depicts a top view of a small-to-moderate sized commercial aircraft from the top looking down, the commercial aircraft having attached to the rear fuselage portion on both the left- and right-hand sides a fan module 200 that is a 2$^{nd}$ embodiment of the fan module, similar to the 1$^{st}$ embodiment 100 but without a flywheel and with a more powerful drive system.

FIG. 18B is a left-hand-side view of the small-to-moderate sized commercial aircraft from FIG. 18A. The left-hand-side view shows the longitudinal position and vertical elevation of the left-hand-side fan module 200 relative to the aircraft it is attached to. FIGS. 18A and 18B will be discussed simultaneously.

As shown in FIGS. 18A-18B, the Applicant has chosen to depict the small-to-moderate sized commercial aircraft as a private jet, but or course it could be any aircraft with a long hollow fuselage and could seat anywhere from four to two hundred people, or thousands of pounds of inanimate cargo. The airframe is labeled as 220 and fan modules 200 could be attached to the vertical stabilizer or to the wings, but they are shown in the typical spot private jets usually have them. Instead of showing the nacelles' complete solid structure and the pylons which attach the nacelles to the fuselage, in FIGS. 18A-18B the Applicant has decided to show the fan modules divested of support structure, in order to depict only the functioning elements and, particularly, to show the aircraft as the oncoming air sees it, with hollow fan modules 200 that let air pass through them unobstructed, in a way that greatly reduces drag especially when one of the fan modules 200 is shut down for single-fan drive, discussed later.

Other than that, FIGS. 18A and 18B show the well-known outer features of an aircraft: wings, winglets, flaps, ailerons, fuselage, nose, cockpit window, door, passenger windows, vertical stabilizer, horizontal stabilizers, rudder, and elevators. In short, this time the Applicant is leaving well alone the structure of a traditional aircraft, and is making no attempts to create a new aircraft or claim anything new about any aircraft. This portion of the application, the 2$^{nd}$ fan module embodiment particularly, is solely concerned with the fan module 200 of the 2$^{nd}$ embodiment and its drive system.

So, speaking of said 2$^{nd}$ embodiment fan module 200, FIG. 18C is a side (or top) cross-sectional view through the 2$^{nd}$ embodiment of the fan module 200 from FIGS. 18A and 18B showing 1$^{st}$-3$^{rd}$ diagonal fan stages 201, 202, and 203 each being separately driven by concentric rotors (not labeled) which are in turn driven by magnetic interplay between the rotors and a set of concentric stators (not labeled). FIG. 18C can be compared with FIG. 3A for comparison between the 1$^{st}$ fan module 100 and 2$^{nd}$ fan module 200 (although FIG. 3C moves air from right to left and FIG. 18C moves air from left to right). Anything that is needed for functionality but not shown or labeled in FIG. 18C can be found in FIGS. 3A-3G. The Applicant does not feel the need to redraw or redescribe all of the elements for the 2$^{nd}$ embodiment since they have all been described in a way that they can be applied to FIG. 18C (from FIGS. 3A-3G) via modification that requires no more than an ordinary skill in the art.

Now for the aspects of the 2$^{nd}$ fan module 200 (2$^{nd}$ embodiment) that are different from the 1$^{st}$ fan module 100 (1$^{st}$ embodiment). FIG. 18C further shows a nacelle 208 surrounding the fan module to protect it from the environment and give it an aerodynamic shape and smooth outer surface. Starting with the front (left-hand side in FIG. 18C or flight-direction-facing) of the 2$^{nd}$ fan module 200, the 2$^{nd}$ embodiment comprises a pre-swirler 213 in front (upstream) of the intake to the 1$^{st}$ fan stage 201. This type of aircraft is designed to travel of airspeeds greater than 500 mph and it doesn't do any good to have the air entering the fan module 200, from left-to-right in FIG. 18C, at such a great velocity (in the frame of reference of the fan module). We are trying to twist the air about the rotational axis of the fan module as much as and as many times as we can before letting it exit the fan module, so the incoming air's axial velocity, whose absolute value is the aircraft's airspeed, needs to be brought much closer to 0-200 mph relative to the frame of reference of the fan module 200 (which in this frame is traveling axially at 0 mph).

So, in order to reduce the incoming air's axial velocity in the frame of reference of the fan module (per FIG. 18C), an annular pre-swirler 213 is placed in a position such that all incoming intake air must pass through it before entering the 1$^{st}$ diagonal fan 201. The pre-swirler was discussed in detail in US 20220363378 A1 which has been invoked by reference herein, so the description herein will be brief. Basically, the pre-swirler 213 has an annular bank of arcuate guide vanes that accept the intake air axially and then scoop it around, every vane to the same extent and in the same direction, to have a moderately- or mostly-tangential velocity. This way the air is already swirling or spinning around the fan module's axis of rotation when it encounters the leading edges of the 1$^{st}$ fan stage (shown at the left-hand side of FIG. 18D, not yet discussed). It is swirling with a tangential velocity (i.e. ⅔ the airspeed) of hundreds of mph so the 1st fan stage can be driven up to an augmented rotational velocity higher than during lower airspeeds. This way the airflow entering the fan module never slows down, it is only deflected and then the fan module immediately begins to work on it.

In the 1$^{st}$ embodiment, the 1$^{st}$ fan module exhaust was captured in a fan exhaust volute 31 and then routed to its intended destination, and this is also the case for the 2 nd embodiment. As shown in FIG. 18C, a slightly different style of fan module exhaust volute 204 resides behind the 3$^{rd}$ fan stage 203. It has a front-facing slit that lines up with the exhaust end of the 3$^{rd}$ fan stage 203, but the volute body itself does not expand radially inward like the 1$^{st}$ embodiment, nor does it expand radially outward like the standard volutes of conventional centrifugal compressors. It expands radially rearward, such that in the bottom annular cross section at the bottom of FIG. 18C, it is much narrower than at the top of FIG. 18C. This is because in FIG. 18C, the fan module exhaust volute 204 has only been collecting air from the 3$^{rd}$ fan stage 203 for 180° of the route from top, around, under, around again, and back to the top where it is split off. At the top, at 360° of the route expressed in the last sentence, it is at its broadest extent and ready to be split off into another duct.

To assist with understanding a reader to conceptualizing the geometry of the fan module exhaust volute 204, we should just move on to FIG. 18F, which has been placed near FIG. 18C for this reason. FIG. 18F is a rear view that should be considered in conjunction with FIG. 18B, looking at the small-to-moderate sized commercial aircraft airframe 220 and its fan modules 200 from behind, in a forward direction, in order to show how the fan modules 200 can be affixed to the fuselage via a dual-pylon configuration.

Continuing with the discussion of FIG. 18F, but keeping in mind the fan module exhaust volute 204 from FIG. 18C. The airframe 220 has at least one horizontal pylon 209 on each side of it, extending from preferably the top dorsal area of the airframe, substantially horizontally outward, to the nacelles 208 of the fan module 200 (not shown in FIG. 18F). Importantly, the fan module exhaust volutes 204 of both the right-hand and left-hand fan modules (inside nacelles), after wrapping around the drive system of their respective fan modules, have a duct 206 (FIG. 19A) that splits off and travels inside the horizontal pylon 209. If this is confusing, a quick glance at FIG. 19A should be had at this moment.

So, referring simultaneously to FIGS. 18C and 18F, the volute 204 has basically no breadth where it begins under the pylon 209 (this can't be shown in the drawings), and it gradually widens as it wraps around the fan module, in order to handle the accumulating air inside it, until, where it comes near the pylon 209, a duct (206 in FIG. 19A) splits the volute airflow tangentially off such that the air is fed from the volute 204 to the in-pylon duct 206 in a continuous stream at very high velocity, wherein the duct 206 is inside of the pylon 209, which is relatively hollow. In other words, the fan module is twisting air round and round until at some point the air is streamed tangentially out of the system, laterally, toward the aircraft, inside the horizontal pylon 209. Each fan module (represented by nacelles 220) in FIG. 18F is spinning in an opposite rotational direction to the other, so that in FIG. 18F, it is hopefully easy for the reader to imagine this happening, as if the horizontal pylons are gun barrels aimed at each other. This discussion will pause because it will be much easier to continue it once FIGS. 19A-19C have been properly introduced.

A major difference between the $1^{st}$ embodiment's $1^{st}$ fan module 100 and the 2 nd embodiment's $2^{nd}$ fan module 200 is that in the latter, as shown in FIG. 18C, there is no boundary limiting the depth to which the fan drive system (nested concentric rotors and stators, as in FIG. 3A). Well, we certainly need more power than we needed in the 1st embodiment, so of course these $2^{nd}$ embodiment fan modules 200 will have a larger diameter than the $1^{st}$ embodiment fan module 100. But to get more power without making them too wide/tall, we are free to make every stator and rotor as lengthy as we wish to, and this has been done by the Applicant on the right-hand side of FIG. 18C, where a fan module drive system 205 is shown extending rearwardly from the fan stages 201-203, through the annular fan module exhaust volute 204, and even further rearward, and the Applicant has drawn the inner rotors/stators more extensive than the outer ones, such that the nacelle can be given an inwardly tapered shape that creates the least amount of turbulence, and thus, wind resistance, possible. It does not seem a stretch to think that the $2^{nd}$ fan module 200, if it had the same diameter as the $1^{st}$ fan module 100 from the first embodiment, would be significantly more powerful than the $1^{st}$ fan module 100. Not only that, there would be two of them (one on each side). The $1^{st}$ embodiment needed a thrust-to-weight ratio (weight being weight of the aircraft) of 1.5, while the $2^{nd}$ embodiment needs nothing near this amount, perhaps even an order of magnitude less, such that with the extended fan module drive system 205 in the $2^{nd}$ fan modules 200, and the fact that there are now two of them instead of one, it is possible that the very simple, inexpensive fan module, which is the main invention of this application, does not even need to be scaled up (larger diameter) much to serve as a propulsion source for a 20-passenger aircraft. However, scaling up the power of the $2^{nd}$ fan module 200 can be accomplished by a) increasing its length and therefore the number of magnetized elements, b) increasing its diameter and therefore the number of magnetized elements as well as the torque on the air flow, and/or c) increasing the voltage on the rotors. These should all be considered obvious to one of ordinary skill in the art.

Let's stop now and look instead at FIG. 18D in detail. It is basically a repeat of FIG. 2B, but has been provided to complement FIG. 18C so that one can picture the fan stage vanes of the fan stages 201-203 disembodied from the drive system and nacelle. Again, the 2 nd fan module 202 spins almost twice as fast as the $1^{st}$ fan module 201 (it's different this time because of the pre-swirler 213, but we won't go into that) and the $3^{rd}$ fan module 203 spins at almost three times the rotational velocity of the $1^{st}$ fan stage 201. The air comes out almost completely tangentially into the fan module exhaust volute 204, and that's how FIG. 18D connects to FIG. 18C, wherein FIG. 18C treated the fan stages 201-203 almost entirely as transparent, while FIG. 18D only has the nacelle 208 and the outer walls of the fan stages transparent.

One very important aspect of the $2^{nd}$ embodiment requires us to focus momentarily on the very front end of the $2^{nd}$ fan module 200 of FIGS. 18A-18C, where in FIG. 18C the Applicant has drawn a fan module intake 212. The inner wall of the fan module intake 212 is cylindrical and shared with the rest of the fan module. The outer wall of the fan module intake 212 is frusto-conical and meets the inner wall at the very front edge of the fan module/nacelle. The outer wall of the fan module intake is not a solid wall but is actually intermittently constructed by an array of pivoting doors 211, which in FIG. 18C are shown in their open positions. Each door 211 pivots around a hinge on its side, the hinge being connected to an inner framework, such that when the doors 211 are closed, the outer wall of the frusto-conical structure becomes a flat, frusto-conical surface, but when the doors 211 are opened, they flare directly outwardly from the structure (radially outward away from the fan module intake 212, such that air can pass into the fan module intake 212 and thence into the pre-swirler 213—and since the doors 211 are substantially flat and parallel to the flight direction, the air passes along/across them without turbulence when they are opened.

The reason the doors 211 are provided, in combination with such a fan module intake 212, is to enhance the aircraft's capability to shut down one of the fan modules during cruise flight. Most twin engine aircraft keep both engines running during the whole flight for various reasons, such as: a) if an engine is shut down it might not start back up, b) if an engine is shut down, it creates a huge drag on the aircraft due to wind resistance, and worse, it drags only one side of the aircraft, such that the rudder must be pitched to offset it, and c) the torque of the active engine will yaw the aircraft, again requiring that the rudder be pitched even more to offset it. Our fan modules 200 are electrically driven, so there is no issue of them not restarting, and our fan modules are hollow, so if one is shut down, the incoming air just passes through the hollow core.

The doors are not necessary; a fan could be shut down in the present embodiment and since it is hollow it still would not have such deleterious effects as a shut-down prior-art turbofan, but with the doors providing the capability to close the fan module intake in such a way that the nacelle 208 has an extremely sleek and aerodynamic profile, the intention is to shut down a fan for a good duration of every flight, to save energy during cruise, and for the shut-down fan module's aerodynamic effects on the passing air almost nonexistent. And, so that a shut-down fan module does not end up with the other fan module's torque about the cg yawing the aircraft in a way that requires inefficient positioning of the rudders, the outlets of the thrust ducts 206 that conduct the air from the fan module out the back of the aircraft have been placed very close together, near the center of the back of the fuselage, as will be shown in FIG. 19A.

This is a good time to bring in FIGS. 19A-19C which jointly illustrate the small-to-moderate sized commercial aircraft with $2^{nd}$ embodiment fan modules 200 attached to the sides of the rear of the fuselage, wherein unlike FIGS. 18A-18B the nacelles 208 and fan modules are not transparent to show internal parts, but the pylons 209 are transparent to show the ducts 206 and 207 for routing the fan module exhaust rearwardly (FIG. 19C) for main thrust and forwardly for reversed thrust (FIG. 19B). It also shows how the two, oppositely positioned, rear (main) thrust ducts 206 have their respective outlets very close to the center plane of the aircraft, such that one of the fan modules 200 can be shut down to conserve energy without adversely yawing the aircraft as a result.

So, as shown in FIG. 19A, the fan modules 200 are not shown because they are in their nacelles 208, which shouldn't need to be discussed or labeled. FIG. 19A is about what happens to the fan module exhaust after it exits the fan module. As discussed before, this air travels in an annular duct called the fan module exhaust volute 204, part of which has been shown in FIG. 19A, specifically the part of it where it is grown to full breadth and where it meets the rear (main) thrust duct 206 and/or the reverse thrust duct 207. In FIG. 19A, focusing on the right-side fan module which has been labeled, the air is traveling up into the page at the very outermost (upmost in FIG. 19A) segment of the fan module exhaust volute 204 and then after a bit (a little lower in FIG. 19A) it is traveling down along the page toward the aircraft.

Both the rear (main) thrust duct 206 and the reverse thrust duct 207 reside within the horizontal pylon 209. During almost every minute of a flight, a flap blocks flow to the reverse thrust duct 207 such that all passing from the fan module exhaust volute 204 passes into and along the rear (main) thrust duct 206 and is ejected for main thrust 210. So, that's about it; we have simply taken the fan module concept of the present application, attached it to a regular old aircraft, and configured it to take in incoming air during high-speed travel, linearly accelerate the air around a helical line (really a curve), and when the air tangentially leaves the fan module at extremely high speed and thrust, which seems to be the only way to harness the power of the air spinning inside such a fan system, we pass it into a conduit and bend the conduit so that it sends the air out the back of the aircraft. The applicant could say a lot more, but FIG. 19A really wraps this up. And since the 2$^{nd}$ embodiment hasn't been thought about much by the Applicant, it seems that anything more that he could type would probably be going in a useless tangent or toward a dead-end. We have arrived at a useful embodiment that has industrial applicability and has been explained in such a way that it can be understood by any practitioner in the art, so a few more things and we will end this.

FIG. 19B shows a close-up of the ducting system from FIG. 19A wherein a thrust reverser pivoting flap 215B has pivoted to a position such that the air coming from the fan exhaust volute 204 is curved through an arcuate duct 207 to be ejected forwardly, in the flight direction, for thrust reversal thrust 210B, to brake the aircraft after touchdown and perhaps to help taxi the aircraft before takeoff. FIG. 19C shows the thrust reverser pivoting flap 215B back in its normal operating position wherein air coming from the fan exhaust volute 204 is curved through an arcuate duct 206 to be ejected rearwardly, in a direction opposite to the flight direction, to create main thrust 210A.

3$^{rd}$ Embodiment

FIGS. 20A-20B show the disembodied soul of the essential element of the present invention, meaning that if one were to remove the fan module 100 or 200 (the soul or essence) from the "body" it is pushing through the air (the airframe 1, the underlying supports for the airframe, the cargo, the underlying supports for the cargo, the fuselage and empennage, the power supply supports and connections, etc.), it could simply, with various modifications that will not be gone in depth into herein, fly itself around using stabilizers and/or control surfaces (not shown).

FIG. 20A shows a side cross section that is transparent to various elements in order to show the fans, fan module drive system, and the shapes of the nacelle outer profile and inner wall. Their respective shapes should cooperate to create lift at high airspeeds. Similarly, FIG. 20B shows a top cross section also transparent to various elements in order to show the fans, fan module drive system, and the shapes of the nacelle outer profile and inner wall. Their respective shapes do not cooperate to create a force in any direction.

So what the system of FIGS. 20A-20B show is, of course, a 3$^{rd}$ embodiment for implementation by the fan module species (those already disclosed herein as well as hybrids or offshoots of them) that was the primary subject of the 1$^{st}$ and 2 nd embodiments. The fan module exhaust volute in FIGS. 20A-20B could be of any type and could have rearward exhausts bending around to rearward at any point and accelerating the aircraft to ungodly extreme speeds—since there is basically no load or payload, the accelerations and top speeds will be intense. The blank space (in FIGS. 20A-20B) behind (to the right-hand side of) the fan modules of FIGS. 2A-20B should probably be mostly filled with batteries. The area labeled "payload" is shown as an annulus in FIGS. 20A-20B but could simply be a box for the placement of an organ transplant cooler or some other exorbitant small item (such as a signed document or lost wallet) that must reach its destination in an extremely short amount of time.

The 3$^{rd}$ embodiment of the fan module, as partially shown in FIGS. 20A-20B, can also levitate, take off, move around wantonly, land, and/or do what it wants, if it is provided with adequate thrust ducts that split or separate the tangentially flowing fan exhaust and tangentially flowing airstream within the fan exhaust volute(s) or at some other zone of the "aircraft", and point the thrust(s) where it/they is/are needed for any prescribed action. It is noted that since a single flywheel probably cannot be located concentric within the fan module's inner radius, it is not omitted but perhaps it, or plural flywheels, is/are located in other useful locations to negate the incipient Coriolis forces of the fan module shown in FIGS. 20A-20B, to include original embodiments wherein one small counterrotating flywheel is in front of the fan module, and another is behind it, relative to the flight direction. This is shown but not labeled in FIGS. 20A-20B.

Referring back to FIGS. 18E and 18G, an embodiment is therein exhibited for utilizing compressed gaseous fuel for an electrical supply for the fan modules (using a generator). FIG. 18E shows a bank of gaseous fuel supply cylinders 222, each preferably housed between most adjacent spars of both aircraft wings. The embodiment of FIGS. 18E and 18G also contains removable battery cartridges 221 that can be inserted into and removed from a lower portion of the aircraft, while 221 in FIG. 18G represents the extraction (extraction direction shown via the arrow at the bottom) from the aircraft of a longitudinally insertable battery pack or monolithic battery supported by a battery frame, with 221 representing the extractable battery module and the arrow in FIG. 18G representing the extraction vector, of which the battery insertion vector is an opposite.

FIGS. 18E and 18G, and thereby ref. #'s 223-225, partially illustrate an internal combustion engine of the piston type, wherein the pistons 223 are sequentially yet simultaneously driven, and wherein all of the pistons 223 drive a set of rods 225 that have grooves cut into them to make them effectively racks, such that when the pistons 223 reciprocate in a sequence, the rods/racks 225 reciprocate with the pistons 223, thereby rotating pinions that are integrally (or via a normal transmission or a reversible planetary transmission) locked for rotation with, and drive, piston-driven electrical generators 224. This feature is advantageous but the Applicant does not have time to draw it or describe it, because time constraints are currently overwhelming him to file this application. But the world should by now understand that since the Applicant has devised all these systems and therefore he is only stopping in order to be able to file a patent application, he could have invented anything in continuation of the gist of the embodiments of the present application, if he had had the time.

What is claimed by the applicant is:

1. An aircraft comprising an electrically powered fan module, said aircraft further comprising a longitudinal forward flight direction and a longitudinal rearward direction parallel to said longitudinal forward flight direction and opposite to said longitudinal forward flight direction, said aircraft further comprising a vertical downward direction that is orthogonal to said longitudinal forward flight direction and a vertical upward direction that is also orthogonal to said longitudinal forward flight direction and opposite to said downward direction; said aircraft being configured to be forwardly propelled toward said longitudinal forward flight direction by at least one longitudinal rearward thrust ejected from said aircraft substantially toward said longitudinal rearward direction, wherein;

said electrically powered fan module impels an exhaust air, wherein said electrically powered fan module comprises a rotational axis and an axial direction parallel to said rotational axis said electrically powered fan module expels said exhaust air into at least one air duct that conducts said exhaust air away from said electrically powered fan module substantially along a tangential direction;

wherein said electrically powered fan module comprises at least two fan stages in series flow, said at least two fan stages in series flow including a first fan stage capable of a first fan stage rotational velocity and a second fan stage capable of a second fan stage rotational velocity, wherein said first fan stage feeds air to said second fan stage, and wherein said second fan stage rotational velocity is greater than said first fan stage rotational velocity;

the first fan stage comprising a first diagonal fan having an outlet diameter greater than an inlet diameter, and the second fan stage comprising a second diagonal fan having an outlet diameter greater than an inlet diameter, and the inlet diameter of the second diagonal fan approximately equal to the outlet diameter of the first diagonal fan, wherein the first diagonal fan and second diagonal fan each have a plane of rotation and are each configured to impel exhaust air in a direction tangent to the plane of rotation, and both of the first diagonal fan and second diagonal fan are configured to increase an air speed between inlet and outlet;

wherein said second diagonal fan is placed coaxial with and adjacent to said first diagonal fan such that air passes through said first diagonal fan to said second diagonal fan and then through said second diagonal fan along a helical path; and wherein the first and stage and second fan stage are placed end-to-end with the outlet of the first fan stage adjacent to the inlet of the second fan stage.

2. The aircraft of claim 1, wherein said electrically powered fan module comprises at least two fan stages in series flow, said at least two fan stages in series flow including at least the first fan stage spinning at a first fan stage rotational velocity and the second fan stage spinning at a second fan stage rotational velocity, wherein said first fan stage feeds air to said second fan stage, and wherein a ratio of said second fan stage rotational velocity to said first fan stage rotational velocity is greater than 1.5; wherein said electrically powered fan module expels fan module exhaust air into said at least one air duct or into an air duct system that conducts said exhaust air away from said electrically powered fan module and ejects said exhaust air out of said aircraft for thrust to accelerate said aircraft toward said longitudinal forward flight direction, or toward said upward direction, or simultaneously toward both said forward direction and said upward direction, or toward said longitudinal rearward direction.

3. The aircraft of claim 1, further comprising a third fan stage spinning at a third fan stage rotational velocity, wherein said second fan stage feeds air to said third fan stage, wherein a ratio of said third fan stage rotational velocity to said first fan stage rotational velocity is greater than 2.2.

4. The aircraft of claim 1, wherein said air duct either;

a) ejects said air directly downwardly along said downward direction to accelerate said aircraft in said upward direction, or b) leads to a splitter module that ejects said air directly downwardly along said downward direction to accelerate said aircraft in said upward direction.

5. The aircraft of claim 1, wherein said air duct leads to a splitter module that ejects said air directly downwardly along said downward direction to accelerate said aircraft upward toward said upward direction, and said splitter module can be manipulated to eject air rearwardly along said longitudinal rearward direction to create said at least one longitudinal rearward thrust to accelerate said aircraft toward said longitudinal forward flight direction.

6. The aircraft of claim 1, wherein said air duct leads to a splitter module that ejects said air directly downwardly along said downward direction, at 0° relative to said vertical downward direction, to accelerate said aircraft upward toward said upward direction, and said splitter module can be manipulated to eject air downwardly at a non-vertical 1st angle, said non-vertical 1st angle being between said downward direction, 0° from said downward direction, and said longitudinal rearward direction, 90° from said downward direction, to accelerate said aircraft upward in a direction along an oblique non-vertical 2nd angle.

7. The aircraft of claim 1, wherein said electrically powered fan module comprises at least one fan stage including the first fan stage spinning in a first fan stage rotational direction, and wherein at least one of said aircraft and said electrically powered fan module comprises at least one flywheel module spinning in a flywheel module rotational direction that is opposite to said first fan stage rotational direction, wherein said first fan stage has a first fan stage axis of rotation and said flywheel module has a flywheel module axis of rotation wherein said first fan stage axis of rotation is also said flywheel module axis of rotation.

8. The aircraft of claim 7, wherein said electrically powered fan module has a hollow portion and said flywheel module resides within said hollow portion.

9. The aircraft of claim 7, wherein said electrically powered fan module comprises at least two fan stages including the second fan stage spinning in a second fan stage rotational direction about said first fan stage axis, wherein said second fan stage rotational direction is the same as said first fan stage rotational direction and opposite to said flywheel module rotational direction.

10. The aircraft of claim 1, wherein said electrically powered fan module comprises at least one fan stage including the first fan stage that is a diagonal fan stage having a large hollow central portion; wherein said electrically powered fan module further comprises a spinning first drive rotor to drive said first fan stage, wherein said first drive rotor is located within said large hollow central portion of said first fan stage and fixed for rotation with said first fan stage to form a unitary spinning body, wherein said first drive rotor also comprises a hollow center, such that said unitary spinning body spins about said hollow center of said first drive rotor in a shaftless manner.

11. The aircraft of claim 1, wherein at least one of said first and second fan stages is levitated by active magnetic radial bearings and said at least one of said two fan stages spins at a rotational velocity of more than 40,000 revolutions per minute.

12. The aircraft of claim 1, wherein said aircraft has a front end and a rear end according to said longitudinal forward flight direction and said longitudinal rearward direction, and wherein said front end comprises a front stabilizer that can emit bursts or streams of stabilizing air to control the orientation of the aircraft, wherein said bursts or streams of stabilizing air are emitted by the front stabilizer in multiple directions including at least one of said downward direction and said upward direction.

13. The aircraft of claim 1, wherein said air duct leads to a splitter module that ejects said air substantially rearwardly along said longitudinal rearward direction to accelerate said aircraft forward toward said longitudinal forward flight direction, and said splitter module can be manipulated to eject air forwardly at an angle of 35° or less from said longitudinal forward flight direction, to decelerate said aircraft relative to said longitudinal forward flight direction.

14. The aircraft of claim 1 wherein said electrically powered fan module expels fan module exhaust air at an area that is substantially at a center of mass of the aircraft for thrust to accelerate said aircraft toward said upward direction.

15. The aircraft of claim 1 further comprising:

a first annular electromagnet rotor coaxial with the first diagonal fan and second diagonal fan; and a first annular stator bank of permanent magnets coaxial with the first annular electromagnet rotor.

16. An aircraft comprising an electrically powered fan module, said aircraft further comprising a longitudinal forward flight direction and a longitudinal rearward direction parallel to said longitudinal forward flight direction and opposite to said longitudinal forward flight direction, said aircraft further comprising a vertical downward direction that is orthogonal to said longitudinal forward flight direction and toward the Earth and a vertical upward direction that is also orthogonal to said longitudinal forward flight direction and opposite to said downward direction; said aircraft being configured to be forwardly propelled toward said longitudinal forward flight direction by at least one longitudinal rearward thrust ejected from said aircraft substantially toward said longitudinal rearward direction, wherein said electrically powered fan module comprises at least two fan stages in series flow, said at least two fan stages in series flow including at least a 1st fan stage spinning at a 1st fan stage rotational velocity and a 2nd fan stage spinning at a 2nd fan stage rotational velocity, wherein said 1st fan stage feeds air to said 2nd fan stage, and wherein a ratio of said 2nd fan stage rotational velocity to said 1st fan stage rotational velocity is greater than 1.5; wherein said electrically powered fan module expels fan module exhaust air into at least one air duct or air duct system that conducts said exhaust air away from said electrically powered fan module and ejects said exhaust air out of said aircraft for thrust to accelerate said aircraft toward said longitudinal forward flight direction, or toward said upward direction, or simultaneously toward both said forward direction and said upward direction, or toward said longitudinal rearward direction; and the first fan stage comprising a first diagonal fan having an outlet diameter greater than an inlet diameter, and the second fan stage comprising a second diagonal fan having an outlet diameter greater than an inlet diameter, and the inlet diameter of the second diagonal fan approximately equal to the outlet diameter of the first diagonal fan;

wherein the first and stage and second fan stage are placed end-to-end with the outlet of the first fan stage adjacent to the inlet of the second fan stage.

17. The aircraft of claim 16, wherein said electrically powered fan module impels said fan module exhaust air, wherein said electrically powered fan module comprises a rotational axis and an axial direction parallel to said rotational axis, and wherein said fan module has a plane of rotation and is configured to impel exhaust air in directions tangent to the plane of rotation; wherein when said electrically powered fan module expels said exhaust air into said at least one air duct or air duct system, said air duct or air duct system conducts said exhaust air away from said electrically powered fan module substantially along a tangential direction.

18. The aircraft of claim 16, wherein said electrically powered fan module comprises an air intake comprising an intake area which is the total measure of an open cross-sectional area of said air intake, through which all air that passes into the electrically powered fan module must pass; wherein said air duct or air duct system has an air-duct cross-sectional area that passes 100% of said exhaust air out of said aircraft during an operating state; wherein a ratio of said intake area to said air-duct cross-sectional area is greater than 5:1.

19. The aircraft of claim 16, wherein said air duct leads to a splitter module that ejects said air directly downwardly along said downward direction to accelerate said aircraft upward toward said upward direction, and said splitter module can be manipulated to eject air rearwardly along said longitudinal rearward direction to create said longitudinal rearward thrust to accelerate said aircraft toward said longitudinal forward flight direction.

20. The aircraft of claim 16, wherein said 1st fan stage spins in a 1st fan stage rotational direction, and wherein at least one of said aircraft and said electrically powered fan module comprises at least one flywheel module spinning in a flywheel module rotational direction that is opposite to said 1st fan stage rotational direction, wherein said 1st fan stage has a 1st fan stage axis of rotation and said flywheel module has a flywheel module axis of rotation wherein said 1st fan stage axis of rotation is also said flywheel module axis of rotation.

21. The aircraft of claim 16, wherein said 1st fan stage comprises a 1st diagonal fan and said 2nd fan stage comprises a 2nd diagonal fan, wherein said 2nd diagonal fan is placed coaxial with and adjacent to said 1st diagonal fan such that air continuously passes through said 1st diagonal fan to said 2nd diagonal fan and then through said 2nd diagonal fan along an unbroken helical path.

22. An aircraft comprising an electrically powered fan module, said aircraft further comprising a longitudinal forward flight direction and a longitudinal rearward direction parallel to said longitudinal forward flight direction and opposite to said longitudinal forward flight direction, said aircraft further comprising a vertical downward direction that is orthogonal to said longitudinal forward flight direction and toward the Earth and a vertical upward direction that is also orthogonal to said longitudinal forward flight direction and opposite to said downward direction; said aircraft being configured to be forwardly propelled toward said longitudinal forward flight direction by at least one longitudinal rearward thrust ejected from said aircraft substantially toward said longitudinal rearward direction, wherein;

said electrically powered fan module impels an exhaust air, wherein said electrically powered fan module comprises a rotational axis and an axial direction parallel to said rotational axis;

said electrically powered fan module expels said exhaust air into at least one air duct that conducts said exhaust air away from said electrically powered fan module substantially along a tangential direction; and wherein said electrically powered fan module comprises at least one fan stage including a 1st fan stage spinning in a 1st fan stage rotational direction, and wherein at least one of said aircraft and said electrically powered fan module comprises at least one flywheel module spinning in a flywheel module rotational direction that is opposite to said 1st fan stage rotational direction, wherein said 1st fan stage has a 1st fan stage axis of rotation and said flywheel module has a flywheel module axis of rotation wherein said 1st fan stage axis of rotation is also said flywheel module axis of rotation.

* * * * *